US012180414B2

(12) United States Patent
Willett et al.

(10) Patent No.: US 12,180,414 B2
(45) Date of Patent: Dec. 31, 2024

(54) DOWNSTREAM USES FOR BRIQUETTES AND OTHER FORMS OF POWDER FROM ASPHALT SHINGLE WASTE

(71) Applicant: BMIC LLC, Dallas, TX (US)

(72) Inventors: Adam Willett, Dallas, TX (US); Ann Hamer, Waxahachie, TX (US); Denis Muki Tibah, Waxahachie, TX (US); Parminder Agarwal, Skillman, NJ (US); Alan Eaton, Parsippany, NJ (US); Gregory Becht, Parsippany, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/536,994

(22) Filed: Dec. 12, 2023

(65) Prior Publication Data

US 2024/0191125 A1 Jun. 13, 2024

Related U.S. Application Data

(60) Provisional application No. 63/517,513, filed on Aug. 3, 2023, provisional application No. 63/477,087, filed on Dec. 23, 2022, provisional application No. 63/387,046, filed on Dec. 12, 2022.

(51) Int. Cl.
*C08L 95/00* (2006.01)
*C09K 8/12* (2006.01)

(52) U.S. Cl.
CPC ................ *C09K 8/12* (2013.01); *C08L 95/00* (2013.01); *C08L 2555/34* (2013.01); *C08L 2555/52* (2013.01)

(58) Field of Classification Search
CPC ..... C08L 95/00; C08L 95/005; C08L 2555/34
See application file for complete search history.

(56) References Cited

U.S. PATENT DOCUMENTS

| | | | |
|---|---|---|---|
| 3,026,568 | A | 3/1962 | Moar |
| 4,352,837 | A | 10/1982 | Kopenhaver |
| 4,706,893 | A | 11/1987 | Brock |

(Continued)

FOREIGN PATENT DOCUMENTS

| | | | |
|---|---|---|---|
| WO | 2363387 | A1 | 5/2002 |
| WO | 20315871 | U1 | 12/2003 |

(Continued)

*Primary Examiner* — Alexandra M Moore
(74) *Attorney, Agent, or Firm* — GREENBERG TRAURIG, LLP

(57) ABSTRACT

Downstream uses for briquettes and other forms of asphalt shingle waste are provided. A composition is provided. The composition comprises 5% to 50% by weight of an asphalt shingle waste based on a total weight of the composition, wherein the asphalt shingle waste comprises a waste asphalt; 1% to 25% by weight of at least one filler material based on the total weight of the composition; 1% to 15% by weight of at least one polymer based on the total weight of the composition; 1% to 10% by weight of at least one stabilizer based on the total weight of the composition; and 1% to 15% by weight of at least one surfactant based on the total weight of the composition. A drilling fluid, various other asphalt products, and related methods are also provided, among other things.

30 Claims, 5 Drawing Sheets

(56) References Cited

U.S. PATENT DOCUMENTS

| | | | | |
|---|---|---|---|---|
| 5,098,025 | A * | 3/1992 | Drouin | C10C 3/007 241/23 |
| 5,209,802 | A | 5/1993 | Hannah et al. | |
| 5,385,426 | A | 1/1995 | Omann | |
| 5,397,389 | A * | 3/1995 | Glynn, Jr. | E01C 19/1004 588/257 |
| 5,718,787 | A | 2/1998 | Gallagher et al. | |
| 5,848,755 | A | 12/1998 | Zickell et al. | |
| 6,120,838 | A | 9/2000 | Zickell | |
| 6,441,065 | B1 | 8/2002 | Chevillard et al. | |
| 6,497,930 | B1 | 12/2002 | Petermeier | |
| 6,743,313 | B2 | 6/2004 | Mischo | |
| 6,984,670 | B2 | 1/2006 | Meyers, III et al. | |
| 7,052,635 | B2 | 5/2006 | Mischo | |
| 7,202,290 | B2 | 4/2007 | Stuart et al. | |
| 7,297,301 | B1 | 11/2007 | Deschamps et al. | |
| 7,487,931 | B2 | 2/2009 | Monyak | |
| 7,758,686 | B2 | 7/2010 | Michel | |
| 7,891,590 | B2 | 2/2011 | Rasmussen | |
| 7,900,266 | B1 | 3/2011 | Longcor | |
| 7,913,940 | B2 | 3/2011 | Harmon | |
| 7,951,417 | B1 | 5/2011 | Wen et al. | |
| 8,034,172 | B2 | 10/2011 | Naidoo et al. | |
| 8,083,166 | B2 | 12/2011 | Gould et al. | |
| 8,162,242 | B2 | 4/2012 | Hofmann et al. | |
| 8,177,152 | B2 | 5/2012 | Harmon | |
| 8,186,610 | B2 | 5/2012 | Gould et al. | |
| 8,192,539 | B2 | 6/2012 | Barger et al. | |
| 8,198,350 | B2 | 6/2012 | Fee et al. | |
| 8,210,458 | B2 | 7/2012 | Strasser et al. | |
| 8,298,331 | B2 | 10/2012 | Ribeiro | |
| 8,382,362 | B2 | 2/2013 | Omann | |
| 8,388,873 | B2 | 3/2013 | Hofmann et al. | |
| 8,444,759 | B2 | 5/2013 | Wen et al. | |
| 8,470,275 | B2 | 6/2013 | Constantz et al. | |
| 8,490,338 | B2 | 7/2013 | Longo | |
| 8,496,196 | B2 | 7/2013 | Zickell et al. | |
| 8,672,248 | B2 | 3/2014 | Zickell et al. | |
| 8,783,590 | B2 | 7/2014 | Zickell et al. | |
| 8,784,554 | B2 | 7/2014 | Naidoo et al. | |
| 8,789,773 | B2 | 7/2014 | Teeter, Jr. et al. | |
| 8,821,064 | B1 | 9/2014 | Morris | |
| 8,919,681 | B1 | 12/2014 | Horton et al. | |
| 8,940,360 | B1 | 1/2015 | Brasier et al. | |
| 9,115,284 | B2 | 8/2015 | Davis et al. | |
| 9,156,035 | B1 | 10/2015 | Horton et al. | |
| 9,227,196 | B2 | 1/2016 | Hassan et al. | |
| 9,273,228 | B1 | 3/2016 | Hyer et al. | |
| 9,279,255 | B2 | 3/2016 | Bryson et al. | |
| 9,295,992 | B2 | 3/2016 | Zickell | |
| 9,382,423 | B2 | 7/2016 | Bolton et al. | |
| 9,440,239 | B1 | 9/2016 | Horton et al. | |
| 9,457,354 | B2 | 10/2016 | Svec et al. | |
| 9,458,320 | B2 | 10/2016 | Blyth et al. | |
| 9,493,633 | B2 | 11/2016 | Rowland et al. | |
| 9,493,653 | B2 | 11/2016 | Rowe et al. | |
| 9,550,311 | B1 | 1/2017 | Neel | |
| 9,605,152 | B2 | 3/2017 | Ruan et al. | |
| 9,637,615 | B2 | 5/2017 | Fini | |
| 9,745,472 | B2 | 8/2017 | Salmonsen et al. | |
| 9,765,280 | B2 | 9/2017 | Kurth et al. | |
| 9,790,360 | B2 | 10/2017 | Puchalski et al. | |
| 9,834,895 | B2 | 12/2017 | Neel | |
| 9,855,677 | B2 | 1/2018 | Brock et al. | |
| 9,856,377 | B1 | 1/2018 | Krivohlavek | |
| 9,862,861 | B2 | 1/2018 | Boddy et al. | |
| 9,926,102 | B2 | 3/2018 | Baker et al. | |
| 9,944,796 | B1 | 4/2018 | Grzybowski | |
| 9,951,223 | B2 | 4/2018 | Gillespie et al. | |
| 9,951,224 | B2 | 4/2018 | Russell | |
| 9,963,837 | B1 | 5/2018 | Gilpin et al. | |
| 9,994,485 | B2 | 6/2018 | Warner et al. | |
| 10,000,463 | B2 | 6/2018 | Iwase et al. | |
| 10,000,487 | B2 | 6/2018 | Sprengeler et al. | |
| 10,000,551 | B2 | 6/2018 | Shaaltiel et al. | |
| 10,000,890 | B2 | 6/2018 | Nonni et al. | |
| 10,018,986 | B2 | 7/2018 | Richard | |
| 10,023,782 | B2 | 7/2018 | Wang et al. | |
| 10,030,338 | B2 | 7/2018 | Dempsey et al. | |
| 10,060,085 | B2 | 8/2018 | Christian | |
| 10,076,759 | B1 | 9/2018 | Christian | |
| 10,077,356 | B2 | 9/2018 | Fini | |
| 10,155,866 | B2 | 12/2018 | Le et al. | |
| 10,190,265 | B2 | 1/2019 | Dempsey et al. | |
| 10,196,585 | B2 | 2/2019 | Kurth et al. | |
| 10,196,783 | B2 | 2/2019 | Dempsey et al. | |
| 10,202,533 | B2 | 2/2019 | Wang et al. | |
| 10,214,364 | B2 | 2/2019 | Grathwol | |
| 10,288,349 | B2 | 5/2019 | Swanson | |
| 10,294,616 | B2 | 5/2019 | Crupi et al. | |
| 10,316,189 | B2 | 6/2019 | Kurth et al. | |
| 10,316,190 | B2 | 6/2019 | Kurth et al. | |
| 10,316,192 | B2 | 6/2019 | Kurth et al. | |
| 10,323,149 | B2 | 6/2019 | Russell | |
| 10,329,426 | B2 | 6/2019 | Kurth et al. | |
| 10,336,906 | B2 | 7/2019 | Lewandowski et al. | |
| 10,337,153 | B2 | 7/2019 | Hoffmann et al. | |
| 10,358,588 | B2 | 7/2019 | Subotic et al. | |
| 10,416,057 | B2 | 9/2019 | Mohseni | |
| 10,485,381 | B2 | 11/2019 | Fortmann et al. | |
| 10,550,574 | B2 | 2/2020 | Hong et al. | |
| 10,611,938 | B2 | 4/2020 | Croteau et al. | |
| 10,683,620 | B1 | 6/2020 | Kelley et al. | |
| 10,858,790 | B1 | 12/2020 | Kelley et al. | |
| 11,059,976 | B2 | 7/2021 | Franzen et al. | |
| 11,401,449 | B2 | 8/2022 | Kelley et al. | |
| 11,499,276 | B2 | 11/2022 | Kelley et al. | |
| 11,802,228 | B2 | 10/2023 | Kelley et al. | |
| 2002/0066813 | A1 | 6/2002 | Mischo | |
| 2005/0250399 | A1 | 11/2005 | Kuhn et al. | |
| 2008/0184661 | A1 | 8/2008 | Lombard | |
| 2008/0314803 | A1 | 12/2008 | Burke | |
| 2010/0064937 | A1 | 3/2010 | Harmon et al. | |
| 2010/0307380 | A1 | 12/2010 | Fader | |
| 2011/0041731 | A1 | 2/2011 | Lombard | |
| 2011/0233105 | A1 * | 9/2011 | Bailey | C09D 195/00 106/272 |
| 2013/0199410 | A1 | 8/2013 | Maldonado et al. | |
| 2013/0220175 | A1 | 8/2013 | Zickell | |
| 2013/0307172 | A1 | 11/2013 | Seder et al. | |
| 2013/0313344 | A1 | 11/2013 | Nykulin et al. | |
| 2014/0014000 | A1 | 1/2014 | Franzen et al. | |
| 2014/0269143 | A1 | 9/2014 | Gencer | |
| 2014/0299018 | A1 | 10/2014 | Elseifi et al. | |
| 2014/0331897 | A1 | 11/2014 | Elseifi | |
| 2014/0373749 | A1 | 12/2014 | Zickell et al. | |
| 2015/0252534 | A1 | 9/2015 | Dempsey et al. | |
| 2016/0362338 | A1 | 12/2016 | Reinke et al. | |
| 2016/0362339 | A1 | 12/2016 | Franzen et al. | |
| 2018/0030276 | A1 | 2/2018 | De Garavilla et al. | |
| 2018/0141866 | A1 | 5/2018 | Kotefski et al. | |
| 2018/0186963 | A1 | 7/2018 | Kotefski et al. | |
| 2018/0208771 | A1 | 7/2018 | Gillespie et al. | |
| 2018/0243798 | A1 | 8/2018 | Abraham et al. | |
| 2018/0334620 | A1 | 11/2018 | Kotefski et al. | |
| 2019/0039105 | A1 | 2/2019 | Burns, Sr. et al. | |
| 2019/0194461 | A1 * | 6/2019 | Koleas | C08L 91/00 |
| 2019/0300427 | A1 | 10/2019 | Horton | |
| 2019/0375940 | A1 | 12/2019 | Franzen et al. | |
| 2021/0032161 | A1 | 2/2021 | Gue et al. | |

FOREIGN PATENT DOCUMENTS

| | | | |
|---|---|---|---|
| WO | 2363387 | C | 9/2005 |
| WO | 2018/091769 | A1 | 5/2018 |
| WO | 2018/094315 | A2 | 5/2018 |
| WO | 2018/125952 | A2 | 7/2018 |
| WO | 2019/134729 | A1 | 7/2019 |
| WO | 2009/150519 | A1 | 8/2019 |
| WO | 2021/051619 | | 3/2021 |

* cited by examiner

DOWNSTREAM USES FOR BRIQUETTES AND OTHER FORMS OF POWDER FROM ASPHALT SHINGLE WASTE

CROSS-REFERENCE TO RELATED APPLICATIONS

This application claims priority to and benefit of U.S. Provisional Patent Application No. 63/387,046, filed Dec. 12, 2022 and entitled "DOWNSTREAM USES FOR BRIQUETTES AND OTHER FORMS OF POWDER FROM ASPHALT SHINGLE WASTE," U.S. Provisional Patent Application No. 63/477,087, filed Dec. 23, 2022 and entitled "DOWNSTREAM USES FOR BRIQUETTES AND OTHER FORMS OF POWDER FROM ASPHALT SHINGLE WASTE," and U.S. Provisional Patent Application No. 63/517,513, filed Aug. 3, 2023 and entitled "DOWNSTREAM USES FOR BRIQUETTES AND OTHER FORMS OF POWDER FROM ASPHALT SHINGLE WASTE," the entirety of which is herein incorporated by reference.

FIELD

In some embodiments, the present disclosure relates to downstream uses for briquettes and other forms of powder from asphalt shingle waste, and related systems and related methods.

BACKGROUND

Approximately 11 million tons of asphalt shingle waste (ASW) are generated in the U.S. each year. ASW can take hundreds of years to decompose in a landfill. Accordingly, ASW presents a major environmental problem. Improved methods of processing ASW are needed.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments relate to a composition. In some embodiments, the composition comprises 5% to 50% by weight of an asphalt shingle waste based on a total weight of the composition. In some embodiments, the asphalt shingle waste comprises a waste asphalt. In some embodiments, the composition comprises 1% to 25% by weight of at least one filler material based on the total weight of the composition. In some embodiments, the composition comprises 1% to 15% by weight of at least one polymer based on the total weight of the composition. In some embodiments, the composition comprises 1% to 10% by weight of at least one stabilizer based on the total weight of the composition. In some embodiments, the composition comprises 1% to 15% by weight of at least one surfactant based on the total weight of the composition.

In some embodiments, the composition comprises 15% to 35% by weight of the asphalt shingle waste based on the total weight of the composition.

In some embodiments, the composition comprises 1% to 10% by weight of the at least one filler material based on the total weight of the composition.

In some embodiments, the composition comprises 2% to 10% by weight of the at least one polymer based on the total weight of the composition.

In some embodiments, the composition comprises 1% to 5% by weight of the at least one stabilizer based on the total weight of the composition.

In some embodiments, the composition comprises 1% to 10% by weight of the at least one surfactant based on the total weight of the composition.

In some embodiments, the asphalt shingle waste further comprises a limestone, granules, and impurities.

In some embodiments, the at least one polymer comprises a styrenic block copolymer.

In some embodiments, the at least one polymer comprises at least one of a poly(styrene-isoprene-styrene) (SIS), a poly(styrene-butadiene-styrene) (SBS), a poly(styrene-ethylene/butylene-styrene) (SEBS), a poly(styrene-ethylene/propylene-styrene) (SEPS), a styrene-butadiene rubber (SBR), or any combination thereof.

In some embodiments, the at least one stabilizer comprises at least one of a microcrystalline cellulose, a xanthan gum, a carboxymethyl cellulose (CMC), an alginate, a pectin, a guar gum, or any combination thereof.

In some embodiments, the at least one surfactant comprises at least one of a cationic emulsifier, an anionic emulsifier, or any combination thereof.

In some embodiments, the composition is substantially free of a non-waste asphalt.

In some embodiments, the composition is free of a non-waste asphalt.

In some embodiments, when the composition is located between a roofing material and a roofing substrate and, when tested at a thickness of 30 mils according to ASTM D413, the composition exhibits a peel strength between the roofing material and the roofing substrate of 5 PLI to 25 PLI.

In some embodiments, when tested according to ASTM 831, the composition exhibits a coefficient of thermal expansion that is 1% to 20% less than a coefficient of thermal expansion of a control composition, wherein the control composition does not comprise an asphalt shingle waste.

Some embodiments relate to a method of making a composition. In some embodiments, the method comprises obtaining a plurality of briquettes, at least one filler material, at least one polymer, at least one stabilizer, and at least one surfactant. In some embodiments, the plurality of briquettes comprises an asphalt shingle waste. In some embodiments, the asphalt shingle waste comprises a waste asphalt. In some embodiments, the method comprises feeding at least one of the plurality of briquettes, the at least one filler material, the at least one polymer, the at least one stabilizer, the at least one surfactant, or any combination thereof, to a mixer. In some embodiments, the method comprises mixing at least one of the plurality of briquettes, the at least one filler material, the at least one polymer, the at least one stabilizer, the at least one surfactant, or any combination thereof, in the mixer to form a composition. In some embodiments, the composition comprises 5% to 50% by weight of the asphalt shingle waste based on a total weight of the composition. In some embodiments, the composition comprises 1% to 25% by weight of the at least one filler material based on the total weight of the composition. In some embodiments, the composition comprises 1% to 15% by weight of the at least one polymer based on the total weight of the composition. In some embodiments, the composition comprises 1% to 10% by weight of the at least one stabilizer based on the total weight of the composition. In some embodiments, the composition comprises 1% to 15% by weight of the at least one surfactant based on the total weight of the composition.

In some embodiments, the asphalt shingle waste further comprises a limestone, granules, and impurities.

In some embodiments, the asphalt shingle waste is substantially free of a non-waste asphalt.

In some embodiments, the asphalt shingle waste is free of a non-waste asphalt.

Some embodiments relate to a making a composition. In some embodiments, the method comprises obtaining at least one of an asphalt shingle waste powder, at least one filler material, at least one polymer, at least one stabilizer, at least one surfactant, or any combination thereof. In some embodiments, the asphalt shingle waste powder comprises an asphalt shingle waste. In some embodiments, the asphalt shingle waste comprises a waste asphalt. In some embodiments, the method comprises feeding at least one of the asphalt shingle waste powder, the at least one filler material, the at least one polymer, the at least one stabilizer, the at least one surfactant, or any combination thereof, to a mixer. In some embodiments, the method comprises mixing at least one of the asphalt shingle waste powder, the at least one filler material, the at least one polymer, the at least one stabilizer, the at least one surfactant, or any combination thereof, in the mixer to form a composition. In some embodiments, the composition comprises 5% to 50% by weight of the asphalt shingle waste based on a total weight of the composition. In some embodiments, the composition comprises 1% to 25% by weight of the at least one filler material based on the total weight of the composition. In some embodiments, the composition comprises 1% to 15% by weight of the at least one polymer based on the total weight of the composition. In some embodiments, the composition comprises 1% to 10% by weight of the at least one stabilizer based on the total weight of the composition. In some embodiments, the composition comprises 1% to 15% by weight of the at least one surfactant based on the total weight of the composition.

In some embodiments, prior to obtaining the asphalt shingle waste powder, the method comprises obtaining a plurality of briquettes, and forming the plurality of briquettes into the asphalt shingle waste powder. In some embodiments, the plurality of briquettes comprises a pressurized asphalt shingle waste powder.

In some embodiments, the asphalt shingle waste further comprises a limestone, granules, and impurities.

In some embodiments, the asphalt shingle waste is substantially free of a non-waste asphalt.

Some embodiments relate to a drilling fluid. In some embodiments, the drilling fluid comprises 1% to 10% by weight of at least one rheology modifier based on a total weight of the drilling fluid. In some embodiments, the drilling fluid comprises 1% to 10% by weight of at least one fluid loss reducer based on the total weight of the drilling fluid. In some embodiments, the drilling fluid comprises 1% to 20% by weight of an asphalt shingle waste based on a total weight of the drilling fluid. In some embodiments, the asphalt shingle waste comprises a waste asphalt.

In some embodiments, the drilling fluid comprises 1% to 5% by weight of the at least one rheology modifier based on the total weight of the drilling fluid.

In some embodiments, the drilling fluid comprises 1% to 5% by weight of the at least one fluid loss reducer based on the total weight of the drilling fluid.

In some embodiments, the drilling fluid comprises 1% to 10% by weight of the asphalt shingle waste based on the total weight of the drilling fluid.

In some embodiments, the at least one rheology modifier comprises at least one hydrocolloid.

In some embodiments, the at least one fluid loss reducer comprises gilsonite.

In some embodiments, the asphalt shingle waste is different from the at least one rheology modifier, wherein the asphalt shingle waste is different from the at least one fluid loss reducer.

Some embodiments relate to a membrane. In some embodiments, the membrane comprises a first layer. In some embodiments, the membrane comprises a second layer. In some embodiments, the second layer is located on the first layer. In some embodiments, the second layer comprises 25% to 75% by weight of an asphalt based on a total weight of the second layer. In some embodiments, the asphalt comprises a waste asphalt. In some embodiments, the second layer comprises 0.1% to 20% by weight of at least one polymer based on the total weight of the second layer. In some embodiments, the second layer comprises 0.1% to 40% by weight of at least one filler material based on the total weight of the second layer. In some embodiments, the at least one filler material comprises a waste filler.

In some embodiments, the asphalt comprises 1% to 99% by weight of the waste asphalt based on a total weight of the asphalt.

In some embodiments, the asphalt comprises 1% to 99% by weight of the waste asphalt based on a total weight of the asphalt. In some embodiments, the asphalt comprises 1% to 99% by weight of a non-waste asphalt based on the total weight of the asphalt.

In some embodiments, the waste filler comprises a waste limestone, waste granules, and waste impurities.

In some embodiments, the at least one filler material comprises 1% to 99% by weight of the waste filler based on a total weight of the at least one filler material.

In some embodiments, the at least one filler material comprises 1% to 99% by weight of the waste filler based on a total weight of the at least one filler material. In some embodiments, the waste filler comprises a waste limestone, waste granules, and waste impurities. In some embodiments, the at least one filler material comprises 1% to 99% by weight of a non-waste filler based on the total weight of the at least one filler material. In some embodiments, the non-waste filler comprises a non-waste limestone.

In some embodiments, the at least one polymer comprises at least one of a thermoplastic polyolefin, a styrenic block copolymer, or any combination thereof.

In some embodiments, the at least one polymer comprises at least one of an isotactic polypropylene, an atactic polypropylene, a poly(styrene-isoprene-styrene) (SIS), a poly(styrene-butadiene-styrene) (SBS), a poly(styrene-ethylene/butylene-styrene) (SEBS), a poly(styrene-ethylene/propylene-styrene) (SEPS), a styrene-butadiene rubber (SBR), or any combination thereof.

In some embodiments, the second layer is substantially free of a non-waste asphalt.

In some embodiments, the second layer is free of a non-waste asphalt.

BRIEF DESCRIPTION OF THE DRAWINGS

Some embodiments of the disclosure are herein described, by way of example only, with reference to the accompanying drawings. With specific reference now to the drawings in detail, the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
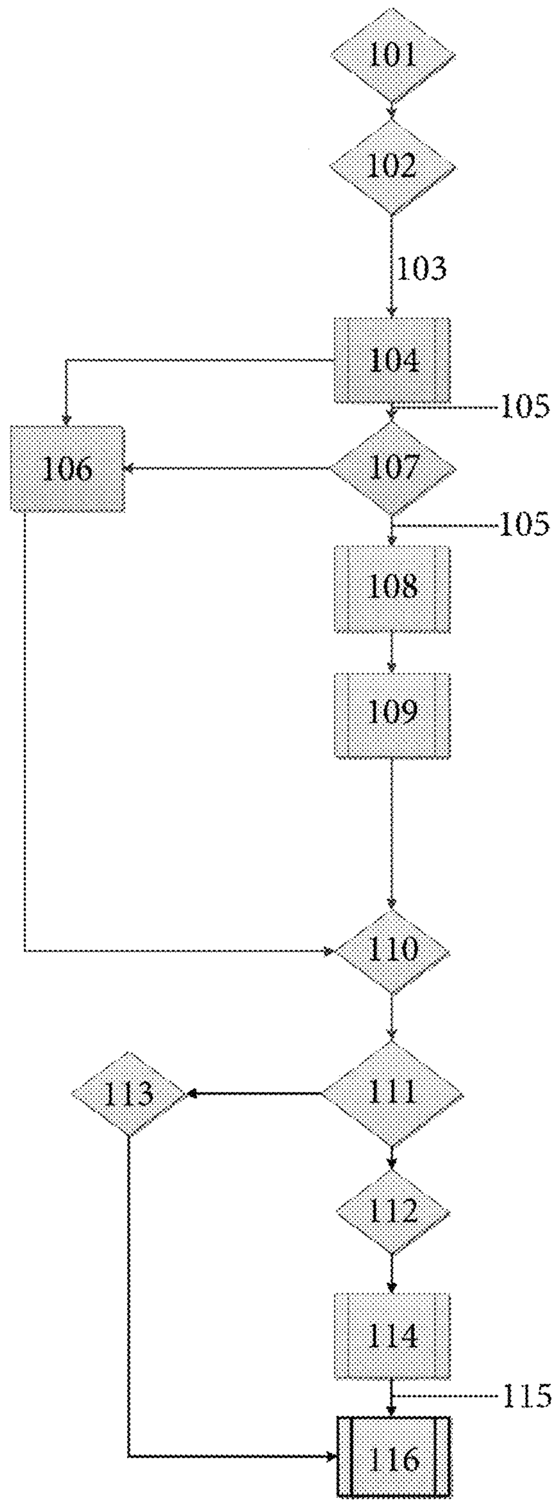
FIG. 1 is a flow diagram depicting an exemplary method of forming asphalt shingle waste (ASW) powder from asphalt shingle waste (ASW), according to some embodiments.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

All prior patents, publications, and test methods referenced herein are incorporated by reference in their entireties.

Definitions

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "asphalt shingle waste" is defined as any form of discarded asphalt shingle. "Asphalt shingle waste" includes, but is not limited to, post-manufacturing waste and post-consumer waste, such as recycled asphalt shingles, whether or not installed on a roof.

As used herein, the term "post-consumer waste" is defined as any waste produced by an end consumer of a material stream. A non-limiting example of "post-consumer waste" is a discarded roofing shingle from a residential or commercial roof. Another non-limiting example of "post-consumer waste" is contractor waste including, but not limited to, surplus new material, damaged material, and scrap from cut shingles during installation. Yet another non-limiting example of "post-consumer waste" is at least one of: distributor waste, retail waste, or any combination thereof, including, but not limited to, damaged shingle products, aged inventory of shingles, and customer returns.

As used herein, the term "post-manufacturing waste" is defined as waste produced prior to reaching the end consumer of a material stream. A non-limiting example of "post-manufacturing waste" is any shingle waste generated during the production, handling, transportation or other method of generation prior to installation on a roof of a consumer. Post-manufacturing waste may include production waste such as, but not limited to, partial shingles and coated fiberglass mat with or without granules.

As used herein, the term "grinding" is the reduction of particles by size. Non-limiting examples of grinding include, but are not limited to, crushing, shredding, chopping, milling (e.g., hammermilling), the like, and combinations thereof.

As used herein, the term "screening" is the separation of particles by size. Non-limiting examples of screening include, but are not limited to, vibratory screening, rotary screening, the like, and combinations thereof.

As used herein, the term "screener" is a screening device that is configured to perform at least one screening step.

As used herein, the term "rotary screener" is any type of screening device that separates particles by size through rotation of at least a portion of the screening device.

As used herein, the term "trommel screener" is a rotary screening device that includes a rotating drum. Trommel screeners are not vibratory screeners. In some embodiments, a trommel screener separates particles by size as the particles pass through the rotating drum. In some embodiments, particles that are smaller than openings in the drum fall through the openings. In some embodiments, particles that are larger than the openings in the drum do not fall through the openings.

As used herein, the term "vibratory screener" is any type of screening device that separates particles by size through vibration of at least a portion of the screening device.

As used herein, the term "sizing shaker" is a type of vibratory screener that includes at least one vibrating tray. In some embodiments, a sizing shaker separates particles by size as the at least one vibrating tray vibrates. In some embodiments, particles that are smaller than openings in the tray fall through the openings. In some embodiments, particles that are larger than the openings in the tray do not fall through the openings. In some embodiments, a sizing shaker includes at least one ball tray.

As used herein, the term "ball tray" is a tray that includes balls within one or more compartments of the tray. In some embodiments, at least one ball tray may be placed underneath the at least one vibrating tray of a vibratory screener (e.g., a sizing shaker) to reduce clogging of particles within the openings of the tray. In some embodiments, as the at least one vibrating tray vibrates, the balls of the at least one ball tray strike an underside of the vibrating tray, thereby dislodging the clogged particles.

As used herein, the term "air separator" is a device configured to receive a suspension of particles in air and separate the particles by at least one of, size, density or a combination thereof. In some embodiments, an "air separator" may include at least one of a "cyclone air separator" or a "mechanical air separator." In some embodiments, a "cyclone air separator" can operate in a vertically oriented configuration (i.e., with a top of the cyclone air separator pointing towards the sky and with a bottom of the cyclone air separator pointing towards the ground). In some embodiments, the suspension of particles may be introduced into a chamber, such that flow of the suspension into the chamber creates a spiral vortex. In some embodiments, a "mechanical air separator" includes one or more spinning blades (e.g., centrifugally rotating blades). In some embodiments, a fraction of particles from the suspension pass through the spinning blades, while a remainder of the particles from the suspension do not pass through the plurality of spinning blades.

As used herein, the term "wet extraction steps" are steps that include, but are not limited to, at least one of: the introduction of a solvent into a mixture of particles, the formation of a liquid from a mixture of particles, or any combination thereof.

As used herein, the term "dry grinding steps" are grinding steps that do not include wet extraction steps.

As used herein, the term "average particle size" is defined as "the smallest size sieve openings according to the U.S. Standard Test Sieve Series where 90% of the particles pass through the sieve." For example, particles having an average particle size of 425 microns means at least 90% of the particles pass through a 40 U.S. Standard Test Sieve having 425 micron sieve openings and less than 90% of the particles pass through a 45 U.S. Standard Test Sieve having 355 micron sieve openings.

As used herein, the term "granule liberator" is any device configured to separate granules from a mixture of particles, a powder, or any combination thereof. A non-limiting example of a granule liberator is a rotary impact separator (RIS). Other non-limiting examples of granule liberators include any size separation device described herein, or any density separation device described herein.

As used herein, the term "rotary impact separator" is a device having rotating elements attached to a central shaft, such that the device is configured to impact feed material. In some embodiments, the rotating elements may include, but are not limited to paddles, chains, knives, or other shapes. In some embodiments, the rotating elements may be located at one or more locations along the central shaft to facilitate impact of the feed material. In some embodiments, the rotary impact separator may further include screens on at least one of the bottom or the sides of the unit to collect the impacted material. In some embodiments, after collection, the impacted material exits the rotary impact separator via an exit chute or equivalent. In some embodiments, the rotary impact separator may further include dams, baffles, breakers, and adjustable gates. In some embodiments, the rotary impact separator can also be used to help control flow and residence time of the material within the unit. A non-limiting example of a rotary impact separator according to certain embodiments is shown in U.S. Patent Application Publication No. 2017/0305038, which is incorporated by reference in its entirety.

As used herein, the term "powder" is a mixture of particles produced by size reduction steps including, but not limited to, grinding, crushing, or disintegration, the like, or any combination thereof, of a solid substance.

As used herein, the term "asphalt shingle waste (ASW) powder" is a mixture of particles produced by size reduction steps including, but not limited to, grinding, crushing, or disintegration, the like, or any combination thereof, of asphalt shingle waste.

As used herein, the term "scalping screen" is a screening device comprising a series of conveyor belts. In some embodiments, the scalping screen is configured to receive particles in various sizes and stockpile resulting screened particles off one or more ends of the conveyor belts.

As used herein, the term "lump breaker" is any device configured to de-agglomerate particles.

As used herein, the term "briquette" broadly refers to any solid agglomeration of particles that includes ASW powder, AC powder (as defined herein, infra), or any combination thereof. In some embodiments, a briquette may include a binding agent. In some embodiments, a briquette may exclude binding agents. In some embodiments, in any method step where an ASW powder, an AC powder, or any combination thereof is used, the ASW powder, an AC powder, or any combination thereof may be partially or completely replaced with a plurality of briquettes. In some embodiments, a briquette comprises a pressurized asphalt shingle waste powder from any form of discarded asphalt shingle. That is, for example, in some embodiments, the briquette is not a powder (e.g., a coarse powder, a fine powder, or any combination thereof).

As used herein the term "briquetting" refers to any process of forming a briquette. In some embodiments, a briquetting process may include the addition of a binding agent. In some embodiments, a briquetting process may exclude addition of any binding agents.

As used herein, the term "wet extraction steps" are steps that include, but are not limited to, at least one of: the introduction of a solvent into a mixture of particles, the formation of a liquid from a mixture of particles, or any combination thereof.

As used herein, the term "asphalt coating" is defined as any form of processed asphalt, where "processed asphalt" is formed by subjecting asphalt to at least one processing step. The at least one processing step can include, but is not limited to, oxidation, dehydrogenation, condensation, polymerization, the like, or any combination thereof.

As used herein, the term "asphalt containing (AC) powder" is a mixture of particles produced by size reduction steps including, but not limited to, grinding, crushing, or disintegration, the like, or any combination thereof, of at least one asphalt containing composition. Examples of AC powder include, but are not limited to, ASW powder, powders formed from processed asphalt, powders formed from unprocessed asphalt, or any combination or mixture thereof.

As used herein, the term "oxidized asphalt coating" is defined as a form of processed asphalt that is created by oxidizing asphalt. A non-limiting example of an oxidation procedure is air-blowing, in which air is blown into asphalt at a sufficient temperature (e.g., from 450° F. to 500° F.) to oxidize the asphalt. Other non-limiting examples of oxidation procedures are described in U.S. Pat. Nos. 7,901,563 and 9,556,383, each of which are incorporated by reference in their entireties.

As used herein, the term "virgin asphalt coating" is defined as a form of asphalt that has not been oxidized.

As used herein, the term "waste asphalt" refers to any form of asphalt that is obtained from asphalt shingle waste.

As used herein, the term "non-waste asphalt" refers to any form of asphalt that is not obtained from asphalt shingle waste. For example, in some embodiments, a non-waste asphalt comprises at least one of a product of petroleum refining, a product of atmospheric distillation, a product of vacuum distillation, a product of a solvent deasphalting unit, a residue of a vacuum tower bottoms (VTB), a product of a recycled asphalt stream (e.g., re-refined engine oil bottoms), a product of a recycled asphalt process, a product of direct distillation of petroleum, a product of propane deasphalting of petroleum fractions, or any combination thereof. In some embodiments, the non-waste asphalt comprises at least one of hot mix asphalt, warm mix asphalt, cold mix asphalt, sheet asphalt, high-modulus asphalt, or any combination thereof.

As used herein, the term "oxidized asphalt" refers to an asphalt that is (or has been) subjected to an oxidation or air blowing process. For example, in some embodiments, an oxidized asphalt refers to an asphalt that is (or has been) subjected to air blowing sufficient to undergo oxidation. A non-limiting example of an oxidation procedure is one in which air is blown into an asphalt at a sufficient temperature (e.g., from 450° F. to 500° F.) to oxidize the asphalt. Other non-limiting examples of oxidation procedures are described in U.S. Pat. Nos. 7,901,563 and 9,556,383, each of which are incorporated by reference in their entireties.

As used herein, the term "unoxidized asphalt" refers to an asphalt that is not (or has not been) subjected to an oxidation or air blowing process. For example, in some embodiments, an unoxidized asphalt refers to an asphalt that is not (or has not been) subjected to air blowing sufficient to undergo oxidation.

As used herein, the term "polymer modified asphalt coating" is defined as a form of processed asphalt that is created by adding at least one polymer to asphalt. A non-limiting example of a polymer modification procedure is emulsification, in which at least one polymer is mixed with asphalt at a sufficient temperature (e.g., from 250° F. to 350° F.) to form an emulsion. Other non-limiting examples of polymer modification procedures are described in U.S. Pat. No. 8,901,211, which is incorporated by reference in its entirety. In yet other embodiments, the polymer forms a colloid suspension, colloid solution, or dispersion with the asphalt.

As used herein, the term "waste filler" refers to any form of a filler material that is obtained from asphalt shingle waste. The term includes any one or more of the filler materials disclosed herein. In some embodiments, the waste filler comprises a limestone, granules, and impurities. In some embodiments, when the limestone, granules, and impurities are obtained from as asphalt shingle waste, the limestone, granules, and impurities are referred to as a waste limestone, waste granules, and waste impurities.

As used herein, the term "non-waste filler" refers to any form of a filler material that is not obtained from asphalt shingle waste. The term includes any one or more of the filler materials disclosed herein. In some embodiments, the non-waste filler comprises a non-waste limestone.

As used herein, the term "substantially free" of a substance refers to an amount of 5% by weight or less of a substance. The weight percentage may be based on a total weight of a composition, a product, or another basis as provided herein. The term includes compositions and/or products comprising none of the substance. In some embodiments, the term "substantially free" of a substance refers to an amount of 1% to 5% by weight of the substance. In some embodiments, the term "substantially free" of a substance refers to an amount of 1% to 4.5% by weight of the substance. In some embodiments, the term "substantially free" of a substance refers to an amount of 1% to 4% by weight of the substance. In some embodiments, the term "substantially free" of a substance refers to an amount of 1% to 3.5% by weight of the substance. In some embodiments, the term "substantially free" of a substance refers to an amount of 1% to 3% by weight of the substance. In some embodiments, the term "substantially free" of a substance refers to an amount of 1% to 2.5% by weight of the substance. In some embodiments, the term "substantially free" of a substance refers to an amount of 1% to 2% by weight of the substance. In some embodiments, the term "substantially free" of a substance refers to an amount of 1% to 1.5% by weight of the substance.

In some embodiments, the term "substantially free" of a substance refers to an amount of 1.5% to 5% by weight of the substance. In some embodiments, the term "substantially free" of a substance refers to an amount of 2% to 5% by weight of the substance. In some embodiments, the term "substantially free" of a substance refers to an amount of 2.5% to 5% by weight of the substance. In some embodiments, the term "substantially free" of a substance refers to an amount of 3% to 5% by weight of the substance. In some embodiments, the term "substantially free" of a substance refers to an amount of 3.5% to 5% by weight of the substance. In some embodiments, the term "substantially free" of a substance refers to an amount of 4% to 5% by weight of the substance. In some embodiments, the term "substantially free" of a substance refers to an amount of 4.5% to 5% by weight of the substance.

As used herein, the term "free" of a substance refers to an amount of 1% by weight or less of a substance. The weight percentage may be based on a total weight of a composition, a product, or another basis as provided herein. The term includes compositions and/or products comprising none of the substance. In some embodiments, the term "free" of a substance refers to an amount of 0.1% to 1% by weight of the substance. In some embodiments, the term "free" of a substance refers to an amount of 0.1% to 0.9% by weight of the substance. In some embodiments, the term "free" of a substance refers to an amount of 0.1% to 0.8% by weight of the substance. In some embodiments, the term "free" of a substance refers to an amount of 0.1% to 0.7% by weight of the substance. In some embodiments, the term "free" of a substance refers to an amount of 0.1% to 0.6% by weight of the substance. In some embodiments, the term "free" of a substance refers to an amount of 0.1% to 0.5% by weight of the substance. In some embodiments, the term "free" of a substance refers to an amount of 0.1% to 0.4% by weight of the substance. In some embodiments, the term "free" of a substance refers to an amount of 0.1% to 0.3% by weight of the substance. In some embodiments, the term "free" of a substance refers to an amount of 0.1% to 0.2% by weight of the substance.

In some embodiments, the term "free" of a substance refers to an amount of 0.2% to 1% by weight of the substance. In some embodiments, the term "free" of a substance refers to an amount of 0.3% to 1% by weight of the substance. In some embodiments, the term "free" of a substance refers to an amount of 0.4% to 1% by weight of the substance. In some embodiments, the term "free" of a substance refers to an amount of 0.5% to 1% by weight of the substance. In some embodiments, the term "free" of a substance refers to an amount of 0.6% to 1% by weight of the substance. In some embodiments, the term "free" of a substance refers to an amount of 0.7% to 1% by weight of the substance. In some embodiments, the term "free" of a substance refers to an amount of 0.8% to 1% by weight of the substance. In some embodiments, the term "free" of a substance refers to an amount of 0.9% to 1% by weight of the substance.

As used herein, the term "softening point" is the temperature at which a material softens beyond a predetermined reference softness. Softening point is measured herein according to ASTM-D-3461.

As used herein, the term "penetration point" is the vertical distance penetrated by the point of a standard needle into asphalt under specific conditions of load, time and temperature. Penetration point is measured herein according to ASTM D-5.

As used herein, the term "viscosity" is a measure of a fluid's resistance to flow at a given shear rate and temperature. Viscosity is measured herein in accordance with ASTM D-4402 by using a Brookfield LVT viscometer at 400° F. with a #31 spindle at 30 RPM.

Exemplary Methods of Processing Asphalt Shingle Waste (ASW)

Some embodiments of the present disclosure relate to methods of processing asphalt shingle waste (ASW).

In some embodiments, an exemplary method according to the present disclosure includes obtaining ASW. In some embodiments, the ASW comprises asphalt, limestone, granules, and impurities. In some embodiments, the ASW consists essentially of asphalt, limestone, granules, and impurities. In some embodiments, the ASW consists of asphalt, limestone, granules, and impurities. In some embodiments, the impurities comprise least one of: fiberglass mat sand, fines, marker paint, sealant, one or more adhesives, tape, plastic debris, paper debris, soil, woods, nails, or any combination thereof.

In some embodiments, an exemplary method according to the present disclosure comprises a step of grinding the ASW to form ground ASW. In some embodiments, the ground ASW may be stored for a period of time. In some such embodiments, the ground ASW may agglomerate. In some such embodiments, the ASW may be deagglomerated using a lump breaker.

In some embodiments, a portion of the ground ASW may have a sufficiently small particle size, such that this portion of the ground ASW may be fed directly to a downstream step of an exemplary method described herein. Put differently. In some embodiments, the portion of the ground ASW having the sufficiently small particle size may "skip" one or more downstream grinding or separation steps detailed herein. In some of such embodiments, the portion of the ground ASW that is sufficiently small in size may be separated from a remainder of the ground ASW using a scalping screen.

In some non-limiting embodiments, the sufficiently small size corresponds to an average particle size ranging from 2 microns to 425 microns. In some non-limiting embodiments, the sufficiently small size corresponds to an average particle size ranging from 5 microns to 425 microns. In some non-limiting embodiments, the sufficiently small size corresponds to an average particle size ranging from 10 microns to 425 microns. In some non-limiting embodiments, the sufficiently small size corresponds to an average particle size ranging from 25 microns to 425 microns. In some non-limiting embodiments, the sufficiently small size corresponds to an average particle size ranging from 50 microns to 425 microns. In some non-limiting embodiments, the sufficiently small size corresponds to an average particle size ranging from 100 microns to 425 microns. In some non-limiting embodiments, the sufficiently small size corresponds to an average particle size ranging from 200 microns to 425 microns. In some non-limiting embodiments, the sufficiently small size corresponds to an average particle size ranging from 300 microns to 425 microns. In some non-limiting embodiments, the sufficiently small size corresponds to an average particle size ranging from 400 microns to 425 microns.

In some non-limiting embodiments, the sufficiently small size corresponds to an average particle size ranging from 2 microns to 400 microns. In some non-limiting embodiments, the sufficiently small size corresponds to an average particle size ranging from 2 microns to 300 microns. In some non-limiting embodiments, the sufficiently small size corresponds to an average particle size ranging from 2 microns to 200 microns. In some non-limiting embodiments, the sufficiently small size corresponds to an average particle size ranging from 2 microns to 100 microns. In some non-limiting embodiments, the sufficiently small size corresponds to an average particle size ranging from 2 microns to 50 microns. In some non-limiting embodiments, the sufficiently small size corresponds to an average particle size ranging from 2 microns to 25 microns. In some non-limiting embodiments, the sufficiently small size corresponds to an average particle size ranging from 2 microns to 10 microns. In some non-limiting embodiments, the sufficiently small size corresponds to an average particle size ranging from 2 microns to 5 microns.

In some non-limiting embodiments, the sufficiently small size corresponds to an average particle size ranging from 5 microns to 400 microns. In some non-limiting embodiments, the sufficiently small size corresponds to an average particle size ranging from 10 microns to 300 microns. In some non-limiting embodiments, the sufficiently small size corresponds to an average particle size ranging from 25 microns to 200 microns. In some non-limiting embodiments, the sufficiently small size corresponds to an average particle size ranging from 50 microns to 100 microns.

In some embodiments, an exemplary method according to the present disclosure comprises screening the ground ASW with a rotary screener. In some embodiments, the rotary screener is a trommel screener. In some embodiments, an exemplary method according to the present disclosure does not comprise any steps of screening with a vibratory screener. In some embodiments, an exemplary method according to the present disclosure does not comprise any steps of screening with a screening device that comprises at least one ball tray. In some embodiments, an exemplary method according to the present disclosure does not comprise any steps of screening with a sizing shaker.

In some embodiments, the screening of the ground ASW with the rotary screener results in a first set of ASW particles and a second set of ASW particles.

In some embodiments, the first set of ASW particles has an average particle size of 425 microns to 6350 microns. In some embodiments, the first set of ASW particles has an average particle size of 500 microns to 6350 microns. In some embodiments, the first set of ASW particles has an average particle size of 750 microns to 6350 microns. In some embodiments, the first set of ASW particles has an average particle size of 1000 microns to 6350 microns. In some embodiments, the first set of ASW particles has an average particle size of 2000 microns to 6350 microns. In some embodiments, the first set of ASW particles has an average particle size of 5000 microns to 6350 microns. In some embodiments, the first set of ASW particles has an average particle size of 6000 microns to 6350 microns.

In some embodiments, the first set of ASW particles has an average particle size of 425 microns to 6000 microns. In some embodiments, the first set of ASW particles has an average particle size of 425 microns to 5000 microns. In some embodiments, the first set of ASW particles has an average particle size of 425 microns to 2000 microns. In some embodiments, the first set of ASW particles has an average particle size of 425 microns to 1000 microns. In some embodiments, the first set of ASW particles has an average particle size of 425 microns to 750 microns. In some embodiments, the first set of ASW particles has an average particle size of 425 microns to 500 microns.

In some embodiments, the first set of ASW particles has an average particle size of 500 microns to 6000 microns. In some embodiments, the first set of ASW particles has an average particle size of 750 microns to 5000 microns. In some embodiments, the first set of ASW particles has an average particle size of 1000 microns to 2000 microns.

In some embodiments, the second set of ASW particles has an average particle size of 2 microns to 425 microns. In some embodiments, the second set of ASW particles has an average particle size of 5 microns to 425 microns. In some embodiments, the second set of ASW particles has an average particle size of 10 microns to 425 microns. In some embodiments, the second set of ASW particles has an average particle size of 25 microns to 425 microns. In some embodiments, the second set of ASW particles has an average particle size of 50 microns to 425 microns. In some embodiments, the second set of ASW particles has an average particle size of 75 microns to 425 microns. In some embodiments, the second set of ASW particles has an average particle size of 100 microns to 425 microns. In some embodiments, the second set of ASW particles has an average particle size of 200 microns to 425 microns. In some embodiments, the second set of ASW particles has an average particle size of 300 microns to 425 microns. In some embodiments, the second set of ASW particles has an average particle size of 400 microns to 425 microns.

In some embodiments, the second set of ASW particles has an average particle size of 2 microns to 400 microns. In some embodiments, the second set of ASW particles has an average particle size of 2 microns to 300 microns. In some embodiments, the second set of ASW particles has an average particle size of 2 microns to 200 microns. In some embodiments, the second set of ASW particles has an average particle size of 2 microns to 100 microns. In some embodiments, the second set of ASW particles has an average particle size of 2 microns to 75 microns. In some embodiments, the second set of ASW particles has an average particle size of 2 microns to 50 microns. In some embodiments, the second set of ASW particles has an average particle size of 2 microns to 25 microns. In some embodiments, the second set of ASW particles has an average particle size of 2 microns to 10 microns. In some embodiments, the second set of ASW particles has an average particle size of 2 microns to 5 microns.

In some embodiments, the second set of ASW particles has an average particle size of 5 microns to 400 microns. In some embodiments, the second set of ASW particles has an average particle size of 10 microns to 300 microns. In some embodiments, the second set of ASW particles has an average particle size of 25 microns to 200 microns. In some embodiments, the second set of ASW particles has an average particle size of 75 microns to 100 microns.

In some embodiments, the first set of ASW particles has an average particle size that is greater than the average particle size of the second set of ASW particles.

In some embodiments, an exemplary method according to the present disclosure includes removing at least some of the granules from at least one of the first set of ASW particles, the second set of ASW particles, or a combination thereof with at least one granule liberator such as, but not limited to at least one rotary impact separator. In some embodiments, an exemplary method according to the present disclosure includes removing all the granules from at least one of the first set of ASW particles, the second set of ASW particles, or a combination thereof with an MS.

In some embodiments, an exemplary method according to the present disclosure includes removing 20% to 95% of the granules from at least one of the first set of ASW particles, the second set of ASW particles, or a combination thereof with at least one granule liberator. In some embodiments, an exemplary method according to the present disclosure includes removing 40% to 95% of the granules from at least one of the first set of ASW particles, the second set of ASW particles, or a combination thereof with at least one granule liberator. In some embodiments, an exemplary method according to the present disclosure includes removing 60% to 95% of the granules from at least one of the first set of ASW particles, the second set of ASW particles, or a combination thereof with at least one granule liberator. In some embodiments, an exemplary method according to the present disclosure includes removing 80% to 95% of the granules from at least one of the first set of ASW particles, the second set of ASW particles, or a combination thereof with at least one granule liberator. In some embodiments, an exemplary method according to the present disclosure includes removing 90% to 95% of the granules from at least one of the first set of ASW particles, the second set of ASW particles, or a combination thereof with at least one granule liberator.

In some embodiments, an exemplary method according to the present disclosure includes removing 20% to 90% of the granules from at least one of the first set of ASW particles, the second set of ASW particles, or a combination thereof with at least one granule liberator. In some embodiments, an exemplary method according to the present disclosure includes removing 20% to 80% of the granules from at least one of the first set of ASW particles, the second set of ASW particles, or a combination thereof with at least one granule liberator. In some embodiments, an exemplary method according to the present disclosure includes removing 20% to 60% of the granules from at least one of the first set of ASW particles, the second set of ASW particles, or a combination thereof with at least one granule liberator. In some embodiments, an exemplary method according to the present disclosure includes removing 20% to 40% of the granules from at least one of the first set of ASW particles, the second set of ASW particles, or a combination thereof with at least one granule liberator.

In some embodiments, an exemplary method according to the present disclosure includes removing 40% to 90% of the granules from at least one of the first set of ASW particles, the second set of ASW particles, or a combination thereof with at least one granule liberator. In some embodiments, an exemplary method according to the present disclosure includes removing 60% to 80% of the granules from at least one of the first set of ASW particles, the second set of ASW particles, or a combination thereof with at least one granule liberator.

In some embodiments, an exemplary method according to the present disclosure includes removing 95% to 100% of the granules from at least one of the first set of ASW particles, the second set of ASW particles, or a combination thereof with at least one granule liberator. In some embodiments, an exemplary method according to the present disclosure includes removing 96% to 100% of the granules from at least one of the first set of ASW particles, the second set of ASW particles, or a combination thereof with at least one granule liberator. In some embodiments, an exemplary method according to the present disclosure includes removing 97% to 100% of the granules from at least one of the first set of ASW particles, the second set of ASW particles, or a combination thereof with at least one granule liberator. In some embodiments, an exemplary method according to the present disclosure includes removing 98% to 100% of the granules from at least one of the first set of ASW particles, the second set of ASW particles, or a combination thereof with at least one granule liberator. In some embodiments, an exemplary method according to the present disclosure includes removing 99% to 100% of the granules from at least one of the first set of ASW particles, the second set of ASW particles, or a combination thereof with at least one granule liberator.

In some embodiments, an exemplary method according to the present disclosure includes removing less than 20% of the granules from at least one of the first set of ASW particles, the second set of ASW particles, or a combination thereof with at least one granule liberator. In some embodiments, an exemplary method according to the present disclosure includes removing less than 15% of the granules from at least one of the first set of ASW particles, the second set of ASW particles, or a combination thereof with at least one granule liberator. In some embodiments, an exemplary method according to the present disclosure includes removing less than 10% of the granules from at least one of the first set of ASW particles, the second set of ASW particles, or a combination thereof with at least one granule liberator. In some embodiments, an exemplary method according to the present disclosure includes removing less than 9% of the granules from at least one of the first set of ASW particles, the second set of ASW particles, or a combination thereof with at least one granule liberator. In some embodiments, an exemplary method according to the present disclosure includes removing less than 8% of the granules from at least one of the first set of ASW particles, the second set of ASW particles, or a combination thereof with at least one granule liberator. In some embodiments, an exemplary method according to the present disclosure includes removing less than 7% of the granules from at least one of the first set of ASW particles, the second set of ASW particles, or a combination thereof with at least one granule liberator. In some embodiments, an exemplary method according to the present disclosure includes removing less than 6% of the granules from at least one of the first set of ASW particles, the second set of ASW particles, or a combination thereof with at least one granule liberator. In some embodiments, an exemplary method according to the present disclosure includes removing less than 5% of the granules from at least one of the first set of ASW particles, the second set of ASW particles, or a combination thereof with at least one granule liberator. In some embodiments, an exemplary method according to the present disclosure includes removing less than 4% of the granules from at least one of the first set of ASW particles, the second set of ASW particles, or a combination thereof with at least one granule liberator. In some embodiments, an exemplary method according to the present disclosure includes removing less than 3% of the granules from at least one of the first set of ASW particles, the second set of ASW particles, or a combination thereof with at least one granule liberator. In some embodiments, an exemplary method according to the present disclosure includes removing less than 2% of the granules from at least one of the first set of ASW particles, the second set of ASW particles, or a combination thereof with at least one granule liberator. In some embodiments, an exemplary method according to the present disclosure includes removing less than 1% of the granules from at least one of the first set of ASW particles, the second set of ASW particles, or a combination thereof with at least one granule liberator. In some embodiments, an exemplary method according to the present disclosure includes removing no granules from at least one of the first set of ASW particles, the second set of ASW particles, or a combination thereof with at least one granule liberator.

In some embodiments, an exemplary method according to the present disclosure includes removing at least some of the granules from at least one of the first set of ASW particles, the second set of ASW particles, or a combination thereof with two or more granule liberators. In some embodiments, the two or more granule liberators are operated in series. In yet other embodiments, the two or more granule liberators are operated in parallel.

In some embodiments, at least some of the ASW particles from at least one of the first set of ASW particles, the second set of ASW particles, or any combination thereof may remain in a mixture with the granules that are removed using at least one granule liberator. In such embodiments, at least some of the remaining ASW particles may be separated from the mixture using at least one density separation technique, at least one size separation technique, or any combination thereof. Non-limiting examples of the at least one density separation technique, the at least one size separation technique, or any combination thereof include any screening technique described herein, any air separation technique described herein (e.g., cyclone air separation, mechanical air separation), air classification, vacuum separation, the like, or any combination thereof.

In some embodiments, the at least one granule liberator may remove sand, fiberglass, backing, mat substrate, non-asphaltic materials, or any combination thereof.

In some embodiments, the at least one density separation technique, the at least one size separation technique, or any combination thereof may be used to remove at least some of the granules from at least one of the first set of ASW particles, the second set of ASW particles, or a combination thereof, in addition to or as an alternative granule liberation mechanism (i.e., other than the RIS). In some embodiments, a plurality of density separation techniques, a plurality of size separation techniques, or any combination thereof may be used to remove at least some of the granules from at least one of the first set of ASW particles, the second set of ASW particles, or a combination thereof.

In some embodiments, an exemplary method according to the present disclosure includes removing at least some of the granules from at least one of the first set of ASW particles, the second set of ASW particles, or a combination thereof with a plurality of density separation techniques, a plurality of size separation techniques, or any combination thereof. In embodiments, the plurality of density separation techniques, the plurality of size separation techniques, or any combination thereof are performed in series. In yet other embodiments, the plurality of density separation techniques, the plurality of size separation techniques, or any combination thereof are performed in parallel.

In some embodiments, the first set of ASW particles is subjected to a grinding step. In some embodiments, the step of grinding the first set of ASW particles results in a third set of ASW particles.

In some embodiments, the third set of ASW particles has an average particle size of 2 microns to 425 microns. In some embodiments, the third set of ASW particles has an average particle size of 5 microns to 425 microns. In some embodiments, the third set of ASW particles has an average particle size of 10 microns to 425 microns. In some embodiments, the third set of ASW particles has an average particle size of 25 microns to 425 microns. In some embodiments, the third set of ASW particles has an average particle size of 50 microns to 425 microns. In some embodiments, the third set of ASW particles has an average particle size of 75 microns to 425 microns. In some embodiments, the third set of ASW particles has an average particle size of 100 microns to 425 microns. In some embodiments, the third set of ASW particles has an average particle size of 200 microns to 425 microns. In some embodiments, the third set of ASW particles has an average particle size of 300 microns to 425 microns. In some embodiments, the third set of ASW particles has an average particle size of 400 microns to 425 microns.

In some embodiments, the third set of ASW particles has an average particle size of 2 microns to 400 microns. In some embodiments, the third set of ASW particles has an average particle size of 2 microns to 300 microns. In some embodiments, the third set of ASW particles has an average particle size of 2 microns to 200 microns. In some embodiments, the third set of ASW particles has an average particle size of 2 microns to 100 microns. In some embodiments, the third set of ASW particles has an average particle size of 2 microns to 75 microns. In some embodiments, the third set of ASW particles has an average particle size of 2 microns to 50 microns. In some embodiments, the third set of ASW particles has an average particle size of 2 microns to 25 microns. In some embodiments, the third set of ASW particles has an average particle size of 2 microns to 10 microns. In some embodiments, the third set of ASW particles has an average particle size of 2 microns to 5 microns.

In some embodiments, the third set of ASW particles has an average particle size of 5 microns to 400 microns. In some embodiments, the third set of ASW particles has an average particle size of 10 microns to 300 microns. In some embodiments, the third set of ASW particles has an average particle size of 25 microns to 200 microns. In some embodiments, the third set of ASW particles has an average particle size of 75 microns to 100 microns.

In some embodiments, the second set of ASW particles and the third set of ASW particles are combined to form a combination of the second and third sets of ASW particles. In some embodiments, the second set of ASW particles and the third set of ASW particles are not combined.

In some embodiments, the combination of the second and third sets of ASW particles are separated using an air separator. In some embodiments, each of the second set of ASW particles and the third set of ASW particles is individually separated using the air separator. In some embodiments, the air separator is a mechanical air separator. In some embodiments, the air separator is a cyclone air separator.

In some embodiments, the separating using the air separator results in a fourth set of ASW particles and a fifth set of ASW particles.

In some embodiments, the fourth set of ASW particles has an average particle size of 250 microns to 450 microns. In some embodiments, the fourth set of ASW particles has an average particle size of 300 microns to 450 microns. In some embodiments, the fourth set of ASW particles has an average particle size of 350 microns to 450 microns. In some embodiments, the fourth set of ASW particles has an average particle size of 400 microns to 450 microns.

In some embodiments, the fourth set of ASW particles has an average particle size of 250 microns to 400 microns. In some embodiments, the fourth set of ASW particles has an average particle size of 250 microns to 350 microns. In some embodiments, the fourth set of ASW particles has an average particle size of 250 microns to 300 microns.

In some embodiments, the fourth set of ASW particles has an average particle size of 300 microns to 400 microns.

In some embodiments, the fifth set of ASW particles has an average particle size of 2 microns to 250 microns. In some embodiments, the fifth set of ASW particles has an average particle size of 5 microns to 250 microns. In some embodiments, the fifth set of ASW particles has an average particle size of 10 microns to 250 microns. In some embodiments, the fifth set of ASW particles has an average particle size of 25 microns to 250 microns. In some embodiments, the fifth set of ASW particles has an average particle size of 50 microns to 250 microns. In some embodiments, the fifth set of ASW particles has an average particle size of 75 microns to 250 microns. In some embodiments, the fifth set of ASW particles has an average particle size of 100 microns to 250 microns. In some embodiments, the fifth set of ASW particles has an average particle size of 150 microns to 250 microns. In some embodiments, the fifth set of ASW particles has an average particle size of 200 microns to 250 microns.

In some embodiments, the fifth set of ASW particles has an average particle size of 2 microns to 200 microns. In some embodiments, the fifth set of ASW particles has an average particle size of 2 microns to 150 microns. In some embodiments, the fifth set of ASW particles has an average particle size of 2 microns to 100 microns. In some embodiments, the fifth set of ASW particles has an average particle size of 2 microns to 75 microns. In some embodiments, the fifth set of ASW particles has an average particle size of 2 microns to 50 microns. In some embodiments, the fifth set of ASW particles has an average particle size of 2 microns to 25 microns. In some embodiments, the fifth set of ASW particles has an average particle size of 2 microns to microns. In some embodiments, the fifth set of ASW particles has an average particle size of 2 microns to 5 microns.

In some embodiments, the fourth set of ASW particles has an average particle size that is greater than the average particle size of the fifth set of ASW particles.

In some embodiments, an exemplary method according to the present disclosure includes grinding the fourth set of ASW particles. In some embodiments, the grinding of the fourth set of ASW particles results in a sixth set of ASW particles.

In some embodiments, the sixth set of ASW particles has an average particle size of 2 microns to 250 microns. In some embodiments, the sixth set of ASW particles has an average particle size of 5 microns to 250 microns. In some embodiments, the sixth set of ASW particles has an average particle size of 10 microns to 250 microns. In some embodiments, the sixth set of ASW particles has an average particle size of 25 microns to 250 microns. In some embodiments, the sixth set of ASW particles has an average particle size of 50 microns to 250 microns. In some embodiments, the sixth set of ASW particles has an average particle size of 75 microns to 250 microns. In some embodiments, the sixth set of ASW particles has an average particle size of 100 microns to 250 microns. In some embodiments, the sixth set of ASW particles has an average particle size of 150 microns to 250 microns. In some embodiments, the sixth set of ASW particles has an average particle size of 200 microns to 250 microns.

In some embodiments, the sixth set of ASW particles has an average particle size of 2 microns to 200 microns. In some embodiments, the sixth set of ASW particles has an average particle size of 2 microns to 150 microns. In some embodiments, the sixth set of ASW particles has an average particle size of 2 microns to 100 microns. In some embodiments, the sixth set of ASW particles has an average particle size of 2 microns to 75 microns. In some embodiments, the sixth set of ASW particles has an average particle size of 2 microns to 50 microns. In some embodiments, the sixth set of ASW particles has an average particle size of 2 microns to 25 microns. In some embodiments, the sixth set of ASW particles has an average particle size of 2 microns to 10 microns. In some embodiments, the sixth set of ASW particles has an average particle size of 2 microns to 5 microns.

In some embodiments, the fifth set of ASW particles and the sixth set of ASW particles are combined. In some embodiments, the fifth set of ASW particles and the sixth set of ASW particles are not combined.

In some embodiments, the combining of the fifth set of ASW particles and the sixth set of ASW particles results in an ASW powder. In some embodiments, each of the fifth set of ASW particles and the sixth set of ASW particles is an ASW powder.

In some embodiments, at least one of: the second set of ASW particles, the third set of ASW particles, the fourth set of ASW particles, the fifth set of ASW particles, the sixth set of ASW particles, or any combination thereof comprises the ASW powder. In some such embodiments, the ASW powder may be separated from at least one of: the second set of ASW particles, the third set of ASW particles, the fourth set of ASW particles, the fifth set of ASW particles, the sixth set of ASW particles or any combination thereof using any separation technique (e.g., screening, density separation, size separation) described herein or any combination of separation techniques described herein.

In some embodiments, the ASW powder is combined with an asphalt coating (e.g., an oxidized asphalt coating, a virgin asphalt coating, or a polymer modified asphalt coating) to form a partially filled asphalt coating. In some embodiments, limestone or at least one other filler material may be added to the partially filled asphalt coating to form a filled asphalt coating. In some embodiments, the filled asphalt coating is incorporated into a ground covering including asphalt, such as, for example, a road, parking lot, or other surface.

In some embodiments, the ASW powder comprises 5 wt % to 40 wt % asphalt based on a total weight of the ASW powder. In some embodiments, the ASW powder comprises 10 wt % to 40 wt % asphalt based on a total weight of the ASW powder. In some embodiments, the ASW powder comprises 15 wt % to 40 wt % asphalt based on a total weight of the ASW powder. In some embodiments, the ASW powder comprises 20 wt % to 40 wt % asphalt based on a total weight of the ASW powder. In some embodiments, the ASW powder comprises 25 wt % to 40 wt % asphalt based on a total weight of the ASW powder. In some embodiments, the ASW powder comprises 30 wt % to 40 wt % asphalt based on a total weight of the ASW powder. In some embodiments, the ASW powder comprises 35 wt % to 40 wt % asphalt based on a total weight of the ASW powder.

In some embodiments, the ASW powder comprises 5 wt % to 35 wt % asphalt based on a total weight of the ASW powder. In some embodiments, the ASW powder comprises 5 wt % to 30 wt % asphalt based on a total weight of the ASW powder. In some embodiments, the ASW powder comprises 5 wt % to 20 wt % asphalt based on a total weight of the ASW powder. In some embodiments, the ASW powder comprises 5 wt % to 15 wt % asphalt based on a total weight of the ASW powder. In some embodiments, the ASW powder comprises 5 wt % to 10 wt % asphalt based on a total weight of the ASW powder.

In some embodiments, the ASW powder comprises 10 wt % to 35 wt % asphalt based on a total weight of the ASW powder. In some embodiments, the ASW powder comprises 15 wt % to 30 wt % asphalt based on a total weight of the ASW powder. In some embodiments, the ASW powder comprises 20 wt % to 25 wt % asphalt based on a total weight of the ASW powder.

In some embodiments, the ASW powder comprises 5 wt % to 95 wt % asphalt based on a total weight of the ASW powder. In some embodiments, the ASW powder comprises 10 wt % to 95 wt % asphalt based on a total weight of the ASW powder. In some embodiments, the ASW powder comprises 15 wt % to 95 wt % asphalt based on a total weight of the ASW powder. In some embodiments, the ASW powder comprises 20 wt % to 95 wt % asphalt based on a total weight of the ASW powder. In some embodiments, the ASW powder comprises 25 wt % to 95 wt % asphalt based on a total weight of the ASW powder. In some embodiments, the ASW powder comprises 30 wt % to 95 wt % asphalt based on a total weight of the ASW powder. In some embodiments, the ASW powder comprises 35 wt % to 95 wt % asphalt based on a total weight of the ASW powder. In some embodiments, the ASW powder comprises 40 wt % to 95 wt % asphalt based on a total weight of the ASW powder. In some embodiments, the ASW powder comprises 45 wt % to 95 wt % asphalt based on a total weight of the ASW powder. In some embodiments, the ASW powder comprises 50 wt % to 95 wt % asphalt based on a total weight of the ASW powder. In some embodiments, the ASW powder comprises 55 wt % to 95 wt % asphalt based on a total weight of the ASW powder. In some embodiments, the ASW powder comprises 60 wt % to 95 wt % asphalt based on a total weight of the ASW powder. In some embodiments, the ASW powder comprises 65 wt % to 95 wt % asphalt based on a total weight of the ASW powder. In some embodiments, the ASW powder comprises 70 wt % to 95 wt % asphalt based on a total weight of the ASW powder. In some embodiments, the ASW powder comprises 75 wt % to 95 wt % asphalt based on a total weight of the ASW powder. In some embodiments, the ASW powder comprises 80 wt % to 95 wt % asphalt based on a total weight of the ASW powder. In some embodiments, the ASW powder comprises 85 wt % to 95 wt % asphalt based on a total weight of the ASW powder. In some embodiments, the ASW powder comprises 90 wt % to 95 wt % asphalt based on a total weight of the ASW powder. In some embodiments, the ASW powder comprises 5 wt % to 90 wt % asphalt based on a total weight of the ASW powder. In some embodiments, the ASW powder comprises 10 wt % to 90 wt % asphalt based on a total weight of the ASW powder. In some embodiments, the ASW powder comprises 15 wt % to 90 wt % asphalt based on a total weight of the ASW powder. In some embodiments, the ASW powder comprises 20 wt % to 90 wt % asphalt based on a total weight of the ASW powder. In some embodiments, the ASW powder comprises 25 wt % to 90 wt % asphalt based on a total weight of the ASW powder. In some embodiments, the ASW powder comprises 30 wt % to 90 wt % asphalt based on a total weight of the ASW powder. In some embodiments, the ASW powder comprises 35 wt % to 90 wt % asphalt based on a total weight of the ASW powder. In some embodiments, the ASW powder comprises 40 wt % to 90 wt % asphalt based on a total weight of the ASW powder. In some embodiments, the ASW powder comprises 45 wt % to 90 wt % asphalt based on a total weight of the ASW powder. In some embodiments, the ASW powder comprises 50 wt % to 90 wt % asphalt based on a total weight of the ASW powder. In some embodiments, the ASW powder comprises 55 wt % to 90 wt % asphalt based on a total weight of the ASW powder. In some embodiments, the ASW powder comprises 60 wt % to 90 wt % asphalt based on a total weight of the ASW powder. In some embodiments, the ASW powder comprises 65 wt % to 90 wt % asphalt based on a total weight of the ASW powder. In some embodiments, the ASW powder comprises 70 wt % to 90 wt % asphalt based on a total weight of the ASW powder. In some embodiments, the ASW powder comprises 75 wt % to 90 wt % asphalt based on a total weight of the ASW powder. In some embodiments, the ASW powder comprises 80 wt % to 90 wt % asphalt based on a total weight of the ASW powder. In some embodiments, the ASW powder comprises 85 wt % to 90 wt % asphalt based on a total weight of the ASW powder.

In some embodiments, the ASW powder comprises 5 wt % to 85 wt % asphalt based on a total weight of the ASW powder. In some embodiments, the ASW powder comprises 10 wt % to 85 wt % asphalt based on a total weight of the ASW powder. In some embodiments, the ASW powder comprises 15 wt % to 85 wt % asphalt based on a total weight of the ASW powder. In some embodiments, the ASW powder comprises 20 wt % to 85 wt % asphalt based on a total weight of the ASW powder. In some embodiments, the ASW powder comprises 25 wt % to 85 wt % asphalt based on a total weight of the ASW powder. In some embodiments, the ASW powder comprises 30 wt % to 85 wt % asphalt based on a total weight of the ASW powder. In some embodiments, the ASW powder comprises 35 wt % to 85 wt % asphalt based on a total weight of the ASW powder. In some embodiments, the ASW powder comprises 40 wt % to 85 wt % asphalt based on a total weight of the ASW powder. In some embodiments, the ASW powder comprises 45 wt % to 85 wt % asphalt based on a total weight of the ASW powder. In some embodiments, the ASW powder comprises 50 wt % to 85 wt % asphalt based on a total weight of the ASW powder. In some embodiments, the ASW powder comprises 55 wt % to 85 wt % asphalt based on a total weight of the ASW powder. In some embodiments, the ASW powder comprises 60 wt % to 85 wt % asphalt based on a total weight of the ASW powder. In some embodiments, the ASW powder comprises 65 wt % to 85 wt % asphalt based on a total weight of the ASW powder. In some embodiments, the ASW powder comprises 70 wt % to 85 wt % asphalt based on a total weight of the ASW powder. In some embodiments, the ASW powder comprises 75 wt % to 85 wt % asphalt based on a total weight of the ASW powder. In some embodiments, the ASW powder comprises 80 wt % to 85 wt % asphalt based on a total weight of the ASW powder. In some embodiments, the ASW powder comprises 5 wt % to 80 wt % asphalt based on a total weight of the ASW powder. In some embodiments, the ASW powder comprises 10 wt % to 80 wt % asphalt based on a total weight of the ASW powder. In some embodiments, the ASW powder comprises 15 wt % to 80 wt % asphalt based on a total weight of the ASW powder. In some embodiments, the ASW powder comprises 20 wt % to 80 wt % asphalt based on a total weight of the ASW powder. In some embodiments, the ASW powder comprises 25 wt % to 80 wt % asphalt based on a total weight of the ASW powder. In some embodiments, the ASW powder comprises 30 wt % to 80 wt % asphalt based on a total weight of the ASW powder. In some embodiments, the ASW powder comprises 35 wt % to 80 wt % asphalt based on a total weight of the ASW powder. In some embodiments, the ASW powder comprises 40 wt % to 80 wt % asphalt based on a total weight of the ASW powder. In some embodiments, the ASW powder comprises 45 wt % to 80 wt % asphalt based on a total weight of the ASW powder. In some embodiments, the ASW powder comprises 50 wt % to 80 wt % asphalt based on a total weight of the ASW powder. In some embodiments, the ASW powder comprises 55 wt % to 80 wt % asphalt based on a total weight of the ASW powder. In some embodiments, the ASW powder comprises 60 wt % to 80 wt % asphalt based on a total weight of the ASW powder. In some embodiments, the ASW powder comprises 65 wt % to 80 wt % asphalt based on a total weight of the ASW powder. In some embodiments, the ASW powder comprises 70 wt % to 80 wt % asphalt based on a total weight of the ASW powder. In some embodiments, the ASW powder comprises 75 wt % to 80 wt % asphalt based on a total weight of the ASW powder.

In some embodiments, the ASW powder comprises 5 wt % to 75 wt % asphalt based on a total weight of the ASW powder. In some embodiments, the ASW powder comprises 10 wt % to 75 wt % asphalt based on a total weight of the ASW powder. In some embodiments, the ASW powder comprises 15 wt % to 75 wt % asphalt based on a total weight of the ASW powder. In some embodiments, the ASW powder comprises 20 wt % to 75 wt % asphalt based on a total weight of the ASW powder. In some embodiments, the ASW powder comprises 25 wt % to 75 wt % asphalt based on a total weight of the ASW powder. In some embodiments, the ASW powder comprises 30 wt % to 75 wt % asphalt based on a total weight of the ASW powder. In some embodiments, the ASW powder comprises 35 wt % to 75 wt % asphalt based on a total weight of the ASW powder. In some embodiments, the ASW powder comprises 40 wt % to 75 wt % asphalt based on a total weight of the ASW powder. In some embodiments, the ASW powder comprises 45 wt % to 75 wt % asphalt based on a total weight of the ASW powder. In some embodiments, the ASW powder comprises 50 wt % to 75 wt % asphalt based on a total weight of the ASW powder. In some embodiments, the ASW powder comprises 55 wt % to 75 wt % asphalt based on a total weight of the ASW powder. In some embodiments, the ASW powder comprises 60 wt % to 75 wt % asphalt based on a total weight of the ASW powder. In some embodiments, the ASW powder comprises 65 wt % to 75 wt % asphalt based on a total weight of the ASW powder. In some embodiments, the ASW powder comprises 70 wt % to 75 wt % asphalt based on a total weight of the ASW powder. In some embodiments, the ASW powder comprises 5 wt % to 70 wt % asphalt based on a total weight of the ASW powder. In some embodiments, the ASW powder comprises 10 wt % to 70 wt % asphalt based on a total weight of the ASW powder. In some embodiments, the ASW powder comprises 15 wt % to 70 wt % asphalt based on a total weight of the ASW powder. In some embodiments, the ASW powder comprises 20 wt % to 70 wt % asphalt based on a total weight of the ASW powder. In some embodiments, the ASW powder comprises 25 wt % to 70 wt % asphalt based on a total weight of the ASW powder. In some embodiments, the ASW powder comprises 30 wt % to 70 wt % asphalt based on a total weight of the ASW powder. In some embodiments, the ASW powder comprises 35 wt % to 70 wt % asphalt based on a total weight of the ASW powder. In some embodiments, the ASW powder comprises 40 wt % to 70 wt % asphalt based on a total weight of the ASW powder. In some embodiments, the ASW powder comprises 45 wt % to 70 wt % asphalt based on a total weight of the ASW powder. In some embodiments, the ASW powder comprises 50 wt % to 70 wt % asphalt based on a total weight of the ASW powder. In some embodiments, the ASW powder comprises 55 wt % to 70 wt % asphalt based on a total weight of the ASW powder. In some embodiments, the ASW powder comprises 60 wt % to 70 wt % asphalt based on a total weight of the ASW powder. In some embodiments, the ASW powder comprises 65 wt % to 70 wt % asphalt based on a total weight of the ASW powder.

In some embodiments, the ASW powder comprises 5 wt % to 65 wt % asphalt based on a total weight of the ASW powder. In some embodiments, the ASW powder comprises 10 wt % to 65 wt % asphalt based on a total weight of the ASW powder. In some embodiments, the ASW powder comprises 15 wt % to 65 wt % asphalt based on a total weight of the ASW powder. In some embodiments, the ASW powder comprises 20 wt % to 65 wt % asphalt based on a total weight of the ASW powder. In some embodiments, the ASW powder comprises 25 wt % to 65 wt % asphalt based on a total weight of the ASW powder. In some embodiments, the ASW powder comprises 30 wt % to 65 wt % asphalt based on a total weight of the ASW powder. In some embodiments, the ASW powder comprises 35 wt % to 65 wt % asphalt based on a total weight of the ASW powder. In some embodiments, the ASW powder comprises 40 wt % to 65 wt % asphalt based on a total weight of the ASW powder. In some embodiments, the ASW powder comprises 45 wt % to 65 wt % asphalt based on a total weight of the ASW powder. In some embodiments, the ASW powder comprises 50 wt % to 65 wt % asphalt based on a total weight of the ASW powder. In some embodiments, the ASW powder comprises 55 wt % to 65 wt % asphalt based on a total weight of the ASW powder. In some embodiments, the ASW powder comprises 60 wt % to 65 wt % asphalt based on a total weight of the ASW powder. In some embodiments, the ASW powder comprises 5 wt % to 60 wt % asphalt based on a total weight of the ASW powder. In some embodiments, the ASW powder comprises 10 wt % to 60 wt % asphalt based on a total weight of the ASW powder. In some embodiments, the ASW powder comprises 15 wt % to 60 wt % asphalt based on a total weight of the ASW powder. In some embodiments, the ASW powder comprises 20 wt % to 60 wt % asphalt based on a total weight of the ASW powder. In some embodiments, the ASW powder comprises 25 wt % to 60 wt % asphalt based on a total weight of the ASW powder. In some embodiments, the ASW powder comprises 30 wt % to 60 wt % asphalt based on a total weight of the ASW powder. In some embodiments, the ASW powder comprises 35 wt % to 60 wt % asphalt based on a total weight of the ASW powder. In some embodiments, the ASW powder comprises 40 wt % to 60 wt % asphalt based on a total weight of the ASW powder. In some embodiments, the ASW powder comprises 45 wt % to 60 wt % asphalt based on a total weight of the ASW powder. In some embodiments, the ASW powder comprises 50 wt % to 60 wt % asphalt based on a total weight of the ASW powder. In some embodiments, the ASW powder comprises 55 wt % to 60 wt % asphalt based on a total weight of the ASW powder.

In some embodiments, the ASW powder comprises 5 wt % to 55 wt % asphalt based on a total weight of the ASW powder. In some embodiments, the ASW powder comprises 10 wt % to 55 wt % asphalt based on a total weight of the ASW powder. In some embodiments, the ASW powder comprises 15 wt % to 55 wt % asphalt based on a total weight of the ASW powder. In some embodiments, the ASW powder comprises 20 wt % to 55 wt % asphalt based on a total weight of the ASW powder. In some embodiments, the ASW powder comprises 25 wt % to 55 wt % asphalt based on a total weight of the ASW powder. In some embodiments, the ASW powder comprises 30 wt % to 55 wt % asphalt based on a total weight of the ASW powder. In some embodiments, the ASW powder comprises 35 wt % to 55 wt % asphalt based on a total weight of the ASW powder. In some embodiments, the ASW powder comprises 40 wt % to 55 wt % asphalt based on a total weight of the ASW powder. In some embodiments, the ASW powder comprises 45 wt % to 55 wt % asphalt based on a total weight of the ASW powder. In some embodiments, the ASW powder comprises 50 wt % to 55 wt % asphalt based on a total weight of the ASW powder. In some embodiments, the ASW powder comprises 5 wt % to 50 wt % asphalt based on a total weight of the ASW powder. In some embodiments, the ASW powder comprises 10 wt % to 50 wt % asphalt based on a total weight of the ASW powder. In some embodiments, the ASW powder comprises 15 wt % to 50 wt % asphalt based on a total weight of the ASW powder. In some embodiments, the ASW powder comprises 20 wt % to 50 wt % asphalt based on a total weight of the ASW powder. In some embodiments, the ASW powder comprises 25 wt % to 50 wt % asphalt based on a total weight of the ASW powder. In some embodiments, the ASW powder comprises 30 wt % to 50 wt % asphalt based on a total weight of the ASW powder. In some embodiments, the ASW powder comprises 35 wt % to 50 wt % asphalt based on a total weight of the ASW powder. In some embodiments, the ASW powder comprises 40 wt % to 50 wt % asphalt based on a total weight of the ASW powder. In some embodiments, the ASW powder comprises 45 wt % to 50 wt % asphalt based on a total weight of the ASW powder.

In some embodiments, the ASW powder comprises 5 wt % to 45 wt % asphalt based on a total weight of the ASW powder. In some embodiments, the ASW powder comprises 10 wt % to 45 wt % asphalt based on a total weight of the ASW powder. In some embodiments, the ASW powder comprises 15 wt % to 45 wt % asphalt based on a total weight of the ASW powder. In some embodiments, the ASW powder comprises 20 wt % to 45 wt % asphalt based on a total weight of the ASW powder. In some embodiments, the ASW powder comprises 25 wt % to 45 wt % asphalt based on a total weight of the ASW powder. In some embodiments, the ASW powder comprises 30 wt % to 45 wt % asphalt based on a total weight of the ASW powder. In some embodiments, the ASW powder comprises 35 wt % to 45 wt % asphalt based on a total weight of the ASW powder. In some embodiments, the ASW powder comprises 40 wt % to 45 wt % asphalt based on a total weight of the ASW powder. In some embodiments, the ASW powder comprises 5 wt % to 40 wt % asphalt based on a total weight of the ASW powder. In some embodiments, the ASW powder comprises 10 wt % to 40 wt % asphalt based on a total weight of the ASW powder. In some embodiments, the ASW powder comprises 15 wt % to 40 wt % asphalt based on a total weight of the ASW powder. In some embodiments, the ASW powder comprises 20 wt % to 40 wt % asphalt based on a total weight of the ASW powder. In some embodiments, the ASW powder comprises 25 wt % to 40 wt % asphalt based on a total weight of the ASW powder. In some embodiments, the ASW powder comprises 30 wt % to 40 wt % asphalt based on a total weight of the ASW powder. In some embodiments, the ASW powder comprises 35 wt % to 40 wt % asphalt based on a total weight of the ASW powder.

In some embodiments, the ASW powder comprises 5 wt % to 35 wt % asphalt based on a total weight of the ASW powder. In some embodiments, the ASW powder comprises 10 wt % to 35 wt % asphalt based on a total weight of the ASW powder. In some embodiments, the ASW powder comprises 15 wt % to 35 wt % asphalt based on a total weight of the ASW powder. In some embodiments, the ASW powder comprises 20 wt % to 35 wt % asphalt based on a total weight of the ASW powder. In some embodiments, the ASW powder comprises 25 wt % to 35 wt % asphalt based on a total weight of the ASW powder. In some embodiments, the ASW powder comprises 30 wt % to 35 wt % asphalt based on a total weight of the ASW powder. In some embodiments, the ASW powder comprises 5 wt % to 30 wt % asphalt based on a total weight of the ASW powder. In some embodiments, the ASW powder comprises 10 wt % to 30 wt % asphalt based on a total weight of the ASW powder. In some embodiments, the ASW powder comprises 15 wt % to 30 wt % asphalt based on a total weight of the ASW powder. In some embodiments, the ASW powder comprises 20 wt % to 30 wt % asphalt based on a total weight of the ASW powder. In some embodiments, the ASW powder comprises 25 wt % to 30 wt % asphalt based on a total weight of the ASW powder.

In some embodiments, the ASW powder comprises 5 wt % to 25 wt % asphalt based on a total weight of the ASW powder. In some embodiments, the ASW powder comprises 10 wt % to 25 wt % asphalt based on a total weight of the ASW powder. In some embodiments, the ASW powder comprises 15 wt % to 25 wt % asphalt based on a total weight of the ASW powder. In some embodiments, the ASW powder comprises 20 wt % to 25 wt % asphalt based on a total weight of the ASW powder. In some embodiments, the ASW powder comprises 5 wt % to 20 wt % asphalt based on a total weight of the ASW powder. In some embodiments, the ASW powder comprises 10 wt % to 20 wt % asphalt based on a total weight of the ASW powder. In some embodiments, the ASW powder comprises 15 wt % to 20 wt % asphalt based on a total weight of the ASW powder. In some embodiments, the ASW powder comprises 5 wt % to 15 wt % asphalt based on a total weight of the ASW powder. In some embodiments, the ASW powder comprises 10 wt % to 15 wt % asphalt based on a total weight of the ASW powder. In some embodiments, the ASW powder comprises 5 wt % to 10 wt % asphalt based on a total weight of the ASW powder.

In some embodiments, the ASW powder comprises 60 wt % to 95 wt % of limestone, granules, and impurities based on the total weight of the ASW powder. In some embodiments, the ASW powder comprises 65 wt % to 95 wt % of limestone, granules, and impurities based on the total weight of the ASW powder. In some embodiments, the ASW powder comprises 70 wt % to 95 wt % of limestone, granules, and impurities based on the total weight of the ASW powder. In some embodiments, the ASW powder comprises 75 wt % to 95 wt % of limestone, granules, and impurities based on the total weight of the ASW powder. In some embodiments, the ASW powder comprises 80 wt % to 95 wt % of limestone, granules, and impurities based on the total weight of the ASW powder. In some embodiments, the ASW powder comprises 85 wt % to 95 wt % of limestone, granules, and impurities based on the total weight of the ASW powder. In some embodiments, the ASW powder comprises 90 wt % to 95 wt % of limestone, granules, and impurities based on the total weight of the ASW powder.

In some embodiments, the ASW powder comprises 60 wt % to 90 wt % of limestone, granules, and impurities based on the total weight of the ASW powder. In some embodiments, the ASW powder comprises 60 wt % to 85 wt % of limestone, granules, and impurities based on the total weight of the ASW powder. In some embodiments, the ASW powder comprises 60 wt % to 80 wt % of limestone, granules, and impurities based on the total weight of the ASW powder. In some embodiments, the ASW powder comprises 60 wt % to 75 wt % of limestone, granules, and impurities based on the total weight of the ASW powder. In some embodiments, the ASW powder comprises 60 wt % to 70 wt % of limestone, granules, and impurities based on the total weight of the ASW powder. In some embodiments, the ASW powder comprises 60 wt % to 65 wt % of limestone, granules, and impurities based on the total weight of the ASW powder.

In some embodiments, the ASW powder comprises 65 wt % to 90 wt % of limestone, granules, and impurities based on the total weight of the ASW powder. In some embodiments, the ASW powder comprises 70 wt % to 85 wt % of limestone, granules, and impurities based on the total weight of the ASW powder. In some embodiments, the ASW powder comprises 75 wt % to 80 wt % of limestone, granules, and impurities based on the total weight of the ASW powder.

In some embodiments, the ASW powder comprises 5 wt % to 40 wt % asphalt based on a total weight of the ASW powder with the remainder limestone, granules, and impurities. In some embodiments, the ASW powder comprises 10 wt % to 40 wt % asphalt based on a total weight of the ASW powder with the remainder limestone, granules, and impurities. In some embodiments, the ASW powder comprises 15 wt % to 40 wt % asphalt based on a total weight of the ASW powder with the remainder limestone, granules, and impurities. In some embodiments, the ASW powder comprises 20 wt % to 40 wt % asphalt based on a total weight of the ASW powder with the remainder limestone, granules, and impurities. In some embodiments, the ASW powder comprises 25 wt % to 40 wt % asphalt based on a total weight of the ASW powder with the remainder limestone, granules, and impurities. In some embodiments, the ASW powder comprises 30 wt % to 40 wt % asphalt based on a total weight of the ASW powder with the remainder limestone, granules, and impurities. In some embodiments, the ASW powder comprises 35 wt % to 40 wt % asphalt based on a total weight of the ASW powder with the remainder limestone, granules, and impurities.

In some embodiments, the ASW powder comprises 5 wt % to 35 wt % asphalt based on a total weight of the ASW powder with the remainder limestone, granules, and impurities. In some embodiments, the ASW powder comprises 5 wt % to 30 wt % asphalt based on a total weight of the ASW powder with the remainder limestone, granules, and impurities. In some embodiments, the ASW powder comprises 5 wt % to 20 wt % asphalt based on a total weight of the ASW powder with the remainder limestone, granules, and impurities. In some embodiments, the ASW powder comprises 5 wt % to 15 wt % asphalt based on a total weight of the ASW powder with the remainder limestone, granules, and impurities. In some embodiments, the ASW powder comprises 5 wt % to 10 wt % asphalt based on a total weight of the ASW powder with the remainder limestone, granules, and impurities.

In some embodiments, an exemplary method of the present disclosure does not comprise a wet extraction step.

In embodiments, the method further comprises an air stripping step before one or more of the screening steps detailed herein.

In some embodiments, one or more dust collection steps may be performed at any stage of the method (i.e., before, during, after, or between any step(s) of an exemplary method described herein) without departing from the scope of the present disclosure. In some embodiments, residual waste products from the ASW may be removed at any stage of the process (i.e., before, during, after, or between any step(s) of an exemplary method described herein) without departing from the scope of the present disclosure. A non-limiting example of a residual waste product is a residual plastic material from the asphalt shingles, such as, but not limited to, residual portions of fiberglass mat.

In some embodiments, at least one aeration device may be added at any stage of the process (i.e., before, during, after, or between any step(s) of an exemplary method described herein) without departing from the scope of the present disclosure. In some embodiments, the at least one aeration device includes, but is not limited to, at least one air separator described herein, at least one aspirator, or any combination thereof.

In some embodiments, the present disclosure may provide an asphalt product. In some embodiments, the asphalt product may comprise the ASW powder and/or the briquette, which is combined with one or more additives. In some embodiments, the ASW powder and/or the briquette itself may include the additive. In some embodiments, the additive may be added to the ASW powder or the briquette that otherwise does not include the additive, to provide the asphalt product.

In some embodiments, the asphalt product may be incorporated into roofing applications. In some embodiments, the asphalt product may be incorporated into a coating that coats a roofing deck, a roofing shingle, and/or another component or layer installed on a roofing deck. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives. In some embodiments, the asphalt product comprises one or more additives that enhance impact resistance properties of the coating, roofing deck, roofing shingle, and/or other component or layer installed on a roofing deck.

In some embodiments, the asphalt product comprises a roofing material comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, a roofing material comprises at least one of a roofing membrane, a roofing shingle, a roofing substrate, a roofing accessory, a liquid applied roofing membrane, either in liquid or solid form, or any combination thereof.

In some embodiments, the roofing substrate comprises at least one of an asphaltic substrate, a plywood substrate, a glass substrate, a cellulosic substrate, an underlayment, a roofing membrane (reinforced or unreinforced), a roof deck, a photovoltaic (PV) panel, a modified bitumen (MODBIT) substrate, an oriented strand board (OSB), a roll good, a board (such as but not limited to at least one of a foam board (e.g., a polyisocyanurate (ISO) foam board), a cover board, or any combination thereof), a fire retardant board, a hail resistant board, a high density cover board, a cement board, concrete, a base sheet, a pipe, a chimney, a wax paper, a roof shingle, a mat, a fabric, a glass mat, a fiberglass mat, a woven mat, a nonwoven a fabric, a polyester mat, a scrim, a coated scrim, or any combination thereof.

In some embodiments, the asphalt product may be incorporated into a sealant that seals a roofing deck, a roofing shingle, and/or another component or layer installed on a roofing deck. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives. In some embodiments, the asphalt product comprises one or more additives that enhance impact water resistance properties of the coating, roofing deck, roofing shingle, and/or other component or layer installed on a roofing deck.

In some embodiments, the asphalt product may be incorporated into an adhesive that adheres one or more components or layers to a roofing deck, such as a roofing shingle, and/or another component or layer installed on the roofing deck. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into a roofing membrane installed above a roofing deck. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into an artificial or engineered lumber substitute. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into an artificial or engineered brick substitute. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into a lubricant. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into a drilling fluid. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into a ground covering including asphalt that paves a surface, such as, for example, a ground covering comprising a road, parking lot, or other asphalt ground-covering surface. In some embodiments, the asphalt product may be incorporated into a coating that coats an asphalt ground covering. In some embodiments, the asphalt product may be incorporated into a product that at least partially or totally fills, repairs, and/or rehabilitates, one or more of a crack, seam, fissure, opening, and/or void in an asphalt ground covering.

In some embodiments, the asphalt product may be incorporated into a laminate. In some embodiments, the asphalt product may be incorporated into a compact laminate, wherein the compact laminate is a laminate that is compressed under high pressure and heated to meld layers of the laminate together. In some embodiments, the asphalt product may be incorporated into a cement formulation.

In some embodiments, the ASW powder and/or the briquette may be processed, such as being pulverized, before or after being mixed with the additional asphalt coating and/or the additional additive, to form the asphalt product.

In some embodiments, the asphalt product comprises an asphalt pavement comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a liquid binder comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a liquid binder for paving applications (e.g., pavement) comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a liquid binder for roofing applications comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a pavement composition (e.g., at least one of a dry pavement material, a hot mix, a cold mix, or any combination thereof). comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a crack seal comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a chip seal comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a slurry seal comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a cold patch comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a cement composition comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a cementitious composition comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a material for acoustic applications comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive. In some embodiments, when used in acoustic applications, the asphalt product improves vibrational dampening. In some embodiments, when used in acoustic applications, the asphalt product improves sound transmission loss.

In some embodiments, the asphalt product comprises a sound dampening material (e.g., for vehicle applications, like automotive applications, wall boards, ceiling tiles, sound boards, etc.) comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a modified bitumen membrane comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a material for waterproofing applications comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises an adhesive composition comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, the asphalt product comprises a sealant composition comprising at least one of an ASW powder and/or a briquette, with or without an additional asphalt coating including one or more of oxidized asphalt coating, virgin asphalt coating, polymer modified asphalt coating, and/or mixtures thereof, and/or with or without an additional additive.

In some embodiments, a system comprising the asphalt product is provided. In some embodiments, the system comprises at least one layer. In some embodiments, the at least one layer comprises a substrate, such as, for example and without limitation, any one or more of the substrates disclosed herein, including roofing substrates, among others. For example, in some embodiments, the system comprises a substrate. In some embodiments, the asphalt product is located on the substrate. In some embodiments, the asphalt product is located between a first substrate and a second substrate. In some embodiments, the asphalt product is located on the first substrate and the second substrate. In some embodiments, the asphalt product directly contacts the substrate. In some embodiments, the asphalt product directly contacts at least one of the first substrate, the second substrate, or any combination thereof. In some embodiments, the substrate comprises at least one of a roofing material, a roofing substrate, a pavement substrate, a concrete substrate, a cement substrate, a substrate having a surface, a road, a parking lot, a wall board, a building substrate, a damaged substrate, a metal substrate, any surfaces or substrates disclosed herein, or any combination thereof.

In some embodiments, the asphalt product comprises 1% to 99% by weight of an asphalt based on a total weight of the asphalt product.

In some embodiments, the asphalt comprises at least one of a waste asphalt, a non-waste asphalt, or any combination thereof. In some embodiments, the non-waste asphalt comprises at least one of an oxidized asphalt, an unoxidized asphalt, a polymer-modified asphalt, a In some embodiments, the asphalt product comprises 1% to 99% by weight of an additive In some embodiments, the additional additive may include ground tire rubber.

As used herein, the term "ground tire rubber" refers to rubber derived from at least one of tires, tubes, or any combination thereof. The term "ground tire rubber" includes, for example, waste rubber and recycled rubber, which is derived from processed waste rubber. In some embodiments, the ground tire rubber comprises at least partially vulcanized waste rubber, at least partially devulcanized waste rubber, or any combination thereof.

In some embodiments, the ground tire rubber comprises at least one of synthetic rubber, natural rubber, or any combination thereof. In some embodiments, the ground tire rubber comprises recycled rubber. In some embodiments, the ground tire rubber comprises recycled rubber from tires, recycled rubber from tubes, or any combination thereof. In some embodiments, the ground tire rubber comprises at least one of a vulcanized rubber, a partially vulcanized rubber, or any combination thereof. In some embodiments, each of the vulcanized rubber and the partially vulcanized rubber independently comprises at least one of a polymer, a filler, a plasticizer, a surfactant, an elastomer, an additive, or any combination thereof. In some embodiments, each of the vulcanized rubber and the partially vulcanized rubber independently comprises at least one of the following polymers: at least one of styrene-butadiene-styrene (SBS), styrene butadiene (SBR), styrene-ethylene/butylene-styrene (SEBS), ethylene-propylene-diene, polyethylene, polyisoprene, polybutylene, polybutadiene, polychloroprene (neoprene), nitrile rubber (acrylonitrile butadiene), butyl rubber, polyacrylonitrile, or any combination thereof. In some embodiments, the chemical composition of ground tire rubber depends on the source from which the ground tire rubber is derived and thus can vary and be non-uniform. In some embodiments, the additional additive comprises crumb rubber.

As used herein, the term "mesh size" refers to a mean particle size of a granular material based on U.S. standard mesh sizes.

In some embodiments, the ground tire rubber comprises 4 mesh ground tire rubber to 1200 mesh ground tire rubber. In some embodiments, the ground tire rubber comprises 4 mesh ground tire rubber. In some embodiments, the ground tire rubber comprises 5 mesh ground tire rubber. In some embodiments, the ground tire rubber comprises 6 mesh ground tire rubber. In some embodiments, the ground tire rubber comprises 7 mesh ground tire rubber. In some embodiments, the ground tire rubber comprises 8 mesh ground tire rubber. In some embodiments, the ground tire rubber comprises 10 mesh ground tire rubber. In some embodiments, the ground tire rubber comprises 12 mesh ground tire rubber. In some embodiments, the ground tire rubber comprises 14 mesh ground tire rubber. In some embodiments, the ground tire rubber comprises 16 mesh ground tire rubber. In some embodiments, the ground tire rubber comprises 18 mesh ground tire rubber. In some embodiments, the ground tire rubber comprises 20 mesh ground tire rubber. In some embodiments, the ground tire rubber comprises 24 mesh ground tire rubber. In some embodiments, the ground tire rubber comprises 30 mesh ground tire rubber. In some embodiments, the ground tire rubber comprises 36 mesh ground tire rubber. In some embodiments, the ground tire rubber comprises 40 mesh ground tire rubber. In some embodiments, the ground tire rubber comprises 46 mesh ground tire rubber. In some embodiments, the ground tire rubber comprises 54 mesh ground tire rubber. In some embodiments, the ground tire rubber comprises 60 mesh ground tire rubber. In some embodiments, the ground tire rubber comprises 70 mesh ground tire rubber. In some embodiments, the ground tire rubber comprises 80 mesh ground tire rubber. In some embodiments, the ground tire rubber comprises 90 mesh ground tire rubber. In some embodiments, the ground tire rubber comprises 100 mesh ground tire rubber. In some embodiments, the ground tire rubber comprises 120 mesh ground tire rubber. In some embodiments, the ground tire rubber comprises 140 mesh ground tire rubber. In some embodiments, the ground tire rubber comprises 150 mesh ground tire rubber. In some embodiments, the ground tire rubber comprises 170 mesh ground tire rubber. In some embodiments, the ground tire rubber comprises 180 mesh ground tire rubber. In some embodiments, the ground tire rubber comprises 200 mesh ground tire rubber. In some embodiments, the ground tire rubber comprises 220 mesh ground tire rubber. In some embodiments, the ground tire rubber comprises 240 mesh ground tire rubber. In some embodiments, the ground tire rubber comprises 280 mesh ground tire rubber. In some embodiments, the ground tire rubber comprises 320 mesh ground tire rubber. In some embodiments, the ground tire rubber comprises 400 mesh ground tire rubber. In some embodiments, the ground tire rubber comprises 500 mesh ground tire rubber. In some embodiments, the ground tire rubber comprises 600 mesh ground tire rubber. In some embodiments, the ground tire rubber comprises 1000 mesh ground tire rubber. In some embodiments, the ground tire rubber comprises 1200 mesh ground tire rubber. In some embodiments, the ground tire rubber comprises any combination of the foregoing mesh sizes of ground tire rubber.

In some embodiments, the additional additive may include at least one hydrocarbon oil. In some embodiments, the at least one hydrocarbon oil may comprise, consist of, or consist essentially of an oil comprising, consisting of, or consisting essentially of at least one hydrocarbon. In some embodiments, the at least one hydrocarbon oil may comprise, consist of, or consist essentially of at least one paraffinic hydrocarbon oil. In some embodiments, the at least one hydrocarbon oil may comprise, consist of, or consist essentially of at least one aromatic hydrocarbon oil. In some embodiments, the at least one hydrocarbon oil may comprise, consist of, or consist essentially of at least one re-fined engine oil bottoms (REOBs). In some embodiments, the at least one hydrocarbon oil may comprise, consist of, or consist essentially of at least one paraffinic hydrocarbon oil, at least one aromatic hydrocarbon oil, at least one re-fined engine oil bottoms (REOBs), or any combination thereof.

In some embodiments, the at least one paraffinic hydrocarbon oil may comprise, consist of, or consist essentially of a hydrocarbon oil comprising, consisting of, or consisting essentially of at least one paraffin (e.g., at least one saturate). In some embodiments, the at least one paraffinic hydrocarbon oil may comprise, consist of, or consist essentially of 0% to 100% by weight of the at least one paraffin based on a total weight of the paraffinic hydrocarbon oil. In some embodiments, the at least one paraffinic hydrocarbon oil may comprise, consist of, or consist essentially of at least 50% by weight of the at least one paraffin based on the total weight of the paraffinic hydrocarbon oil. In some embodiments, the at least one paraffinic hydrocarbon oil may comprise, consist of, or consist essentially of an amount greater than 50% by weight of the at least one paraffin based on the total weight of the paraffinic hydrocarbon oil. In some embodiments, the at least one paraffinic hydrocarbon oil may comprise, consist of, or consist essentially of 50% to 100% by weight of the at least one paraffin based on the total weight of the paraffinic hydrocarbon oil.

In some embodiments, the at least one aromatic hydrocarbon oil may comprise, consist of, or consist essentially of a hydrocarbon oil comprising, consisting of, or consisting essentially of at least one aromatic. In some embodiments, the at least one aromatic hydrocarbon oil may comprise, consist of, or consist essentially of 0% to 100% by weight of the at least one aromatic based on a total weight of the aromatic hydrocarbon oil. In some embodiments, the at least one aromatic hydrocarbon oil may comprise, consist of, or consist essentially of at least 50% by weight of the at least one aromatic based on the total weight of the aromatic hydrocarbon oil. In some embodiments, the at least one aromatic hydrocarbon oil may comprise, consist of, or consist essentially of an amount greater than 50% by weight of the at least one aromatic based on the total weight of the aromatic hydrocarbon oil. In some embodiments, the at least one aromatic hydrocarbon oil may comprise, consist of, or consist essentially of 50% to 100% by weight of the at least one aromatic based on the total weight of the aromatic hydrocarbon oil.

In some embodiments, the re-fined engine oil bottoms (REOBs) may comprise, consist of, or consist essentially of a residual distillation product. For example, in some embodiments, the re-refined engine oil bottoms may comprise, consist of, or consist essentially of a residual distillation product from a vacuum tower, such as for example a vacuum tower in a re-refinery of used lubricating oil. In some embodiments, the re-refined engine oil bottoms may specifically not include any cleaned-up waste engine oil, any residue from only an atmospheric tower of an oil re-refinery, or any combination thereof. In some embodiments, the re-refined engine oil bottoms may be compositionally different from asphalt (e.g., such as asphalt from a vacuum tower of a crude oil refinery, etc.) and therefore may not be or comprise asphalt. In some embodiments, for example, the re-refined engine oil bottoms may have at least one component, at least one property, or any combination thereof that is different from asphalt. In some embodiments, one or more of the following may replace the re-refined engine oil bottoms, or may be combined with the re-refined engine oil bottoms: heavy vacuum tower bottoms, re-refined heavy vacuum tower bottoms, re-refined engine oil, re-refined motor oil, waste engine oil, flux, asphalt flux, asphalt blowdown, engine oil residue, re-refined heavy vacuum distillation bottoms, re-refined heavy vacuum distillation oil, re-refined vacuum tower bottoms, vacuum tower bottom, vacuum tower asphalt binder, waste engine oil residue, and waste oil distillation bottoms.

Some non-limiting examples of the at least one hydrocarbon oil may include, without limitation, one or more of the following: Kendex® 0897, Kendex® 0898, Kendex® 0834, Kendex® 0060HT, Kendex® 0150H, Kendex® 0150, Kendex® 0847, Kendex® 0070, Kendex® 0100, Kendex® 0200, Kendex® 0250, Kendex® 0300, Kendex® 0325 D, Kendex® 0500, Kendex® 0600, Kendex® 0842, Kendex® 0846, Kendex® 0866, Kendex® MNE, Kendex® CAT, which are available from American Refining Group, Inc., Bradford, Pa.; Nynas Oil (Nyflex-223), which is available from Nynas AB, Stockholm, Sweden; Hyprene Process Oils, which are available from Ergon, Inc., Jackson, Miss.; Hydrolene H600T, which is available from Holly Frontier, Plymouth Meeting, Pa.; Exxon Evlast C 30, Exxon Evlast D 50, and Exxon UmPAO 65, which are available from ExxonMobil, Irving, Tex.; and ethylene bis-stearamide (CAS #110-30-5), which is available from several suppliers, including, for example and without limitation, Acme-Hardesty, Blue Bell, Pa., among others; re-refined engine oil bottoms products or vacuum tower asphalt extender products available from several suppliers, including, for example and without limitation, Safety-Kleen, Richardson, Tex.; Vertex Energy, Houston, Tex.; and Universal Environmental Services (UES), Peachtree City, Ga.

In some embodiments, the additional additive may include a rejuvenating agent. In some embodiments, the rejuvenating agent may include a petroleum based rejuvenating agent. In some embodiments, the rejuvenating agent may include a biobased rejuvenating agent. In some embodiments, the biobased rejuvenating agent may include one or more oils and/or esters, from natural and/or biological resources, including but not limited to one or more derivatives and/or modifications thereof. In some embodiments, the biobased rejuvenating agent may include one or more of vegetable oil and/or ester thereof, seed oil and/or ester thereof, soybean oil and/or ester thereof, corn oil and/or ester thereof, palm oil and/or ester thereof, canola oil and/or ester thereof, safflower oil and/or ester thereof, sunflower oil and/or ester thereof, citrus oil and/or ester thereof, pine oil and/or ester thereof, rosin oil and/or ester thereof, other plant-based oil and/or ester thereof, and/or biobased fatty acid ester. In some embodiments, the biobased rejuvenating agent may be an emulsion.

In some embodiments, the rejuvenating agent may include accessible or available carbonyl groups capable of reacting with one or more hydroxyl groups of a polyol. In some embodiments, starting materials for forming the rejuvenating agents may include those containing carboxylic acid groups that react with polyols to form ester linkages, or react with amine groups of an amine alcohol to form amide linkages. In some embodiment, carbonyl containing compounds may include, but are not limited to, triglycerides such as various vegetable and natural oils, various tall oils, vegetable oils, or natural fatty acids, tall oil and gum rosin acids, mono acids, di acids, tri acids, esters, polyesters, and various amides. In some embodiments, starting materials for forming the rejuvenating agent may include one or more coal or petroleum based materials including, but not limited to, coal tar pitch, coal extracts, engine or lubricating oils, paraffin or naphthenic oils, derivatives or mixtures thereof, and the like.

In some embodiments, the additive may include an anti-aging agent. In some embodiments, the anti-aging agent may be a reaction product of ingredients including (i) a first material including a compound containing one or more carbonyl groups and (ii) a second material that reacts with the one or more carbonyl groups of the first material and adds hydroxyl groups to the reaction product. In some embodiments, the anti-aging agent may have a hydroxyl value of greater than about 25 mg KOH/g, greater than 35 mg KOH/g, greater than 40 mg KOH/g, or greater than 50 mg KOH/g.

In some embodiments, the first and/or second material may include one or more materials containing one or more of a carboxylic acid group, ester group, amine group, imide group, and/or combinations thereof that react with one or more polyol (e.g., to form ester linkages) and/or react with amine groups of an amine alcohol (e.g., to form amide linkages). In some embodiments, a carbonyl-containing compound may include, but is not limited to, a glyceride and/or a triglyceride such as one or more of a vegetable oil, tall oil, rosin, pitch, wood-chemistry material, engine oil, recycled oil, fatty acid, mono acid, di-acid, tri-acid, C1-C36 carboxylic acid, ester, keto acid, oxo-carboxylic acid, polyester, anhydride, compound containing both anhydride and carboxylic acid groups, various amides and imides, compounds that contain two or more groups of the above referenced types, blends thereof, and the like. In some embodiments, the first and/or second material may include a mixture and/or blend of different carbonyl-containing compounds, and/or may additionally or alternatively include a co-reactant that may omit a carbonyl group but which may participate in the reaction. In some embodiments, the first and/or second material may include, but is not limited to, a plant based material such as but not limited to castor, cashew nut shell, cottonseed, corn, peanut, rapeseed, rice bran, safflower, sarsaparilla root, soybean, sunflower, vegetable, wheat germ, and/or other plant based oil; recycled oil; rosin and/or rosin acid; fatty acid; mixtures thereof and the like. In some embodiments, the first and/or second material may include one or more coal or petroleum-based materials including, but not limited to, coal tar pitch, coal extracts, petroleum sourced reactants, derivatives or mixtures thereof, and the like. In some embodiments, the first and/or second material may include ingredients capable of reacting with one or more hydroxyl groups of a polyol or the amine group of an amine alcohol to provide a sufficiently hydroxyl-functional modified anti-aging agent or additive that will impart improved anti-aging properties to an asphalt binder mixture.

In some embodiments, the anti-aging agent may include one or more sterols. In some embodiments, the sterol may be a steroid alcohol. In some embodiments, the sterol alcohol may be derived from one or more natural sources, such as but not limited to one or more of plant, animal, fungus, and/or bacterium. In some embodiments, the sterol alcohol may be derived from one or more of castor, cashew nut shell, rapeseed, soybean, sunflower, tall, vegetable, and/or other plant-based oils.

In some embodiments, the anti-aging agent may comprise a blend of pure sterol and crude sterol. In some embodiments, the sterol blend comprises from 10:90 to 90:10 weight ratio of pure sterol to crude sterol. In some embodiments, the sterol blend comprises from 15:85 to 90:10 weight ratio of pure sterol to crude sterol. In some embodiments, the sterol blend comprises from 20:80 to 90:10 weight ratio of pure sterol to crude sterol. In some embodiments, the sterol blend comprises from 25:75 to 90:10 weight ratio of pure sterol to crude sterol. In some embodiments, the sterol blend comprises from 30:70 to 90:10 weight ratio of pure sterol to crude sterol. In some embodiments, the sterol blend comprises from 35:65 to 90:10 weight ratio of pure sterol to crude sterol. In some embodiments, the sterol blend comprises from 40:60 to 90:10 weight ratio of pure sterol to crude sterol. In some embodiments, the sterol blend comprises from 45:55 to 90:10 weight ratio of pure sterol to crude sterol. In some embodiments, the sterol blend comprises from 50:50 to 90:10 weight ratio of pure sterol to crude sterol. In some embodiments, the sterol blend comprises from 55:45 to 90:10 weight ratio of pure sterol to crude sterol. In some embodiments, the sterol blend comprises from 60:40 to 90:10 weight ratio of pure sterol to crude sterol. In some embodiments, the sterol blend comprises from 65:35 to 90:10 weight ratio of pure sterol to crude sterol. In some embodiments, the sterol blend comprises from 70:30 to 90:10 weight ratio of pure sterol to crude sterol. In some embodiments, the sterol blend comprises from 75:25 to 90:10 weight ratio of pure sterol to crude sterol. In some embodiments, the sterol blend comprises from 80:20 to 90:10 weight ratio of pure sterol to crude sterol. In some embodiments, the sterol blend comprises from 85:15 to 90:10 weight ratio of pure sterol to crude sterol. In some embodiments, the sterol blend comprises from 10:90 to 85:15 weight ratio of pure sterol to crude sterol. In some embodiments, the sterol blend comprises from 15:85 to 85:15 weight ratio of pure sterol to crude sterol. In some embodiments, the sterol blend comprises from 20:80 to 85:15 weight ratio of pure sterol to crude sterol. In some embodiments, the sterol blend comprises from 25:75 to 85:15 weight ratio of pure sterol to crude sterol. In some embodiments, the sterol blend comprises from 30:70 to 85:15 weight ratio of pure sterol to crude sterol. In some embodiments, the sterol blend comprises from 35:65 to 85:15 weight ratio of pure sterol to crude sterol. In some embodiments, the sterol blend comprises from 40:60 to 85:15 weight ratio of pure sterol to crude sterol. In some embodiments, the sterol blend comprises from 45:55 to 85:15 weight ratio of pure sterol to crude sterol. In some embodiments, the sterol blend comprises from 50:50 to 85:15 weight ratio of pure sterol to crude sterol. In some embodiments, the sterol blend comprises from 55:45 to 85:15 weight ratio of pure sterol to crude sterol. In some embodiments, the sterol blend comprises from 60:40 to 85:15 weight ratio of pure sterol to crude sterol. In some embodiments, the sterol blend comprises from 65:35 to 85:15 weight ratio of pure sterol to crude sterol. In some embodiments, the sterol blend comprises from 70:30 to 85:15 weight ratio of pure sterol to crude sterol. In some embodiments, the sterol blend comprises from 75:25 to 85:15 weight ratio of pure sterol to crude sterol. In some embodiments, the sterol blend comprises from 80:20 to 85:15 weight ratio of pure sterol to crude sterol. In some embodiments, the sterol blend comprises from 10:90 to 80:20 weight ratio of pure sterol to crude sterol. In some embodiments, the sterol blend comprises from 15:85 to 80:20 weight ratio of pure sterol to crude sterol. In some embodiments, the sterol blend comprises from 20:80 to 80:20 weight ratio of pure sterol to crude sterol. In some embodiments, the sterol blend comprises from 25:75 to 80:20 weight ratio of pure sterol to crude sterol. In some embodiments, the sterol blend comprises from 30:70 to 80:20 weight ratio of pure sterol to crude sterol. In some embodiments, the sterol blend comprises from 35:65 to 80:20 weight ratio of pure sterol to crude sterol. In some embodiments, the sterol blend comprises from 40:60 to 80:20 weight ratio of pure sterol to crude sterol. In some embodiments, the sterol blend comprises from 45:55 to 80:20 weight ratio of pure sterol to crude sterol. In some embodiments, the sterol blend comprises from 50:50 to 80:20 weight ratio of pure sterol to crude sterol. In some embodiments, the sterol blend comprises from 55:45 to 80:20 weight ratio of pure sterol to crude sterol. In some embodiments, the sterol blend comprises from 60:40 to 80:20 weight ratio of pure sterol to crude sterol. In some embodiments, the sterol blend comprises from 65:35 to 80:20 weight ratio of pure sterol to crude sterol. In some embodiments, the sterol blend comprises from 70:30 to 80:20 weight ratio of pure sterol to crude sterol. In some embodiments, the sterol blend comprises from 75:25 to 80:20 weight ratio of pure sterol to crude sterol. In some embodiments, the sterol blend comprises from 10:90 to 75:25 weight ratio of pure sterol to crude sterol. In some embodiments, the sterol blend comprises from 15:85 to 75:25 weight ratio of pure sterol to crude sterol. In some embodiments, the sterol blend comprises from 20:80 to 75:25 weight ratio of pure sterol to crude sterol. In some embodiments, the sterol blend comprises from 25:75 to 75:25 weight ratio of pure sterol to crude sterol. In some embodiments, the sterol blend comprises from 30:70 to 75:25 weight ratio of pure sterol to crude sterol. In some embodiments, the sterol blend comprises from 35:65 to 75:25 weight ratio of pure sterol to crude sterol. In some embodiments, the sterol blend comprises from 40:60 to 75:25 weight ratio of pure sterol to crude sterol. In some embodiments, the sterol blend comprises from 45:55 to 75:25 weight ratio of pure sterol to crude sterol. In some embodiments, the sterol blend comprises from 50:50 to 75:25 weight ratio of pure sterol to crude sterol. In some embodiments, the sterol blend comprises from 55:45 to 75:25 weight ratio of pure sterol to crude sterol. In some embodiments, the sterol blend comprises from 60:40 to 75:25 weight ratio of pure sterol to crude sterol. In some embodiments, the sterol blend comprises from 65:35 to 75:25 weight ratio of pure sterol to crude sterol. In some embodiments, the sterol blend comprises from 70:30 to 75:25 weight ratio of pure sterol to crude sterol. In some embodiments, the sterol blend comprises from 10:90 to 70:30 weight ratio of pure sterol to crude sterol. In some embodiments, the sterol blend comprises from 15:85 to 70:30 weight ratio of pure sterol to crude sterol. In some embodiments, the sterol blend comprises from 20:80 to 70:30 weight ratio of pure sterol to crude sterol. In some embodiments, the sterol blend comprises from 25:75 to 70:30 weight ratio of pure sterol to crude sterol. In some embodiments, the sterol blend comprises from 30:70 to 70:30 weight ratio of pure sterol to crude sterol. In some embodiments, the sterol blend comprises from 35:65 to 70:30 weight ratio of pure sterol to crude sterol. In some embodiments, the sterol blend comprises from 40:60 to 70:30 weight ratio of pure sterol to crude sterol. In some embodiments, the sterol blend comprises from 45:55 to 70:30 weight ratio of pure sterol to crude sterol. In some embodiments, the sterol blend comprises from 50:50 to 70:30 weight ratio of pure sterol to crude sterol. In some embodiments, the sterol blend comprises from 55:45 to 70:30 weight ratio of pure sterol to crude sterol. In some embodiments, the sterol blend comprises from 60:40 to 70:30 weight ratio of pure sterol to crude sterol. In some embodiments, the sterol blend comprises from 65:35 to 70:30 weight ratio of pure sterol to crude sterol. In some embodiments, the sterol blend comprises from 10:90 to 65:35 weight ratio of pure sterol to crude sterol. In some embodiments, the sterol blend comprises from 15:85 to 65:35 weight ratio of pure sterol to crude sterol. In some embodiments, the sterol blend comprises from 20:80 to 65:35 weight ratio of pure sterol to crude sterol. In some embodiments, the sterol blend comprises from 25:75 to 65:35 weight ratio of pure sterol to crude sterol. In some embodiments, the sterol blend comprises from 30:70 to 65:35 weight ratio of pure sterol to crude sterol. In some embodiments, the sterol blend comprises from 35:65 to 65:35 weight ratio of pure sterol to crude sterol. In some embodiments, the sterol blend comprises from 40:60 to 65:35 weight ratio of pure sterol to crude sterol. In some embodiments, the sterol blend comprises from 45:55 to 65:35 weight ratio of pure sterol to crude sterol. In some embodiments, the sterol blend comprises from 50:50 to 65:35 weight ratio of pure sterol to crude sterol. In some embodiments, the sterol blend comprises from 55:45 to 65:35 weight ratio of pure sterol to crude sterol. In some embodiments, the sterol blend comprises from 60:40 to 65:35 weight ratio of pure sterol to crude sterol. In some embodiments, the sterol blend comprises from 10:90 to 60:40 weight ratio of pure sterol to crude sterol. In some embodiments, the sterol blend comprises from 15:85 to 60:40 weight ratio of pure sterol to crude sterol. In some embodiments, the sterol blend comprises from 20:80 to 60:40 weight ratio of pure sterol to crude sterol. In some embodiments, the sterol blend comprises from 25:75 to 60:40 weight ratio of pure sterol to crude sterol. In some embodiments, the sterol blend comprises from 30:70 to 60:40 weight ratio of pure sterol to crude sterol. In some embodiments, the sterol blend comprises from 35:65 to 60:40 weight ratio of pure sterol to crude sterol. In some embodiments, the sterol blend comprises from 40:60 to 60:40 weight ratio of pure sterol to crude sterol. In some embodiments, the sterol blend comprises from 45:55 to 60:40 weight ratio of pure sterol to crude sterol. In some embodiments, the sterol blend comprises from 50:50 to 60:40 weight ratio of pure sterol to crude sterol. In some embodiments, the sterol blend comprises from 55:45 to 60:40 weight ratio of pure sterol to crude sterol. In some embodiments, the sterol blend comprises from 10:90 to 55:45 weight ratio of pure sterol to crude sterol. In some embodiments, the sterol blend comprises from 15:85 to 55:45 weight ratio of pure sterol to crude sterol. In some embodiments, the sterol blend comprises from 20:80 to 55:45 weight ratio of pure sterol to crude sterol. In some embodiments, the sterol blend comprises from 25:75 to 55:45 weight ratio of pure sterol to crude sterol. In some embodiments, the sterol blend comprises from 30:70 to 55:45 weight ratio of pure sterol to crude sterol. In some embodiments, the sterol blend comprises from 35:65 to 55:45 weight ratio of pure sterol to crude sterol. In some embodiments, the sterol blend comprises from 40:60 to 55:45 weight ratio of pure sterol to crude sterol. In some embodiments, the sterol blend comprises from 45:55 to 55:45 weight ratio of pure sterol to crude sterol. In some embodiments, the sterol blend comprises from 50:50 to 55:45 weight ratio of pure sterol to crude sterol. In some embodiments, the sterol blend comprises from 10:90 to 50:50 weight ratio of pure sterol to crude sterol. In some embodiments, the sterol blend comprises from 15:85 to 50:50 weight ratio of pure sterol to crude sterol. In some embodiments, the sterol blend comprises from 20:80 to 50:50 weight ratio of pure sterol to crude sterol. In some embodiments, the sterol blend comprises from 25:75 to 50:50 weight ratio of pure sterol to crude sterol. In some embodiments, the sterol blend comprises from 30:70 to 50:50 weight ratio of pure sterol to crude sterol. In some embodiments, the sterol blend comprises from 35:65 to 50:50 weight ratio of pure sterol to crude sterol. In some embodiments, the sterol blend comprises from 40:60 to 50:50 weight ratio of pure sterol to crude sterol. In some embodiments, the sterol blend comprises from 45:55 to 50:50 weight ratio of pure sterol to crude sterol. In some embodiments, the sterol blend comprises from 10:90 to 45:55 weight ratio of pure sterol to crude sterol. In some embodiments, the sterol blend comprises from 15:85 to 45:55 weight ratio of pure sterol to crude sterol. In some embodiments, the sterol blend comprises from 20:80 to 45:55 weight ratio of pure sterol to crude sterol. In some embodiments, the sterol blend comprises from 25:75 to 45:55 weight ratio of pure sterol to crude sterol. In some embodiments, the sterol blend comprises from 30:70 to 45:55 weight ratio of pure sterol to crude sterol. In some embodiments, the sterol blend comprises from 35:65 to 45:55 weight ratio of pure sterol to crude sterol. In some embodiments, the sterol blend comprises from 40:60 to 45:55 weight ratio of pure sterol to crude sterol. In some embodiments, the sterol blend comprises from 10:90 to 40:60 weight ratio of pure sterol to crude sterol. In some embodiments, the sterol blend comprises from 15:85 to 40:60 weight ratio of pure sterol to crude sterol. In some embodiments, the sterol blend comprises from 20:80 to 40:60 weight ratio of pure sterol to crude sterol. In some embodiments, the sterol blend comprises from 25:75 to 40:60 weight ratio of pure sterol to crude sterol. In some embodiments, the sterol blend comprises from 30:70 to 40:60 weight ratio of pure sterol to crude sterol. In some embodiments, the sterol blend comprises from 35:65 to 40:60 weight ratio of pure sterol to crude sterol. In some embodiments, the sterol blend comprises from 10:90 to 35:65 weight ratio of pure sterol to crude sterol. In some embodiments, the sterol blend comprises from 15:85 to 35:65 weight ratio of pure sterol to crude sterol. In some embodiments, the sterol blend comprises from 20:80 to 35:65 weight ratio of pure sterol to crude sterol. In some embodiments, the sterol blend comprises from 25:75 to 35:65 weight ratio of pure sterol to crude sterol. In some embodiments, the sterol blend comprises from 30:70 to 35:65 weight ratio of pure sterol to crude sterol. In some embodiments, the sterol blend comprises from 10:90 to 30:70 weight ratio of pure sterol to crude sterol. In some embodiments, the sterol blend comprises from 15:85 to 30:70 weight ratio of pure sterol to crude sterol. In some embodiments, the sterol blend comprises from 20:80 to 30:70 weight ratio of pure sterol to crude sterol. In some embodiments, the sterol blend comprises from 25:75 to 30:70 weight ratio of pure sterol to crude sterol. In some embodiments, the sterol blend comprises from 10:90 to 25:75 weight ratio of pure sterol to crude sterol. In some embodiments, the sterol blend comprises from 15:85 to 25:75 weight ratio of pure sterol to crude sterol. In some embodiments, the sterol blend comprises from 20:80 to 25:75 weight ratio of pure sterol to crude sterol. In some embodiments, the sterol blend comprises from 10:90 to 20:80 weight ratio of pure sterol to crude sterol. In some embodiments, the sterol blend comprises from 15:85 to 20:80 weight ratio of pure sterol to crude sterol. In some embodiments, the sterol blend comprises from 10:90 to 15:85 weight ratio of pure sterol to crude sterol.

In some embodiments, crude sterol may include one or more of modified and/or unmodified corn oil, sugarcane oil, wheat germ oil, sarsaparilla root, soybean pitch, and/or corn oil pitch. In some embodiments, crude sterol may include one or more of stigmasterol, β-sitosterol, campesterol, ergosterol, brassicasterol, and/or lanosterol, and/or mixtures thereof. In some embodiments, crude sterol may include a bio-derived source and/or partially distilled residue of the bio-derived source. In some embodiments, the crude sterol may include an animal derived oil, such as cholesterol.

In some embodiments, the additive, such as the rejuvenating or anti-aging agent, may comprise a reclaimed sterol. In some embodiments, a reclaimed sterol may refer to sterol contained in aged asphalt binder and/or binder that was previously present in an existing, used and/or unused asphalt pavement, and/or an existing used and/or unused asphalt shingle. In some embodiments, a reclaimed sterol may be present in any of the AC powder, the ASW powder, and/or the asphalt product in a weight percentage from 1% to 50%. In some embodiments, a reclaimed sterol may be present in any of the AC powder, ASW powder, and/or the asphalt product in a weight percentage from 2% to 50%. In some embodiments, a reclaimed sterol may be present in any of the AC powder, ASW powder, and/or the asphalt product in a weight percentage from 3% to 50%. In some embodiments, a reclaimed sterol may be present in any of the AC powder, ASW powder, and/or the asphalt product in a weight percentage from 4% to 50%. In some embodiments, a reclaimed sterol may be present in any of the AC powder, ASW powder, and/or the asphalt product in a weight percentage from 5% to 50%. In some embodiments, a reclaimed sterol may be present in any of the AC powder, ASW powder, and/or the asphalt product in a weight percentage from 10% to 50%. In some embodiments, a reclaimed sterol may be present in any of the AC powder, ASW powder, and/or the asphalt product in a weight percentage from 15% to 50%. In some embodiments, a reclaimed sterol may be present in any of the AC powder, ASW powder, and/or the asphalt product in a weight percentage from 20% to 50%. In some embodiments, a reclaimed sterol may be present in any of the AC powder, ASW powder, and/or the asphalt product in a weight percentage from 25% to 50%. In some embodiments, a reclaimed sterol may be present in any of the AC powder, ASW powder, and/or the asphalt product in a weight percentage from 30% to 50%. In some embodiments, a reclaimed sterol may be present in any of the AC powder, ASW powder, and/or the asphalt product in a weight percentage from 35% to 50%. In some embodiments, a reclaimed sterol may be present in any of the AC powder, ASW powder, and/or the asphalt product in a weight percentage from 40% to 50%. In some embodiments, a reclaimed sterol may be present in any of the AC powder, ASW powder, and/or the asphalt product in a weight percentage from 45% to 50%. In some embodiments, a reclaimed sterol may be present in any of the AC powder, ASW powder, and/or the asphalt product in a weight percentage from 1% to 45%. In some embodiments, a reclaimed sterol may be present in any of the AC powder, ASW powder, and/or the asphalt product in a weight percentage from 2% to 45%. In some embodiments, a reclaimed sterol may be present in any of the AC powder, ASW powder, and/or the asphalt product in a weight percentage from 3% to 45%. In some embodiments, a reclaimed sterol may be present in any of the AC powder, ASW powder, and/or the asphalt product in a weight percentage from 4% to 45%. In some embodiments, a reclaimed sterol may be present in any of the AC powder, ASW powder, and/or the asphalt product in a weight percentage from 5% to 45%. In some embodiments, a reclaimed sterol may be present in any of the AC powder, ASW powder, and/or the asphalt product in a weight percentage from 10% to 45%. In some embodiments, a reclaimed sterol may be present in any of the AC powder, ASW powder, and/or the asphalt product in a weight percentage from 15% to 45%. In some embodiments, a reclaimed sterol may be present in any of the AC powder, ASW powder, and/or the asphalt product in a weight percentage from 20% to 45%. In some embodiments, a reclaimed sterol may be present in any of the AC powder, ASW powder, and/or the asphalt product in a weight percentage from 25% to 45%. In some embodiments, a reclaimed sterol may be present in any of the AC powder, ASW powder, and/or the asphalt product in a weight percentage from 30% to 45%. In some embodiments, a reclaimed sterol may be present in any of the AC powder, ASW powder, and/or the asphalt product in a weight percentage from 35% to 45%. In some embodiments, a reclaimed sterol may be present in any of the AC powder, ASW powder, and/or the asphalt product in a weight percentage from 40% to 45%. In some embodiments, a reclaimed sterol may be present in any of the AC powder, ASW powder, and/or the asphalt product in a weight percentage from 1% to 40%. In some embodiments, a reclaimed sterol may be present in any of the AC powder, ASW powder, and/or the asphalt product in a weight percentage from 2% to 40%. In some embodiments, a reclaimed sterol may be present in any of the AC powder, ASW powder, and/or the asphalt product in a weight percentage from 3% to 40%. In some embodiments, a reclaimed sterol may be present in any of the AC powder, ASW powder, and/or the asphalt product in a weight percentage from 4% to 40%. In some embodiments, a reclaimed sterol may be present in any of the AC powder, ASW powder, and/or the asphalt product in a weight percentage from 5% to 40%. In some embodiments, a reclaimed sterol may be present in any of the AC powder, ASW powder, and/or the asphalt product in a weight percentage from 10% to 40%. In some embodiments, a reclaimed sterol may be present in any of the AC powder, ASW powder, and/or the asphalt product in a weight percentage from 15% to 40%. In some embodiments, a reclaimed sterol may be present in any of the AC powder, ASW powder, and/or the asphalt product in a weight percentage from 20% to 40%. In some embodiments, a reclaimed sterol may be present in any of the AC powder, ASW powder, and/or the asphalt product in a weight percentage from 25% to 40%. In some embodiments, a reclaimed sterol may be present in any of the AC powder, ASW powder, and/or the asphalt product in a weight percentage from 30% to 40%. In some embodiments, a reclaimed sterol may be present in any of the AC powder, ASW powder, and/or the asphalt product in a weight percentage from 35% to 40%. In some embodiments, a reclaimed sterol may be present in any of the AC powder, ASW powder, and/or the asphalt product in a weight percentage from 1% to 35%. In some embodiments, a reclaimed sterol may be present in any of the AC powder, ASW powder, and/or the asphalt product in a weight percentage from 2% to 35%. In some embodiments, a reclaimed sterol may be present in any of the AC powder, ASW powder, and/or the asphalt product in a weight percentage from 3% to 35%. In some embodiments, a reclaimed sterol may be present in any of the AC powder, ASW powder, and/or the asphalt product in a weight percentage from 4% to 35%. In some embodiments, a reclaimed sterol may be present in any of the AC powder, ASW powder, and/or the asphalt product in a weight percentage from 5% to 35%. In some embodiments, a reclaimed sterol may be present in any of the AC powder, ASW powder, and/or the asphalt product in a weight percentage from 10% to 35%. In some embodiments, a reclaimed sterol may be present in any of the AC powder, ASW powder, and/or the asphalt product in a weight percentage from 15% to 35%. In some embodiments, a reclaimed sterol may be present in any of the AC powder, ASW powder, and/or the asphalt product in a weight percentage from 20% to 35%. In some embodiments, a reclaimed sterol may be present in any of the AC powder, ASW powder, and/or the asphalt product in a weight percentage from 25% to 35%. In some embodiments, a reclaimed sterol may be present in any of the AC powder, ASW powder, and/or the asphalt product in a weight percentage from 30% to 35%. In some embodiments, a reclaimed sterol may be present in any of the AC powder, ASW powder, and/or the asphalt product in a weight percentage from 1% to 30%. In some embodiments, a reclaimed sterol may be present in any of the AC powder, ASW powder, and/or the asphalt product in a weight percentage from 2% to 30%. In some embodiments, a reclaimed sterol may be present in any of the AC powder, ASW powder, and/or the asphalt product in a weight percentage from 3% to 30%. In some embodiments, a reclaimed sterol may be present in any of the AC powder, ASW powder, and/or the asphalt product in a weight percentage from 4% to 30%. In some embodiments, a reclaimed sterol may be present in any of the AC powder, ASW powder, and/or the asphalt product in a weight percentage from 5% to 30%. In some embodiments, a reclaimed sterol may be present in any of the AC powder, ASW powder, and/or the asphalt product in a weight percentage from 10% to 30%. In some embodiments, a reclaimed sterol may be present in any of the AC powder, ASW powder, and/or the asphalt product in a weight percentage from 15% to 30%. In some embodiments, a reclaimed sterol may be present in any of the AC powder, ASW powder, and/or the asphalt product in a weight percentage from 20% to 30%. In some embodiments, a reclaimed sterol may be present in any of the AC powder, ASW powder, and/or the asphalt product in a weight percentage from 25% to 30%. In some embodiments, a reclaimed sterol may be present in any of the AC powder, ASW powder, and/or the asphalt product in a weight percentage from 1% to 25%. In some embodiments, a reclaimed sterol may be present in any of the AC powder, ASW powder, and/or the asphalt product in a weight percentage from 2% to 25%. In some embodiments, a reclaimed sterol may be present in any of the AC powder, ASW powder, and/or the asphalt product in a weight percentage from 3% to 25%. In some embodiments, a reclaimed sterol may be present in any of the AC powder, ASW powder, and/or the asphalt product in a weight percentage from 4% to 25%. In some embodiments, a reclaimed sterol may be present in any of the AC powder, ASW powder, and/or the asphalt product in a weight percentage from 5% to 25%. In some embodiments, a reclaimed sterol may be present in any of the AC powder, ASW powder, and/or the asphalt product in a weight percentage from 10% to 25%. In some embodiments, a reclaimed sterol may be present in any of the AC powder, ASW powder, and/or the asphalt product in a weight percentage from 15% to 25%. In some embodiments, a reclaimed sterol may be present in any of the AC powder, ASW powder, and/or the asphalt product in a weight percentage from 20% to 25%. In some embodiments, a reclaimed sterol may be present in any of the AC powder, ASW powder, and/or the asphalt product in a weight percentage from 1% to 20%. In some embodiments, a reclaimed sterol may be present in any of the AC powder, ASW powder, and/or the asphalt product in a weight percentage from 2% to 20%. In some embodiments, a reclaimed sterol may be present in any of the AC powder, ASW powder, and/or the asphalt product in a weight percentage from 3% to 20%. In some embodiments, a reclaimed sterol may be present in any of the AC powder, ASW powder, and/or the asphalt product in a weight percentage from 4% to 20%. In some embodiments, a reclaimed sterol may be present in any of the AC powder, ASW powder, and/or the asphalt product in a weight percentage from 5% to 20%. In some embodiments, a reclaimed sterol may be present in any of the AC powder, ASW powder, and/or the asphalt product in a weight percentage from 10% to 20%. In some embodiments, a reclaimed sterol may be present in any of the AC powder, ASW powder, and/or the asphalt product in a weight percentage from 15% to 20%. In some embodiments, a reclaimed sterol may be present in any of the AC powder, ASW powder, and/or the asphalt product in a weight percentage from 1% to 15%. In some embodiments, a reclaimed sterol may be present in any of the AC powder, ASW powder, and/or the asphalt product in a weight percentage from 2% to 15%. In some embodiments, a reclaimed sterol may be present in any of the AC powder, ASW powder, and/or the asphalt product in a weight percentage from 3% to 15%. In some embodiments, a reclaimed sterol may be present in any of the AC powder, ASW powder, and/or the asphalt product in a weight percentage from 4% to 15%. In some embodiments, a reclaimed sterol may be present in any of the AC powder, ASW powder, and/or the asphalt product in a weight percentage from 5% to 15%. In some embodiments, a reclaimed sterol may be present in any of the AC powder, ASW powder, and/or the asphalt product in a weight percentage from 10% to 15%. In some embodiments, a reclaimed sterol may be present in any of the AC powder, ASW powder, and/or the asphalt product in a weight percentage from 1% to 10%. In some embodiments, a reclaimed sterol may be present in any of the AC powder, ASW powder, and/or the asphalt product in a weight percentage from 2% to 10%. In some embodiments, a reclaimed sterol may be present in any of the AC powder, ASW powder, and/or the asphalt product in a weight percentage from 3% to 10%. In some embodiments, a reclaimed sterol may be present in any of the AC powder, ASW powder, and/or the asphalt product in a weight percentage from 4% to 10%. In some embodiments, a reclaimed sterol may be present in any of the AC powder, ASW powder, and/or the asphalt product in a weight percentage from 5% to 10%. In some embodiments, a reclaimed sterol may be present in any of the AC powder, ASW powder, and/or the asphalt product in a weight percentage from 1% to 5%. In some embodiments, a reclaimed sterol may be present in any of the AC powder, ASW powder, and/or the asphalt product in a weight percentage from 2% to 5%. In some embodiments, a reclaimed sterol may be present in any of the AC powder, ASW powder, and/or the asphalt product in a weight percentage from 3% to 5%. In some embodiments, a reclaimed sterol may be present in any of the AC powder, ASW powder, and/or the asphalt product in a weight percentage from 4% to 5%. In some embodiments, a reclaimed sterol may be present in any of the AC powder, ASW powder, and/or the asphalt product in a weight percentage from 1% to 4%. In some embodiments, a reclaimed sterol may be present in any of the AC powder, ASW powder, and/or the asphalt product in a weight percentage from 2% to 4%. In some embodiments, a reclaimed sterol may be present in any of the AC powder, ASW powder, and/or the asphalt product in a weight percentage from 3% to 4%. In some embodiments, a reclaimed sterol may be present in any of the AC powder, ASW powder, and/or the asphalt product in a weight percentage from 1% to 3%. In some embodiments, a reclaimed sterol may be present in any of the AC powder, ASW powder, and/or the asphalt product in a weight percentage from 2% to 3%. In some embodiments, a reclaimed sterol may be present in any of the AC powder, ASW powder, and/or the asphalt product in a weight percentage from 1% to 2%.

In some embodiments, the additive, such as the rejuvenating and/or anti-aging agent, may be a blend of reclaimed sterol and fresh sterol, where fresh sterol is sterol that has not been reclaimed. In some embodiments, the sterol blend comprises from 10:90 to 90:10 weight ratio of reclaimed sterol to fresh sterol. In some embodiments, the sterol blend comprises from 15:85 to 90:10 weight ratio of reclaimed sterol to fresh sterol. In some embodiments, the sterol blend comprises from 20:80 to 90:10 weight ratio of reclaimed sterol to fresh sterol. In some embodiments, the sterol blend comprises from 25:75 to 90:10 weight ratio of reclaimed sterol to fresh sterol. In some embodiments, the sterol blend comprises from 30:70 to 90:10 weight ratio of reclaimed sterol to fresh sterol. In some embodiments, the sterol blend comprises from 35:65 to 90:10 weight ratio of reclaimed sterol to fresh sterol. In some embodiments, the sterol blend comprises from 40:60 to 90:10 weight ratio of reclaimed sterol to fresh sterol. In some embodiments, the sterol blend comprises from 45:55 to 90:10 weight ratio of reclaimed sterol to fresh sterol. In some embodiments, the sterol blend comprises from 50:50 to 90:10 weight ratio of reclaimed sterol to fresh sterol. In some embodiments, the sterol blend comprises from 55:45 to 90:10 weight ratio of reclaimed sterol to fresh sterol. In some embodiments, the sterol blend comprises from 60:40 to 90:10 weight ratio of reclaimed sterol to fresh sterol. In some embodiments, the sterol blend comprises from 65:35 to 90:10 weight ratio of reclaimed sterol to fresh sterol. In some embodiments, the sterol blend comprises from 70:30 to 90:10 weight ratio of reclaimed sterol to fresh sterol. In some embodiments, the sterol blend comprises from 75:25 to 90:10 weight ratio of reclaimed sterol to fresh sterol. In some embodiments, the sterol blend comprises from 80:20 to 90:10 weight ratio of reclaimed sterol to fresh sterol. In some embodiments, the sterol blend comprises from 85:15 to 90:10 weight ratio of reclaimed sterol to fresh sterol. In some embodiments, the sterol blend comprises from 10:90 to 85:15 weight ratio of reclaimed sterol to fresh sterol. In some embodiments, the sterol blend comprises from 15:85 to 85:15 weight ratio of reclaimed sterol to fresh sterol. In some embodiments, the sterol blend comprises from 20:80 to 85:15 weight ratio of reclaimed sterol to fresh sterol. In some embodiments, the sterol blend comprises from 25:75 to 85:15 weight ratio of reclaimed sterol to fresh sterol. In some embodiments, the sterol blend comprises from 30:70 to 85:15 weight ratio of reclaimed sterol to fresh sterol. In some embodiments, the sterol blend comprises from 35:65 to 85:15 weight ratio of reclaimed sterol to fresh sterol. In some embodiments, the sterol blend comprises from 40:60 to 85:15 weight ratio of reclaimed sterol to fresh sterol. In some embodiments, the sterol blend comprises from 45:55 to 85:15 weight ratio of reclaimed sterol to fresh sterol. In some embodiments, the sterol blend comprises from 50:50 to 85:15 weight ratio of reclaimed sterol to fresh sterol. In some embodiments, the sterol blend comprises from 55:45 to 85:15 weight ratio of reclaimed sterol to fresh sterol. In some embodiments, the sterol blend comprises from 60:40 to 85:15 weight ratio of reclaimed sterol to fresh sterol. In some embodiments, the sterol blend comprises from 65:35 to 85:15 weight ratio of reclaimed sterol to fresh sterol. In some embodiments, the sterol blend comprises from 70:30 to 85:15 weight ratio of reclaimed sterol to fresh sterol. In some embodiments, the sterol blend comprises from 75:25 to 85:15 weight ratio of reclaimed sterol to fresh sterol. In some embodiments, the sterol blend comprises from 80:20 to 85:15 weight ratio of reclaimed sterol to fresh sterol. In some embodiments, the sterol blend comprises from 10:90 to 80:20 weight ratio of reclaimed sterol to fresh sterol. In some embodiments, the sterol blend comprises from 15:85 to 80:20 weight ratio of reclaimed sterol to fresh sterol. In some embodiments, the sterol blend comprises from 20:80 to 80:20 weight ratio of reclaimed sterol to fresh sterol. In some embodiments, the sterol blend comprises from 25:75 to 80:20 weight ratio of reclaimed sterol to fresh sterol. In some embodiments, the sterol blend comprises from 30:70 to 80:20 weight ratio of reclaimed sterol to fresh sterol. In some embodiments, the sterol blend comprises from 35:65 to 80:20 weight ratio of reclaimed sterol to fresh sterol. In some embodiments, the sterol blend comprises from 40:60 to 80:20 weight ratio of reclaimed sterol to fresh sterol. In some embodiments, the sterol blend comprises from 45:55 to 80:20 weight ratio of reclaimed sterol to fresh sterol. In some embodiments, the sterol blend comprises from 50:50 to 80:20 weight ratio of reclaimed sterol to fresh sterol. In some embodiments, the sterol blend comprises from 55:45 to 80:20 weight ratio of reclaimed sterol to fresh sterol. In some embodiments, the sterol blend comprises from 60:40 to 80:20 weight ratio of reclaimed sterol to fresh sterol. In some embodiments, the sterol blend comprises from 65:35 to 80:20 weight ratio of reclaimed sterol to fresh sterol. In some embodiments, the sterol blend comprises from 70:30 to 80:20 weight ratio of reclaimed sterol to fresh sterol. In some embodiments, the sterol blend comprises from 75:25 to 80:20 weight ratio of reclaimed sterol to fresh sterol. In some embodiments, the sterol blend comprises from 10:90 to 75:25 weight ratio of reclaimed sterol to fresh sterol. In some embodiments, the sterol blend comprises from 15:85 to 75:25 weight ratio of reclaimed sterol to fresh sterol. In some embodiments, the sterol blend comprises from 20:80 to 75:25 weight ratio of reclaimed sterol to fresh sterol. In some embodiments, the sterol blend comprises from 25:75 to 75:25 weight ratio of reclaimed sterol to fresh sterol. In some embodiments, the sterol blend comprises from 30:70 to 75:25 weight ratio of reclaimed sterol to fresh sterol. In some embodiments, the sterol blend comprises from 35:65 to 75:25 weight ratio of reclaimed sterol to fresh sterol. In some embodiments, the sterol blend comprises from 40:60 to 75:25 weight ratio of reclaimed sterol to fresh sterol. In some embodiments, the sterol blend comprises from 45:55 to 75:25 weight ratio of reclaimed sterol to fresh sterol. In some embodiments, the sterol blend comprises from 50:50 to 75:25 weight ratio of reclaimed sterol to fresh sterol. In some embodiments, the sterol blend comprises from 55:45 to 75:25 weight ratio of reclaimed sterol to fresh sterol. In some embodiments, the sterol blend comprises from 60:40 to 75:25 weight ratio of reclaimed sterol to fresh sterol. In some embodiments, the sterol blend comprises from 65:35 to 75:25 weight ratio of reclaimed sterol to fresh sterol. In some embodiments, the sterol blend comprises from 70:30 to 75:25 weight ratio of reclaimed sterol to fresh sterol. In some embodiments, the sterol blend comprises from 10:90 to 70:30 weight ratio of reclaimed sterol to fresh sterol. In some embodiments, the sterol blend comprises from 15:85 to 70:30 weight ratio of reclaimed sterol to fresh sterol. In some embodiments, the sterol blend comprises from 20:80 to 70:30 weight ratio of reclaimed sterol to fresh sterol. In some embodiments, the sterol blend comprises from 25:75 to 70:30 weight ratio of reclaimed sterol to fresh sterol. In some embodiments, the sterol blend comprises from 30:70 to 70:30 weight ratio of reclaimed sterol to fresh sterol. In some embodiments, the sterol blend comprises from 35:65 to 70:30 weight ratio of reclaimed sterol to fresh sterol. In some embodiments, the sterol blend comprises from 40:60 to 70:30 weight ratio of reclaimed sterol to fresh sterol. In some embodiments, the sterol blend comprises from 45:55 to 70:30 weight ratio of reclaimed sterol to fresh sterol. In some embodiments, the sterol blend comprises from 50:50 to 70:30 weight ratio of reclaimed sterol to fresh sterol. In some embodiments, the sterol blend comprises from 55:45 to 70:30 weight ratio of reclaimed sterol to fresh sterol. In some embodiments, the sterol blend comprises from 60:40 to 70:30 weight ratio of reclaimed sterol to fresh sterol. In some embodiments, the sterol blend comprises from 65:35 to 70:30 weight ratio of reclaimed sterol to fresh sterol. In some embodiments, the sterol blend comprises from 10:90 to 65:35 weight ratio of reclaimed sterol to fresh sterol. In some embodiments, the sterol blend comprises from 15:85 to 65:35 weight ratio of reclaimed sterol to fresh sterol. In some embodiments, the sterol blend comprises from 20:80 to 65:35 weight ratio of reclaimed sterol to fresh sterol. In some embodiments, the sterol blend comprises from 25:75 to 65:35 weight ratio of reclaimed sterol to fresh sterol. In some embodiments, the sterol blend comprises from 30:70 to 65:35 weight ratio of reclaimed sterol to fresh sterol. In some embodiments, the sterol blend comprises from 35:65 to 65:35 weight ratio of reclaimed sterol to fresh sterol. In some embodiments, the sterol blend comprises from 40:60 to 65:35 weight ratio of reclaimed sterol to fresh sterol. In some embodiments, the sterol blend comprises from 45:55 to 65:35 weight ratio of reclaimed sterol to fresh sterol. In some embodiments, the sterol blend comprises from 50:50 to 65:35 weight ratio of reclaimed sterol to fresh sterol. In some embodiments, the sterol blend comprises from 55:45 to 65:35 weight ratio of reclaimed sterol to fresh sterol. In some embodiments, the sterol blend comprises from 60:40 to 65:35 weight ratio of reclaimed sterol to fresh sterol. In some embodiments, the sterol blend comprises from 10:90 to 60:40 weight ratio of reclaimed sterol to fresh sterol. In some embodiments, the sterol blend comprises from 15:85 to 60:40 weight ratio of reclaimed sterol to fresh sterol. In some embodiments, the sterol blend comprises from 20:80 to 60:40 weight ratio of reclaimed sterol to fresh sterol. In some embodiments, the sterol blend comprises from 25:75 to 60:40 weight ratio of reclaimed sterol to fresh sterol. In some embodiments, the sterol blend comprises from 30:70 to 60:40 weight ratio of reclaimed sterol to fresh sterol. In some embodiments, the sterol blend comprises from 35:65 to 60:40 weight ratio of reclaimed sterol to fresh sterol. In some embodiments, the sterol blend comprises from 40:60 to 60:40 weight ratio of reclaimed sterol to fresh sterol. In some embodiments, the sterol blend comprises from 45:55 to 60:40 weight ratio of reclaimed sterol to fresh sterol. In some embodiments, the sterol blend comprises from 50:50 to 60:40 weight ratio of reclaimed sterol to fresh sterol. In some embodiments, the sterol blend comprises from 55:45 to 60:40 weight ratio of reclaimed sterol to fresh sterol. In some embodiments, the sterol blend comprises from 10:90 to 55:45 weight ratio of reclaimed sterol to fresh sterol. In some embodiments, the sterol blend comprises from 15:85 to 55:45 weight ratio of reclaimed sterol to fresh sterol. In some embodiments, the sterol blend comprises from 20:80 to 55:45 weight ratio of reclaimed sterol to fresh sterol. In some embodiments, the sterol blend comprises from 25:75 to 55:45 weight ratio of reclaimed sterol to fresh sterol. In some embodiments, the sterol blend comprises from 30:70 to 55:45 weight ratio of reclaimed sterol to fresh sterol. In some embodiments, the sterol blend comprises from 35:65 to 55:45 weight ratio of reclaimed sterol to fresh sterol. In some embodiments, the sterol blend comprises from 40:60 to 55:45 weight ratio of reclaimed sterol to fresh sterol. In some embodiments, the sterol blend comprises from 45:55 to 55:45 weight ratio of reclaimed sterol to fresh sterol. In some embodiments, the sterol blend comprises from 50:50 to 55:45 weight ratio of reclaimed sterol to fresh sterol. In some embodiments, the sterol blend comprises from 10:90 to 50:50 weight ratio of reclaimed sterol to fresh sterol. In some embodiments, the sterol blend comprises from 15:85 to 50:50 weight ratio of reclaimed sterol to fresh sterol. In some embodiments, the sterol blend comprises from 20:80 to 50:50 weight ratio of reclaimed sterol to fresh sterol. In some embodiments, the sterol blend comprises from 25:75 to 50:50 weight ratio of reclaimed sterol to fresh sterol. In some embodiments, the sterol blend comprises from 30:70 to 50:50 weight ratio of reclaimed sterol to fresh sterol. In some embodiments, the sterol blend comprises from 35:65 to 50:50 weight ratio of reclaimed sterol to fresh sterol. In some embodiments, the sterol blend comprises from 40:60 to 50:50 weight ratio of reclaimed sterol to fresh sterol. In some embodiments, the sterol blend comprises from 45:55 to 50:50 weight ratio of reclaimed sterol to fresh sterol. In some embodiments, the sterol blend comprises from 10:90 to 45:55 weight ratio of reclaimed sterol to fresh sterol. In some embodiments, the sterol blend comprises from 15:85 to 45:55 weight ratio of reclaimed sterol to fresh sterol. In some embodiments, the sterol blend comprises from 20:80 to 45:55 weight ratio of reclaimed sterol to fresh sterol. In some embodiments, the sterol blend comprises from 25:75 to 45:55 weight ratio of reclaimed sterol to fresh sterol. In some embodiments, the sterol blend comprises from 30:70 to 45:55 weight ratio of reclaimed sterol to fresh sterol. In some embodiments, the sterol blend comprises from 35:65 to 45:55 weight ratio of reclaimed sterol to fresh sterol. In some embodiments, the sterol blend comprises from 40:60 to 45:55 weight ratio of reclaimed sterol to fresh sterol. In some embodiments, the sterol blend comprises from 10:90 to 40:60 weight ratio of reclaimed sterol to fresh sterol. In some embodiments, the sterol blend comprises from 15:85 to 40:60 weight ratio of reclaimed sterol to fresh sterol. In some embodiments, the sterol blend comprises from 20:80 to 40:60 weight ratio of reclaimed sterol to fresh sterol. In some embodiments, the sterol blend comprises from 25:75 to 40:60 weight ratio of reclaimed sterol to fresh sterol. In some embodiments, the sterol blend comprises from 30:70 to 40:60 weight ratio of reclaimed sterol to fresh sterol. In some embodiments, the sterol blend comprises from 35:65 to 40:60 weight ratio of reclaimed sterol to fresh sterol. In some embodiments, the sterol blend comprises from 10:90 to 35:65 weight ratio of reclaimed sterol to fresh sterol. In some embodiments, the sterol blend comprises from 15:85 to 35:65 weight ratio of reclaimed sterol to fresh sterol. In some embodiments, the sterol blend comprises from 20:80 to 35:65 weight ratio of reclaimed sterol to fresh sterol. In some embodiments, the sterol blend comprises from 25:75 to 35:65 weight ratio of reclaimed sterol to fresh sterol. In some embodiments, the sterol blend comprises from 30:70 to 35:65 weight ratio of reclaimed sterol to fresh sterol. In some embodiments, the sterol blend comprises from 10:90 to 30:70 weight ratio of reclaimed sterol to fresh sterol. In some embodiments, the sterol blend comprises from 15:85 to 30:70 weight ratio of reclaimed sterol to fresh sterol. In some embodiments, the sterol blend comprises from 20:80 to 30:70 weight ratio of reclaimed sterol to fresh sterol. In some embodiments, the sterol blend comprises from 25:75 to 30:70 weight ratio of reclaimed sterol to fresh sterol. In some embodiments, the sterol blend comprises from 10:90 to 25:75 weight ratio of reclaimed sterol to fresh sterol. In some embodiments, the sterol blend comprises from 15:85 to 25:75 weight ratio of reclaimed sterol to fresh sterol. In some embodiments, the sterol blend comprises from 20:80 to 25:75 weight ratio of reclaimed sterol to fresh sterol. In some embodiments, the sterol blend comprises from 10:90 to 20:80 weight ratio of reclaimed sterol to fresh sterol. In some embodiments, the sterol blend comprises from 15:85 to 20:80 weight ratio of reclaimed sterol to fresh sterol. In some embodiments, the sterol blend comprises from 10:90 to 15:85 weight ratio of reclaimed sterol to fresh sterol.

In some embodiments, the total weight percent of the sterol blend of the reclaimed sterol and the fresh sterol may be from 0.5 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 6 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 5 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 4 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 3 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 2 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 1 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 0.9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 0.8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 0.7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.5 wt % to 0.6 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 0.6 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 6 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 5 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 4 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 3 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 2 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 1 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 0.9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 0.8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.6 wt % to 0.7 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 0.7 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 6 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 5 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 4 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 3 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 2 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 1 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 0.9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.7 wt % to 0.8 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 0.8 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 6 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 5 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 4 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 3 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 2 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 1 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.8 wt % to 0.9 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 0.9 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 6 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 5 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 4 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 3 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 2 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 0.9 wt % to 1 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 1 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 6 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 5 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 4 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 3 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 1 wt % to 2 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 2 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 6 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 5 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 4 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 2 wt % to 3 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 3 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 6 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 5 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 3 wt % to 4 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 4 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 6 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 4 wt % to 5 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 5 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 5 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 5 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 5 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 5 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 5 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 5 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 5 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 5 wt % to 7 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 5 wt % to 6 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 6 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 6 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 6 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 6 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 6 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 6 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 6 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 6 wt % to 8 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 6 wt % to 7 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 7 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 7 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 7 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 7 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 7 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 7 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 7 wt % to 9 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 7 wt % to 8 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 8 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 8 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 8 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 8 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 8 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 8 wt % to 10 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 8 wt % to 9 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 9 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 9 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 9 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 9 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 9 wt % to 11 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 9 wt % to 10 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 10 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 10 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 10 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 10 wt % to 12 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 10 wt % to 11 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 11 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 11 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 11 wt % to 13 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 11 wt % to 12 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 12 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 12 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 12 wt % to 13 wt % of the total weight of the ASW powder, briquette, or asphalt product including the ASW powder and/or briquette, and/or any additives.

In some embodiments, the total weight percent of the sterol blend of the reclaimed sterol and the fresh sterol may be from 13 wt % to 15 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 13 wt % to 14 wt % of the total weight of the ASW powder, briquette, or asphalt product including the ASW powder and/or briquette, and/or any additives. In some embodiments, the total weight percent of the sterol blend of the reclaimed sterol and the fresh sterol may be from 14 wt % to 15 wt % of the total weight of the ASW powder, briquette, or asphalt product including the ASW powder and/or briquette, and/or any additives.

In some embodiments, the additive, such as the rejuvenating and/or anti-aging agent, may include i) a fused hydrocarbon ring structure, ii) a polar element attached to the ring structure, and iii) an aliphatic element attached to the ring structure opposite the polar element. In some embodiments, the fused ring structure may comprise multiple fused aliphatic rings of about 12 to about 24 carbon atoms, optionally including one or more attached methyl moieties, or one or more double bonds in one or more of the fused rings. In some embodiments, the fused hydrocarbon ring structure may comprise one or more of 3 ring structures, 4 ring structures, 5 ring structures, and/or 6 ring structures. In some embodiments, the ring structures may be saturated rings and/or unsaturated rings, having one or more double bonds in any of fused rings. In some embodiments, the hydrocarbon fused ring structures may omit fused ring structures that include aromatic rings, such as polycyclic aromatic compounds. In some embodiments, the ring structures may include one or more of sterol and/or stanol molecules having fused ring structures, such as but not limited to Δ5-avenosterol, Δ7-avenosterol, 5.alpha.-stigmast-8(14)-en-3-one, 5-ergosten-3-one, 22-methylcholesterol, brassicasterol, campesterol, campestanol, cholestan-4-ol, coprosterol, ergost-22-ene-1,3-diol, stigasterol, Δ7-stigasterol, stigmasterol, sitostanol, and/or β-sitosterol. In some embodiments, the fused rings may include one or more alkyl moieties, such as methyl moieties, attached to the ring structure.

In some embodiments, the polar element may comprise linear or branched alkyl, or alkenyl moieties having about 2 to about 16 carbon atoms. In some embodiments, the polar element may comprise a hydroxyl moiety. In some embodiments, the polar elements may comprise —OH, —$OR_a$, —OCO—$R_a$, $R_aCO_2H$, —F, —Cl, —Br, —SH, —SO—, —$SO_2$, —$NH_2$, —$NHR_a$, or —$N(R_aR_b)$, wherein $R_a$ and $R_b$ are $C_1$-$C_{10}$ linear or branched alkyl or alkenyl groups, optionally substituted with one or more hydroxyl moieties.

In some embodiments, the additive may be at least one sterol and/or stanol additive. In some embodiments, the additive may be one or more blends of one or more of sterol and/or stanol additives. In some embodiments, the sterol and/or stanol additive may be derived from animal waste. In some embodiments, the animal waste may be manure. In some embodiments, the manure may be swine manure. In some embodiments, the manure may be poultry manure. In some embodiments, the manure may be cow manure.

In some embodiments, the additive may be a blend of at least one first animal waste-derived sterol or stanol additive and at least one second sterol or stanol additive derived from a source other than animal waste. In some embodiments, a blend of at least one first animal waste-derived sterol or stanol additive and at least one second sterol or stanol additive derived from a source other than animal waste comprises a 10:90 to 90:10 weight ratio of at least one first animal waste-derived sterol or stanol additive and at least one second sterol or stanol additive derived from a source other than animal waste. In some embodiments, the blend comprises from 10:90 to 90:10 weight ratio of at least one first animal waste derived additive to at least one second additive derived from a source other than animal waste. In some embodiments, the blend comprises from 15:85 to 90:10 weight ratio of at least one first animal waste derived additive to at least one second additive derived from a source other than animal waste. In some embodiments, the blend comprises from 20:80 to 90:10 weight ratio of at least one first animal waste derived additive to at least one second additive derived from a source other than animal waste. In some embodiments, the blend comprises from 25:75 to 90:10 weight ratio of at least one first animal waste derived additive to at least one second additive derived from a source other than animal waste. In some embodiments, the blend comprises from 30:70 to 90:10 weight ratio of at least one first animal waste derived additive to at least one second additive derived from a source other than animal waste. In some embodiments, the blend comprises from 35:65 to 90:10 weight ratio of at least one first animal waste derived additive to at least one second additive derived from a source other than animal waste. In some embodiments, the blend comprises from 40:60 to 90:10 weight ratio of at least one first animal waste derived additive to at least one second additive derived from a source other than animal waste. In some embodiments, the blend comprises from 45:55 to 90:10 weight ratio of at least one first animal waste derived additive to at least one second additive derived from a source other than animal waste. In some embodiments, the blend comprises from 50:50 to 90:10 weight ratio of at least one first animal waste derived additive to at least one second additive derived from a source other than animal waste. In some embodiments, the blend comprises from 55:45 to 90:10 weight ratio of at least one first animal waste derived additive to at least one second additive derived from a source other than animal waste. In some embodiments, the blend comprises from 60:40 to 90:10 weight ratio of at least one first animal waste derived additive to at least one second additive derived from a source other than animal waste. In some embodiments, the blend comprises from 65:35 to 90:10 weight ratio of at least one first animal waste derived additive to at least one second additive derived from a source other than animal waste. In some embodiments, the blend comprises from 70:30 to 90:10 weight ratio of at least one first animal waste derived additive to at least one second additive derived from a source other than animal waste. In some embodiments, the blend comprises from 75:25 to 90:10 weight ratio of at least one first animal waste derived additive to at least one second additive derived from a source other than animal waste. In some embodiments, the blend comprises from 80:20 to 90:10 weight ratio of at least one first animal waste derived additive to at least one second additive derived from a source other than animal waste. In some embodiments, the blend comprises from 85:15 to 90:10 weight ratio of at least one first animal waste derived additive to at least one second additive derived from a source other than animal waste. In some embodiments, the blend comprises from 10:90 to 85:15 weight ratio of at least one first animal waste derived additive to at least one second additive derived from a source other than animal waste. In some embodiments, the blend comprises from 15:85 to 85:15 weight ratio of at least one first animal waste derived additive to at least one second additive derived from a source other than animal waste. In some embodiments, the blend comprises from 20:80 to 85:15 weight ratio of at least one first animal waste derived additive to at least one second additive derived from a source other than animal waste. In some embodiments, the blend comprises from 25:75 to 85:15 weight ratio of at least one first animal waste derived additive to at least one second additive derived from a source other than animal waste. In some embodiments, the blend comprises from 30:70 to 85:15 weight ratio of at least one first animal waste derived additive to at least one second additive derived from a source other than animal waste. In some embodiments, the blend comprises from 35:65 to 85:15 weight ratio of at least one first animal waste derived additive to at least one second additive derived from a source other than animal waste. In some embodiments, the blend comprises from 40:60 to 85:15 weight ratio of at least one first animal waste derived additive to at least one second additive derived from a source other than animal waste. In some embodiments, the blend comprises from 45:55 to 85:15 weight ratio of at least one first animal waste derived additive to at least one second additive derived from a source other than animal waste. In some embodiments, the blend comprises from 50:50 to 85:15 weight ratio of at least one first animal waste derived additive to at least one second additive derived from a source other than animal waste. In some embodiments, the blend comprises from 55:45 to 85:15 weight ratio of at least one first animal waste derived additive to at least one second additive derived from a source other than animal waste. In some embodiments, the blend comprises from 60:40 to 85:15 weight ratio of at least one first animal waste derived additive to at least one second additive derived from a source other than animal waste. In some embodiments, the blend comprises from 65:35 to 85:15 weight ratio of at least one first animal waste derived additive to at least one second additive derived from a source other than animal waste. In some embodiments, the blend comprises from 70:30 to 85:15 weight ratio of at least one first animal waste derived additive to at least one second additive derived from a source other than animal waste. In some embodiments, the blend comprises from 75:25 to 85:15 weight ratio of at least one first animal waste derived additive to at least one second additive derived from a source other than animal waste. In some embodiments, the blend comprises from 80:20 to 85:15 weight ratio of at least one first animal waste derived additive to at least one second additive derived from a source other than animal waste. In some embodiments, the blend comprises from 10:90 to 80:20 weight ratio of at least one first animal waste derived additive to at least one second additive derived from a source other than animal waste. In some embodiments, the blend comprises from 15:85 to 80:20 weight ratio of at least one first animal waste derived additive to at least one second additive derived from a source other than animal waste. In some embodiments, the blend comprises from 20:80 to 80:20 weight ratio of at least one first animal waste derived additive to at least one second additive derived from a source other than animal waste. In some embodiments, the blend comprises from 25:75 to 80:20 weight ratio of at least one first animal waste derived additive to at least one second additive derived from a source other than animal waste. In some embodiments, the blend comprises from 30:70 to 80:20 weight ratio of at least one first animal waste derived additive to at least one second additive derived from a source other than animal waste. In some embodiments, the blend comprises from 35:65 to 80:20 weight ratio of at least one first animal waste derived additive to at least one second additive derived from a source other than animal waste. In some embodiments, the blend comprises from 40:60 to 80:20 weight ratio of at least one first animal waste derived additive to at least one second additive derived from a source other than animal waste. In some embodiments, the blend comprises from 45:55 to 80:20 weight ratio of at least one first animal waste derived additive to at least one second additive derived from a source other than animal waste. In some embodiments, the blend comprises from 50:50 to 80:20 weight ratio of at least one first animal waste derived additive to at least one second additive derived from a source other than animal waste. In some embodiments, the blend comprises from 55:45 to 80:20 weight ratio of at least one first animal waste derived additive to at least one second additive derived from a source other than animal waste. In some embodiments, the blend comprises from 60:40 to 80:20 weight ratio of at least one first animal waste derived additive to at least one second additive derived from a source other than animal waste. In some embodiments, the blend comprises from 65:35 to 80:20 weight ratio of at least one first animal waste derived additive to at least one second additive derived from a source other than animal waste. In some embodiments, the blend comprises from 70:30 to 80:20 weight ratio of at least one first animal waste derived additive to at least one second additive derived from a source other than animal waste. In some embodiments, the blend comprises from 75:25 to 80:20 weight ratio of at least one first animal waste derived additive to at least one second additive derived from a source other than animal waste. In some embodiments, the blend comprises from 10:90 to 75:25 weight ratio of at least one first animal waste derived additive to at least one second additive derived from a source other than animal waste. In some embodiments, the blend comprises from 15:85 to 75:25 weight ratio of at least one first animal waste derived additive to at least one second additive derived from a source other than animal waste. In some embodiments, the blend comprises from 20:80 to 75:25 weight ratio of at least one first animal waste derived additive to at least one second additive derived from a source other than animal waste. In some embodiments, the blend comprises from 25:75 to 75:25 weight ratio of at least one first animal waste derived additive to at least one second additive derived from a source other than animal waste. In some embodiments, the blend comprises from 30:70 to 75:25 weight ratio of at least one first animal waste derived additive to at least one second additive derived from a source other than animal waste. In some embodiments, the blend comprises from 35:65 to 75:25 weight ratio of at least one first animal waste derived additive to at least one second additive derived from a source other than animal waste. In some embodiments, the blend comprises from 40:60 to 75:25 weight ratio of at least one first animal waste derived additive to at least one second additive derived from a source other than animal waste. In some embodiments, the blend comprises from 45:55 to 75:25 weight ratio of at least one first animal waste derived additive to at least one second additive derived from a source other than animal waste. In some embodiments, the blend comprises from 50:50 to 75:25 weight ratio of at least one first animal waste derived additive to at least one second additive derived from a source other than animal waste. In some embodiments, the blend comprises from 55:45 to 75:25 weight ratio of at least one first animal waste derived additive to at least one second additive derived from a source other than animal waste. In some embodiments, the blend comprises from 60:40 to 75:25 weight ratio of at least one first animal waste derived additive to at least one second additive derived from a source other than animal waste. In some embodiments, the blend comprises from 65:35 to 75:25 weight ratio of at least one first animal waste derived additive to at least one second additive derived from a source other than animal waste. In some embodiments, the blend comprises from 70:30 to 75:25 weight ratio of at least one first animal waste derived additive to at least one second additive derived from a source other than animal waste. In some embodiments, the blend comprises from 10:90 to 70:30 weight ratio of at least one first animal waste derived additive to at least one second additive derived from a source other than animal waste. In some embodiments, the blend comprises from 15:85 to 70:30 weight ratio of at least one first animal waste derived additive to at least one second additive derived from a source other than animal waste. In some embodiments, the blend comprises from 20:80 to 70:30 weight ratio of at least one first animal waste derived additive to at least one second additive derived from a source other than animal waste. In some embodiments, the blend comprises from 25:75 to 70:30 weight ratio of at least one first animal waste derived additive to at least one second additive derived from a source other than animal waste. In some embodiments, the blend comprises from 30:70 to 70:30 weight ratio of at least one first animal waste derived additive to at least one second additive derived from a source other than animal waste. In some embodiments, the blend comprises from 35:65 to 70:30 weight ratio of at least one first animal waste derived additive to at least one second additive derived from a source other than animal waste. In some embodiments, the blend comprises from 40:60 to 70:30 weight ratio of at least one first animal waste derived additive to at least one second additive derived from a source other than animal waste. In some embodiments, the blend comprises from 45:55 to 70:30 weight ratio of at least one first animal waste derived additive to at least one second additive derived from a source other than animal waste. In some embodiments, the blend comprises from 50:50 to 70:30 weight ratio of at least one first animal waste derived additive to at least one second additive derived from a source other than animal waste. In some embodiments, the blend comprises from 55:45 to 70:30 weight ratio of at least one first animal waste derived additive to at least one second additive derived from a source other than animal waste. In some embodiments, the blend comprises from 60:40 to 70:30 weight ratio of at least one first animal waste derived additive to at least one second additive derived from a source other than animal waste. In some embodiments, the blend comprises from 65:35 to 70:30 weight ratio of at least one first animal waste derived additive to at least one second additive derived from a source other than animal waste. In some embodiments, the blend comprises from 10:90 to 65:35 weight ratio of at least one first animal waste derived additive to at least one second additive derived from a source other than animal waste. In some embodiments, the blend comprises from 15:85 to 65:35 weight ratio of at least one first animal waste derived additive to at least one second additive derived from a source other than animal waste. In some embodiments, the blend comprises from 20:80 to 65:35 weight ratio of at least one first animal waste derived additive to at least one second additive derived from a source other than animal waste. In some embodiments, the blend comprises from 25:75 to 65:35 weight ratio of at least one first animal waste derived additive to at least one second additive derived from a source other than animal waste. In some embodiments, the blend comprises from 30:70 to 65:35 weight ratio of at least one first animal waste derived additive to at least one second additive derived from a source other than animal waste. In some embodiments, the blend comprises from 35:65 to 65:35 weight ratio of at least one first animal waste derived additive to at least one second additive derived from a source other than animal waste. In some embodiments, the blend comprises from 40:60 to 65:35 weight ratio of at least one first animal waste derived additive to at least one second additive derived from a source other than animal waste. In some embodiments, the blend comprises from 45:55 to 65:35 weight ratio of at least one first animal waste derived additive to at least one second additive derived from a source other than animal waste. In some embodiments, the blend comprises from 50:50 to 65:35 weight ratio of at least one first animal waste derived additive to at least one second additive derived from a source other than animal waste. In some embodiments, the blend comprises from 55:45 to 65:35 weight ratio of at least one first animal waste derived additive to at least one second additive derived from a source other than animal waste. In some embodiments, the blend comprises from 60:40 to 65:35 weight ratio of at least one first animal waste derived additive to at least one second additive derived from a source other than animal waste. In some embodiments, the blend comprises from 10:90 to 60:40 weight ratio of at least one first animal waste derived additive to at least one second additive derived from a source other than animal waste. In some embodiments, the blend comprises from 15:85 to 60:40 weight ratio of at least one first animal waste derived additive to at least one second additive derived from a source other than animal waste. In some embodiments, the blend comprises from 20:80 to 60:40 weight ratio of at least one first animal waste derived additive to at least one second additive derived from a source other than animal waste. In some embodiments, the blend comprises from 25:75 to 60:40 weight ratio of at least one first animal waste derived additive to at least one second additive derived from a source other than animal waste. In some embodiments, the blend comprises from 30:70 to 60:40 weight ratio of at least one first animal waste derived additive to at least one second additive derived from a source other than animal waste. In some embodiments, the blend comprises from 35:65 to 60:40 weight ratio of at least one first animal waste derived additive to at least one second additive derived from a source other than animal waste. In some embodiments, the blend comprises from 40:60 to 60:40 weight ratio of at least one first animal waste derived additive to at least one second additive derived from a source other than animal waste. In some embodiments, the blend comprises from 45:55 to 60:40 weight ratio of at least one first animal waste derived additive to at least one second additive derived from a source other than animal waste. In some embodiments, the blend comprises from 50:50 to 60:40 weight ratio of at least one first animal waste derived additive to at least one second additive derived from a source other than animal waste. In some embodiments, the blend comprises from 55:45 to 60:40 weight ratio of at least one first animal waste derived additive to at least one second additive derived from a source other than animal waste. In some embodiments, the blend comprises from 10:90 to 55:45 weight ratio of at least one first animal waste derived additive to at least one second additive derived from a source other than animal waste. In some embodiments, the blend comprises from 15:85 to 55:45 weight ratio of at least one first animal waste derived additive to at least one second additive derived from a source other than animal waste. In some embodiments, the blend comprises from 20:80 to 55:45 weight ratio of at least one first animal waste derived additive to at least one second additive derived from a source other than animal waste. In some embodiments, the blend comprises from 25:75 to 55:45 weight ratio of at least one first animal waste derived additive to at least one second additive derived from a source other than animal waste. In some embodiments, the blend comprises from 30:70 to 55:45 weight ratio of at least one first animal waste derived additive to at least one second additive derived from a source other than animal waste. In some embodiments, the blend comprises from 35:65 to 55:45 weight ratio of at least one first animal waste derived additive to at least one second additive derived from a source other than animal waste. In some embodiments, the blend comprises from 40:60 to 55:45 weight ratio of at least one first animal waste derived additive to at least one second additive derived from a source other than animal waste. In some embodiments, the blend comprises from 45:55 to 55:45 weight ratio of at least one first animal waste derived additive to at least one second additive derived from a source other than animal waste. In some embodiments, the blend comprises from 50:50 to 55:45 weight ratio of at least one first animal waste derived additive to at least one second additive derived from a source other than animal waste. In some embodiments, the blend comprises from 10:90 to 50:50 weight ratio of at least one first animal waste derived additive to at least one second additive derived from a source other than animal waste. In some embodiments, the blend comprises from 15:85 to 50:50 weight ratio of at least one first animal waste derived additive to at least one second additive derived from a source other than animal waste. In some embodiments, the blend comprises from 20:80 to 50:50 weight ratio of at least one first animal waste derived additive to at least one second additive derived from a source other than animal waste. In some embodiments, the blend comprises from 25:75 to 50:50 weight ratio of at least one first animal waste derived additive to at least one second additive derived from a source other than animal waste. In some embodiments, the blend comprises from 30:70 to 50:50 weight ratio of at least one first animal waste derived additive to at least one second additive derived from a source other than animal waste. In some embodiments, the blend comprises from 35:65 to 50:50 weight ratio of at least one first animal waste derived additive to at least one second additive derived from a source other than animal waste. In some embodiments, the blend comprises from 40:60 to 50:50 weight ratio of at least one first animal waste derived additive to at least one second additive derived from a source other than animal waste. In some embodiments, the blend comprises from 45:55 to 50:50 weight ratio of at least one first animal waste derived additive to at least one second additive derived from a source other than animal waste. In some embodiments, the blend comprises from 10:90 to 45:55 weight ratio of at least one first animal waste derived additive to at least one second additive derived from a source other than animal waste. In some embodiments, the blend comprises from 15:85 to 45:55 weight ratio of at least one first animal waste derived additive to at least one second additive derived from a source other than animal waste. In some embodiments, the blend comprises from 20:80 to 45:55 weight ratio of at least one first animal waste derived additive to at least one second additive derived from a source other than animal waste. In some embodiments, the blend comprises from 25:75 to 45:55 weight ratio of at least one first animal waste derived additive to at least one second additive derived from a source other than animal waste. In some embodiments, the blend comprises from 30:70 to 45:55 weight ratio of at least one first animal waste derived additive to at least one second additive derived from a source other than animal waste. In some embodiments, the blend comprises from 35:65 to 45:55 weight ratio of at least one first animal waste derived additive to at least one second additive derived from a source other than animal waste. In some embodiments, the blend comprises from 40:60 to 45:55 weight ratio of at least one first animal waste derived additive to at least one second additive derived from a source other than animal waste. In some embodiments, the blend comprises from 10:90 to 40:60 weight ratio of at least one first animal waste derived additive to at least one second additive derived from a source other than animal waste. In some embodiments, the blend comprises from 15:85 to 40:60 weight ratio of at least one first animal waste derived additive to at least one second additive derived from a source other than animal waste. In some embodiments, the blend comprises from 20:80 to 40:60 weight ratio of at least one first animal waste derived additive to at least one second additive derived from a source other than animal waste. In some embodiments, the blend comprises from 25:75 to 40:60 weight ratio of at least one first animal waste derived additive to at least one second additive derived from a source other than animal waste. In some embodiments, the blend comprises from 30:70 to 40:60 weight ratio of at least one first animal waste derived additive to at least one second additive derived from a source other than animal waste. In some embodiments, the blend comprises from 35:65 to 40:60 weight ratio of at least one first animal waste derived additive to at least one second additive derived from a source other than animal waste. In some embodiments, the blend comprises from 10:90 to 35:65 weight ratio of at least one first animal waste derived additive to at least one second additive derived from a source other than animal waste. In some embodiments, the blend comprises from 15:85 to 35:65 weight ratio of at least one first animal waste derived additive to at least one second additive derived from a source other than animal waste. In some embodiments, the blend comprises from 20:80 to 35:65 weight ratio of at least one first animal waste derived additive to at least one second additive derived from a source other than animal waste. In some embodiments, the blend comprises from 25:75 to 35:65 weight ratio of at least one first animal waste derived additive to at least one second additive derived from a source other than animal waste. In some embodiments, the blend comprises from 30:70 to 35:65 weight ratio of at least one first animal waste derived additive to at least one second additive derived from a source other than animal waste. In some embodiments, the blend comprises from 10:90 to 30:70 weight ratio of at least one first animal waste derived additive to at least one second additive derived from a source other than animal waste. In some embodiments, the blend comprises from 15:85 to 30:70 weight ratio of at least one first animal waste derived additive to at least one second additive derived from a source other than animal waste. In some embodiments, the blend comprises from 20:80 to 30:70 weight ratio of at least one first animal waste derived additive to at least one second additive derived from a source other than animal waste. In some embodiments, the blend comprises from 25:75 to 30:70 weight ratio of at least one first animal waste derived additive to at least one second additive derived from a source other than animal waste. In some embodiments, the blend comprises from 10:90 to 25:75 weight ratio of at least one first animal waste derived additive to at least one second additive derived from a source other than animal waste. In some embodiments, the blend comprises from 15:85 to 25:75 weight ratio of at least one first animal waste derived additive to at least one second additive derived from a source other than animal waste. In some embodiments, the blend comprises from 20:80 to 25:75 weight ratio of at least one first animal waste derived additive to at least one second additive derived from a source other than animal waste. In some embodiments, the blend comprises from 10:90 to 20:80 weight ratio of at least one first animal waste derived additive to at least one second additive derived from a source other than animal waste. In some embodiments, the blend comprises from 15:85 to 20:80 weight ratio of at least one first animal waste derived additive to at least one second additive derived from a source other than animal waste. In some embodiments, the blend comprises from 10:90 to 15:85 weight ratio of at least one first animal waste derived additive to at least one second additive derived from a source other than animal waste.

In some embodiments, the additional additive comprises at least one polymer. In some embodiments, the at least one polymer comprises at least one of an elastomer, a polyolefin, a resin, a thermoset, a thermoplastic, a block copolymer (e.g., a styrenic block copolymer), or any combination thereof. In some embodiments, the at least one polymer comprises at least one of a thermosetting polyolefin, thermoplastic polyolefin (TPO), a silyl-modified polymer, a silane-terminated polymer, a natural rubber, a poly-alpha-olefin (APAO/APO) polymer, a polyamide polyvinyl acetate, a polyvinyl alcohol, a polyamide, a polyester, a polyester amide, a polyvinyl butyrate, a polysiloxane or a silicone, a polychloroprene, a polycarbonate, a polyurethane, an asphalt, a butyl, an epoxy, a rubber, a butyl rubber, a polystyrene, a styrenic copolymer (e.g., a styrenic block copolymer), a styrene-butadiene-styrene (SBS), a styrene-isoprene-styrene (SIS), a styrene butadiene (SB), a styrene-ethylene-butadiene-styrene (SEBS), an ethylene vinyl acetate (EVA), a polyvinyl acetate, an acrylic, a vinyl acetate acrylic, an ethylene vinyl acetate, an ethylene acrylic, a styrene acrylic, a vinyl chloride acrylic, a vinyl versatate, any copolymer thereof, or any combination thereof. In some embodiments, the at least one polymer comprises a styrenic block copolymer. In some embodiments, the at least one polymer comprises at least one of a poly(styrene-isoprene-styrene) (SIS), a poly(styrene-butadiene-styrene) (SBS), a poly(styrene-ethylene/butylene-styrene) (SEBS), a poly(styrene-ethylene/propylene-styrene) (SEPS), a styrene-butadiene rubber (SBR), or any combination thereof. In some embodiments, the at least one polymer comprises a polymer comprising styrene. In some embodiments, the at least one polymer comprises a rubber (e.g., at least one of a ground tire rubber, a crumb rubber, or any combination thereof, etc.).

In some embodiments, the at least one polymer comprises at least one thermoplastic polymer. In some embodiments, the at least one polymer comprises at least one thermoplastic polyolefin (TPO). In some embodiments, the at least one polymer comprises at least one of polyethylene, polypropylene, any copolymer thereof, any homopolymer thereof, any polymer blend thereof, or any combination thereof. In some embodiments, the thermoplastic polyolefin comprises at least one of a copolymer of propylene and ethylene, a blend of propylene and ethylene, a copolymer of ethylene alpha-olefin, a propylene homopolymer, an ethylene homopolymer, a propylene block copolymer, an ethylene block copolymer, a propylene elastomer, an ethylene elastomer, or any combination thereof. In some embodiments, the thermoplastic polymer comprises at least one of a copolymer comprising ethylene and octene, a copolymer comprising ethylene and hexane, a copolymer comprising ethylene and butene, polyethylene (including raw and/or recycled low density polyethylene (LDPE)), linear low density polyethylene (LLDPE), high density polyethylene (HDPE)), polypropylenes (e.g., isotactic polypropylene (IPP) and/or atactic polypropylene (APP/IPP)), amorphous polyalpha olefins (APAO), amorphous polyolefins (APO), a poly(styrene-isoprene-styrene) (SIS), a poly(styrene-butadiene-styrene) (SBS), a poly(styrene-ethylene/butylene-styrene) (SEBS), a poly(styrene-ethylene/propylene-styrene) (SEPS), a styrene-butadiene rubber (SBR), or any combination thereof. In some embodiments, the at least one polymer comprises polyethylene terephthalate (PET). In some embodiments, the at least one polymer comprises an acrylic polymer, such as, for example, polymethyl methacrylate. In some embodiments, the at least one polymer comprises ethylene tetrafluoroethylene (ETFE).

Examples of the at least one polymer include, for example and without limitation, at least one of Vistamaxx® 6102, Vistamaxx® 8880, both of which are polypropylenes (e.g., isotactic polypropylene (IPP)) that are available from ExxonMobil, Irving, Tex.; Elvaloy®, which is a terpolymer that is available from Dow/DuPont, Wilmington, Del.; Fusabond®, which is a chemically modified ethylene acrylate copolymer and/or a modified polyethylene, that is available from Dow/DuPont, Wilmington, Del.; RT2304, which is an amorphous polyalpha olefin (APAO) that is available from Rextac APAO Polymers LLC, Odessa, Tex.; Eastoflex® P1023, which is an amorphous polyolefin (APO) that comprises a propylene homopolymer, and is available from Eastman Chemical Company, Kingsport, Tenn.; Eastoflex® E1060, which is an amorphous polyolefin (APO) that comprises a copolymer of propylene and ethylene, and is available from Eastman Chemical Company, Kingsport, Tenn.; Eastoflex® M1025, which is an amorphous polyolefin (APO) that comprises a blend of propylene homopolymer and copolymers of propylene and ethylene, and is available from Eastman Chemical Company, Kingsport, Tenn.; Engage® 7487, which is a polyolefin elastomer (POE) that is available from Dow Inc., Midland, Mich., or any combination thereof.

In some embodiments, the additional additive comprises at least one stabilizer. In some embodiments, the at least one stabilizer comprises at least one of a microcrystalline cellulose, a xanthan gum, a carboxymethyl cellulose (CMC), an alginate, a pectin, a guar gum, a gum acacia, a starch gum, or any combination thereof. Non-limiting examples of the at least one stabilizer comprise, for example and without limitation, at least one of Lattice® NT, which is a microcrystalline cellulose powder having an average particle size of 20 μm to 200 μm, that is available from IFF; Lattice® NTC, which is a microcrystalline cellulose powder having an average particle size of 50 μm to 100 μm, that is available from IFF; Valida S231C, which is a fibrillated cellulose, that is available from Sappi; and Valida S191C, which is a fibrillated cellulose, that is available from Sappi; among others.

In some embodiments, the additional additive comprises at least one surfactant. In some embodiments, the at least one surfactant comprises at least one of an emulsifier, a wetting agent, a foaming agent, a dispersant, or any combination thereof. In some embodiments, the at least one surfactant comprises at least one of a cationic emulsifier, an anionic emulsifier, or any combination thereof. In some embodiments, the anionic emulsifier comprises at least one of an alkylbenzene sulfonate, an alkylnaphthalene sulfonate, a higher fatty acid salt, an alkylsulfuric acid ester salt, an alkyl ether sulfuric acid ester salt, a phosphoric acid ester salt, a sodium lauryl sulfate, a sodium dodecylbenzenesulfonate, a fluorinated emulsifier, ammonium perfluorooctanoate, sodium perfluorooctanoate, ammonium perfluorohexanoate, or any combination thereof. In some embodiments, the cationic emulsifier comprises at least one of a quaternary ammonium compound, amine oxides, didodecyldimethylammonium bromide (DDAB) or dodecyltrimethylammonium bromide (DTAB), dimethyldioctadecylammonium bromide, dodecyldimethylethylammonium bromide, tetradecyltrimethylammonium bromide, laurylamine oxide, lauryl dimethylamine oxide, and N,N-dimethyldodecylamine-N-oxide, or any combination thereof. In some embodiments, a nonionic emulsifier is used. In some embodiments, the nonionic emulsifier comprises at least one of an alkylphenol ethylene oxide adduct, a higher alcohol ethylene oxide adduct, a block copolymer of ethylene oxide and propylene oxide, or any combination thereof. A non-limiting example of a surfactant includes, for example and without limitation, Redicote® Series (e.g., E-7000, among others), which includes various emulsifiers, that is available from Nouryan, among others.

In some embodiments, the additional additive comprises at least one filler material. In some embodiments, the at least one filler material comprises at least one of nepheline syenite, calcium carbonate, barium sulfate, iron oxide, diatomaceous earth, melamine, quartz, silica, colloidal silica, crystalline silica, precipitated silica, amorphous silica, titanium dioxide, alumina trihydrate, zinc oxide, zirconium oxide, zirconium silicate, zinc borate, chromic oxide, crystalline silica fine powder, amorphous silica fine powder, silicone rubber powder, glass, glass bubbles, glass powder, zeolites, silica hydrogen, silica aero gel, calcium silicate, aluminum silicate, aluminum oxide, ferrite, carbon black, graphite, mica, clay, bentonite, ground quartz, kaolin, calcined kaolin, wollastonite, hydroxyapatite, hydrated alumina, magnesium hydroxide, vermiculite, talcum, slaked lime, a fumed silica powder, a modified fumed silica, a hydrophilic fumed silica, a hydrophobic fumed silica, or any combination thereof.

In some embodiments, the additional additive comprises at least one of stabilizers, antioxidants, nucleating agents, colorants, pigments, dyes, coloring agents, mold release agents, dispersing agents, UV light absorbers, UV stabilizers, fire retardants, mold release agents, anti-static agents, or any combination thereof.

In some embodiments, for example, the additional additive comprises at least one colorant. In some embodiments, the colorant comprises at least one dye. In some embodiments, the at least one colorant comprises at least one pigment. In some embodiments, the at least one colorant comprises at least one coloring agent. In some embodiments, the at least one colorant comprises at least one of infrared reflective pigments, infrared reflective dyes, phosphorescence pigments, phosphorescence dyes, fluorescence pigments, fluorescence dyes, color pigments, color dyes, reflective pigments, reflective dyes, or any combination thereof. In some embodiments, the at least one pigment comprises at least one of metallic pigments, metallic powders such as aluminum, heavy metal-based pigments, heavy-metal free pigments, organic pigments, or any combination thereof. In some embodiments, the at least one pigment comprises at least one of carbon black, titanium dioxide, chromium oxide, chromium iron oxide, titanium oxide, magnesium oxide, magnesium hydroxide, zinc oxide, calcium carbonate, black iron oxide, red iron oxide, yellow iron oxide, green iron oxide, mixed metal oxides, bismuth vanadate, phthalocyanine blue, phthalocyanine green, quinacridone reds, anthraquinone, perylene reds, polyazos, or any combination thereof. In some embodiments, the at least one pigment comprises at least one of zinc oxide, antimony oxide, zirconium oxide, chromium oxide, iron oxide, lead oxide, zinc sulfide, titanium dioxide (anatase, rutile, or brookite), lithopone, and carbon black, or any combination thereof.

An example of a metallic pigment includes, without limitation, Polybatch White P8555 SD, which is available from A. Schulman Inc. and which is identified as a white color concentrate having a coated rutile titanium dioxide concentration of 50% by weight in a propylene homopolymer carrier resin; Ampacet 110235, which is a white pigmented polyethylene concentrate available from the Ampacet Corporation; and Ampacet 110868. Examples of black pigments include, without limitation, various carbon blacks and organic concentrates, such as Ampacet 190303, which is a black pigmented polyethylene resin concentrate; and Ampacet 190671A, which is another black pigmented resin concentrate from Ampacet Corporation. In some embodiments, the pigments include a gray color obtained by mixing white pigment and black pigment to achieve a desired shade of gray. Examples of a commercially available gray concentrate include, without limitation, Ampacet 190697 and Ampacet 190870. Examples of organic pigment concentrates include, without limitation, Ampacet 150623, a red pigmented polyethylene resin concentrate; Ampacet 150380, a red pigment concentrate; Ampacet 150703 Red PE MB; Ampacet 150623 Red UV PE MB; Ampacet 130283 Yellow UV PE MB; Ampacet 140085 Orange PE MB; Ampacet Dark Green 170560; Ampacet Olympic Blue 160972; and Ampacet Sapphire Blue 160904. An example of a heavy metal containing pigment includes, without limitation, Ampacet LP20631 Orange PE MB which is identified as a lead molybdate/lead chromate pigment concentrate.

In some embodiments, the additional additive comprises at least one rheology modifier. In some embodiments, the at least one rheology modifier comprises at least one hydrocolloid. In some embodiments, the at least one rheology modifier comprises at least one of a polymer, a pine chemical additive, a renewable oil, or any combination thereof. In some embodiments, the at least one rheology modifier comprises at least one of a guar gum, a xanthan gum, a polyacrylamide, an organophilic clay, or any combination thereof. In some embodiments, the at least one rheology modifier comprises at least one of hydroxylethyl cellulose (HEC), polyacrylamide, an (anionic) acrylamide copolymer, or any combination thereof. In some embodiments, the pine chemical additive can be derived from Crude Tall Oil, which is a renewable raw material and a by-product of the paper industry. In some embodiments, the pine chemical additive comprises at least one of octadecadienoic acid, octadecenoic acid, or any combination thereof. In some embodiments, the renewable oil comprises at least one of hexadecanoic acid, hexadecanoic acid ethyl ester, octadecadienoic acid, octadecadienoic acid ethyl ester, octadecenoic acid, ethyl oleate, sitosterol, or any combination thereof. In some embodiments, the at least one rheology modifier comprises at least one of hexadecanoic acid, octadecadienoic acid, octadecenoic acid, octadecanoic acid, tocopherol, campesterol, stigmasterol, sitosterol, or any combination thereof. In some embodiments, the at least one rheology modifier comprises at least one of a terpolymer of acrylamide (AM)/2-acrylamido-2-methyl propanesulfonic acid (AMPS)/hydrophobe; a terpolymer of acrylamide (AM)/2-acrylamido-2-methyl propanesulfonic acid (AMPS)/C12-25 alkyl acrylate; carboxymethyl cellulose, hydroxyethylcellulose, carboxymethylhydroxyethyl cellulose, sulphoethylcellulose; starch derivatives/crosslinked starch derivatives (e.g., at least one of carboxymethyl starch, hydroxyethylstarch, hydroxypropyl starch); bacterial gums (e.g., at least one of xanthan, welan, diutan, succinoglycan, scleroglucan, dextran, pullulan, or any combination thereof); plant derived gums (e.g., at least one of guar gum, locust-bean gum, tara gum and their derivatives, or any combination thereof), polyanionic cellulose (PAC), hydroxyethyl cellulose (HEC), Hydroxypropyl cellulose (HPC), carboxymethyl hydroxyethyl cellulose (CMHEC), carboxymethyl cellulose (CMC), xanthan gum, guar gum, or any combination thereof. In some embodiments, the at least one rheology modifier is different from an asphalt shingle waste. In some embodiments, the at least one rheology modifier is different from the at least one fluid loss reducer.

In some embodiments, the additional additive comprises at least one fluid loss reducer. In some embodiments, the at least one fluid loss reducer comprises at least one filtration control agent. In some embodiments, the at least one fluid loss reducer comprises at least one of a biopolymer, a mined substance (e.g., a substance obtained from mining, such as, for example and without limitation, a gilsonite, etc.), a synthetic polymer (e.g., a polyacrylamide, etc.), a bridging agent (e.g., a calcite, etc.), or any combination thereof. In some embodiments, the at least one fluid loss reducer comprises at least one of gilsonite, Galena, barite, hematite, illmenite, calcite, dolomite, siderite, Celestite magnetite, iron oxide, or any combination thereof. In some embodiments, the at least one fluid loss reducer is different from the at least one rheology modifier. In some embodiments, the at least one fluid loss reducer is different from the asphalt shingle waste.

In some embodiments, the asphalt product does not comprise any one or more of the additional additives disclosed herein. In some embodiments, at least one of the additional additives disclosed herein is different from at least one other additional additive.

In some embodiments, the asphalt product comprises a substrate. In some embodiments, the substrate comprises a reinforcement layer or a support layer. In some embodiments, the reinforcement layer comprises at least one of a mesh, a fabric, a fleece, a mat (a woven mat, an unwoven mat, etc.), a scrim, a coated scrim, a woven, a non-woven, or any combination thereof. In some embodiments, the reinforcement layer comprises at least one of a spunbond mat, a spunlaced mat, an airlaid mat, a meltblown mat, or any combination thereof. In some embodiments, the reinforcement layer comprises a fibrous material, wherein the fibrous material comprises at least one of a natural fiber, a synthetic fiber, or any combination thereof. In some embodiments, the reinforcement layer comprises at least one of a polyolefin (e.g., at least one of a polyethylene, a polypropylene, any copolymer thereof, any blend thereof, or any combination thereof), a polyester, a polyamide, a glass, a fiberglass, or any combination thereof. In some embodiments, the substrate comprises a roofing substrate.

In some embodiments, the total weight percent of the additives may be from 0.1 wt % to 99 wt % of the total weight of the ASW powder, briquette, or asphalt product including the ASW powder and/or briquette, and/or any additives. In some embodiments, the total weight percent of the additives may be from 0.1 wt % to 90 wt % of the total weight of the ASW powder, briquette, or asphalt product including the ASW powder and/or briquette, and/or any additives. In some embodiments, the total weight percent of the additives may be from 0.1 wt % to 80 wt % of the total weight of the ASW powder, briquette, or asphalt product including the ASW powder and/or briquette, and/or any additives. In some embodiments, the total weight percent of the additives may be from 0.1 wt % to 70 wt % of the total weight of the ASW powder, briquette, or asphalt product including the ASW powder and/or briquette, and/or any additives. In some embodiments, the total weight percent of the additives may be from 0.1 wt % to 60 wt % of the total weight of the ASW powder, briquette, or asphalt product including the ASW powder and/or briquette, and/or any additives. In some embodiments, the total weight percent of the additives may be from 0.1 wt % to 50 wt % of the total weight of the ASW powder, briquette, or asphalt product including the ASW powder and/or briquette, and/or any additives. In some embodiments, the total weight percent of the additives may be from 0.1 wt % to 40 wt % of the total weight of the ASW powder, briquette, or asphalt product including the ASW powder and/or briquette, and/or any additives. In some embodiments, the total weight percent of the additives may be from 0.1 wt % to 30 wt % of the total weight of the ASW powder, briquette, or asphalt product including the ASW powder and/or briquette, and/or any additives. In some embodiments, the total weight percent of the additives may be from 0.1 wt % to 20 wt % of the total weight of the ASW powder, briquette, or asphalt product including the ASW powder and/or briquette, and/or any additives. In some embodiments, the total weight percent of the additives may be from 0.1 wt % to 10 wt % of the total weight of the ASW powder, briquette, or asphalt product including the ASW powder and/or briquette, and/or any additives. In some embodiments, the total weight percent of the additives may be from 0.1 wt % to 9 wt % of the total weight of the ASW powder, briquette, or asphalt product including the ASW powder and/or briquette, and/or any additives. In some embodiments, the total weight percent of the additives may be from 0.1 wt % to 8 wt % of the total weight of the ASW powder, briquette, or asphalt product including the ASW powder and/or briquette, and/or any additives. In some embodiments, the total weight percent of the additives may be from 0.1 wt % to 7 wt % of the total weight of the ASW powder, briquette, or asphalt product including the ASW powder and/or briquette, and/or any additives. In some embodiments, the total weight percent of the additives may be from 0.1 wt % to 6 wt % of the total weight of the ASW powder, briquette, or asphalt product including the ASW powder and/or briquette, and/or any additives. In some embodiments, the total weight percent of the additives may be from 0.1 wt % to 5 wt % of the total weight of the ASW powder, briquette, or asphalt product including the ASW powder and/or briquette, and/or any additives. In some embodiments, the total weight percent of the additives may be from 0.1 wt % to 4 wt % of the total weight of the ASW powder, briquette, or asphalt product including the ASW powder and/or briquette, and/or any additives. In some embodiments, the total weight percent of the additives may be from 0.1 wt % to 3 wt % of the total weight of the ASW powder, briquette, or asphalt product including the ASW powder and/or briquette, and/or any additives. In some embodiments, the total weight percent of the additives may be from 0.1 wt % to 2 wt % of the total weight of the ASW powder, briquette, or asphalt product including the ASW powder and/or briquette, and/or any additives. In some embodiments, the total weight percent of the additives may be from 0.1 wt % to 1 wt % of the total weight of the ASW powder, briquette, or asphalt product including the ASW powder and/or briquette, and/or any additives.

In some embodiments, the total weight percent of the additives may be from 1 wt % to 99 wt % of the total weight of the ASW powder, briquette, or asphalt product including the ASW powder and/or briquette, and/or any additives. In some embodiments, the total weight percent of the additives may be from 10 wt % to 99 wt % of the total weight of the ASW powder, briquette, or asphalt product including the ASW powder and/or briquette, and/or any additives. In some embodiments, the total weight percent of the additives may be from 20 wt % to 99 wt % of the total weight of the ASW powder, briquette, or asphalt product including the ASW powder and/or briquette, and/or any additives. In some embodiments, the total weight percent of the additives may be from 30 wt % to 99 wt % of the total weight of the ASW powder, briquette, or asphalt product including the ASW powder and/or briquette, and/or any additives. In some embodiments, the total weight percent of the additives may be from 40 wt % to 99 wt % of the total weight of the ASW powder, briquette, or asphalt product including the ASW powder and/or briquette, and/or any additives. In some embodiments, the total weight percent of the additives may be from 50 wt % to 99 wt % of the total weight of the ASW powder, briquette, or asphalt product including the ASW powder and/or briquette, and/or any additives. In some embodiments, the total weight percent of the additives may be from 60 wt % to 99 wt % of the total weight of the ASW powder, briquette, or asphalt product including the ASW powder and/or briquette, and/or any additives. In some embodiments, the total weight percent of the additives may be from 70 wt % to 99 wt % of the total weight of the ASW powder, briquette, or asphalt product including the ASW powder and/or briquette, and/or any additives. In some embodiments, the total weight percent of the additives may be from 80 wt % to 99 wt % of the total weight of the ASW powder, briquette, or asphalt product including the ASW powder and/or briquette, and/or any additives. In some embodiments, the total weight percent of the additives may be from 90 wt % to 99 wt % of the total weight of the ASW powder, briquette, or asphalt product including the ASW powder and/or briquette, and/or any additives.

In some embodiments, the total weight percent of the additives may be from 0.5 wt % to 15 wt % of the total weight of the ASW powder, briquette, or asphalt product including the ASW powder and/or briquette, and/or any additives. In some embodiments, the total weight percent of the additives may be from 0.5 wt % to 14 wt % of the total weight of the ASW powder, briquette, or asphalt product including the ASW powder and/or briquette, and/or any additives. In some embodiments, the total weight percent of the additives may be from 0.5 wt % to 13 wt % of the total weight of the ASW powder, briquette, or asphalt product including the ASW powder and/or briquette, and/or any additives. In some embodiments, the total weight percent of the additives may be from 0.5 wt % to 12 wt % of the total weight of the ASW powder, briquette, or asphalt product including the ASW powder and/or briquette, and/or any additives. In some embodiments, the total weight percent of the additives may be from 0.5 wt % to 11 wt % of the total weight of the ASW powder, briquette, or asphalt product including the ASW powder and/or briquette, and/or any additives. In some embodiments, the total weight percent of the additives may be from 0.5 wt % to 10 wt % of the total weight of the ASW powder, briquette, or asphalt product including the ASW powder and/or briquette, and/or any additives. In some embodiments, the total weight percent of the additives may be from 0.5 wt % to 9 wt % of the total weight of the ASW powder, briquette, or asphalt product including the ASW powder and/or briquette, and/or any additives. In some embodiments, the total weight percent of the additives may be from 0.5 wt % to 8 wt % of the total weight of the ASW powder, briquette, or asphalt product including the ASW powder and/or briquette, and/or any additives. In some embodiments, the total weight percent of the additives may be from 0.5 wt % to 7 wt % of the total weight of the ASW powder, briquette, or asphalt product including the ASW powder and/or briquette, and/or any additives. In some embodiments, the total weight percent of the additives may be from 0.5 wt % to 6 wt % of the total weight of the ASW powder, briquette, or asphalt product including the ASW powder and/or briquette, and/or any additives. In some embodiments, the total weight percent of the additives may be from 0.5 wt % to 5 wt % of the total weight of the ASW powder, briquette, or asphalt product including the ASW powder and/or briquette, and/or any additives. In some embodiments, the total weight percent of the additives may be from 0.5 wt % to 4 wt % of the total weight of the ASW powder, briquette, or asphalt product including the ASW powder and/or briquette, and/or any additives. In some embodiments, the total weight percent of the additives may be from 0.5 wt % to 3 wt % of the total weight of the ASW powder, briquette, or asphalt product including the ASW powder and/or briquette, and/or any additives. In some embodiments, the total weight percent of the additives may be from 0.5 wt % to 2 wt % of the total weight of the ASW powder, briquette, or asphalt product including the ASW powder and/or briquette, and/or any additives. In some embodiments, the total weight percent of the additives may be from 0.5 wt % to 1 wt % of the total weight of the ASW powder, briquette, or asphalt product including the ASW powder and/or briquette, and/or any additives. In some embodiments, the total weight percent of the additives may be from 0.5 wt % to 0.9 wt % of the total weight of the ASW powder, briquette, or asphalt product including the ASW powder and/or briquette, and/or any additives. In some embodiments, the total weight percent of the additives may be from 0.5 wt % to 0.8 wt % of the total weight of the ASW powder, briquette, or asphalt product including the ASW powder and/or briquette, and/or any additives. In some embodiments, the total weight percent of the additives may be from 0.5 wt % to 0.7 wt % of the total weight of the ASW powder, briquette, or asphalt product including the ASW powder and/or briquette, and/or any additives. In some embodiments, the total weight percent of the additives may be from 0.5 wt % to 0.6 wt % of the total weight of the ASW powder, briquette, or asphalt product including the ASW powder and/or briquette, and/or any additives.

In some embodiments, the total weight percent of the additives may be from 0.6 wt % to 15 wt % of the total weight of the ASW powder, briquette, or asphalt product including the ASW powder and/or briquette, and/or any additives. In some embodiments, the total weight percent of the additives may be from 0.6 wt % to 14 wt % of the total weight of the ASW powder, briquette, or asphalt product including the ASW powder and/or briquette, and/or any additives. In some embodiments, the total weight percent of the additives may be from 0.6 wt % to 13 wt % of the total weight of the ASW powder, briquette, or asphalt product including the ASW powder and/or briquette, and/or any additives. In some embodiments, the total weight percent of the additives may be from 0.6 wt % to 12 wt % of the total weight of the ASW powder, briquette, or asphalt product including the ASW powder and/or briquette, and/or any additives. In some embodiments, the total weight percent of the additives may be from 0.6 wt % to 11 wt % of the total weight of the ASW powder, briquette, or asphalt product including the ASW powder and/or briquette, and/or any additives. In some embodiments, the total weight percent of the additives may be from 0.6 wt % to 10 wt % of the total weight of the ASW powder, briquette, or asphalt product including the ASW powder and/or briquette, and/or any additives. In some embodiments, the total weight percent of the additives may be from 0.6 wt % to 9 wt % of the total weight of the ASW powder, briquette, or asphalt product including the ASW powder and/or briquette, and/or any additives. In some embodiments, the total weight percent of the additives may be from 0.6 wt % to 8 wt % of the total weight of the ASW powder, briquette, or asphalt product including the ASW powder and/or briquette, and/or any additives. In some embodiments, the total weight percent of the additives may be from 0.6 wt % to 7 wt % of the total weight of the ASW powder, briquette, or asphalt product including the ASW powder and/or briquette, and/or any additives. In some embodiments, the total weight percent of the additives may be from 0.6 wt % to 6 wt % of the total weight of the ASW powder, briquette, or asphalt product including the ASW powder and/or briquette, and/or any additives. In some embodiments, the total weight percent of the additives may be from 0.6 wt % to 5 wt % of the total weight of the ASW powder, briquette, or asphalt product including the ASW powder and/or briquette, and/or any additives. In some embodiments, the total weight percent of the additives may be from 0.6 wt % to 4 wt % of the total weight of the ASW powder, briquette, or asphalt product including the ASW powder and/or briquette, and/or any additives. In some embodiments, the total weight percent of the additives may be from 0.6 wt % to 3 wt % of the total weight of the ASW powder, briquette, or asphalt product including the ASW powder and/or briquette, and/or any additives. In some embodiments, the total weight percent of the additives may be from 0.6 wt % to 2 wt % of the total weight of the ASW powder, briquette, or asphalt product including the ASW powder and/or briquette, and/or any additives. In some embodiments, the total weight percent of the additives may be from 0.6 wt % to 1 wt % of the total weight of the ASW powder, briquette, or asphalt product including the ASW powder and/or briquette, and/or any additives. In some embodiments, the total weight percent of the additives may be from 0.6 wt % to 0.9 wt % of the total weight of the ASW powder, briquette, or asphalt product including the ASW powder and/or briquette, and/or any additives. In some embodiments, the total weight percent of the additives may be from 0.6 wt % to 0.8 wt % of the total weight of the ASW powder, briquette, or asphalt product including the ASW powder and/or briquette, and/or any additives. In some embodiments, the total weight percent of the additives may be from 0.6 wt % to 0.7 wt % of the total weight of the ASW powder, briquette, or asphalt product including the ASW powder and/or briquette, and/or any additives.

In some embodiments, the total weight percent of the additives may be from 0.7 wt % to 15 wt % of the total weight of the ASW powder, briquette, or asphalt product including the ASW powder and/or briquette, and/or any additives. In some embodiments, the total weight percent of the additives may be from 0.7 wt % to 14 wt % of the total weight of the ASW powder, briquette, or asphalt product including the ASW powder and/or briquette, and/or any additives. In some embodiments, the total weight percent of the additives may be from 0.7 wt % to 13 wt % of the total weight of the ASW powder, briquette, or asphalt product including the ASW powder and/or briquette, and/or any additives. In some embodiments, the total weight percent of the additives may be from 0.7 wt % to 12 wt % of the total weight of the ASW powder, briquette, or asphalt product including the ASW powder and/or briquette, and/or any additives. In some embodiments, the total weight percent of the additives may be from 0.7 wt % to 11 wt % of the total weight of the ASW powder, briquette, or asphalt product including the ASW powder and/or briquette, and/or any additives. In some embodiments, the total weight percent of the additives may be from 0.7 wt % to 10 wt % of the total weight of the ASW powder, briquette, or asphalt product including the ASW powder and/or briquette, and/or any additives. In some embodiments, the total weight percent of the additives may be from 0.7 wt % to 9 wt % of the total weight of the ASW powder, briquette, or asphalt product including the ASW powder and/or briquette, and/or any additives. In some embodiments, the total weight percent of the additives may be from 0.7 wt % to 8 wt % of the total weight of the ASW powder, briquette, or asphalt product including the ASW powder and/or briquette, and/or any additives. In some embodiments, the total weight percent of the additives may be from 0.7 wt % to 7 wt % of the total weight of the ASW powder, briquette, or asphalt product including the ASW powder and/or briquette, and/or any additives. In some embodiments, the total weight percent of the additives may be from 0.7 wt % to 6 wt % of the total weight of the ASW powder, briquette, or asphalt product including the ASW powder and/or briquette, and/or any additives. In some embodiments, the total weight percent of the additives may be from 0.7 wt % to 5 wt % of the total weight of the ASW powder, briquette, or asphalt product including the ASW powder and/or briquette, and/or any additives. In some embodiments, the total weight percent of the additives may be from 0.7 wt % to 4 wt % of the total weight of the ASW powder, briquette, or asphalt product including the ASW powder and/or briquette, and/or any additives. In some embodiments, the total weight percent of the additives may be from 0.7 wt % to 3 wt % of the total weight of the ASW powder, briquette, or asphalt product including the ASW powder and/or briquette, and/or any additives. In some embodiments, the total weight percent of the additives may be from 0.7 wt % to 2 wt % of the total weight of the ASW powder, briquette, or asphalt product including the ASW powder and/or briquette, and/or any additives. In some embodiments, the total weight percent of the additives may be from 0.7 wt % to 1 wt % of the total weight of the ASW powder, briquette, or asphalt product including the ASW powder and/or briquette, and/or any additives. In some embodiments, the total weight percent of the additives may be from 0.7 wt % to 0.9 wt % of the total weight of the ASW powder, briquette, or asphalt product including the ASW powder and/or briquette, and/or any additives. In some embodiments, the total weight percent of the additives may be from 0.7 wt % to 0.8 wt % of the total weight of the ASW powder, briquette, or asphalt product including the ASW powder and/or briquette, and/or any additives.

In some embodiments, the total weight percent of the additives may be from 0.8 wt % to 15 wt % of the total weight of the ASW powder, briquette, or asphalt product including the ASW powder and/or briquette, and/or any additives. In some embodiments, the total weight percent of the additives may be from 0.8 wt % to 14 wt % of the total weight of the ASW powder, briquette, or asphalt product including the ASW powder and/or briquette, and/or any additives. In some embodiments, the total weight percent of the additives may be from 0.8 wt % to 13 wt % of the total weight of the ASW powder, briquette, or asphalt product including the ASW powder and/or briquette, and/or any additives. In some embodiments, the total weight percent of the additives may be from 0.8 wt % to 12 wt % of the total weight of the ASW powder, briquette, or asphalt product including the ASW powder and/or briquette, and/or any additives. In some embodiments, the total weight percent of the additives may be from 0.8 wt % to 11 wt % of the total weight of the ASW powder, briquette, or asphalt product including the ASW powder and/or briquette, and/or any additives. In some embodiments, the total weight percent of the additives may be from 0.8 wt % to 10 wt % of the total weight of the ASW powder, briquette, or asphalt product including the ASW powder and/or briquette, and/or any additives. In some embodiments, the total weight percent of the additives may be from 0.8 wt % to 9 wt % of the total weight of the ASW powder, briquette, or asphalt product including the ASW powder and/or briquette, and/or any additives. In some embodiments, the total weight percent of the additives may be from 0.8 wt % to 8 wt % of the total weight of the ASW powder, briquette, or asphalt product including the ASW powder and/or briquette, and/or any additives. In some embodiments, the total weight percent of the additives may be from 0.8 wt % to 7 wt % of the total weight of the ASW powder, briquette, or asphalt product including the ASW powder and/or briquette, and/or any additives. In some embodiments, the total weight percent of the additives may be from 0.8 wt % to 6 wt % of the total weight of the ASW powder, briquette, or asphalt product including the ASW powder and/or briquette, and/or any additives. In some embodiments, the total weight percent of the additives may be from 0.8 wt % to 5 wt % of the total weight of the ASW powder, briquette, or asphalt product including the ASW powder and/or briquette, and/or any additives. In some embodiments, the total weight percent of the additives may be from 0.8 wt % to 4 wt % of the total weight of the ASW powder, briquette, or asphalt product including the ASW powder and/or briquette, and/or any additives. In some embodiments, the total weight percent of the additives may be from 0.8 wt % to 3 wt % of the total weight of the ASW powder, briquette, or asphalt product including the ASW powder and/or briquette, and/or any additives. In some embodiments, the total weight percent of the additives may be from 0.8 wt % to 2 wt % of the total weight of the ASW powder, briquette, or asphalt product including the ASW powder and/or briquette, and/or any additives. In some embodiments, the total weight percent of the additives may be from 0.8 wt % to 1 wt % of the total weight of the ASW powder, briquette, or asphalt product including the ASW powder and/or briquette, and/or any additives. In some embodiments, the total weight percent of the additives may be from 0.8 wt % to 0.9 wt % of the total weight of the ASW powder, briquette, or asphalt product including the ASW powder and/or briquette, and/or any additives.

In some embodiments, the total weight percent of the additives may be from 0.9 wt % to 15 wt % of the total weight of the ASW powder, briquette, or asphalt product including the ASW powder and/or briquette, and/or any additives. In some embodiments, the total weight percent of the additives may be from 0.9 wt % to 14 wt % of the total weight of the ASW powder, briquette, or asphalt product including the ASW powder and/or briquette, and/or any additives. In some embodiments, the total weight percent of the additives may be from 0.9 wt % to 13 wt % of the total weight of the ASW powder, briquette, or asphalt product including the ASW powder and/or briquette, and/or any additives. In some embodiments, the total weight percent of the additives may be from 0.9 wt % to 12 wt % of the total weight of the ASW powder, briquette, or asphalt product including the ASW powder and/or briquette, and/or any additives. In some embodiments, the total weight percent of the additives may be from 0.9 wt % to 11 wt % of the total weight of the ASW powder, briquette, or asphalt product including the ASW powder and/or briquette, and/or any additives. In some embodiments, the total weight percent of the additives may be from 0.9 wt % to 10 wt % of the total weight of the ASW powder, briquette, or asphalt product including the ASW powder and/or briquette, and/or any additives. In some embodiments, the total weight percent of the additives may be from 0.9 wt % to 9 wt % of the total weight of the ASW powder, briquette, or asphalt product including the ASW powder and/or briquette, and/or any additives. In some embodiments, the total weight percent of the additives may be from 0.9 wt % to 8 wt % of the total weight of the ASW powder, briquette, or asphalt product including the ASW powder and/or briquette, and/or any additives. In some embodiments, the total weight percent of the additives may be from 0.9 wt % to 7 wt % of the total weight of the ASW powder, briquette, or asphalt product including the ASW powder and/or briquette, and/or any additives. In some embodiments, the total weight percent of the additives may be from 0.9 wt % to 6 wt % of the total weight of the ASW powder, briquette, or asphalt product including the ASW powder and/or briquette, and/or any additives. In some embodiments, the total weight percent of the additives may be from 0.9 wt % to 5 wt % of the total weight of the ASW powder, briquette, or asphalt product including the ASW powder and/or briquette, and/or any additives. In some embodiments, the total weight percent of the additives may be from 0.9 wt % to 4 wt % of the total weight of the ASW powder, briquette, or asphalt product including the ASW powder and/or briquette, and/or any additives. In some embodiments, the total weight percent of the additives may be from 0.9 wt % to 3 wt % of the total weight of the ASW powder, briquette, or asphalt product including the ASW powder and/or briquette, and/or any additives. In some embodiments, the total weight percent of the additives may be from 0.9 wt % to 2 wt % of the total weight of the ASW powder, briquette, or asphalt product including the ASW powder and/or briquette, and/or any additives. In some embodiments, the total weight percent of the additives may be from 0.9 wt % to 1 wt % of the total weight of the ASW powder, briquette, or asphalt product including the ASW powder and/or briquette, and/or any additives.

In some embodiments, the total weight percent of the additives may be from 1 wt % to 15 wt % of the total weight of the ASW powder, briquette, or asphalt product including the ASW powder and/or briquette, and/or any additives. In some embodiments, the total weight percent of the additives may be from 1 wt % to 14 wt % of the total weight of the ASW powder, briquette, or asphalt product including the ASW powder and/or briquette, and/or any additives. In some embodiments, the total weight percent of the additives may be from 1 wt % to 13 wt % of the total weight of the ASW powder, briquette, or asphalt product including the ASW powder and/or briquette, and/or any additives. In some embodiments, the total weight percent of the additives may be from 1 wt % to 12 wt % of the total weight of the ASW powder, briquette, or asphalt product including the ASW powder and/or briquette, and/or any additives. In some embodiments, the total weight percent of the additives may be from 1 wt % to 11 wt % of the total weight of the ASW powder, briquette, or asphalt product including the ASW powder and/or briquette, and/or any additives. In some embodiments, the total weight percent of the additives may be from 1 wt % to 10 wt % of the total weight of the ASW powder, briquette, or asphalt product including the ASW powder and/or briquette, and/or any additives. In some embodiments, the total weight percent of the additives may be from 1 wt % to 9 wt % of the total weight of the ASW powder, briquette, or asphalt product including the ASW powder and/or briquette, and/or any additives. In some embodiments, the total weight percent of the additives may be from 1 wt % to 8 wt % of the total weight of the ASW powder, briquette, or asphalt product including the ASW powder and/or briquette, and/or any additives. In some embodiments, the total weight percent of the additives may be from 1 wt % to 7 wt % of the total weight of the ASW powder, briquette, or asphalt product including the ASW powder and/or briquette, and/or any additives. In some embodiments, the total weight percent of the additives may be from 1 wt % to 6 wt % of the total weight of the ASW powder, briquette, or asphalt product including the ASW powder and/or briquette, and/or any additives. In some embodiments, the total weight percent of the additives may be from 1 wt % to 5 wt % of the total weight of the ASW powder, briquette, or asphalt product including the ASW powder and/or briquette, and/or any additives. In some embodiments, the total weight percent of the additives may be from 1 wt % to 4 wt % of the total weight of the ASW powder, briquette, or asphalt product including the ASW powder and/or briquette, and/or any additives. In some embodiments, the total weight percent of the additives may be from 1 wt % to 3 wt % of the total weight of the ASW powder, briquette, or asphalt product including the ASW powder and/or briquette, and/or any additives. In some embodiments, the total weight percent of the additives may be from 1 wt % to 2 wt % of the total weight of the ASW powder, briquette, or asphalt product including the ASW powder and/or briquette, and/or any additives.

In some embodiments, the total weight percent of the additives may be from 2 wt % to 15 wt % of the total weight of the ASW powder, briquette, or asphalt product including the ASW powder and/or briquette, and/or any additives. In some embodiments, the total weight percent of the additives may be from 2 wt % to 14 wt % of the total weight of the ASW powder, briquette, or asphalt product including the ASW powder and/or briquette, and/or any additives. In some embodiments, the total weight percent of the additives may be from 2 wt % to 13 wt % of the total weight of the ASW powder, briquette, or asphalt product including the ASW powder and/or briquette, and/or any additives. In some embodiments, the total weight percent of the additives may be from 2 wt % to 12 wt % of the total weight of the ASW powder, briquette, or asphalt product including the ASW powder and/or briquette, and/or any additives. In some embodiments, the total weight percent of the additives may be from 2 wt % to 11 wt % of the total weight of the ASW powder, briquette, or asphalt product including the ASW powder and/or briquette, and/or any additives. In some embodiments, the total weight percent of the additives may be from 2 wt % to 10 wt % of the total weight of the ASW powder, briquette, or asphalt product including the ASW powder and/or briquette, and/or any additives. In some embodiments, the total weight percent of the additives may be from 2 wt % to 9 wt % of the total weight of the ASW powder, briquette, or asphalt product including the ASW powder and/or briquette, and/or any additives. In some embodiments, the total weight percent of the additives may be from 2 wt % to 8 wt % of the total weight of the ASW powder, briquette, or asphalt product including the ASW powder and/or briquette, and/or any additives. In some embodiments, the total weight percent of the additives may be from 2 wt % to 7 wt % of the total weight of the ASW powder, briquette, or asphalt product including the ASW powder and/or briquette, and/or any additives. In some embodiments, the total weight percent of the additives may be from 2 wt % to 6 wt % of the total weight of the ASW powder, briquette, or asphalt product including the ASW powder and/or briquette, and/or any additives. In some embodiments, the total weight percent of the additives may be from 2 wt % to 5 wt % of the total weight of the ASW powder, briquette, or asphalt product including the ASW powder and/or briquette, and/or any additives. In some embodiments, the total weight percent of the additives may be from 2 wt % to 4 wt % of the total weight of the ASW powder, briquette, or asphalt product including the ASW powder and/or briquette, and/or any additives. In some embodiments, the total weight percent of the additives may be from 2 wt % to 3 wt % of the total weight of the ASW powder, briquette, or asphalt product including the ASW powder and/or briquette, and/or any additives.

In some embodiments, the total weight percent of the additives may be from 3 wt % to 15 wt % of the total weight of the ASW powder, briquette, or asphalt product including the ASW powder and/or briquette, and/or any additives. In some embodiments, the total weight percent of the additives may be from 3 wt % to 14 wt % of the total weight of the ASW powder, briquette, or asphalt product including the ASW powder and/or briquette, and/or any additives. In some embodiments, the total weight percent of the additives may be from 3 wt % to 13 wt % of the total weight of the ASW powder, briquette, or asphalt product including the ASW powder and/or briquette, and/or any additives. In some embodiments, the total weight percent of the additives may be from 3 wt % to 12 wt % of the total weight of the ASW powder, briquette, or asphalt product including the ASW powder and/or briquette, and/or any additives. In some embodiments, the total weight percent of the additives may be from 3 wt % to 11 wt % of the total weight of the ASW powder, briquette, or asphalt product including the ASW powder and/or briquette, and/or any additives. In some embodiments, the total weight percent of the additives may be from 3 wt % to 10 wt % of the total weight of the ASW powder, briquette, or asphalt product including the ASW powder and/or briquette, and/or any additives. In some embodiments, the total weight percent of the additives may be from 3 wt % to 9 wt % of the total weight of the ASW powder, briquette, or asphalt product including the ASW powder and/or briquette, and/or any additives. In some embodiments, the total weight percent of the additives may be from 3 wt % to 8 wt % of the total weight of the ASW powder, briquette, or asphalt product including the ASW powder and/or briquette, and/or any additives. In some embodiments, the total weight percent of the additives may be from 3 wt % to 7 wt % of the total weight of the ASW powder, briquette, or asphalt product including the ASW powder and/or briquette, and/or any additives. In some embodiments, the total weight percent of the additives may be from 3 wt % to 6 wt % of the total weight of the ASW powder, briquette, or asphalt product including the ASW powder and/or briquette, and/or any additives. In some embodiments, the total weight percent of the additives may be from 3 wt % to 5 wt % of the total weight of the ASW powder, briquette, or asphalt product including the ASW powder and/or briquette, and/or any additives. In some embodiments, the total weight percent of the additives may be from 3 wt % to 4 wt % of the total weight of the ASW powder, briquette, or asphalt product including the ASW powder and/or briquette, and/or any additives.

In some embodiments, the total weight percent of the additives may be from 4 wt % to 15 wt % of the total weight of the ASW powder, briquette, or asphalt product including the ASW powder and/or briquette, and/or any additives. In some embodiments, the total weight percent of the additives may be from 4 wt % to 14 wt % of the total weight of the ASW powder, briquette, or asphalt product including the ASW powder and/or briquette, and/or any additives. In some embodiments, the total weight percent of the additives may be from 4 wt % to 13 wt % of the total weight of the ASW powder, briquette, or asphalt product including the ASW powder and/or briquette, and/or any additives. In some embodiments, the total weight percent of the additives may be from 4 wt % to 12 wt % of the total weight of the ASW powder, briquette, or asphalt product including the ASW powder and/or briquette, and/or any additives. In some embodiments, the total weight percent of the additives may be from 4 wt % to 11 wt % of the total weight of the ASW powder, briquette, or asphalt product including the ASW powder and/or briquette, and/or any additives. In some embodiments, the total weight percent of the additives may be from 4 wt % to 10 wt % of the total weight of the ASW powder, briquette, or asphalt product including the ASW powder and/or briquette, and/or any additives. In some embodiments, the total weight percent of the additives may be from 4 wt % to 9 wt % of the total weight of the ASW powder, briquette, or asphalt product including the ASW powder and/or briquette, and/or any additives. In some embodiments, the total weight percent of the additives may be from 4 wt % to 8 wt % of the total weight of the ASW powder, briquette, or asphalt product including the ASW powder and/or briquette, and/or any additives. In some embodiments, the total weight percent of the additives may be from 4 wt % to 7 wt % of the total weight of the ASW powder, briquette, or asphalt product including the ASW powder and/or briquette, and/or any additives. In some embodiments, the total weight percent of the additives may be from 4 wt % to 6 wt % of the total weight of the ASW powder, briquette, or asphalt product including the ASW powder and/or briquette, and/or any additives. In some embodiments, the total weight percent of the additives may be from 4 wt % to 5 wt % of the total weight of the ASW powder, briquette, or asphalt product including the ASW powder and/or briquette, and/or any additives.

In some embodiments, the total weight percent of the additives may be from 5 wt % to 15 wt % of the total weight of the ASW powder, briquette, or asphalt product including the ASW powder and/or briquette, and/or any additives. In some embodiments, the total weight percent of the additives may be from 5 wt % to 14 wt % of the total weight of the ASW powder, briquette, or asphalt product including the ASW powder and/or briquette, and/or any additives. In some embodiments, the total weight percent of the additives may be from 5 wt % to 13 wt % of the total weight of the ASW powder, briquette, or asphalt product including the ASW powder and/or briquette, and/or any additives. In some embodiments, the total weight percent of the additives may be from 5 wt % to 12 wt % of the total weight of the ASW powder, briquette, or asphalt product including the ASW powder and/or briquette, and/or any additives. In some embodiments, the total weight percent of the additives may be from 5 wt % to 11 wt % of the total weight of the ASW powder, briquette, or asphalt product including the ASW powder and/or briquette, and/or any additives. In some embodiments, the total weight percent of the additives may be from 5 wt % to 10 wt % of the total weight of the ASW powder, briquette, or asphalt product including the ASW powder and/or briquette, and/or any additives. In some embodiments, the total weight percent of the additives may be from 5 wt % to 9 wt % of the total weight of the ASW powder, briquette, or asphalt product including the ASW powder and/or briquette, and/or any additives. In some embodiments, the total weight percent of the additives may be from 5 wt % to 8 wt % of the total weight of the ASW powder, briquette, or asphalt product including the ASW powder and/or briquette, and/or any additives. In some embodiments, the total weight percent of the additives may be from 5 wt % to 7 wt % of the total weight of the ASW powder, briquette, or asphalt product including the ASW powder and/or briquette, and/or any additives. In some embodiments, the total weight percent of the additives may be from 5 wt % to 6 wt % of the total weight of the ASW powder, briquette, or asphalt product including the ASW powder and/or briquette, and/or any additives.

In some embodiments, the total weight percent of the additives may be from 6 wt % to 15 wt % of the total weight of the ASW powder, briquette, or asphalt product including the ASW powder and/or briquette, and/or any additives. In some embodiments, the total weight percent of the additives may be from 6 wt % to 14 wt % of the total weight of the ASW powder, briquette, or asphalt product including the ASW powder and/or briquette, and/or any additives. In some embodiments, the total weight percent of the additives may be from 6 wt % to 13 wt % of the total weight of the ASW powder, briquette, or asphalt product including the ASW powder and/or briquette, and/or any additives. In some embodiments, the total weight percent of the additives may be from 6 wt % to 12 wt % of the total weight of the ASW powder, briquette, or asphalt product including the ASW powder and/or briquette, and/or any additives. In some embodiments, the total weight percent of the additives may be from 6 wt % to 11 wt % of the total weight of the ASW powder, briquette, or asphalt product including the ASW powder and/or briquette, and/or any additives. In some embodiments, the total weight percent of the additives may be from 6 wt % to 10 wt % of the total weight of the ASW powder, briquette, or asphalt product including the ASW powder and/or briquette, and/or any additives. In some embodiments, the total weight percent of the additives may be from 6 wt % to 9 wt % of the total weight of the ASW powder, briquette, or asphalt product including the ASW powder and/or briquette, and/or any additives. In some embodiments, the total weight percent of the additives may be from 6 wt % to 8 wt % of the total weight of the ASW powder, briquette, or asphalt product including the ASW powder and/or briquette, and/or any additives. In some embodiments, the total weight percent of the additives may be from 6 wt % to 7 wt % of the total weight of the ASW powder, briquette, or asphalt product including the ASW powder and/or briquette, and/or any additives.

In some embodiments, the total weight percent of the additives may be from 7 wt % to 15 wt % of the total weight of the ASW powder, briquette, or asphalt product including the ASW powder and/or briquette, and/or any additives. In some embodiments, the total weight percent of the additives may be from 7 wt % to 14 wt % of the total weight of the ASW powder, briquette, or asphalt product including the ASW powder and/or briquette, and/or any additives. In some embodiments, the total weight percent of the additives may be from 7 wt % to 13 wt % of the total weight of the ASW powder, briquette, or asphalt product including the ASW powder and/or briquette, and/or any additives. In some embodiments, the total weight percent of the additives may be from 7 wt % to 12 wt % of the total weight of the ASW powder, briquette, or asphalt product including the ASW powder and/or briquette, and/or any additives. In some embodiments, the total weight percent of the additives may be from 7 wt % to 11 wt % of the total weight of the ASW powder, briquette, or asphalt product including the ASW powder and/or briquette, and/or any additives. In some embodiments, the total weight percent of the additives may be from 7 wt % to 10 wt % of the total weight of the ASW powder, briquette, or asphalt product including the ASW powder and/or briquette, and/or any additives. In some embodiments, the total weight percent of the additives may be from 7 wt % to 9 wt % of the total weight of the ASW powder, briquette, or asphalt product including the ASW powder and/or briquette, and/or any additives. In some embodiments, the total weight percent of the additives may be from 7 wt % to 8 wt % of the total weight of the ASW powder, briquette, or asphalt product including the ASW powder and/or briquette, and/or any additives.

In some embodiments, the total weight percent of the additives may be from 8 wt % to 15 wt % of the total weight of the ASW powder, briquette, or asphalt product including the ASW powder and/or briquette, and/or any additives. In some embodiments, the total weight percent of the additives may be from 8 wt % to 14 wt % of the total weight of the ASW powder, briquette, or asphalt product including the ASW powder and/or briquette, and/or any additives. In some embodiments, the total weight percent of the additives may be from 8 wt % to 13 wt % of the total weight of the ASW powder, briquette, or asphalt product including the ASW powder and/or briquette, and/or any additives. In some embodiments, the total weight percent of the additives may be from 8 wt % to 12 wt % of the total weight of the ASW powder, briquette, or asphalt product including the ASW powder and/or briquette, and/or any additives. In some embodiments, the total weight percent of the additives may be from 8 wt % to 11 wt % of the total weight of the ASW powder, briquette, or asphalt product including the ASW powder and/or briquette, and/or any additives. In some embodiments, the total weight percent of the additives may be from 8 wt % to 10 wt % of the total weight of the ASW powder, briquette, or asphalt product including the ASW powder and/or briquette, and/or any additives. In some embodiments, the total weight percent of the additives may be from 8 wt % to 9 wt % of the total weight of the ASW powder, briquette, or asphalt product including the ASW powder and/or briquette, and/or any additives.

In some embodiments, the total weight percent of the additives may be from 9 wt % to 15 wt % of the total weight of the ASW powder, briquette, or asphalt product including the ASW powder and/or briquette, and/or any additives. In some embodiments, the total weight percent of the additives may be from 9 wt % to 14 wt % of the total weight of the ASW powder, briquette, or asphalt product including the ASW powder and/or briquette, and/or any additives. In some embodiments, the total weight percent of the additives may be from 9 wt % to 13 wt % of the total weight of the ASW powder, briquette, or asphalt product including the ASW powder and/or briquette, and/or any additives. In some embodiments, the total weight percent of the additives may be from 9 wt % to 12 wt % of the total weight of the ASW powder, briquette, or asphalt product including the ASW powder and/or briquette, and/or any additives. In some embodiments, the total weight percent of the additives may be from 9 wt % to 11 wt % of the total weight of the ASW powder, briquette, or asphalt product including the ASW powder and/or briquette, and/or any additives. In some embodiments, the total weight percent of the additives may be from 9 wt % to 10 wt % of the total weight of the ASW powder, briquette, or asphalt product including the ASW powder and/or briquette, and/or any additives.

In some embodiments, the total weight percent of the additives may be from 10 wt % to 15 wt % of the total weight of the ASW powder, briquette, or asphalt product including the ASW powder and/or briquette, and/or any additives. In some embodiments, the total weight percent of the additives may be from 10 wt % to 14 wt % of the total weight of the ASW powder, briquette, or asphalt product including the ASW powder and/or briquette, and/or any additives. In some embodiments, the total weight percent of the additives may be from 10 wt % to 13 wt % of the total weight of the ASW powder, briquette, or asphalt product including the ASW powder and/or briquette, and/or any additives. In some embodiments, the total weight percent of the additives may be from 10 wt % to 12 wt % of the total weight of the ASW powder, briquette, or asphalt product including the ASW powder and/or briquette, and/or any additives. In some embodiments, the total weight percent of the additives may be from 10 wt % to 11 wt % of the total weight of the ASW powder, briquette, or asphalt product including the ASW powder and/or briquette, and/or any additives.

In some embodiments, the total weight percent of the additives may be from 11 wt % to 15 wt % of the total weight of the ASW powder, briquette, or asphalt product including the ASW powder and/or briquette, and/or any additives. In some embodiments, the total weight percent of the additives may be from 11 wt % to 14 wt % of the total weight of the ASW powder, briquette, or asphalt product including the ASW powder and/or briquette, and/or any additives. In some embodiments, the total weight percent of the additives may be from 11 wt % to 13 wt % of the total weight of the ASW powder, briquette, or asphalt product including the ASW powder and/or briquette, and/or any additives. In some embodiments, the total weight percent of the additives may be from 11 wt % to 12 wt % of the total weight of the ASW powder, briquette, or asphalt product including the ASW powder and/or briquette, and/or any additives.

In some embodiments, the total weight percent of the additives may be from 12 wt % to 15 wt % of the total weight of the ASW powder, briquette, or asphalt product including the ASW powder and/or briquette, and/or any additives. In some embodiments, the total weight percent of the additives may be from 12 wt % to 14 wt % of the total weight of the ASW powder, briquette, or asphalt product including the ASW powder and/or briquette, and/or any additives. In some embodiments, the total weight percent of the additives may be from 12 wt % to 13 wt % of the total weight of the ASW powder, briquette, or asphalt product including the ASW powder and/or briquette, and/or any additives.

In some embodiments, the total weight percent of the additives may be from 13 wt % to 15 wt % of the total weight of the ASW powder, briquette, or asphalt product including the ASW powder and/or briquette, and/or any additives. In some embodiments, the total weight percent of the additives may be from 13 wt % to 14 wt % of the total weight of the ASW powder, briquette, or asphalt product including the ASW powder and/or briquette, and/or any additives. In some embodiments, the total weight percent of the additives may be from 14 wt % to 15 wt % of the total weight of the ASW powder, briquette, or asphalt product including the ASW powder and/or briquette, and/or any additives.

In some embodiments, the disclosed one or more of the anti-aging agents, rejuvenating agents, and/or additives, may be substituted for one another.

In some embodiments an exemplary method according to the present disclosure may be performed in any order.

Further, in some embodiments, the discussed additives may be added any time during manufacture of the briquettes, the powder, and/or the asphalt product.

In some non-limiting embodiments, an exemplary method of the present disclosure is performed in the following order: (a) obtaining the ASW; (b) grinding the ASW to form ground ASW; (c) screening the ground ASW with the rotary screener to form the first set of ASW particles and the second set of ASW particles; (d) removing at least some of the granules of the ASW from at least one of the first set of ASW particles, the second set of ASW particles, or a combination thereof with at least one granule liberator, such as at least one rotary impact separator; (e) grinding the first set of ASW particles to result in a third set of particles; (f) separating the combination of the second and third sets of ASW particles using an air separator to result in a fourth set of ASW particles and a fifth set of ASW particles; (g) grinding the fourth set of ASW particles to result in a sixth set of particles.

In some embodiments, an exemplary method of the present disclosure does not comprise a grinding step after step (g). In some embodiments, an exemplary method of the present disclosure does not comprise any grinding steps other than steps (b), (e), and (g). In some embodiments, an exemplary method of the present disclosure does not comprise a screening step after step (f).

Figure 3:
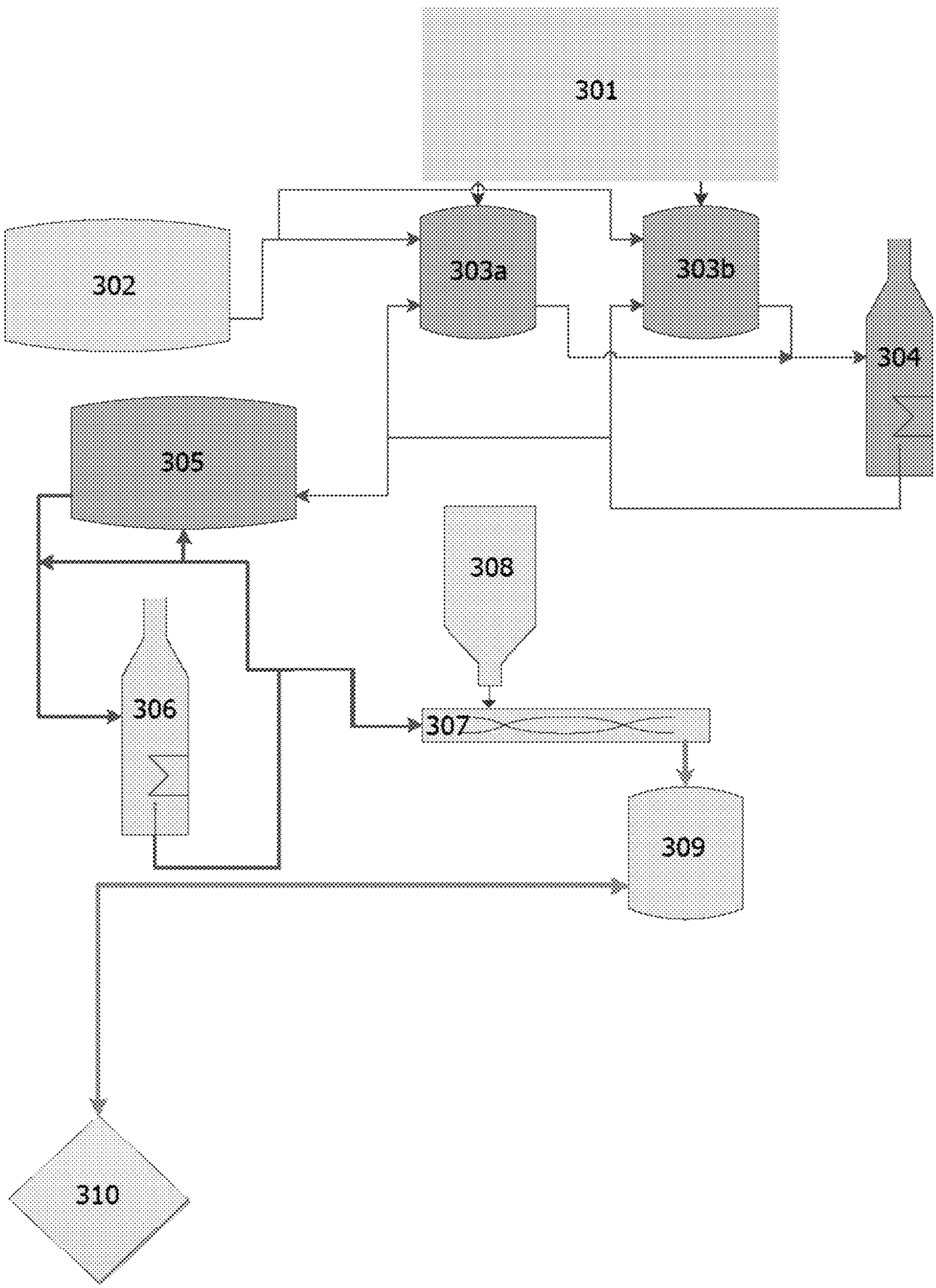
FIG. 3 is a flow diagram depicting an exemplary method of forming an ASW powder filled coating, according to some embodiments.

An exemplary embodiment of the present disclosure is shown in FIG. 1. As shown in the non-limiting exemplary embodiment of FIG. 1, asphalt shingle waste (ASW) 101 may be obtained. In some embodiments, the ASW 101 is subjected to a grinding step 102 to form ground ASW particles. In some embodiments, the ground ASW particles 103 are subjected to a screening step 104 to form a first set of ASW particles 105 and a second set of ASW particles 106. In some embodiments, the screening step 104 is performed with a rotary screener. In some embodiments, some or all of the granules are removed from the first set of ASW particles 105 using rotary impact separator 107. While not depicted in FIG. 1, rotary impact separator 107 may also remove some or all of the granules from the second set of ASW particles 106. In some embodiments, the first set of particles 105 is subjected to a grinding step 108, so as to form a third set of ASW particles 109. In some embodiments the second set of ASW particles 106 and the third set of ASW particles 109 may be combined to form a combination 110 of the second and third sets of ASW particles. In some embodiments, the combination 110 of the second and third sets of ASW particles 110 is fed into an air separator 111, where the combination 110 of the second and third sets of ASW particles are separated into a fourth set of ASW particles 112 and a fifth set of ASW particles 113. In some embodiments, the fourth set of ASW particles 112 is subjected to a grinding step 114, so as to form a sixth set of ASW particles 115. In some embodiments, the fifth set of ASW particles 113 and the sixth set of ASW particles 115 are combined to form ASW powder 116. In some embodiments, ASW powder 116 is combined with an asphalt coating to form a partially filled asphalt coating, as shown in FIG. 3 and described herein, infra. In some embodiments, limestone or other filler material may be added to the partially filled asphalt coating to form a filled asphalt coating, as shown in FIG. 3 and described herein, infra. In some embodiments, the filled asphalt coating (not shown) is incorporated into a ground covering including asphalt, such as, for example, a road, parking lot, or other surface (not shown).

Exemplary Briquetting Methods

In some embodiments, the ASW powder is formed into a plurality of briquettes. In some embodiments, each briquette of the plurality of briquettes comprises the ASW powder. In some embodiments, some of the plurality of briquettes comprises the ASW powder. In some embodiments, the above discussed additives may be added during any time in the formation of the powder and/or the briquettes, and/or the asphalt product described throughout this disclosure.

In some embodiments, each briquette of the plurality of briquettes comprises at least one of: the ASW powder, AC powder (as described herein), or any combination thereof. In some embodiments, some of the plurality of briquettes comprises the ASW powder, the AC powder, or any combination thereof. In some embodiments, the plurality of briquettes is formed after performing the grinding steps and screening steps (described herein) on the ASW to result in the ASW powder.

In some embodiments, limestone powder or other filler is added to at least one of: the ASW powder, the AC powder, or any combination thereof to form the plurality of briquettes. In some embodiments, the plurality of briquettes may be obtained (e.g., delivered, purchased, obtained from storage, formed, compressed, or any combination thereof).

In some embodiments, the plurality of briquettes is formed by compressing the ASW powder and the limestone powder and at a pressure sufficient to form the plurality of briquettes. In some embodiments, the plurality of briquettes is formed by compressing the ASW powder at a pressure sufficient to form the plurality of briquettes. Any suitable compression device may be used, including but not limited to, a piston, a briquetting machine, a plurality of compression wheels, or any combination thereof.

In some embodiments, the pressure sufficient to form the plurality of briquettes ranges from 200 psi to 20,000 psi. In some embodiments, the pressure sufficient to form the plurality of briquettes ranges from 500 psi to 20,000 psi. In some embodiments, the pressure sufficient to form the plurality of briquettes ranges from 1,000 psi to 20,000 psi. In some embodiments, the pressure sufficient to form the plurality of briquettes ranges from 5,000 psi to 20,000 psi. In some embodiments, the pressure sufficient to form the plurality of briquettes ranges from 10,000 psi to 20,000 psi. In some embodiments, the pressure sufficient to form the plurality of briquettes ranges from 15,000 psi to 20,000 psi.

In some embodiments, the pressure sufficient to form the plurality of briquettes ranges from 200 psi to 15,000 psi. In some embodiments, the pressure sufficient to form the plurality of briquettes ranges from 200 psi to 10,000 psi. In some embodiments, the pressure sufficient to form the plurality of briquettes ranges from 200 psi to 5,000 psi. In some embodiments, the pressure sufficient to form the plurality of briquettes ranges from 200 psi to 1,000 psi. In some embodiments, the pressure sufficient to form the plurality of briquettes ranges from 200 psi to 5000 psi.

In some embodiments, the pressure sufficient to form the plurality of briquettes ranges from 500 psi to 15,000 psi. In some embodiments, the pressure sufficient to form the plurality of briquettes ranges from 1,000 psi to 10,000 psi. In some embodiments, the pressure sufficient to form the plurality of briquettes is 500 psi.

The plurality of briquettes may be any shape. In some embodiments, each briquette the plurality of briquettes is spherical. In some embodiments, each briquette of the plurality of briquettes is an oblate spheroid (i.e., an ellipsoid). In some embodiments the plurality of briquettes may include briquettes having at least one of the following non-limiting shapes: a rectangular prism, a cube, a cone, a tetrahedron, a pentahedron, a hexahedron, a dodecahedron, a torus, or any combination thereof.

The plurality of briquettes may have any size. In some embodiments, each briquette of the plurality of briquettes may be spherical with a diameter in a range of 0.5 inches to 2 inches. In some embodiments, each briquette of the plurality of briquettes may be spherical with a diameter in a range of 1 inch to 2 inches. In some embodiments, each briquette of the plurality of briquettes may be spherical with a diameter in a range of 1.5 inches to 2 inches. In some embodiments, each briquette of the plurality of briquettes may be spherical with a diameter in a range of 0.5 inches to 1.5 inches. In some embodiments, each briquette of the plurality of briquettes may be spherical with a diameter in a range of 0.5 inches to 1 inch. In some embodiments, each briquette of the plurality of briquettes may be spherical with a diameter in a range of 1 inch to 1.5 inches.

In some embodiments, each briquette of the plurality of briquettes may be an oblate spheroid with at least one of: a first diameter, a second diameter, or any combination thereof having a range of 0.5 inches to 2 inches. In some embodiments, each briquette of the plurality of briquettes may be an oblate spheroid with at least one of: a first diameter, a second diameter, or any combination thereof having a range of 1 inch to 2 inches. In some embodiments, each briquette of the plurality of briquettes may be an oblate spheroid with at least one of: a first diameter, a second diameter, or any combination thereof having a range of 1.5 inches to 2 inches In some embodiments, each briquette of the plurality of briquettes may be an oblate spheroid with at least one of: a first diameter, a second diameter, or any combination thereof having a range of 0.5 inches to 1.5 inches In some embodiments, each briquette of the plurality of briquettes may be an oblate spheroid with at least one of: a first diameter, a second diameter, or any combination thereof having a range of 0.5 inches to 1 inch. In some embodiments, each briquette of the plurality of briquettes may be an oblate spheroid with at least one of: a first diameter, a second diameter, or any combination thereof having a range of 1 inch to 1.5 inches In some embodiments, a first dimension refers to a length (e.g., a maximum length or an average length), a second dimension refers to a width (e.g., a maximum width or an average width), and a third dimension (e.g., a maximum height or an average height). In some embodiments, each briquette of the plurality of briquettes has a first dimension of 0.5 inches to 2 inches, a second dimension of 0.5 inches to 2 inches, and a third dimension of 0.5 inches to 2 inches. In some embodiments, each briquette of the plurality of briquettes has a first dimension of 0.6 inches to 2 inches. In some embodiments, each briquette of the plurality of briquettes has a first dimension of 0.7 inches to 2 inches. In some embodiments, each briquette of the plurality of briquettes has a first dimension of 0.8 inches to 2 inches. In some embodiments, each briquette of the plurality of briquettes has a first dimension of 0.9 inches to 2 inches. In some embodiments, each briquette of the plurality of briquettes has a first dimension of 1 inch to 2 inches. In some embodiments, each briquette of the plurality of briquettes has a first dimension of 1.1 inches to 2 inches. In some embodiments, each briquette of the plurality of briquettes has a first dimension of 1.2 inches to 2 inches. In some embodiments, each briquette of the plurality of briquettes has a first dimension of 1.3 inches to 2 inches. In some embodiments, each briquette of the plurality of briquettes has a first dimension of 1.4 inches to 2 inches. In some embodiments, each briquette of the plurality of briquettes has a first dimension of 1.5 inches to 2 inches. In some embodiments, each briquette of the plurality of briquettes has a first dimension of 1.6 inches to 2 inches. In some embodiments, each briquette of the plurality of briquettes has a first dimension of 1.7 inches to 2 inches. In some embodiments, each briquette of the plurality of briquettes has a first dimension of 1.8 inches to 2 inches. In some embodiments, each briquette of the plurality of briquettes has a first dimension of 1.9 inches to 2 inches.

In some embodiments, each briquette of the plurality of briquettes has a first dimension of 0.5 inches to 1.9 inches. In some embodiments, each briquette of the plurality of briquettes has a first dimension of 0.5 inches to 1.8 inches. In some embodiments, each briquette of the plurality of briquettes has a first dimension of 0.5 inches to 1.7 inches. In some embodiments, each briquette of the plurality of briquettes has a first dimension of 0.5 inches to 1.6 inches. In some embodiments, each briquette of the plurality of briquettes has a first dimension of 0.5 inches to 1.5 inches. In some embodiments, each briquette of the plurality of briquettes has a first dimension of 0.5 inches to 1.4 inches. In some embodiments, each briquette of the plurality of briquettes has a first dimension of 0.5 inches to 1.3 inches. In some embodiments, each briquette of the plurality of briquettes has a first dimension of 0.5 inches to 1.2 inches. In some embodiments, each briquette of the plurality of briquettes has a first dimension of 0.5 inches to 1 inches. In some embodiments, each briquette of the plurality of briquettes has a first dimension of 0.5 inches to 0.9 inches. In some embodiments, each briquette of the plurality of briquettes has a first dimension of 0.5 inches to 0.8 inches. In some embodiments, each briquette of the plurality of briquettes has a first dimension of 0.5 inches to 0.7 inches. In some embodiments, each briquette of the plurality of briquettes has a first dimension of 0.5 inches to 0.6 inches.

In some embodiments, each briquette of the plurality of briquettes has a second dimension of 0.6 inches to 2 inches. In some embodiments, each briquette of the plurality of briquettes has a second dimension of 0.7 inches to 2 inches. In some embodiments, each briquette of the plurality of briquettes has a second dimension of 0.8 inches to 2 inches. In some embodiments, each briquette of the plurality of briquettes has a second dimension of 0.9 inches to 2 inches. In some embodiments, each briquette of the plurality of briquettes has a second dimension of 1 inch to 2 inches. In some embodiments, each briquette of the plurality of briquettes has a second dimension of 1.1 inches to 2 inches. In some embodiments, each briquette of the plurality of briquettes has a second dimension of 1.2 inches to 2 inches. In some embodiments, each briquette of the plurality of briquettes has a second dimension of 1.3 inches to 2 inches. In some embodiments, each briquette of the plurality of briquettes has a second dimension of 1.4 inches to 2 inches. In some embodiments, each briquette of the plurality of briquettes has a second dimension of 1.5 inches to 2 inches. In some embodiments, each briquette of the plurality of briquettes has a second dimension of 1.6 inches to 2 inches. In some embodiments, each briquette of the plurality of briquettes has a second dimension of 1.7 inches to 2 inches. In some embodiments, each briquette of the plurality of briquettes has a second dimension of 1.8 inches to 2 inches. In some embodiments, each briquette of the plurality of briquettes has a second dimension of 1.9 inches to 2 inches.

In some embodiments, each briquette of the plurality of briquettes has a second dimension of 0.5 inches to 1.9 inches. In some embodiments, each briquette of the plurality of briquettes has a second dimension of 0.5 inches to 1.8 inches. In some embodiments, each briquette of the plurality of briquettes has a second dimension of 0.5 inches to 1.7 inches. In some embodiments, each briquette of the plurality of briquettes has a second dimension of 0.5 inches to 1.6 inches. In some embodiments, each briquette of the plurality of briquettes has a second dimension of 0.5 inches to 1.5 inches. In some embodiments, each briquette of the plurality of briquettes has a second dimension of 0.5 inches to 1.4 inches. In some embodiments, each briquette of the plurality of briquettes has a second dimension of 0.5 inches to 1.3 inches. In some embodiments, each briquette of the plurality of briquettes has a second dimension of 0.5 inches to 1.2 inches. In some embodiments, each briquette of the plurality of briquettes has a second dimension of 0.5 inches to 1 inches. In some embodiments, each briquette of the plurality of briquettes has a second dimension of 0.5 inches to 0.9 inches. In some embodiments, each briquette of the plurality of briquettes has a second dimension of 0.5 inches to 0.8 inches. In some embodiments, each briquette of the plurality of briquettes has a second dimension of 0.5 inches to 0.7 inches. In some embodiments, each briquette of the plurality of briquettes has a second dimension of 0.5 inches to 0.6 inches.

In some embodiments, each briquette of the plurality of briquettes has a third dimension of 0.6 inches to 2 inches. In some embodiments, each briquette of the plurality of briquettes has a third dimension of 0.7 inches to 2 inches. In some embodiments, each briquette of the plurality of briquettes has a third dimension of 0.8 inches to 2 inches. In some embodiments, each briquette of the plurality of briquettes has a third dimension of 0.9 inches to 2 inches. In some embodiments, each briquette of the plurality of briquettes has a third dimension of 1 inch to 2 inches. In some embodiments, each briquette of the plurality of briquettes has a third dimension of 1.1 inches to 2 inches. In some embodiments, each briquette of the plurality of briquettes has a third dimension of 1.2 inches to 2 inches. In some embodiments, each briquette of the plurality of briquettes has a third dimension of 1.3 inches to 2 inches. In some embodiments, each briquette of the plurality of briquettes has a third dimension of 1.4 inches to 2 inches. In some embodiments, each briquette of the plurality of briquettes has a third dimension of 1.5 inches to 2 inches. In some embodiments, each briquette of the plurality of briquettes has a third dimension of 1.6 inches to 2 inches. In some embodiments, each briquette of the plurality of briquettes has a third dimension of 1.7 inches to 2 inches. In some embodiments, each briquette of the plurality of briquettes has a third dimension of 1.8 inches to 2 inches. In some embodiments, each briquette of the plurality of briquettes has a third dimension of 1.9 inches to 2 inches.

In some embodiments, each briquette of the plurality of briquettes has a third dimension of 0.5 inches to 1.9 inches. In some embodiments, each briquette of the plurality of briquettes has a third dimension of 0.5 inches to 1.8 inches. In some embodiments, each briquette of the plurality of briquettes has a third dimension of 0.5 inches to 1.7 inches. In some embodiments, each briquette of the plurality of briquettes has a third dimension of 0.5 inches to 1.6 inches. In some embodiments, each briquette of the plurality of briquettes has a third dimension of 0.5 inches to 1.5 inches. In some embodiments, each briquette of the plurality of briquettes has a third dimension of 0.5 inches to 1.4 inches. In some embodiments, each briquette of the plurality of briquettes has a third dimension of 0.5 inches to 1.3 inches. In some embodiments, each briquette of the plurality of briquettes has a third dimension of 0.5 inches to 1.2 inches. In some embodiments, each briquette of the plurality of briquettes has a third dimension of 0.5 inches to 1 inches. In some embodiments, each briquette of the plurality of briquettes has a third dimension of 0.5 inches to 0.9 inches. In some embodiments, each briquette of the plurality of briquettes has a third dimension of 0.5 inches to 0.8 inches. In some embodiments, each briquette of the plurality of briquettes has a third dimension of 0.5 inches to 0.7 inches. In some embodiments, each briquette of the plurality of briquettes has a third dimension of 0.5 inches to 0.6 inches.

In some embodiments, during the feeding of at least one of: the AC powder, the ASW powder, or any combination thereof into the at least one first mixer (as described herein, infra), at least a portion of the AC powder or the ASW powder is in the form of a briquette. In some embodiments, during the feeding of into the at least one first mixer, all of the AC powder, all of the ASW powder, or all of both is in the form of a briquette.

In some embodiments, each briquette comprises 5% to 90% by weight of an asphalt based on a total weight of the briquette. In some embodiments, each briquette comprises 5% to 85% by weight of an asphalt based on the total weight of the briquette. In some embodiments, each briquette comprises 5% to 80% by weight of an asphalt based on the total weight of the briquette. In some embodiments, each briquette comprises 5% to 75% by weight of an asphalt based on the total weight of the briquette. In some embodiments, each briquette comprises 5% to 70% by weight of an asphalt based on the total weight of the briquette. In some embodiments, each briquette comprises 5% to 65% by weight of an asphalt based on the total weight of the briquette. In some embodiments, each briquette comprises 5% to 60% by weight of an asphalt based on the total weight of the briquette. In some embodiments, each briquette comprises 5% to 55% by weight of an asphalt based on the total weight of the briquette. In some embodiments, each briquette comprises 5% to 50% by weight of an asphalt based on the total weight of the briquette. In some embodiments, each briquette comprises 5% to 45% by weight of an asphalt based on the total weight of the briquette. In some embodiments, each briquette comprises 5% to 40% by weight of an asphalt based on the total weight of the briquette. In some embodiments, each briquette comprises 5% to 35% by weight of an asphalt based on the total weight of the briquette. In some embodiments, each briquette comprises 5% to 30% by weight of an asphalt based on the total weight of the briquette. In some embodiments, each briquette comprises 5% to 25% by weight of an asphalt based on the total weight of the briquette. In some embodiments, each briquette comprises 5% to 20% by weight of an asphalt based on the total weight of the briquette. In some embodiments, each briquette comprises 5% to 15% by weight of an asphalt based on the total weight of the briquette. In some embodiments, each briquette comprises 5% to 10% by weight of an asphalt based on the total weight of the briquette.

In some embodiments, each briquette comprises 10% to 90% by weight of an asphalt based on the total weight of the briquette. In some embodiments, each briquette comprises 15% to 90% by weight of an asphalt based on the total weight of the briquette. In some embodiments, each briquette comprises 20% to 90% by weight of an asphalt based on the total weight of the briquette. In some embodiments, each briquette comprises 25% to 90% by weight of an asphalt based on the total weight of the briquette. In some embodiments, each briquette comprises 30% to 90% by weight of an asphalt based on the total weight of the briquette. In some embodiments, each briquette comprises 35% to 90% by weight of an asphalt based on the total weight of the briquette. In some embodiments, each briquette comprises 40% to 90% by weight of an asphalt based on the total weight of the briquette. In some embodiments, each briquette comprises 45% to 90% by weight of an asphalt based on the total weight of the briquette. In some embodiments, each briquette comprises 50% to 90% by weight of an asphalt based on the total weight of the briquette. In some embodiments, each briquette comprises 55% to 90% by weight of an asphalt based on the total weight of the briquette. In some embodiments, each briquette comprises 60% to 90% by weight of an asphalt based on the total weight of the briquette. In some embodiments, each briquette comprises 65% to 90% by weight of an asphalt based on the total weight of the briquette. In some embodiments, each briquette comprises 70% to 90% by weight of an asphalt based on the total weight of the briquette. In some embodiments, each briquette comprises 75% to 90% by weight of an asphalt based on the total weight of the briquette. In some embodiments, each briquette comprises 80% to 90% by weight of an asphalt based on the total weight of the briquette. In some embodiments, each briquette comprises 85% to 90% by weight of an asphalt based on the total weight of the briquette.

In some embodiments, each briquette comprises 5% to 90% by weight of limestone, granules, and impurities based on a total weight of the briquette. In some embodiments, each briquette comprises 5% to 85% by weight of limestone, granules, and impurities based on the total weight of the briquette. In some embodiments, each briquette comprises 5% to 80% by weight of limestone, granules, and impurities based on the total weight of the briquette. In some embodiments, each briquette comprises 5% to 75% by weight of limestone, granules, and impurities based on the total weight of the briquette. In some embodiments, each briquette comprises 5% to 70% by weight of limestone, granules, and impurities based on the total weight of the briquette. In some embodiments, each briquette comprises 5% to 65% by weight of limestone, granules, and impurities based on the total weight of the briquette. In some embodiments, each briquette comprises 5% to 60% by weight of limestone, granules, and impurities based on the total weight of the briquette. In some embodiments, each briquette comprises 5% to 55% by weight of limestone, granules, and impurities based on the total weight of the briquette. In some embodiments, each briquette comprises 5% to 50% by weight of limestone, granules, and impurities based on the total weight of the briquette. In some embodiments, each briquette comprises 5% to 45% by weight of limestone, granules, and impurities based on the total weight of the briquette. In some embodiments, each briquette comprises 5% to 40% by weight of limestone, granules, and impurities based on the total weight of the briquette. In some embodiments, each briquette comprises 5% to 35% by weight of limestone, granules, and impurities based on the total weight of the briquette. In some embodiments, each briquette comprises 5% to 30% by weight of limestone, granules, and impurities based on the total weight of the briquette. In some embodiments, each briquette comprises 5% to 25% by weight of limestone, granules, and impurities based on the total weight of the briquette. In some embodiments, each briquette comprises 5% to 20% by weight of limestone, granules, and impurities based on the total weight of the briquette. In some embodiments, each briquette comprises 5% to 15% by weight of limestone, granules, and impurities based on the total weight of the briquette. In some embodiments, each briquette comprises 5% to 10% by weight of limestone, granules, and impurities based on the total weight of the briquette.

In some embodiments, each briquette comprises 10% to 90% by weight of limestone, granules, and impurities based on the total weight of the briquette. In some embodiments, each briquette comprises 15% to 90% by weight of limestone, granules, and impurities based on the total weight of the briquette. In some embodiments, each briquette comprises 20% to 90% by weight of limestone, granules, and impurities based on the total weight of the briquette. In some embodiments, each briquette comprises 25% to 90% by weight of limestone, granules, and impurities based on the total weight of the briquette. In some embodiments, each briquette comprises 30% to 90% by weight of limestone, granules, and impurities based on the total weight of the briquette. In some embodiments, each briquette comprises 35% to 90% by weight of limestone, granules, and impurities based on the total weight of the briquette. In some embodiments, each briquette comprises 40% to 90% by weight of limestone, granules, and impurities based on the total weight of the briquette. In some embodiments, each briquette comprises 45% to 90% by weight of limestone, granules, and impurities based on the total weight of the briquette. In some embodiments, each briquette comprises 50% to 90% by weight of limestone, granules, and impurities based on the total weight of the briquette. In some embodiments, each briquette comprises 55% to 90% by weight of limestone, granules, and impurities based on the total weight of the briquette. In some embodiments, each briquette comprises 60% to 90% by weight of limestone, granules, and impurities based on the total weight of the briquette. In some embodiments, each briquette comprises 65% to 90% by weight of limestone, granules, and impurities based on the total weight of the briquette. In some embodiments, each briquette comprises 70% to 90% by weight of limestone, granules, and impurities based on the total weight of the briquette. In some embodiments, each briquette comprises 75% to 90% by weight of limestone, granules, and impurities based on the total weight of the briquette. In some embodiments, each briquette comprises 80% to 90% by weight of limestone, granules, and impurities based on the total weight of the briquette. In some embodiments, each briquette comprises 85% to 90% by weight of limestone, granules, and impurities based on the total weight of the briquette.

In some embodiments, each briquette comprises 5% to 90% by weight of limestone based on a total weight of the briquette. In some embodiments, each briquette comprises 5% to 85% by weight of limestone based on the total weight of the briquette. In some embodiments, each briquette comprises 5% to 80% by weight of limestone based on the total weight of the briquette. In some embodiments, each briquette comprises 5% to 75% by weight of limestone based on the total weight of the briquette. In some embodiments, each briquette comprises 5% to 70% by weight of limestone based on the total weight of the briquette. In some embodiments, each briquette comprises 5% to 65% by weight of limestone based on the total weight of the briquette. In some embodiments, each briquette comprises 5% to 60% by weight of limestone based on the total weight of the briquette. In some embodiments, each briquette comprises 5% to 55% by weight of limestone based on the total weight of the briquette. In some embodiments, each briquette comprises 5% to 50% by weight of limestone based on the total weight of the briquette. In some embodiments, each briquette comprises 5% to 45% by weight of limestone based on the total weight of the briquette. In some embodiments, each briquette comprises 5% to 40% by weight of limestone based on the total weight of the briquette. In some embodiments, each briquette comprises 5% to 35% by weight of limestone based on the total weight of the briquette. In some embodiments, each briquette comprises 5% to 30% by weight of limestone based on the total weight of the briquette. In some embodiments, each briquette comprises 5% to 25% by weight of limestone based on the total weight of the briquette. In some embodiments, each briquette comprises 5% to 20% by weight of limestone based on the total weight of the briquette. In some embodiments, each briquette comprises 5% to 15% by weight of limestone based on the total weight of the briquette. In some embodiments, each briquette comprises 5% to 10% by weight of limestone based on the total weight of the briquette.

In some embodiments, each briquette comprises 10% to 90% by weight of limestone based on the total weight of the briquette. In some embodiments, each briquette comprises 15% to 90% by weight of limestone based on the total weight of the briquette. In some embodiments, each briquette comprises 20% to 90% by weight of limestone based on the total weight of the briquette. In some embodiments, each briquette comprises 25% to 90% by weight of limestone based on the total weight of the briquette. In some embodiments, each briquette comprises 30% to 90% by weight of limestone based on the total weight of the briquette. In some embodiments, each briquette comprises 35% to 90% by weight of limestone based on the total weight of the briquette. In some embodiments, each briquette comprises 40% to 90% by weight of limestone based on the total weight of the briquette. In some embodiments, each briquette comprises 45% to 90% by weight of limestone based on the total weight of the briquette. In some embodiments, each briquette comprises 50% to 90% by weight of limestone based on the total weight of the briquette. In some embodiments, each briquette comprises 55% to 90% by weight of limestone based on the total weight of the briquette. In some embodiments, each briquette comprises 60% to 90% by weight of limestone based on the total weight of the briquette. In some embodiments, each briquette comprises 65% to 90% by weight of limestone based on the total weight of the briquette. In some embodiments, each briquette comprises 70% to 90% by weight of limestone based on the total weight of the briquette. In some embodiments, each briquette comprises 75% to 90% by weight of limestone based on the total weight of the briquette. In some embodiments, each briquette comprises 80% to 90% by weight of limestone based on the total weight of the briquette. In some embodiments, each briquette comprises 85% to 90% by weight of limestone based on the total weight of the briquette.

In some embodiments, each briquette comprises 5% to 90% by weight of granules based on a total weight of the briquette. In some embodiments, each briquette comprises 5% to 85% by weight of granules based on the total weight of the briquette. In some embodiments, each briquette comprises 5% to 80% by weight of granules based on the total weight of the briquette. In some embodiments, each briquette comprises 5% to 75% by weight of granules based on the total weight of the briquette. In some embodiments, each briquette comprises 5% to 70% by weight of granules based on the total weight of the briquette. In some embodiments, each briquette comprises 5% to 65% by weight of granules based on the total weight of the briquette. In some embodiments, each briquette comprises 5% to 60% by weight of granules based on the total weight of the briquette.

In some embodiments, each briquette comprises 5% to 55% by weight of granules based on the total weight of the briquette. In some embodiments, each briquette comprises 5% to 50% by weight of granules based on the total weight of the briquette. In some embodiments, each briquette comprises 5% to 45% by weight of granules based on the total weight of the briquette. In some embodiments, each briquette comprises 5% to 40% by weight of granules based on the total weight of the briquette. In some embodiments, each briquette comprises 5% to 35% by weight of granules based on the total weight of the briquette. In some embodiments, each briquette comprises 5% to 30% by weight of granules based on the total weight of the briquette. In some embodiments, each briquette comprises 5% to 25% by weight of granules based on the total weight of the briquette. In some embodiments, each briquette comprises 5% to 20% by weight of granules based on the total weight of the briquette. In some embodiments, each briquette comprises 5% to 15% by weight of granules based on the total weight of the briquette. In some embodiments, each briquette comprises 5% to 10% by weight of granules based on the total weight of the briquette.

In some embodiments, each briquette comprises 10% to 90% by weight of granules based on the total weight of the briquette. In some embodiments, each briquette comprises 15% to 90% by weight of granules based on the total weight of the briquette. In some embodiments, each briquette comprises 20% to 90% by weight of granules based on the total weight of the briquette. In some embodiments, each briquette comprises 25% to 90% by weight of granules based on the total weight of the briquette. In some embodiments, each briquette comprises 30% to 90% by weight of granules based on the total weight of the briquette. In some embodiments, each briquette comprises 35% to 90% by weight of granules based on the total weight of the briquette. In some embodiments, each briquette comprises 40% to 90% by weight of granules based on the total weight of the briquette. In some embodiments, each briquette comprises 45% to 90% by weight of granules based on the total weight of the briquette. In some embodiments, each briquette comprises 50% to 90% by weight of granules based on the total weight of the briquette. In some embodiments, each briquette comprises 55% to 90% by weight of granules based on the total weight of the briquette. In some embodiments, each briquette comprises 60% to 90% by weight of granules based on the total weight of the briquette. In some embodiments, each briquette comprises 65% to 90% by weight of granules based on the total weight of the briquette. In some embodiments, each briquette comprises 70% to 90% by weight of granules based on the total weight of the briquette. In some embodiments, each briquette comprises 75% to 90% by weight of granules based on the total weight of the briquette. In some embodiments, each briquette comprises 80% to 90% by weight of granules based on the total weight of the briquette. In some embodiments, each briquette comprises 85% to 90% by weight of granules based on the total weight of the briquette.

In some embodiments, each briquette comprises 5% to 90% by weight of impurities based on a total weight of the briquette. In some embodiments, each briquette comprises 5% to 85% by weight of impurities based on the total weight of the briquette. In some embodiments, each briquette comprises 5% to 80% by weight of impurities based on the total weight of the briquette. In some embodiments, each briquette comprises 5% to 75% by weight of impurities based on the total weight of the briquette. In some embodiments, each briquette comprises 5% to 70% by weight of impurities based on the total weight of the briquette. In some embodiments, each briquette comprises 5% to 65% by weight of impurities based on the total weight of the briquette. In some embodiments, each briquette comprises 5% to 60% by weight of impurities based on the total weight of the briquette. In some embodiments, each briquette comprises 5% to 55% by weight of impurities based on the total weight of the briquette. In some embodiments, each briquette comprises 5% to 50% by weight of impurities based on the total weight of the briquette. In some embodiments, each briquette comprises 5% to 45% by weight of impurities based on the total weight of the briquette. In some embodiments, each briquette comprises 5% to 40% by weight of impurities based on the total weight of the briquette. In some embodiments, each briquette comprises 5% to 35% by weight of impurities based on the total weight of the briquette. In some embodiments, each briquette comprises 5% to 30% by weight of impurities based on the total weight of the briquette. In some embodiments, each briquette comprises 5% to 25% by weight of impurities based on the total weight of the briquette. In some embodiments, each briquette comprises 5% to 20% by weight of impurities based on the total weight of the briquette. In some embodiments, each briquette comprises 5% to 15% by weight of impurities based on the total weight of the briquette. In some embodiments, each briquette comprises 5% to 10% by weight of impurities based on the total weight of the briquette.

In some embodiments, each briquette comprises 10% to 90% by weight of impurities based on the total weight of the briquette. In some embodiments, each briquette comprises 15% to 90% by weight of impurities based on the total weight of the briquette. In some embodiments, each briquette comprises 20% to 90% by weight of impurities based on the total weight of the briquette. In some embodiments, each briquette comprises 25% to 90% by weight of impurities based on the total weight of the briquette. In some embodiments, each briquette comprises 30% to 90% by weight of impurities based on the total weight of the briquette. In some embodiments, each briquette comprises 35% to 90% by weight of impurities based on the total weight of the briquette. In some embodiments, each briquette comprises 40% to 90% by weight of impurities based on the total weight of the briquette. In some embodiments, each briquette comprises 45% to 90% by weight of impurities based on the total weight of the briquette. In some embodiments, each briquette comprises 50% to 90% by weight of impurities based on the total weight of the briquette. In some embodiments, each briquette comprises 55% to 90% by weight of impurities based on the total weight of the briquette. In some embodiments, each briquette comprises 60% to 90% by weight of impurities based on the total weight of the briquette. In some embodiments, each briquette comprises 65% to 90% by weight of impurities based on the total weight of the briquette. In some embodiments, each briquette comprises 70% to 90% by weight of impurities based on the total weight of the briquette. In some embodiments, each briquette comprises 75% to 90% by weight of impurities based on the total weight of the briquette. In some embodiments, each briquette comprises 80% to 90% by weight of impurities based on the total weight of the briquette. In some embodiments, each briquette comprises 85% to 90% by weight of impurities based on the total weight of the briquette.

In some embodiments, each briquette comprises 1% to 20% by weight of a binding agent based on the total weight of the briquette. In some embodiments, each briquette comprises 1% to 18% by weight of a binding agent based on the total weight of the briquette. In some embodiments, each briquette comprises 1% to 16% by weight of a binding agent based on the total weight of the briquette. In some embodiments, each briquette comprises 1% to 14% by weight of a binding agent based on the total weight of the briquette. In some embodiments, each briquette comprises 1% to 12% by weight of a binding agent based on the total weight of the briquette. In some embodiments, each briquette comprises 1% to 10% by weight of a binding agent based on the total weight of the briquette. In some embodiments, each briquette comprises 1% to 8% by weight of a binding agent based on the total weight of the briquette. In some embodiments, each briquette comprises 1% to 6% by weight of a binding agent based on the total weight of the briquette. In some embodiments, each briquette comprises 1% to 4% by weight of a binding agent based on the total weight of the briquette. In some embodiments, each briquette comprises 1% to 2% by weight of a binding agent based on the total weight of the briquette.

In some embodiments, each briquette comprises 2% to 20% by weight of a binding agent based on the total weight of the briquette. In some embodiments, each briquette comprises 4% to 20% by weight of a binding agent based on the total weight of the briquette. In some embodiments, each briquette comprises 6% to 20% by weight of a binding agent based on the total weight of the briquette. In some embodiments, each briquette comprises 8% to 20% by weight of a binding agent based on the total weight of the briquette. In some embodiments, each briquette comprises 10% to 20% by weight of a binding agent based on the total weight of the briquette. In some embodiments, each briquette comprises 12% to 20% by weight of a binding agent based on the total weight of the briquette. In some embodiments, each briquette comprises 14% to 20% by weight of a binding agent based on the total weight of the briquette. In some embodiments, each briquette comprises 16% to 20% by weight of a binding agent based on the total weight of the briquette. In some embodiments, each briquette comprises 18% to 20% by weight of a binding agent based on the total weight of the briquette.

Figure 2:
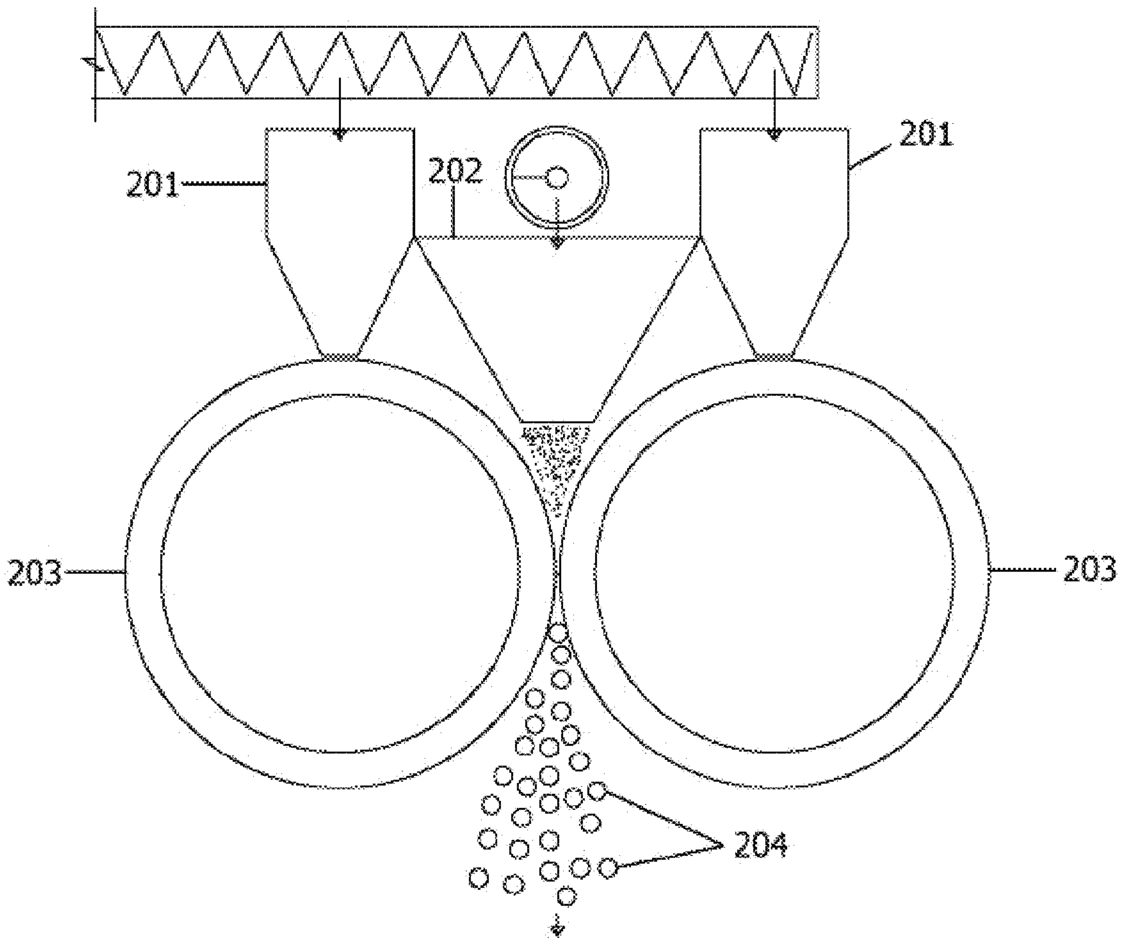
FIG. 2 is a non-limiting example of a briquetting process, according to some embodiments.

FIG. 2 is a non-limiting example of a briquetting method according to the present disclosure. As shown, in some embodiments, limestone powder, other filler, or combination thereof 201 coats compression wheels 203. The ASW powder, AC powder, or combination thereof 202 is fed between the coated compression wheels 203. The compression wheels 203 apply a sufficient pressure to: the limestone powder, other filler, or combination thereof 201; and the ASW powder, AC powder, or combination thereof 202, so as to form a plurality of briquettes 204.

Exemplary Methods of forming Asphalt Shingle Waste (ASW) Powder filled coatings Some embodiments of the present disclosure relate to methods of forming asphalt shingle waste powder filled coatings from asphalt shingle waste. In some embodiments, any steps of forming asphalt shingle waste powder described herein, any steps of forming briquettes described herein, or any combination thereof, may be combined with any of the methods of forming asphalt shingle waste powder filled coatings described herein. In some embodiments, the method is a continuous process.

In some embodiments, the method is a batch process. In some embodiments, the method is a semi-continuous process. In some embodiments, the method is a semi-batch process.

In some embodiments of the present disclosure, asphalt shingle waste (ASW) is obtained. In some embodiments, the ASW comprises asphalt, limestone powder, granules, and impurities. In some embodiments, the ASW consists essentially of asphalt, limestone powder, granules, and impurities. In some embodiments, the ASW consists of asphalt, limestone powder, granules, and impurities.

In some embodiments, the impurities comprise at least one of: fiberglass mat sand, fines, marker paint, sealant, one or more adhesives, tape, plastic debris, paper debris, soil, woods, nails, or any combination thereof.

In some embodiments, sufficient dry grinding and screening steps (including but not limited to any dry grinding and screening steps defined herein, supra) are performed on the ASW to result in ASW powder having an average particle size of 2 microns to 425 microns. In some embodiments, sufficient dry grinding and screening steps are performed on the ASW to result in ASW powder having an average particle size of 2 microns to 325 microns. In some embodiments, sufficient dry grinding and screening steps are performed on the ASW to result in ASW powder having an average particle size of 2 microns to 225 microns. In some embodiments, sufficient dry grinding and screening steps are performed on the ASW to result in ASW powder having an average particle size of 2 microns to 125 microns. In some embodiments, sufficient dry grinding and screening steps are performed on the ASW to result in ASW powder having an average particle size of 2 microns to 100 microns. In some embodiments, sufficient dry grinding and screening steps are performed on the ASW to result in ASW powder having an average particle size of 2 microns to 75 microns. In some embodiments, sufficient dry grinding and screening steps are performed on the ASW to result in ASW powder having an average particle size of 2 microns to 50 microns. In some embodiments, sufficient dry grinding and screening steps are performed on the ASW to result in ASW powder having an average particle size of 2 microns to 25 microns. In some embodiments, sufficient dry grinding and screening steps are performed on the ASW to result in ASW powder having an average particle size of 2 microns to 20 microns. In some embodiments, sufficient dry grinding and screening steps are performed on the ASW to result in ASW powder having an average particle size of 2 microns to 15 microns. In some embodiments, sufficient dry grinding and screening steps are performed on the ASW to result in ASW powder having an average particle size of 2 microns to 10 microns. In some embodiments, sufficient dry grinding and screening steps are performed on the ASW to result in ASW powder having an average particle size of 2 microns to 5 microns.

In some embodiments, sufficient dry grinding and screening steps are performed on the ASW to result in ASW powder having an average particle size of 5 microns to 425 microns. In some embodiments, sufficient dry grinding and screening steps are performed on the ASW to result in ASW powder having an average particle size of 10 microns to 425 microns. In some embodiments, sufficient dry grinding and screening steps are performed on the ASW to result in ASW powder having an average particle size of 15 microns to 425 microns. In some embodiments, sufficient dry grinding and screening steps are performed on the ASW to result in ASW powder having an average particle size of 20 microns to 425 microns. In some embodiments, sufficient dry grinding and screening steps are performed on the ASW to result in ASW powder having an average particle size of 25 microns to 425 microns. In some embodiments, sufficient dry grinding and screening steps are performed on the ASW to result in ASW powder having an average particle size of 50 microns to 425 microns. In some embodiments, sufficient dry grinding and screening steps are performed on the ASW to result in ASW powder having an average particle size of 75 microns to 425 microns. In some embodiments, sufficient dry grinding and screening steps are performed on the ASW to result in ASW powder having an average particle size of 100 microns to 425 microns. In some embodiments, sufficient dry grinding and screening steps are performed on the ASW to result in ASW powder having an average particle size of 125 microns to 425 microns. In some embodiments, sufficient dry grinding and screening steps are performed on the ASW to result in ASW powder having an average particle size of 225 microns to 425 microns. In some embodiments, sufficient dry grinding and screening steps are performed on the ASW to result in ASW powder having an average particle size of 325 microns to 425 microns.

In some embodiments, sufficient dry grinding and screening steps are performed on the ASW to result in ASW powder having an average particle size of 5 microns to 325 microns. In some embodiments, sufficient dry grinding and screening steps are performed on the ASW to result in ASW powder having an average particle size of 10 microns to 225 microns. In some embodiments, sufficient dry grinding and screening steps are performed on the ASW to result in ASW powder having an average particle size of 25 microns to 125 microns. In some embodiments, sufficient dry grinding and screening steps are performed on the ASW to result in ASW powder having an average particle size of 50 microns to 100 microns.

In some embodiments, sufficient dry grinding and screening steps are performed on the ASW to result in ASW powder having an average particle size of 10 microns to 250 microns. In some embodiments, sufficient dry grinding and screening steps are performed on the ASW to result in ASW powder having an average particle size of 10 microns to 200 microns. In some embodiments, sufficient dry grinding and screening steps are performed on the ASW to result in ASW powder having an average particle size of 10 microns to 150 microns. In some embodiments, sufficient dry grinding and screening steps are performed on the ASW to result in ASW powder having an average particle size of 10 microns to 100 microns. In some embodiments, sufficient dry grinding and screening steps are performed on the ASW to result in ASW powder having an average particle size of 10 microns to 75 microns. In some embodiments, sufficient dry grinding and screening steps are performed on the ASW to result in ASW powder having an average particle size of 10 microns to 50 microns. In some embodiments, sufficient dry grinding and screening steps are performed on the ASW to result in ASW powder having an average particle size of 10 microns to 25 microns. In some embodiments, sufficient dry grinding and screening steps are performed on the ASW to result in ASW powder having an average particle size of 10 microns to 20 microns. In some embodiments, sufficient dry grinding and screening steps are performed on the ASW to result in ASW powder having an average particle size of 10 microns to 15 microns.

In some embodiments, sufficient dry grinding and screening steps are performed on the ASW to result in ASW powder having an average particle size of 15 microns to 250 microns. In some embodiments, sufficient dry grinding and screening steps are performed on the ASW to result in ASW powder having an average particle size of 20 microns to 250 microns. In some embodiments, sufficient dry grinding and screening steps are performed on the ASW to result in ASW powder having an average particle size of 25 microns to 250 microns. In some embodiments, sufficient dry grinding and screening steps are performed on the ASW to result in ASW powder having an average particle size of 50 microns to 250 microns. In some embodiments, sufficient dry grinding and screening steps are performed on the ASW to result in ASW powder having an average particle size of 75 microns to 250 microns. In some embodiments, sufficient dry grinding and screening steps are performed on the ASW to result in ASW powder having an average particle size of 100 microns to 250 microns. In some embodiments, sufficient dry grinding and screening steps are performed on the ASW to result in ASW powder having an average particle size of 150 microns to 250 microns. In some embodiments, sufficient dry grinding and screening steps are performed on the ASW to result in ASW powder having an average particle size of 200 microns to 250 microns.

In some embodiments, sufficient dry grinding and screening steps are performed on the ASW to result in ASW powder having an average particle size of 20 microns to 200 microns. In some embodiments, sufficient dry grinding and screening steps are performed on the ASW to result in ASW powder having an average particle size of 40 microns to 100 microns. In some embodiments, sufficient dry grinding and screening steps are performed on the ASW to result in ASW powder having an average particle size of 80 microns to 90 microns.

In some embodiments, sufficient dry grinding and screening steps are performed on the ASW to result in ASW powder having 5 wt % to 40 wt % asphalt based on a total weight of the powder. In some embodiments, sufficient dry grinding and screening steps are performed on the ASW to result in ASW powder having 10 wt % to 40 wt % asphalt based on a total weight of the powder. In some embodiments, sufficient dry grinding and screening steps are performed on the ASW to result in ASW powder having 15 wt % to 40 wt % asphalt based on a total weight of the powder. In some embodiments, sufficient dry grinding and screening steps are performed on the ASW to result in ASW powder having 20 wt % to 40 wt % asphalt based on a total weight of the ASW powder. In some embodiments, sufficient dry grinding and screening steps are performed on the ASW to result in ASW powder having 25 wt % to 40 wt % asphalt based on a total weight of the ASW powder. In some embodiments, sufficient dry grinding and screening steps are performed on the ASW to result in ASW powder having 30 wt % to 40 wt % asphalt based on a total weight of the ASW powder. In some embodiments, sufficient dry grinding and screening steps are performed on the ASW to result in ASW powder having 35 wt % to 40 wt % asphalt based on a total weight of the ASW powder.

In some embodiments, sufficient dry grinding and screening steps are performed on the ASW to result in ASW powder having 5 wt % to 35 wt % asphalt based on a total weight of the ASW powder. In some embodiments, sufficient dry grinding and screening steps are performed on the ASW to result in ASW powder having 5 wt % to 30 wt % asphalt based on a total weight of the ASW powder. In some embodiments, sufficient dry grinding and screening steps are performed on the ASW to result in ASW powder having 5 wt % to 25 wt % asphalt based on a total weight of the ASW powder. In some embodiments, sufficient dry grinding and screening steps are performed on the ASW to result in ASW powder having 5 wt % to 20 wt % asphalt based on a total weight of the ASW powder. In some embodiments, sufficient dry grinding and screening steps are performed on the ASW to result in ASW powder having 5 wt % to 15 wt % asphalt based on a total weight of the ASW powder. In some embodiments, sufficient dry grinding and screening steps are performed on the ASW to result in ASW powder having 5 wt % to 10 wt % asphalt based on a total weight of the ASW powder.

In some embodiments, sufficient dry grinding and screening steps are performed on the ASW to result in ASW powder having 10 wt % to 35 wt % asphalt based on a total weight of the powder. In some embodiments, sufficient dry grinding and screening steps are performed on the ASW to result in ASW powder having 15 wt % to 30 wt % asphalt based on a total weight of the powder. In some embodiments, sufficient dry grinding and screening steps are performed on the ASW to result in ASW powder having 20 wt % to 25 wt % asphalt based on a total weight of the powder.

In some embodiments, sufficient dry grinding and screening steps are performed on the ASW to result in ASW powder having 60 wt % to 95 wt % limestone powder, granules, and impurities based on the total weight of the ASW powder. In some embodiments, sufficient dry grinding and screening steps are performed on the ASW to result in ASW powder having 65 wt % to 95 wt % limestone powder, granules, and impurities based on the total weight of the ASW powder. In some embodiments, sufficient dry grinding and screening steps are performed on the ASW to result in ASW powder having 70 wt % to 95 wt % limestone powder, granules, and impurities based on the total weight of the ASW powder. In some embodiments, sufficient dry grinding and screening steps are performed on the ASW to result in ASW powder having 75 wt % to 95 wt % limestone powder, granules, and impurities based on the total weight of the ASW powder. In some embodiments, sufficient dry grinding and screening steps are performed on the ASW to result in ASW powder having 80 wt % to 95 wt % limestone powder, granules, and impurities based on the total weight of the ASW powder. In some embodiments, sufficient dry grinding and screening steps are performed on the ASW to result in ASW powder having 85 wt % to 95 wt % limestone powder, granules, and impurities based on the total weight of the ASW powder. In some embodiments, sufficient dry grinding and screening steps are performed on the ASW to result in ASW powder having 90 wt % to 95 wt % limestone powder, granules, and impurities based on the total weight of the ASW powder.

In some embodiments, sufficient dry grinding and screening steps are performed on the ASW to result in ASW powder having 60 wt % to 90 wt % limestone powder, granules, and impurities based on the total weight of the ASW powder. In some embodiments, sufficient dry grinding and screening steps are performed on the ASW to result in ASW powder having 60 wt % to 85 wt % limestone powder, granules, and impurities based on the total weight of the ASW powder. In some embodiments, sufficient dry grinding and screening steps are performed on the ASW to result in ASW powder having 60 wt % to 80 wt % limestone powder, granules, and impurities based on the total weight of the ASW powder. In some embodiments, sufficient dry grinding and screening steps are performed on the ASW to result in ASW powder having 60 wt % to 75 wt % limestone powder, granules, and impurities based on the total weight of the ASW powder. In some embodiments, sufficient dry grinding and screening steps are performed on the ASW to result in ASW powder having 60 wt % to 70 wt % limestone powder, granules, and impurities based on the total weight of the ASW powder. In some embodiments, sufficient dry grinding and screening steps are performed on the ASW to result in ASW powder having 60 wt % to 65 wt % limestone powder, granules, and impurities based on the total weight of the ASW powder.

In some embodiments, sufficient dry grinding and screening steps are performed on the ASW to result in ASW powder having 65 wt % to 90 wt % limestone powder, granules, and impurities based on the total weight of the ASW powder. In some embodiments, sufficient dry grinding and screening steps are performed on the ASW to result in ASW powder having 70 wt % to 85 wt % limestone powder, granules, and impurities based on the total weight of the ASW powder. In some embodiments, sufficient dry grinding and screening steps are performed on the ASW to result in ASW powder having 75 wt % to 80 wt % limestone powder, granules, and impurities based on the total weight of the ASW powder.

In some embodiments, the grinding steps and screening steps do not comprise wet extraction steps.

In some embodiments, a sufficient amount of the ASW powder and a sufficient amount of an asphalt coating are added to at least one first mixer to form a mixture of the ASW powder and the asphalt coating that comprises 0.1 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 1 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 2 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 10 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 20 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 30 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 40 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 60 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 70 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 80 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 90 wt % to 95 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 0.1 wt % to 90 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 80 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 70 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 60 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 40 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 30 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 20 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 10 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 5 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 2 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 1 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 1 wt % to 40 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 2 wt % to 30 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 20 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 10 wt % to 15 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 90 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 60 wt % to 80 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 65 wt % to 75 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 70 wt % to 99 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 75 wt % to 95 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 80 wt % to 90 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 5 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 10 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 20 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 30 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 40 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 60 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 70 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 80 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 90 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 95 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 99 wt % to 99.9 wt % of the asphalt coating based on a total weight of the mixture.

In some embodiments, a sufficient amount of the ASW powder and a sufficient amount of an asphalt coating are added to at least one first mixer to form a mixture of the ASW powder and the asphalt coating that comprises 5 wt % to 99 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 95 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 90 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 80 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 70 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 60 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 50 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 40 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 30 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 20 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 10 wt % of the asphalt coating based on a total weight of the mixture.

In some embodiments, a sufficient amount of the ASW powder and a sufficient amount of an asphalt coating are added to at least one first mixer to form a mixture of the ASW powder and the asphalt coating that comprises 60 wt % to 99 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 70 wt % to 95 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 80 wt % to 90 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 10 wt % to 50 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 20 wt % to 40 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 25 wt % to 35 wt % of the asphalt coating based on a total weight of the mixture.

In some embodiments, a sufficient amount of the ASW powder and a sufficient amount of an asphalt coating are added to at least one first mixer to form a mixture of the ASW powder and the asphalt coating that comprises 1 wt % to 30 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 25 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 10 wt % to 20 wt % of the asphalt coating based on a total weight of the mixture.

In some embodiments, the mixture of the ASW powder and the asphalt coating is not subjected to grinding or screening steps. In some embodiments, the mixture of the ASW powder and the asphalt coating is not subjected to grinding steps. In some embodiments, the mixture of the ASW powder and the asphalt coating is not subjected to screening steps.

In some embodiments, asphalt containing (AC) powder is obtained. In some embodiments, the AC powder comprises ASW powder. In some embodiments the AC powder does not comprise ASW powder. In some embodiments, the AC powder comprises a mixture of ASW powder and non-ASW powder. In some embodiments, the AC powder is formed into briquettes as described herein. In some embodiments, the AC powder is obtained as a pre-formed briquette.

In some embodiments, a sufficient amount of the AC powder and a sufficient amount of an asphalt coating are added to at least one first mixer to form a mixture of the AC powder and the asphalt coating that comprises 0.1 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 1 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 2 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 5 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 10 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 20 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 30 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 40 wt % to 50 wt % of AC powder based on a total weight of the mixture.

In some embodiments, a sufficient amount of the AC powder and a sufficient amount of an asphalt coating are added to at least one first mixer to form a mixture of the AC powder and the asphalt coating that comprises 0.1 wt % to 40 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 30 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 20 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 10 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 5 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 2 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 1 wt % of AC powder based on a total weight of the mixture.

In some embodiments, a sufficient amount of the AC powder and a sufficient amount of an asphalt coating are added to at least one first mixer to form a mixture of the AC powder and the asphalt coating that comprises 1 wt % to 40 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 2 wt % to 30 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 5 wt % to 20 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 10 wt % to 15 wt % of AC powder based on a total weight of the mixture.

In some embodiments, a sufficient amount of the AC powder and a sufficient amount of an asphalt coating are added to at least one first mixer to form a mixture of the AC powder and the asphalt coating that comprises 50 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 60 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 70 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 80 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 90 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 95 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 99 wt % to 99.9 wt % of the asphalt coating based on a total weight of the mixture.

In some embodiments, a sufficient amount of the AC powder and a sufficient amount of an asphalt coating are added to at least one first mixer to form a mixture of the AC powder and the asphalt coating that comprises 50 wt % to 99 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 95 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 90 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 80 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 70 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 60 wt % of the asphalt coating based on a total weight of the mixture.

In some embodiments, a sufficient amount of the AC powder and a sufficient amount of an asphalt coating are added to at least one first mixer to form a mixture of the AC powder and the asphalt coating that comprises 60 wt % to 99 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 70 wt % to 95 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 80 wt % to 90 wt % of the asphalt coating based on a total weight of the mixture.

Non-limiting examples of mixers that can be used as the at least first one mixer include, but are not limited to, vertically or horizontally agitated tanks, high or low shear tubular mixers, horizontal paddle mixers, screw transport mixers, continuous high shear mixers, progressive cavity mixing pumps or any combination thereof.

In some embodiments, the at least one first mixer comprises a plurality of first mixers. In some embodiments, the at least one first mixer comprises at least two first mixers. In some embodiments, the at least one first mixer comprises at least three first mixers. In some embodiments, the at least one first mixer comprises at least four first mixers. In some embodiments, the at least one first mixer comprises at least five first mixers. In some embodiments, the at least one first mixer comprises at least ten first mixers. In some embodiments, the at least one first mixer comprises at least twenty first mixers. In some embodiments, the at least one first mixer comprises at least fifty first mixers. In some embodiments, the at least one first mixer comprises at least one-hundred first mixers.

In some embodiments, the at least one first mixer consists of a single mixer. In some embodiments, the at least one first mixer consists of two first mixers. In some embodiments, the at least one first mixer consists of three first mixers. In some embodiments, the at least one first mixer consists of four first mixers. In some embodiments, the at least one first mixer consists of five first mixers. In some embodiments, the at least one first mixer consists of ten first mixers. In some embodiments, the at least one first mixer consists of twenty first mixers. In some embodiments, the at least one first mixer consists of fifty first mixers. In some embodiments, the at least one first mixer consists of one-hundred first mixers.

In some embodiments, the asphalt coating comprises at least one of: oxidized asphalt coating, polymer modified asphalt coating, or mixtures thereof.

In some embodiments, the oxidized asphalt coating is obtained using an asphalt oxidation process. Non-limiting examples of suitable asphalt oxidation processes are described herein, infra. In some embodiments, the oxidized asphalt coating is fed directly from an oxidation process into the at least one first mixer. In some embodiments, the oxidized asphalt coating is oxidized "off-site" and fed from a storage tank into the at least one first mixer.

In some embodiments, the oxidized asphalt coating has a softening point of 190° F. to 250° F. In some embodiments, the oxidized asphalt coating has a softening point of 200° F. to 250° F. In some embodiments, the oxidized asphalt coating has a softening point of 210° F. to 250° F. In some embodiments, the oxidized asphalt coating has a softening point of 220° F. to 250° F. In some embodiments, the oxidized asphalt coating has a softening point of 230° F. to 250° F. In some embodiments, the oxidized asphalt coating has a softening point of 240° F. to 250° F.

In some embodiments, the oxidized asphalt coating has a softening point of 190° F. to 240° F. In some embodiments, the oxidized asphalt coating has a softening point of 190° F. to 230° F. In some embodiments, the oxidized asphalt coating has a softening point of 190° F. to 220° F. In some embodiments, the oxidized asphalt coating has a softening point of 190° F. to 210° F. In some embodiments, the oxidized asphalt coating has a softening point of 190° F. to 200° F.

In some embodiments, the oxidized asphalt coating has a softening point of 200° F. to 240° F. In some embodiments, the oxidized asphalt coating has a softening point of 210° F. to 230° F.

In some embodiments, the oxidized asphalt coating has a penetration point of 15 mm to 45 mm. In some embodiments, the oxidized asphalt coating has a penetration point of 20 mm to 45 mm. In some embodiments, the oxidized asphalt coating has a penetration point of 25 mm to 45 mm. In some embodiments, the oxidized asphalt coating has a penetration point of 30 mm to 45 mm. In some embodiments, the oxidized asphalt coating has a penetration point of 35 mm to 45 mm. In some embodiments, the oxidized asphalt coating has a penetration point of 40 mm to 45 mm.

In some embodiments, the oxidized asphalt coating has a penetration point of 15 mm to 40 mm. In some embodiments, the oxidized asphalt coating has a penetration point of 15 mm to 35 mm. In some embodiments, the oxidized asphalt coating has a penetration point of 15 mm to 30 mm. In some embodiments, the oxidized asphalt coating has a penetration point of 15 mm to 25 mm. In some embodiments, the oxidized asphalt coating has a penetration point of 15 mm to 20 mm.

In some embodiments, the oxidized asphalt coating has a penetration point of 20 mm to 40 mm. In some embodiments, the oxidized asphalt coating has a penetration point of 25 mm to 35 mm.

In some embodiments, the oxidized asphalt coating has a viscosity of 200 cP to 1,000 cP. In some embodiments, the oxidized asphalt coating has a viscosity of 300 cP to 1,000 cP. In some embodiments, the oxidized asphalt coating has a viscosity of 400 cP to 1,000 cP. In some embodiments, the oxidized asphalt coating has a viscosity of 500 cP to 1,000 cP. In some embodiments, the oxidized asphalt coating has a viscosity of 600 cP to 1,000 cP. In some embodiments, the oxidized asphalt coating has a viscosity of 700 cP to 1,000 cP. In some embodiments, the oxidized asphalt coating has a viscosity of 800 cP to 1,000 cP. In some embodiments, the oxidized asphalt coating has a viscosity of 900 cP to 1,000 cP.

In some embodiments, the oxidized asphalt coating has a viscosity of 200 cP to 1,000 cP. In some embodiments, the oxidized asphalt coating has a viscosity of 200 cP to 900 cP. In some embodiments, the oxidized asphalt coating has a viscosity of 200 cP to 800 cP. In some embodiments, the oxidized asphalt coating has a viscosity of 200 cP to 700 cP. In some embodiments, the oxidized asphalt coating has a viscosity of 200 cP to 600 cP. In some embodiments, the oxidized asphalt coating has a viscosity of 200 cP to 500 cP. In some embodiments, the oxidized asphalt coating has a viscosity of 200 cP to 400 cP. In some embodiments, the oxidized asphalt coating has a viscosity of 200 cP to 300 cP.

In some embodiments, the oxidized asphalt coating has a viscosity of 300 cP to 900 cP. In some embodiments, the oxidized asphalt coating has a viscosity of 400 cP to 800 cP. In some embodiments, the oxidized asphalt coating has a viscosity of 500 cP to 700 cP.

In some embodiments, the polymer modified asphalt coating is a poly(styrene-butadiene-styrene) (SBS) modified asphalt coating, a poly(styrene-ethylene/butylene-styrene) (SEBS) modified asphalt coating, an atactic polypropylene (APP) modified asphalt coating, an isotactic polypropylene (IPP) modified asphalt coating, or any mixture thereof.

In some embodiments, the polymer in the polymer modified asphalt comprises one or more of ethylene-vinyl acetate copolymers, polybutadienes, ethylene-propylene copolymers, ethylene-propylene-diene terpolymers, reactive ethylene terpolymers (e.g., ELVALOY™), butadiene-styrene block copolymers, styrene-butadiene-styrene (SBS) block copolymers, isoprene-styrene block copolymers and styrene-isoprene-styrene (SIS) block copolymers, styrene butadiene rubber (SBR) lattices, reactive ethylene terpolymers (RET), acrylic lattices, neoprene lattices, ethylene vinyl acetate (EVA), polybutene, cationic SBR (styrene-butadiene rubber) lattices, natural rubber lattices, and polychloroprene lattices, n-butyl acrylate (nBA), and/or chloroprene polymers (e.g., neoprenes). In some embodiments, the polymer may include one or more cured elastomer additives. In some embodiments, the elastomer additives may include ground tire rubber materials.

In some embodiments, the polymer modified asphalt coating comprises 3 wt % to 12 wt % of at least one polymer by weight of the polymer modified asphalt coating. In some embodiments, the polymer modified asphalt coating comprises 4 wt % to 12 wt % of at least one polymer by weight of the polymer modified asphalt coating. In some embodiments, the polymer modified asphalt coating comprises 5 wt % to 12 wt % of at least one polymer by weight of the polymer modified asphalt coating. In some embodiments, the polymer modified asphalt coating comprises 6 wt % to 12 wt % of at least one polymer by weight of the polymer modified asphalt coating. In some embodiments, the polymer modified asphalt coating comprises 7 wt % to 12 wt % of at least one polymer by weight of the polymer modified asphalt coating. In some embodiments, the polymer modified asphalt coating comprises 8 wt % to 12 wt % of at least one polymer by weight of the polymer modified asphalt coating. In some embodiments, the polymer modified asphalt coating comprises 9 wt % to 12 wt % of at least one polymer by weight of the polymer modified asphalt coating. In some embodiments, the polymer modified asphalt coating comprises 10 wt % to 12 wt % of at least one polymer by weight of the polymer modified asphalt coating. In some embodiments, the polymer modified asphalt coating comprises 11 wt % to 12 wt % of at least one polymer by weight of the polymer modified asphalt coating.

In some embodiments, the polymer modified asphalt coating comprises 3 wt % to 11 wt % of at least one polymer by weight of the polymer modified asphalt coating. In some embodiments, the polymer modified asphalt coating comprises 3 wt % to 10 wt % of at least one polymer by weight of the polymer modified asphalt coating. In some embodiments, the polymer modified asphalt coating comprises 3 wt % to 9 wt % of at least one polymer by weight of the polymer modified asphalt coating. In some embodiments, the polymer modified asphalt coating comprises 3 wt % to 8 wt % of at least one polymer by weight of the polymer modified asphalt coating. In some embodiments, the polymer modified asphalt coating comprises 3 wt % to 7 wt % of at least one polymer by weight of the polymer modified asphalt coating. In some embodiments, the polymer modified asphalt coating comprises 3 wt % to 6 wt % of at least one polymer by weight of the polymer modified asphalt coating. In some embodiments, the polymer modified asphalt coating comprises 3 wt % to 5 wt % of at least one polymer by weight of the polymer modified asphalt coating. In some embodiments, the polymer modified asphalt coating comprises 3 wt % to 4 wt % of at least one polymer by weight of the polymer modified asphalt coating.

In some embodiments, the polymer modified asphalt coating comprises 4 wt % to 11 wt % of at least one polymer by weight of the polymer modified asphalt coating. In some embodiments, the polymer modified asphalt coating comprises 5 wt % to 10 wt % of at least one polymer by weight of the polymer modified asphalt coating. In some embodiments, the polymer modified asphalt coating comprises 6 wt % to 9 wt % of at least one polymer by weight of the polymer modified asphalt coating. In some embodiments, the polymer modified asphalt coating comprises 7 wt % to 8 wt % of at least one polymer by weight of the polymer modified asphalt coating.

In some embodiments, the polymer modified asphalt coating has a softening point of 190° F. to 250° F. In some embodiments, the polymer modified asphalt coating has a softening point of 200° F. to 250° F. In some embodiments, the polymer modified asphalt coating has a softening point of 210° F. to 250° F. In some embodiments, the polymer modified asphalt coating has a softening point of 220° F. to 250° F. In some embodiments, the polymer modified asphalt coating has a softening point of 230° F. to 250° F. In some embodiments, the polymer modified asphalt coating has a softening point of 240° F. to 250° F.

In some embodiments, the polymer modified asphalt coating has a softening point of 190° F. to 240° F. In some embodiments, the polymer modified asphalt coating has a softening point of 190° F. to 230° F. In some embodiments, the polymer modified asphalt coating has a softening point of 190° F. to 220° F. In some embodiments, the polymer modified asphalt coating has a softening point of 190° F. to 210° F. In some embodiments, the polymer modified asphalt coating has a softening point of 190° F. to 200° F.

In some embodiments, the polymer modified asphalt coating has a softening point of 200° F. to 240° F. In some embodiments, the polymer modified asphalt coating has a softening point of 210° F. to 230° F.

In some embodiments, the polymer modified asphalt coating has a penetration point of 15 mm to 45 mm. In some embodiments, the polymer modified asphalt coating has a penetration point of 20 mm to 45 mm. In some embodiments, the polymer modified asphalt coating has a penetration point of 25 mm to 45 mm. In some embodiments, the polymer modified asphalt coating has a penetration point of 30 mm to 45 mm. In some embodiments, the polymer modified asphalt coating has a penetration point of 35 mm to 45 mm. In some embodiments, the polymer modified asphalt coating has a penetration point of 40 mm to 45 mm.

In some embodiments, the polymer modified asphalt coating has a penetration point of 15 mm to 40 mm. In some embodiments, the polymer modified asphalt coating has a penetration point of 15 mm to 35 mm. In some embodiments, the polymer modified asphalt coating has a penetration point of 15 mm to 30 mm. In some embodiments, the polymer modified asphalt coating has a penetration point of 15 mm to 25 mm. In some embodiments, the polymer modified asphalt coating has a penetration point of 15 mm to 20 mm.

In some embodiments, the polymer modified asphalt coating has a penetration point of 20 mm to 40 mm. In some embodiments, the polymer modified asphalt coating has a penetration point of 25 mm to 35 mm.

In some embodiments, the polymer modified asphalt coating has a viscosity of 200 cP to 1,000 cP. In some embodiments, the polymer modified asphalt coating has a viscosity of 300 cP to 1,000 cP. In some embodiments, the polymer modified asphalt coating has a viscosity of 400 cP to 1,000 cP. In some embodiments, the polymer modified asphalt coating has a viscosity of 500 cP to 1,000 cP. In some embodiments, the polymer modified asphalt coating has a viscosity of 600 cP to 1,000 cP. In some embodiments, the polymer modified asphalt coating has a viscosity of 700 cP to 1,000 cP. In some embodiments, the polymer modified asphalt coating has a viscosity of 800 cP to 1,000 cP. In some embodiments, the polymer modified asphalt coating has a viscosity of 900 cP to 1,000 cP.

In some embodiments, the polymer modified asphalt coating has a viscosity of 200 cP to 1,000 cP. In some embodiments, the polymer modified asphalt coating has a viscosity of 200 cP to 900 cP. In some embodiments, the polymer modified asphalt coating has a viscosity of 200 cP to 800 cP. In some embodiments, the polymer modified asphalt coating has a viscosity of 200 cP to 700 cP. In some embodiments, the polymer modified asphalt coating has a viscosity of 200 cP to 600 cP. In some embodiments, the polymer modified asphalt coating has a viscosity of 200 cP to 500 cP. In some embodiments, the polymer modified asphalt coating has a viscosity of 200 cP to 400 cP. In some embodiments, the polymer modified asphalt coating has a viscosity of 200 cP to 300 cP.

In some embodiments, the polymer modified asphalt coating has a viscosity of 300 cP to 900 cP. In some embodiments, the polymer modified asphalt coating has a viscosity of 400 cP to 800 cP. In some embodiments, the polymer modified asphalt coating has a viscosity of 500 cP to 700 cP.

In some embodiments, the mixture of: the ASW powder, the AC powder, or any combination thereof; and the asphalt coating is heated to form a heated mixture. Non-limiting examples of heaters that can be used to form the heated mixture include heat exchangers, horizontal or vertical direct fired heaters, horizontal or vertical indirect-fired (convection) heaters, fire-tube heaters, fluid tube heaters or any combination thereof. Non-limiting examples of heat exchangers include shell and tube heat exchangers with asphalt on either the shell or tube side, plate heat exchangers, heat recovery heat exchangers or any combination thereof.

In some embodiments, the mixture of: the ASW powder, the AC powder, or any combination thereof and the asphalt coating is heated using at least one heater to form the heated mixture. In some embodiments, the mixture of: the ASW powder, the AC powder, or any combination thereof and the asphalt coating is heated using a plurality of heaters to form the heated mixture. In some embodiments, the mixture of: the ASW powder, the AC powder, or any combination thereof and the asphalt coating is heated using at least two heaters to form the heated mixture. In some embodiments, the mixture of: the ASW powder, the AC powder, or any combination thereof; and the asphalt coating is heated using at least three heaters to form the heated mixture. In some embodiments, the mixture of: the ASW powder, the AC powder, or any combination thereof; and the asphalt coating is heated using at least four heaters to form the heated mixture. In some embodiments, the mixture of: the ASW powder, the AC powder, or any combination thereof and the asphalt coating is heated using at least five heaters to form the heated mixture. In some embodiments, the mixture of: the ASW powder, the AC powder, or any combination thereof; and the asphalt coating is heated using at least ten heaters to form the heated mixture. In some embodiments, the mixture of: the ASW powder, the AC powder, or any combination thereof; and the asphalt coating is heated using at least twenty heaters to form the heated mixture. In some embodiments, the mixture of: the ASW powder, the AC powder, or any combination thereof; and the asphalt coating is heated in at least fifty heaters to form the heated mixture. In some embodiments, the mixture of: the ASW powder, the AC powder, or any combination thereof; and the asphalt coating is heated using at least one-hundred heaters to form the heated mixture. In some embodiments, the mixture of: the ASW powder, the AC powder, or any combination thereof; and the asphalt coating is heated using one heater to form the heated mixture. In some embodiments, the mixture of: the ASW powder, the AC powder, or any combination thereof; and the asphalt coating is heated using two heaters to form the heated mixture. In some embodiments, the mixture of: the ASW powder, the AC powder, or any combination thereof; and the asphalt coating is heated using three heaters to form the heated mixture. In some embodiments, the mixture of: the ASW powder, the AC powder, or any combination thereof; and the asphalt coating is heated using four heaters to form the heated mixture. In some embodiments, the mixture of: the ASW powder, the AC powder, or any combination thereof; and the asphalt coating is heated using five heaters to form the heated mixture. In some embodiments, the mixture of: the ASW powder, the AC powder, or any combination thereof; and the asphalt coating is heated using ten heaters to form the heated mixture. In some embodiments, the mixture of: the ASW powder, the AC powder, or any combination thereof; and the asphalt coating is heated using twenty heaters to form the heated mixture. In some embodiments, the mixture of: the ASW powder, the AC powder, or any combination thereof; and the asphalt coating is heated using fifty heaters to form the heated mixture. In some embodiments, the mixture of: the ASW powder, the AC powder, or any combination thereof; and the asphalt coating is heated using one-hundred heaters to form the heated mixture.

In some embodiments, the heated mixture has a temperature in a range of 400° F. to 500° F. In some embodiments, the heated mixture has a temperature in a range of 410° F. to 500° F. In some embodiments, the heated mixture has a temperature in a range of 410° F. to 500° F. In some embodiments, the heated mixture has a temperature in a range of 420° F. to 500° F. In some embodiments, the heated mixture has a temperature in a range of 430° F. to 500° F. In some embodiments, the heated mixture has a temperature in a range of 440° F. to 500° F. In some embodiments, the heated mixture has a temperature in a range of 450° F. to 500° F. In some embodiments, the heated mixture has a temperature in a range of 460° F. to 500° F. In some embodiments, the heated mixture has a temperature in a range of 470° F. to 500° F. In some embodiments, the heated mixture has a temperature in a range of 480° F. to 500° F. In some embodiments, the heated mixture has a temperature in a range of 490° F. to 500° F.

In some embodiments, the heated mixture has a temperature in a range of 400° F. to 490° F. In some embodiments, the heated mixture has a temperature in a range of 400° F. to 480° F. In some embodiments, the heated mixture has a temperature in a range of 400° F. to 470° F. In some embodiments, the heated mixture has a temperature in a range of 400° F. to 460° F. In some embodiments, the heated mixture has a temperature in a range of 400° F. to 450° F. In some embodiments, the heated mixture has a temperature in a range of 400° F. to 440° F. In some embodiments, the heated mixture has a temperature in a range of 400° F. to 430° F. In some embodiments, the heated mixture has a temperature in a range of 400° F. to 420° F. In some embodiments, the heated mixture has a temperature in a range of 400° F. to 410° F.

In some embodiments, the heated mixture has a temperature in a range of 410° F. to 490° F. In some embodiments, the heated mixture has a temperature in a range of 420° F. to 480° F. In some embodiments, the heated mixture has a temperature in a range of 430° F. to 470° F. In some embodiments, the heated mixture has a temperature in a range of 440° F. to 460° F.

In some embodiments, the mixture of: the ASW powder, the AC powder, or any combination thereof; and the asphalt coating is homogenized, using at least one homogenizer, before heating, after heating, or any combination thereof. In some embodiments, the mixture of: the ASW powder, the AC powder, or any combination thereof; and the asphalt coating is homogenized, using a plurality of homogenizers, before heating, after heating, or any combination thereof.

In some embodiments, the mixture of: the ASW powder, the AC powder, or any combination thereof; and the asphalt coating is homogenized, using at least two homogenizers, before heating, after heating, or any combination thereof. In some embodiments, the mixture of: the ASW powder, the AC powder, or any combination thereof; and the asphalt coating is homogenized, using at least three homogenizers, before heating, after heating, or any combination thereof. In some embodiments, the mixture of: the ASW powder, the AC powder, or any combination thereof; and the asphalt coating is homogenized, using at least four homogenizers, before heating, after heating, or any combination thereof. In some embodiments, the mixture of the mixture of: the ASW powder, the AC powder, or any combination thereof; and the asphalt coating is homogenized, using at least five homogenizers, before heating, after heating, or any combination thereof. In some embodiments, the mixture of: the ASW powder, the AC powder, or any combination thereof; and the asphalt coating is homogenized, using at least ten homogenizers, before heating, after heating, or any combination thereof. In some embodiments, the mixture of: the ASW powder, the AC powder, or any combination thereof; and the asphalt coating is homogenized, using at least twenty homogenizers, before heating, after heating, or any combination thereof. In some embodiments, the mixture of: the ASW powder, the AC powder, or any combination thereof; and the asphalt coating is homogenized, using at least fifty homogenizers, before heating, after heating, or any combination thereof. In some embodiments, the mixture of: the ASW powder, the AC powder, or any combination thereof; and the asphalt coating is homogenized, using at least one-hundred homogenizers, before heating, after heating, or any combination thereof.

In some embodiments, the mixture of: the ASW powder, the AC powder, or any combination thereof; and the asphalt coating is homogenized, using one homogenizer, before heating, after heating, or any combination thereof. In some embodiments the mixture of: the ASW powder, the AC powder, or any combination thereof; and the asphalt coating is homogenized, using two homogenizers, before heating, after heating, or any combination thereof. In some embodiments, the mixture of: the ASW powder, the AC powder, or any combination thereof; and the asphalt coating is homogenized, using three homogenizers, before heating, after heating, or any combination thereof. In some embodiments, the mixture of: the ASW powder, the AC powder, or any combination thereof; and the asphalt coating is homogenized, using four homogenizers, before heating, after heating, or any combination thereof. In some embodiments, the mixture of: the ASW powder, the AC powder, or any combination thereof; and the asphalt coating is homogenized, using five homogenizers, before heating, after heating, or any combination thereof. In some embodiments, the mixture of: the ASW powder, the AC powder, or any combination thereof; and the asphalt coating is homogenized, using ten homogenizers, before heating, after heating, or any combination thereof. In some embodiments, the mixture of: the ASW powder, the AC powder, or any combination thereof; and the asphalt coating is homogenized, using twenty homogenizers, before heating, after heating, or any combination thereof. In some embodiments, the mixture of: the ASW powder, the AC powder, or any combination thereof; and the asphalt coating is homogenized, using fifty homogenizers, before heating, after heating, or any combination thereof. In some embodiments, the mixture of: the ASW powder, the AC powder, or any combination thereof; and the asphalt coating is homogenized, using one-hundred homogenizers, before heating, after heating, or any combination thereof.

In some embodiments, any number of heaters may be located upstream from any number of homogenizers, downstream from any number of homogenizers, or any combination thereof.

In some embodiments, the heated mixture of: the ASW powder, the AC powder, or any combination thereof and the asphalt coating is conveyed to at least one second mixer. In some embodiments, the at least one second mixer is of the same type as the at least one first mixer. In some embodiments, the at least one second mixer is of a different type than the at least one first mixer Non-limiting examples of mixers that can be used as the at least one second mixer include, vertically or horizontally agitated tanks, high or low shear tubular mixers, horizontal paddle mixers, screw transport mixers, continuous high shear mixers, progressive cavity mixing pumps or any combination thereof.

In some embodiments, the at least one second mixer comprises a plurality of second mixers. In some embodiments, the at least one second mixer comprises at least two second mixers. In some embodiments, the at least one second mixer comprises at least three second mixers. In some embodiments, the at least one second mixer comprises at least four second mixers. In some embodiments, the at least one second mixer comprises at least five second mixers. In some embodiments, the at least one second mixer comprises at least ten second mixers. In some embodiments, the at least one second mixer comprises at least twenty second mixers. In some embodiments, the at least one second mixer comprises at least fifty second mixers. In some embodiments, the at least one second mixer comprises at least one-hundred second mixers.

In some embodiments, the at least one second mixer consists of a single second mixer. In some embodiments, the at least one second mixer consists of two second mixers. In some embodiments, the at least one second mixer consists of three second mixers. In some embodiments, the at least one second mixer consists of four second mixers. In some embodiments, the at least one second mixer consists of five second mixers. In some embodiments, the at least one second mixer consists of ten second mixers. In some embodiments, the at least one second mixer consists of twenty second mixers. In some embodiments, the at least one second mixer consists of fifty second mixers. In some embodiments, the at least one second mixer consists of one-hundred second mixers.

In some embodiments, a sufficient amount of at least one filler material is mixed with the heated mixture in the at least one second mixer to obtain an ASW powder filled coating, an AC powder filled coating, or combination thereof that comprises 30 wt % to 50 wt % asphalt based on the total weight of the ASW powder filled coating, the AC powder filled coating, or combination thereof. In some embodiments, a sufficient amount of at least one filler material is mixed with the heated mixture in the at least one second mixer to obtain a ASW powder filled coating, an AC powder filled coating, or combination thereof that comprises 35 wt % to 50 wt % asphalt based on the total weight of the ASW powder filled coating, the AC powder filled coating, or combination thereof. In some embodiments, a sufficient amount of at least one filler material is mixed with the heated mixture in the at least one second mixer to obtain an ASW powder filled coating, an AC powder filled coating, or combination thereof that comprises 40 wt % to 50 wt % asphalt based on the total weight of the ASW powder filled coating, the AC powder filled coating, or combination thereof. In some embodiments, a sufficient amount of at least one filler material is mixed with the heated mixture in the at least one second mixer to obtain an ASW powder filled coating, an AC powder filled coating, or combination thereof that comprises 45 wt % to 50 wt % asphalt based on the total weight of the ASW powder filled coating, the AC powder filled coating, or combination thereof.

In some embodiments, a sufficient amount of at least one filler material is mixed with the heated mixture in the at least one second mixer to obtain an ASW powder filled coating, an AC powder filled coating, or combination thereof that comprises 30 wt % to 45 wt % asphalt based on the total weight of the ASW powder filled coating, the AC powder filled coating, or combination thereof. In some embodiments, a sufficient amount of at least one filler material is mixed with the heated mixture in the at least one second mixer to an ASW powder filled coating, an AC powder filled coating, or combination thereof that comprises 30 wt % to 40 wt % asphalt based on the total weight of the ASW powder filled coating, the AC powder filled coating, or combination thereof. In some embodiments, a sufficient amount of at least one filler material is mixed with the heated mixture in the at least one second mixer to obtain an ASW powder filled coating, an AC powder filled coating, or combination thereof that comprises 30 wt % to 35 wt % asphalt based on the total weight of the ASW powder filled coating, the AC powder filled coating, or combination thereof.

In some embodiments, an ASW filled coating comprises 0.1% to 95% by weight of the asphalt shingle waste based on a total weight of the asphalt shingle waste and the asphalt coating. In some embodiments, the ASW filled coating comprises 0.1% to 90% by weight of the asphalt shingle waste based on the total weight of the asphalt shingle waste and the asphalt coating. In some embodiments, the ASW filled coating comprises 0.1% to 80% by weight of the asphalt shingle waste based on the total weight of the asphalt shingle waste and the asphalt coating. In some embodiments, the ASW filled coating comprises 0.1% to 70% by weight of the asphalt shingle waste based on the total weight of the asphalt shingle waste and the asphalt coating. In some embodiments, the ASW filled coating comprises 0.1% to 60% by weight of the asphalt shingle waste based on the total weight of the asphalt shingle waste and the asphalt coating. In some embodiments, the ASW filled coating comprises 0.1% to 50% by weight of the asphalt shingle waste based on the total weight of the asphalt shingle waste and the asphalt coating. In some embodiments, the ASW filled coating comprises 0.1% to 40% by weight of the asphalt shingle waste based on the total weight of the asphalt shingle waste and the asphalt coating. In some embodiments, the ASW filled coating comprises 0.1% to 30% by weight of the asphalt shingle waste based on the total weight of the asphalt shingle waste and the asphalt coating. In some embodiments, the ASW filled coating comprises 0.1% to 20% by weight of the asphalt shingle waste based on the total weight of the asphalt shingle waste and the asphalt coating. In some embodiments, the ASW filled coating comprises 0.1% to 10% by weight of the asphalt shingle waste based on the total weight of the asphalt shingle waste and the asphalt coating. In some embodiments, the ASW filled coating comprises 0.1% to 5% by weight of the asphalt shingle waste based on the total weight of the asphalt shingle waste and the asphalt coating.

In some embodiments, the ASW filled coating comprises 1% to 95% by weight of the asphalt shingle waste based on the total weight of the asphalt shingle waste and the asphalt coating. In some embodiments, the ASW filled coating comprises 2% to 95% by weight of the asphalt shingle waste based on the total weight of the asphalt shingle waste and the asphalt coating. In some embodiments, the ASW filled coating comprises 5% to 95% by weight of the asphalt shingle waste based on the total weight of the asphalt shingle waste and the asphalt coating. In some embodiments, the ASW filled coating comprises 10% to 95% by weight of the asphalt shingle waste based on the total weight of the asphalt shingle waste and the asphalt coating. In some embodiments, the ASW filled coating comprises 20% to 95% by weight of the asphalt shingle waste based on the total weight of the asphalt shingle waste and the asphalt coating. In some embodiments, the ASW filled coating comprises 30% to 95% by weight of the asphalt shingle waste based on the total weight of the asphalt shingle waste and the asphalt coating. In some embodiments, the ASW filled coating comprises 40% to 95% by weight of the asphalt shingle waste based on the total weight of the asphalt shingle waste and the asphalt coating. In some embodiments, the ASW filled coating comprises 50% to 95% by weight of the asphalt shingle waste based on the total weight of the asphalt shingle waste and the asphalt coating. In some embodiments, the ASW filled coating comprises 60% to 95% by weight of the asphalt shingle waste based on the total weight of the asphalt shingle waste and the asphalt coating. In some embodiments, the ASW filled coating comprises 70% to 95% by weight of the asphalt shingle waste based on the total weight of the asphalt shingle waste and the asphalt coating. In some embodiments, the ASW filled coating comprises 80% to 95% by weight of the asphalt shingle waste based on the total weight of the asphalt shingle waste and the asphalt coating. In some embodiments, the ASW filled coating comprises 90% to 95% by weight of the asphalt shingle waste based on the total weight of the asphalt shingle waste and the asphalt coating.

In some embodiments, the ASW filled coating comprises 50% to 90% by weight of the asphalt shingle waste based on the total weight of the asphalt shingle waste and the asphalt coating. In some embodiments, the ASW filled coating comprises 60% to 80% by weight of the asphalt shingle waste based on the total weight of the asphalt shingle waste and the asphalt coating. In some embodiments, the ASW filled coating comprises 65% to 75% by weight of the asphalt shingle waste based on the total weight of the asphalt shingle waste and the asphalt coating. In some embodiments, the ASW filled coating comprises 70% to 99% by weight of the asphalt shingle waste based on the total weight of the asphalt shingle waste and the asphalt coating. In some embodiments, the ASW filled coating comprises 75% to 95% by weight of the asphalt shingle waste based on the total weight of the asphalt shingle waste and the asphalt coating. In some embodiments, the ASW filled coating comprises 80% to 90% by weight of the asphalt shingle waste based on the total weight of the asphalt shingle waste and the asphalt coating.

In some embodiments, the ASW filled coating comprises 5% to 99.9% by weight of the asphalt coating based on the total weight of the asphalt shingle waste and the asphalt coating. In some embodiments, the ASW filled coating comprises 10% to 99.9% by weight of the asphalt coating based on the total weight of the asphalt shingle waste and the asphalt coating. In some embodiments, the ASW filled coating comprises 20% to 99.9% by weight of the asphalt coating based on the total weight of the asphalt shingle waste and the asphalt coating. In some embodiments, the ASW filled coating comprises 30% to 99.9% by weight of the asphalt coating based on the total weight of the asphalt shingle waste and the asphalt coating. In some embodiments, the ASW filled coating comprises 40% to 99.9% by weight of the asphalt coating based on the total weight of the asphalt shingle waste and the asphalt coating. In some embodiments, the ASW filled coating comprises 50% to 99.9% by weight of the asphalt coating based on the total weight of the asphalt shingle waste and the asphalt coating. In some embodiments, the ASW filled coating comprises 60% to 99.9% by weight of the asphalt coating based on the total weight of the asphalt shingle waste and the asphalt coating. In some embodiments, the ASW filled coating comprises 70% to 99.9% by weight of the asphalt coating based on the total weight of the asphalt shingle waste and the asphalt coating. In some embodiments, the ASW filled coating comprises 80% to 99.9% by weight of the asphalt coating based on the total weight of the asphalt shingle waste and the asphalt coating. In some embodiments, the ASW filled coating comprises 90% to 99.9% by weight of the asphalt coating based on the total weight of the asphalt shingle waste and the asphalt coating. In some embodiments, the ASW filled coating comprises 95% to 99.9% by weight of the asphalt coating based on the total weight of the asphalt shingle waste and the asphalt coating.

In some embodiments, the ASW filled coating comprises 5% to 99% by weight of the asphalt coating based on the total weight of the asphalt shingle waste and the asphalt coating. In some embodiments, the ASW filled coating comprises 5% to 95% by weight of the asphalt coating based on the total weight of the asphalt shingle waste and the asphalt coating. In some embodiments, the ASW filled coating comprises 5% to 90% by weight of the asphalt coating based on the total weight of the asphalt shingle waste and the asphalt coating. In some embodiments, the ASW filled coating comprises 5% to 80% by weight of the asphalt coating based on the total weight of the asphalt shingle waste and the asphalt coating. In some embodiments, the ASW filled coating comprises 5% to 70% by weight of the asphalt coating based on the total weight of the asphalt shingle waste and the asphalt coating. In some embodiments, the ASW filled coating comprises 5% to 60% by weight of the asphalt coating based on the total weight of the asphalt shingle waste and the asphalt coating. In some embodiments, the ASW filled coating comprises 5% to 50% by weight of the asphalt coating based on the total weight of the asphalt shingle waste and the asphalt coating. In some embodiments, the ASW filled coating comprises 5% to 40% by weight of the asphalt coating based on the total weight of the asphalt shingle waste and the asphalt coating. In some embodiments, the ASW filled coating comprises 5% to 30% by weight of the asphalt coating based on the total weight of the asphalt shingle waste and the asphalt coating. In some embodiments, the ASW filled coating comprises 5% to 20% by weight of the asphalt coating based on the total weight of the asphalt shingle waste and the asphalt coating. In some embodiments, the ASW filled coating comprises 5% to 10% by weight of the asphalt coating based on the total weight of the asphalt shingle waste and the asphalt coating.

In some embodiments, the ASW filled coating comprises 10% to 50% by weight of the asphalt coating based on the total weight of the asphalt shingle waste and the asphalt coating. In some embodiments, the ASW filled coating comprises 20% to 40% by weight of the asphalt coating based on the total weight of the asphalt shingle waste and the asphalt coating. In some embodiments, the ASW filled coating comprises 25% to 35% by weight of the asphalt coating based on the total weight of the asphalt shingle waste and the asphalt coating. In some embodiments, the ASW filled coating comprises 1% to 30% by weight of the asphalt coating based on the total weight of the asphalt shingle waste and the asphalt coating. In some embodiments, the ASW filled coating comprises 5% to 25% by weight of the asphalt coating based on the total weight of the asphalt shingle waste and the asphalt coating. In some embodiments, the ASW filled coating comprises 10% to 20% by weight of the asphalt coating based on the total weight of the asphalt shingle waste and the asphalt coating.

In some embodiments, an ASW filled coating comprises 0.1% to 95% by weight of the asphalt shingle waste based on a total weight of the ASW filled coating. In some embodiments, the ASW filled coating comprises 0.1% to 90% by weight of the asphalt shingle waste based on the total weight of the ASW filled coating. In some embodiments, the ASW filled coating comprises 0.1% to 80% by weight of the asphalt shingle waste based on the total weight of the ASW filled coating. In some embodiments, the ASW filled coating comprises 0.1% to 70% by weight of the asphalt shingle waste based on the total weight of the ASW filled coating. In some embodiments, the ASW filled coating comprises 0.1% to 60% by weight of the asphalt shingle waste based on the total weight of the ASW filled coating. In some embodiments, the ASW filled coating comprises 0.1% to 50% by weight of the asphalt shingle waste based on the total weight of the ASW filled coating. In some embodiments, the ASW filled coating comprises 0.1% to 40% by weight of the asphalt shingle waste based on the total weight of the ASW filled coating. In some embodiments, the ASW filled coating comprises 0.1% to 30% by weight of the asphalt shingle waste based on the total weight of the ASW filled coating. In some embodiments, the ASW filled coating comprises 0.1% to 20% by weight of the asphalt shingle waste based on the total weight of the ASW filled coating. In some embodiments, the ASW filled coating comprises 0.1% to 10% by weight of the asphalt shingle waste based on the total weight of the ASW filled coating. In some embodiments, the ASW filled coating comprises 0.1% to 5% by weight of the asphalt shingle waste based on the total weight of the ASW filled coating.

In some embodiments, the ASW filled coating comprises 1% to 95% by weight of the asphalt shingle waste based on the total weight of the ASW filled coating. In some embodiments, the ASW filled coating comprises 2% to 95% by weight of the asphalt shingle waste based on the total weight of the ASW filled coating. In some embodiments, the ASW filled coating comprises 5% to 95% by weight of the asphalt shingle waste based on the total weight of the ASW filled coating. In some embodiments, the ASW filled coating comprises 10% to 95% by weight of the asphalt shingle waste based on the total weight of the ASW filled coating. In some embodiments, the ASW filled coating comprises 20% to 95% by weight of the asphalt shingle waste based on the total weight of the ASW filled coating. In some embodiments, the ASW filled coating comprises 30% to 95% by weight of the asphalt shingle waste based on the total weight of the ASW filled coating. In some embodiments, the ASW filled coating comprises 40% to 95% by weight of the asphalt shingle waste based on the total weight of the ASW filled coating. In some embodiments, the ASW filled coating comprises 50% to 95% by weight of the asphalt shingle waste based on the total weight of the ASW filled coating. In some embodiments, the ASW filled coating comprises 60% to 95% by weight of the asphalt shingle waste based on the total weight of the ASW filled coating. In some embodiments, the ASW filled coating comprises 70% to 95% by weight of the asphalt shingle waste based on the total weight of the ASW filled coating. In some embodiments, the ASW filled coating comprises 80% to 95% by weight of the asphalt shingle waste based on the total weight of the ASW filled coating. In some embodiments, the ASW filled coating comprises 90% to 95% by weight of the asphalt shingle waste based on the total weight of the ASW filled coating.

In some embodiments, the ASW filled coating comprises 50% to 90% by weight of the asphalt shingle waste based on the total weight of the ASW filled coating. In some embodiments, the ASW filled coating comprises 60% to 80% by weight of the asphalt shingle waste based on the total weight of the ASW filled coating. In some embodiments, the ASW filled coating comprises 65% to 75% by weight of the asphalt shingle waste based on the total weight of the ASW filled coating. In some embodiments, the ASW filled coating comprises 70% to 99% by weight of the asphalt shingle waste based on the total weight of the ASW filled coating. In some embodiments, the ASW filled coating comprises 75% to 95% by weight of the asphalt shingle waste based on the total weight of the ASW filled coating. In some embodiments, the ASW filled coating comprises 80% to 90% by weight of the asphalt shingle waste based on the total weight of the ASW filled coating.

In some embodiments, the ASW filled coating comprises 5% to 99.9% by weight of the asphalt coating based on the total weight of the ASW filled coating. In some embodiments, the ASW filled coating comprises 10% to 99.9% by weight of the asphalt coating based on the total weight of the ASW filled coating. In some embodiments, the ASW filled coating comprises 20% to 99.9% by weight of the asphalt coating based on the total weight of the ASW filled coating. In some embodiments, the ASW filled coating comprises 30% to 99.9% by weight of the asphalt coating based on the total weight of the ASW filled coating. In some embodiments, the ASW filled coating comprises 40% to 99.9% by weight of the asphalt coating based on the total weight of the ASW filled coating. In some embodiments, the ASW filled coating comprises 50% to 99.9% by weight of the asphalt coating based on the total weight of the ASW filled coating. In some embodiments, the ASW filled coating comprises 60% to 99.9% by weight of the asphalt coating based on the total weight of the ASW filled coating. In some embodiments, the ASW filled coating comprises 70% to 99.9% by weight of the asphalt coating based on the total weight of the ASW filled coating. In some embodiments, the ASW filled coating comprises 80% to 99.9% by weight of the asphalt coating based on the total weight of the ASW filled coating. In some embodiments, the ASW filled coating comprises 90% to 99.9% by weight of the asphalt coating based on the total weight of the ASW filled coating. In some embodiments, the ASW filled coating comprises 95% to 99.9% by weight of the asphalt coating based on the total weight of the ASW filled coating.

In some embodiments, the ASW filled coating comprises 5% to 99% by weight of the asphalt coating based on the total weight of the ASW filled coating. In some embodiments, the ASW filled coating comprises 5% to 95% by weight of the asphalt coating based on the total weight of the ASW filled coating. In some embodiments, the ASW filled coating comprises 5% to 90% by weight of the asphalt coating based on the total weight of the ASW filled coating. In some embodiments, the ASW filled coating comprises 5% to 80% by weight of the asphalt coating based on the total weight of the ASW filled coating. In some embodiments, the ASW filled coating comprises 5% to 70% by weight of the asphalt coating based on the total weight of the ASW filled coating. In some embodiments, the ASW filled coating comprises 5% to 60% by weight of the asphalt coating based on the total weight of the ASW filled coating. In some embodiments, the ASW filled coating comprises 5% to 50% by weight of the asphalt coating based on the total weight of the ASW filled coating. In some embodiments, the ASW filled coating comprises 5% to 40% by weight of the asphalt coating based on the total weight of the ASW filled coating. In some embodiments, the ASW filled coating comprises 5% to 30% by weight of the asphalt coating based on the total weight of the ASW filled coating. In some embodiments, the ASW filled coating comprises 5% to 20% by weight of the asphalt coating based on the total weight of the ASW filled coating. In some embodiments, the ASW filled coating comprises 5% to 10% by weight of the asphalt coating based on the total weight of the ASW filled coating.

In some embodiments, the ASW filled coating comprises 10% to 50% by weight of the asphalt coating based on the total weight of the ASW filled coating. In some embodiments, the ASW filled coating comprises 20% to 40% by weight of the asphalt coating based on the total weight of the ASW filled coating. In some embodiments, the ASW filled coating comprises 25% to 35% by weight of the asphalt coating based on the total weight of the ASW filled coating. In some embodiments, the ASW filled coating comprises 1% to 30% by weight of the asphalt coating based on the total weight of the ASW filled coating. In some embodiments, the ASW filled coating comprises 5% to 25% by weight of the asphalt coating based on the total weight of the ASW filled coating. In some embodiments, the ASW filled coating comprises 10% to 20% by weight of the asphalt coating based on the total weight of the ASW filled coating.

In some embodiments, a sufficient amount of at least one filler material is mixed with the heated mixture in the at least one second mixer to obtain an ASW powder filled coating, an AC powder filled coating, or combination thereof that comprises 35 wt % to 45 wt % asphalt based on the total weight of the ASW or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 70 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 65 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 60 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 55 wt % of: limestone powder, granules, impurities, and the at least one filler material based on the total weight of the ASW powder filled coating or AC powder filled coating.

In some embodiments, a sufficient amount of at least one filler material is mixed with the heated mixture in the at least one second mixer to obtain an ASW powder filled coating, an AC powder filled coating, or combination thereof that comprises 55 wt % to 70 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 60 wt % to 70 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 65 wt % to 70 wt % of: limestone powder, granules, impurities, and the at least one filler material based on the total weight of the ASW powder filled coating, the AC powder filled coating, or combination thereof.

In some embodiments, a sufficient amount of at least one filler material is mixed with the heated mixture in the at least one second mixer to obtain an ASW powder filled coating, an AC powder filled coating, or combination thereof that comprises 55 wt % to 60 wt % of: limestone powder, granules, impurities, and the at least one filler material based on the total weight of the ASW powder filled coating or AC powder filled coating.

In some embodiments, the at least one filler material is subjected to a dust-collection step. In some embodiments, the at least one filler material is heated before the at least one filler material is added the at least one second mixer.

A non-limiting example of the at least one filler material is limestone powder. Other non-limiting examples of the at least one filler material include flash, fiberglass particles, stone dust, and combinations thereof.

In some embodiments, the weight percentage of asphalt in the ASW powder filled coating, based on the total weight of the ASW powder filled coating, is the same as a weight percentage of asphalt in a powder filled coating that does not contain any ASW. In some embodiments, a softening point of the ASW powder filled coating is the same as a softening point of a powder filled coating that does not contain any ASW. In some embodiments, a penetration point of the ASW powder filled coating is the same as a penetration point of a powder filled coating that does not contain any ASW.

In some embodiments, the ASW powder filled coating comprises 1 wt % to 40 wt % of the ASW powder based on the total weight of the ASW powder filled coating. In some embodiments, the ASW powder filled coating comprises 5 wt % to 40 wt % of the ASW powder based on the total weight of the ASW powder filled coating. In some embodiments, the ASW powder filled coating comprises 10 wt % to 40 wt % of the ASW powder based on the total weight of the ASW powder filled coating. In some embodiments, the ASW powder filled coating comprises 20 wt % to 40 wt % of the ASW powder based on the total weight of the ASW powder filled coating. In some embodiments, the ASW powder filled coating comprises 30 wt % to 40 wt % of the ASW powder based on the total weight of the ASW powder filled coating.

In some embodiments, the ASW powder filled coating comprises 1 wt % to 30 wt % of the ASW powder based on the total weight of the ASW powder filled coating. In some embodiments, the ASW powder filled coating comprises 1 wt % to 20 wt % of the ASW powder based on the total weight of the ASW powder filled coating. In some embodiments, the ASW powder filled coating comprises 1 wt % to 10 wt % of the ASW powder based on the total weight of the ASW powder filled coating. In some embodiments, the ASW powder filled coating comprises 1 wt % to 5 wt % of the ASW powder based on the total weight of the ASW powder filled coating.

In some embodiments, the ASW powder filled coating comprises 5 wt % to 40 wt % of the ASW powder based on the total weight of the ASW powder filled coating. In some embodiments, the ASW powder filled coating comprises 10 wt % to 30 wt % of the ASW powder based on the total weight of the ASW powder filled coating. In some embodiments, the ASW powder filled coating comprises 15 wt % to 20 wt % of the ASW powder based on the total weight of the ASW powder filled coating. In some embodiments, the ASW powder filled coating comprises 20 wt % to 25 wt % of the ASW powder based on the total weight of the ASW powder filled coating.

In some embodiments where the at least one filler material comprises limestone powder, the ASW powder filled coating, the AC powder filled coating, or combination thereof can comprise 50% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 55% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 60% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 65% to 70% of: limestone powder, granules, and impurities based on the total weight of the ASW powder filled coating, the AC powder filled coating, or combination thereof.

In some embodiments where the at least one filler material comprises limestone powder, the ASW powder filled coating, the AC powder filled coating, or combination thereof can comprise 55% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 60% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 65% to 70% of: limestone powder, granules, and impurities based on the total weight of the ASW powder filled coating, the AC powder filled coating, or combination thereof.

In some embodiments where the at least one filler material comprises limestone powder, the ASW powder filled coating, the AC powder filled coating, or combination thereof can comprise 55% to 60% of: limestone powder, granules, and impurities based on the total weight of the ASW powder filled coating, the AC powder filled coating, or combination thereof.

In some embodiments, the ASW powder filled coating, the AC powder filled coating, or combination thereof may be homogenized. In some embodiments, any number of homogenizers, heaters, or mixers may be added at any stage of the method without deviating from the scope of the present disclosure.

In some embodiments, the ASW powder filled coating, the AC powder filled coating, or combination thereof has a viscosity of 100 cP to 20,000 cP. In some embodiments, the ASW powder filled coating, the AC powder filled coating, or combination thereof has a viscosity of 500 cP to 20,000 cP. In some embodiments, the ASW powder filled coating, the AC powder filled coating, or combination thereof has a viscosity of 1,000 cP to 20,000 cP. In some embodiments, the ASW powder filled coating, the AC powder filled coating, or combination thereof has a viscosity of 5,000 cP to 20,000 cP. In some embodiments, the ASW powder filled coating, the AC powder filled coating, or combination thereof has a viscosity of 10,000 cP to 20,000 cP. In some embodiments, the ASW powder filled coating, the AC powder filled coating, or combination thereof has a viscosity of 15,000 cP to 20,000 cP.

In some embodiments, the ASW powder filled coating, the AC powder filled coating, or combination thereof has a viscosity of 100 cP to 15,000 cP. In some embodiments, the ASW powder filled coating, the AC powder filled coating, or combination thereof has a viscosity of 100 cP to 10,000 cP. In some embodiments, the ASW powder filled coating, the AC powder filled coating, or combination thereof has a viscosity of 100 cP to 5,000 cP. In some embodiments, the ASW powder filled coating, the AC powder filled coating, or combination thereof has a viscosity of 100 cP to 1,000 cP. In some embodiments, the ASW powder filled coating, the AC powder filled coating, or combination thereof has a viscosity of 100 cP to 500 cP.

In some embodiments, the ASW powder filled coating, the AC powder filled coating, or combination thereof has a viscosity of 500 cP to 15,000 cP. In some embodiments, the ASW powder filled coating, the AC powder filled coating, or combination thereof has a viscosity of 1,000 cP to 10,000 cP. In some embodiments, the ASW powder filled coating, the AC powder filled coating, or combination thereof has a viscosity of 5,000 cP.

In some embodiments, the ASW powder filled coating, the AC powder filled coating, or combination thereof is applied to a fiberglass mat to form a coated fiberglass mat. In some embodiments, at least one of granules or sand are applied to the coated fiberglass mat to form an asphalt shingle. In some embodiments, the ASW powder filled coating is used to form the asphalt that is used in the any or all of the roofing, paving, road, or other applications and products described herein.

FIG. 3 depicts an exemplary non-limiting method according to some embodiments of the present disclosure showing a continuous process of producing an ASW powder filled coating, the AC powder filled coating, or combination thereof as described herein. The non-limiting example of FIG. 3 may include the following steps detailed below.

Sufficient grinding and screening steps (not shown) may be performed on ASW to result in ASW powder 301 having the average particle size described herein. In some embodiments, an AC powder 301 can be obtained. In some embodiments a combination 301 of ASW powder and AC powder can be obtained.

A specified amount of the ASW powder, the AC powder, or combination thereof 301 described herein, is combined with a specified amount of asphalt coating, described herein in tank 302 and fed into first mixers 303 *a* and 303 *b*, where a sufficient amount of shear is applied so as to form a mixture of: ASW powder, AC powder, or combination thereof; and asphalt coating, as described herein. While the embodiment of FIG. 3 depicts two first mixers 303 *a* and 303 *b*, in some embodiments, a single first mixer can be used.

Heat exchanger 304 heats the mixture of: ASW powder, AC powder, or combination thereof; and asphalt coating to a specified temperature so as to form a heated mixture of the ASW or AC powder and the asphalt coating, as described herein. While the embodiment of FIG. 3 depicts heat exchanger 304, any heater or combination of heaters described herein can be used.

A specified amount of the heated mixture of: the ASW powder, AC powder, or combination thereof; and the asphalt coating can be fed into storage tank 305. The storage tank 305 may be in thermal communication with a heater, such as heat exchanger 306.

A specified amount of the heated mixture of the ASW powder, AC powder, or combination thereof; and the asphalt coating can be conveyed from storage tank 305 into second mixer 307 where the at least one filler material 308, described herein, is introduced to the heated mixture of the ASW powder, AC powder, or combination thereof; and the asphalt coating. A sufficient amount of shear is applied to form the ASW powder filled coating, AC powder filled coating, or combination thereof.

The ASW powder filled coating, the AC powder filled coating, or combination thereof can be fed into surge tank 309 where the ASW powder filled coating, the AC powder filled coating, or combination thereof can be stirred until homogenous. The ASW or AC powder filled coating can be transported to third mixer 310 where, in some embodiments, the ASW powder filled coating, the AC powder filled coating, or combination thereof is mixed with another material.

Some embodiments relate to a method for incorporating the asphalt product into a cement formulation. In some embodiments, the method is a method for cement production. In some embodiments, the method is a method for producing a cement clinker or other product (e.g., for cements other than Portland cement). In some embodiments, the use of the briquettes disclosed herein to produce cement is useful for reducing asphalt shingle waste disposed in landfills. In some embodiments, the briquettes disclosed herein, when used in cement production, having a high calorific value, and are sized and dimensioned so as to reduce the occurrence of "choking" of the kiln, permitting the incorporation of the briquettes disclosed herein into standard cement production manufacturing lines. In some embodiments, the high concentration of limestone in the briquettes produces a high amount of calcium oxide during combustion, thereby improving the cement production process. In some embodiments, an asphalt shingle waste (e.g., of the briquettes, powder, etc.) is useful as a replacement for a fuel source, such as, for example, a carbon source. In some embodiments, the filler material (e.g., waste filler material) present in the asphalt shingle waste is useful as an aggregate in the cement formulation. In some embodiments, the asphalt shingle waste is useful to offset the amount of coal or other carbon source material fed to the kiln. In some embodiments, the asphalt shingle waste is useful as a partial or full replacement of the carbon source material (e.g., coal) fed to the kiln. In some embodiments, ash from the kiln is used in the cement formulation.

In some embodiments, the method comprises obtaining a plurality of briquettes. Any of the briquettes disclosed herein may be employed, without departing from the scope of this disclosure. In some embodiments, for example, each of the plurality of briquettes comprises a pressurized asphalt shingle waste powder from any form of discarded asphalt shingle, wherein the asphalt shingle waste powder comprises: 5% to 40% by weight of an asphalt based on a total weight of the asphalt shingle waste powder; and 50% to 95% by weight of limestone, granules, and impurities based on the total weight of the asphalt shingle waste powder.

In some embodiments, the method comprises feeding the plurality of briquettes to a kiln. In some embodiments, the kiln comprises at least one of a wet-process kiln, a semidry kiln, a dry kiln, a preheater kiln, a precalciner kiln, or any combination thereof. In some embodiments, the feeding comprises conveying the plurality of briquettes to the kiln. In some embodiments, the feeding comprises introducing the plurality of briquettes into the kiln. In some embodiments, the feeding comprises supplying the plurality of briquettes into the kiln. In some embodiments, the feeding comprises discharging the plurality of briquettes into the kiln. In some embodiments, the feeding comprises dropping the plurality of briquettes into the kiln. In some embodiments, the feeding comprises supplying the plurality of briquettes into the kiln. In some embodiments, the feeding comprises manually disposing the plurality of briquettes in the kiln.

In some embodiments, the method comprises combusting the plurality of briquettes in the kiln to produce a cement clinker. In some embodiments, combusting comprises firing the plurality of briquettes in the kiln. In some embodiments, combusting comprises burning the plurality of briquettes in the kiln. In some embodiments, combusting comprises heating the plurality of briquettes in the kiln. In some embodiments, combusting comprises igniting the plurality of briquettes in the kiln. In some embodiments, combusting comprises firing the plurality of briquettes in the kiln. In some embodiments, combusting comprises calcining the plurality of briquettes in the kiln. In some embodiments, combusting comprises oxidizing the plurality of briquettes in the kiln. In some embodiments, combusting comprises reducing the plurality of briquettes in the kiln. In some embodiments, combusting comprises exposing the plurality of briquettes in the kiln to heat sufficient to combust the plurality of briquettes. In some embodiments, combusting the plurality of briquettes produces oxides, such as, for example and without limitation, calcium oxide. In some embodiments, the method does not comprise feeding another cement precursor that is configured to combust to produce calcium oxide (e.g., the plurality of briquettes is the only source of calcium oxide).

In some embodiments, the combusting comprises heating the plurality of briquettes in the kiln to a temperature of 2600° F. to 3000° F. In some embodiments, the combusting comprises heating the plurality of briquettes in the kiln to a temperature of 2600° F. to 2900° F. In some embodiments, the combusting comprises heating the plurality of briquettes in the kiln to a temperature of 2600° F. to 2800° F. In some embodiments, the combusting comprises heating the plurality of briquettes in the kiln to a temperature of 2600° F. to 2700° F. In some embodiments, the combusting comprises heating the plurality of briquettes in the kiln to a temperature of 2700° F. to 3000° F. In some embodiments, the combusting comprises heating the plurality of briquettes in the kiln to a temperature of 2800° F. to 3000° F. In some embodiments, the combusting comprises heating the plurality of briquettes in the kiln to a temperature of 2900° F. to 3000° F.

In some embodiments, the plurality of briquettes has a calorific value of 5000 btu/lb. to 6000 btu/lb. In some embodiments, the plurality of briquettes has a calorific value of 5000 btu/lb. to 5900 btu/lb. In some embodiments, the plurality of briquettes has a calorific value of 5000 btu/lb. to 5800 btu/lb. In some embodiments, the plurality of briquettes has a calorific value of 5000 btu/lb. to 5700 btu/lb. In some embodiments, the plurality of briquettes has a calorific value of 5000 btu/lb. to 5600 btu/lb. In some embodiments, the plurality of briquettes has a calorific value of 5000 btu/lb. to 5500 btu/lb. In some embodiments, the plurality of briquettes has a calorific value of 5000 btu/lb. to 5400 btu/lb. In some embodiments, the plurality of briquettes has a calorific value of 5000 btu/lb. to 5300 btu/lb. In some embodiments, the plurality of briquettes has a calorific value of 5000 btu/lb. to 5200 btu/lb. In some embodiments, the plurality of briquettes has a calorific value of 5000 btu/lb. to 5100 btu/lb.

In some embodiments, the plurality of briquettes has a calorific value of 5100 btu/lb. to 6000 btu/lb. In some embodiments, the plurality of briquettes has a calorific value of 5200 btu/lb. to 6000 btu/lb. In some embodiments, the plurality of briquettes has a calorific value of 5300 btu/lb. to 6000 btu/lb. In some embodiments, the plurality of briquettes has a calorific value of 5400 btu/lb. to 6000 btu/lb. In some embodiments, the plurality of briquettes has a calorific value of 5500 btu/lb. to 6000 btu/lb. In some embodiments, the plurality of briquettes has a calorific value of 5600 btu/lb. to 6000 btu/lb. In some embodiments, the plurality of briquettes has a calorific value of 5700 btu/lb. to 6000 btu/lb. In some embodiments, the plurality of briquettes has a calorific value of 5800 btu/lb. to 6000 btu/lb. In some embodiments, the plurality of briquettes has a calorific value of 5900 btu/lb. to 6000 btu/lb.

In some embodiments, the method further comprises obtaining a cement precursor, feeding the cement precursor to the kiln, and mixing the cement precursor and the plurality of briquettes in the kiln. In some embodiments, the cement precursor comprises any combustible raw material and/or non-combustible raw material useful in producing cement (e.g., a Portland cement, among others). In some embodiments, the cement precursor comprises at least one of limestone, sand, shells, chalk combined with shale, marl combined with shale, clay, slate, blast furnace slag, silica sand, iron ore combustion ash, iron oxides, lime waste, alumina, calcium carbonate, clay fines, diatomaceous earth, perlite, slag fines, aluminum dross fines, pyrite ashes, cinder fines, shale fines, bauxite, silica sand, dolomite, or any combination thereof.

In some embodiments, the method further comprises obtaining a carbon source. In some embodiments, the carbon source comprises an organic source. In some embodiments, the carbon source comprises a coal. In some embodiments, the carbon source comprises a coal derivative.

In some embodiments, the method comprises feeding the cement precursor to the kiln. In some embodiments, the feeding comprises conveying the cement precursor to the kiln. In some embodiments, the feeding comprises introducing the cement precursor into the kiln. In some embodiments, the feeding comprises supplying the cement precursor into the kiln. In some embodiments, the feeding comprises discharging the cement precursor into the kiln. In some embodiments, the feeding comprises dropping the cement precursor into the kiln. In some embodiments, the feeding comprises supplying the cement precursor into the kiln. In some embodiments, the feeding comprises manually disposing the cement precursor in the kiln.

In some embodiments, the method comprises feeding the carbon source to the kiln. In some embodiments, the feeding comprises conveying the carbon source to the kiln. In some embodiments, the feeding comprises introducing the carbon source into the kiln. In some embodiments, the feeding comprises supplying the carbon source into the kiln. In some embodiments, the feeding comprises discharging the carbon source into the kiln. In some embodiments, the feeding comprises dropping the carbon source into the kiln. In some embodiments, the feeding comprises supplying the carbon source into the kiln. In some embodiments, the feeding comprises manually disposing the carbon source in the kiln.

In some embodiments, the method comprises mixing the cement precursor and the plurality of briquettes in the kiln. In some embodiments, the mixing comprises tumbling the cement precursor and the plurality of briquettes in the kiln. In some embodiments, the mixing comprises rotating (e.g., rotary mixing) the cement precursor and the plurality of briquettes in the kiln. In some embodiments, the mixing comprises contacting the cement precursor and the plurality of briquettes in the kiln. In some embodiments, the mixing comprises paddle mixing the cement precursor and the plurality of briquettes in the kiln. In some embodiments, the mixing is performed using an industrial mixer, such as, for example and without limitation, at least one of a tank mixer, a drum mixer, a pail mixer, a high shear mixer, a low shear mixer, a static mixer, or any combination thereof. In some embodiments, the cement clinker is further mixed, combined, or otherwise contacted with gypsum, so as to form a cement. In some embodiments, the mixing further comprises mixing the carbon source with at least one of the cement precursor, the plurality of briquettes, or any thereof in the kiln.

In some embodiments, the use of the plurality of briquettes, or more generally the asphalt shingle waste, reduces the amount of coal or carbon source required to be fed to the kiln. In some embodiments, the reduction in the amount of carbon source required to be fed to the kiln is in reference to at least one property. In some embodiments, the method comprises feeding the plurality of briquettes and the carbon source, to the kiln, in an amount sufficient to result in a mixture having a calorific value of "X," where "X" is the calorific value. In some embodiments, the calorific value of "X" is 2000 btu/lb. to 20,000 btu/lb. In some embodiments, the calorific value of "X" is 2,000 btu/lb. to 19,000 btu/lb. In some embodiments, the calorific value of "X" is 2,000 btu/lb. to 18,000 btu/lb. In some embodiments, the calorific value of "X" is 2,000 btu/lb. to 17,000 btu/lb. In some embodiments, the calorific value of "X" is 2,000 btu/lb. to 16,000 btu/lb. In some embodiments, the calorific value of "X" is 2,000 btu/lb. to 15,000 btu/lb. In some embodiments, the calorific value of "X" is 2,000 btu/lb. to 14,000 btu/lb. In some embodiments, the calorific value of "X" is 2,000 btu/lb. to 13,000 btu/lb. In some embodiments, the calorific value of "X" is 2,000 btu/lb. to 12,000 btu/lb. In some embodiments, the calorific value of "X" is 2,000 btu/lb. to 11,000 btu/lb. In some embodiments, the calorific value of "X" is 2,000 btu/lb. to 10,000 btu/lb. In some embodiments, the calorific value of "X" is 2,000 btu/lb. to 9,000 btu/lb. In some embodiments, the calorific value of "X" is 2,000 btu/lb. to 8,000 btu/lb. In some embodiments, the calorific value of "X" is 2,000 btu/lb. to 7,000 btu/lb. In some embodiments, the calorific value of "X" is 2,000 btu/lb. to 6,000 btu/lb. In some embodiments, the calorific value of "X" is 2,000 btu/lb. to 5,000 btu/lb. In some embodiments, the calorific value of "X" is 2,000 btu/lb. to 4,000 btu/lb. In some embodiments, the calorific value of "X" is 2,000 btu/lb. to 3,000 btu/lb.

In some embodiments, the calorific value of "X" is 3,000 btu/lb. to 20,000 btu/lb. In some embodiments, the calorific value of "X" is 4,000 btu/lb. to 20,000 btu/lb. In some embodiments, the calorific value of "X" is 5,000 btu/lb. to 20,000 btu/lb. In some embodiments, the calorific value of "X" is 6,000 btu/lb. to 20,000 btu/lb. In some embodiments, the calorific value of "X" is 7,000 btu/lb. to 20,000 btu/lb. In some embodiments, the calorific value of "X" is 8,000 btu/lb. to 20,000 btu/lb. In some embodiments, the calorific value of "X" is 9,000 btu/lb. to 20,000 btu/lb. In some embodiments, the calorific value of "X" is 10,000 btu/lb. to 20,000 btu/lb. In some embodiments, the calorific value of "X" is 11,000 btu/lb. to 20,000 btu/lb. In some embodiments, the calorific value of "X" is 12,000 btu/lb. to 20,000 btu/lb. In some embodiments, the calorific value of "X" is 13,000 btu/lb. to 20,000 btu/lb. In some embodiments, the calorific value of "X" is 14,000 btu/lb. to 20,000 btu/lb. In some embodiments, the calorific value of "X" is 15,000 btu/lb. to 20,000 btu/lb. In some embodiments, the calorific value of "X" is 16,000 btu/lb. to 20,000 btu/lb. In some embodiments, the calorific value of "X" is 17,000 btu/lb. to 20,000 btu/lb. In some embodiments, the calorific value of "X" is 18,000 btu/lb. to 20,000 btu/lb. In some embodiments, the calorific value of "X" is 19,000 btu/lb. to 20,000 btu/lb.

In some embodiments, the mixture comprises 1% to 99% by weight of the plurality of briquettes based on a total weight of the plurality of briquettes and the carbon source. In some embodiments, the mixture comprises 1% to 95% by weight of the plurality of briquettes based on the total weight of the plurality of briquettes and the carbon source. In some embodiments, the mixture comprises 1% to 90% by weight of the plurality of briquettes based on the total weight of the plurality of briquettes and the carbon source. In some embodiments, the mixture comprises 1% to 85% by weight of the plurality of briquettes based on the total weight of the plurality of briquettes and the carbon source. In some embodiments, the mixture comprises 1% to 80% by weight of the plurality of briquettes based on the total weight of the plurality of briquettes and the carbon source. In some embodiments, the mixture comprises 1% to 75% by weight of the plurality of briquettes based on the total weight of the plurality of briquettes and the carbon source. In some embodiments, the mixture comprises 1% to 70% by weight of the plurality of briquettes based on the total weight of the plurality of briquettes and the carbon source. In some embodiments, the mixture comprises 1% to 65% by weight of the plurality of briquettes based on the total weight of the plurality of briquettes and the carbon source. In some embodiments, the mixture comprises 1% to 60% by weight of the plurality of briquettes based on the total weight of the plurality of briquettes and the carbon source. In some embodiments, the mixture comprises 1% to 55% by weight of the plurality of briquettes based on the total weight of the plurality of briquettes and the carbon source. In some embodiments, the mixture comprises 1% to 50% by weight of the plurality of briquettes based on the total weight of the plurality of briquettes and the carbon source. In some embodiments, the mixture comprises 1% to 45% by weight of the plurality of briquettes based on the total weight of the plurality of briquettes and the carbon source. In some embodiments, the mixture comprises 1% to 40% by weight of the plurality of briquettes based on the total weight of the plurality of briquettes and the carbon source. In some embodiments, the mixture comprises 1% to 35% by weight of the plurality of briquettes based on the total weight of the plurality of briquettes and the carbon source. In some embodiments, the mixture comprises 1% to 30% by weight of the plurality of briquettes based on the total weight of the plurality of briquettes and the carbon source. In some embodiments, the mixture comprises 1% to 25% by weight of the plurality of briquettes based on the total weight of the plurality of briquettes and the carbon source. In some embodiments, the mixture comprises 1% to 20% by weight of the plurality of briquettes based on the total weight of the plurality of briquettes and the carbon source. In some embodiments, the mixture comprises 1% to 15% by weight of the plurality of briquettes based on the total weight of the plurality of briquettes and the carbon source. In some embodiments, the mixture comprises 1% to 10% by weight of the plurality of briquettes based on the total weight of the plurality of briquettes and the carbon source. In some embodiments, the mixture comprises 1% to 5% by weight of the plurality of briquettes based on the total weight of the plurality of briquettes and the carbon source.

In some embodiments, the mixture comprises 5% to 99% by weight of the plurality of briquettes based on the total weight of the plurality of briquettes and the carbon source. In some embodiments, the mixture comprises 10% to 99% by weight of the plurality of briquettes based on the total weight of the plurality of briquettes and the carbon source. In some embodiments, the mixture comprises 15% to 99% by weight of the plurality of briquettes based on the total weight of the plurality of briquettes and the carbon source. In some embodiments, the mixture comprises 20% to 99% by weight of the plurality of briquettes based on the total weight of the plurality of briquettes and the carbon source. In some embodiments, the mixture comprises 25% to 99% by weight of the plurality of briquettes based on the total weight of the plurality of briquettes and the carbon source. In some embodiments, the mixture comprises 30% to 99% by weight of the plurality of briquettes based on the total weight of the plurality of briquettes and the carbon source. In some embodiments, the mixture comprises 35% to 99% by weight of the plurality of briquettes based on the total weight of the plurality of briquettes and the carbon source. In some embodiments, the mixture comprises 40% to 99% by weight of the plurality of briquettes based on the total weight of the plurality of briquettes and the carbon source. In some embodiments, the mixture comprises 45% to 99% by weight of the plurality of briquettes based on the total weight of the plurality of briquettes and the carbon source. In some embodiments, the mixture comprises 50% to 99% by weight of the plurality of briquettes based on the total weight of the plurality of briquettes and the carbon source. In some embodiments, the mixture comprises 55% to 99% by weight of the plurality of briquettes based on the total weight of the plurality of briquettes and the carbon source. In some embodiments, the mixture comprises 60% to 99% by weight of the plurality of briquettes based on the total weight of the plurality of briquettes and the carbon source. In some embodiments, the mixture comprises 65% to 99% by weight of the plurality of briquettes based on the total weight of the plurality of briquettes and the carbon source. In some embodiments, the mixture comprises 70% to 99% by weight of the plurality of briquettes based on the total weight of the plurality of briquettes and the carbon source. In some embodiments, the mixture comprises 75% to 99% by weight of the plurality of briquettes based on the total weight of the plurality of briquettes and the carbon source. In some embodiments, the mixture comprises 80% to 99% by weight of the plurality of briquettes based on the total weight of the plurality of briquettes and the carbon source. In some embodiments, the mixture comprises 85% to 99% by weight of the plurality of briquettes based on the total weight of the plurality of briquettes and the carbon source. In some embodiments, the mixture comprises 90% to 99% by weight of the plurality of briquettes based on the total weight of the plurality of briquettes and the carbon source. In some embodiments, the mixture comprises 95% to 99% by weight of the plurality of briquettes based on the total weight of the plurality of briquettes and the carbon source.

In some embodiments, the mixture comprises 1% to 99% by weight of the carbon source based on the total weight of the plurality of briquettes and the carbon source. In some embodiments, the mixture comprises 1% to 95% by weight of the carbon source based on the total weight of the plurality of briquettes and the carbon source. In some embodiments, the mixture comprises 1% to 90% by weight of the carbon source based on the total weight of the plurality of briquettes and the carbon source. In some embodiments, the mixture comprises 1% to 85% by weight of the carbon source based on the total weight of the plurality of briquettes and the carbon source. In some embodiments, the mixture comprises 1% to 80% by weight of the carbon source based on the total weight of the plurality of briquettes and the carbon source. In some embodiments, the mixture comprises 1% to 75% by weight of the carbon source based on the total weight of the plurality of briquettes and the carbon source. In some embodiments, the mixture comprises 1% to 70% by weight of the carbon source based on the total weight of the plurality of briquettes and the carbon source. In some embodiments, the mixture comprises 1% to 65% by weight of the carbon source based on the total weight of the plurality of briquettes and the carbon source. In some embodiments, the mixture comprises 1% to 60% by weight of the carbon source based on the total weight of the plurality of briquettes and the carbon source. In some embodiments, the mixture comprises 1% to 55% by weight of the carbon source based on the total weight of the plurality of briquettes and the carbon source. In some embodiments, the mixture comprises 1% to 50% by weight of the carbon source based on the total weight of the plurality of briquettes and the carbon source. In some embodiments, the mixture comprises 1% to 45% by weight of the carbon source based on the total weight of the plurality of briquettes and the carbon source. In some embodiments, the mixture comprises 1% to 40% by weight of the carbon source based on the total weight of the plurality of briquettes and the carbon source. In some embodiments, the mixture comprises 1% to 35% by weight of the carbon source based on the total weight of the plurality of briquettes and the carbon source. In some embodiments, the mixture comprises 1% to 30% by weight of the carbon source based on the total weight of the plurality of briquettes and the carbon source. In some embodiments, the mixture comprises 1% to 25% by weight of the carbon source based on the total weight of the plurality of briquettes and the carbon source. In some embodiments, the mixture comprises 1% to 20% by weight of the carbon source based on the total weight of the plurality of briquettes and the carbon source. In some embodiments, the mixture comprises 1% to 15% by weight of the carbon source based on the total weight of the plurality of briquettes and the carbon source. In some embodiments, the mixture comprises 1% to 10% by weight of the carbon source based on the total weight of the plurality of briquettes and the carbon source. In some embodiments, the mixture comprises 1% to 5% by weight of the carbon source based on the total weight of the plurality of briquettes and the carbon source.

In some embodiments, the mixture comprises 5% to 99% by weight of the carbon source based on the total weight of the plurality of briquettes and the carbon source. In some embodiments, the mixture comprises 10% to 99% by weight of the carbon source based on the total weight of the plurality of briquettes and the carbon source. In some embodiments, the mixture comprises 15% to 99% by weight of the carbon source based on the total weight of the plurality of briquettes and the carbon source. In some embodiments, the mixture comprises 20% to 99% by weight of the carbon source based on the total weight of the plurality of briquettes and the carbon source. In some embodiments, the mixture comprises 25% to 99% by weight of the carbon source based on the total weight of the plurality of briquettes and the carbon source. In some embodiments, the mixture comprises 30% to 99% by weight of the carbon source based on the total weight of the plurality of briquettes and the carbon source. In some embodiments, the mixture comprises 35% to 99% by weight of the carbon source based on the total weight of the plurality of briquettes and the carbon source. In some embodiments, the mixture comprises 40% to 99% by weight of the carbon source based on the total weight of the plurality of briquettes and the carbon source. In some embodiments, the mixture comprises 45% to 99% by weight of the carbon source based on the total weight of the plurality of briquettes and the carbon source. In some embodiments, the mixture comprises 50% to 99% by weight of the carbon source based on the total weight of the plurality of briquettes and the carbon source. In some embodiments, the mixture comprises 55% to 99% by weight of the carbon source based on the total weight of the plurality of briquettes and the carbon source. In some embodiments, the mixture comprises 60% to 99% by weight of the carbon source based on the total weight of the plurality of briquettes and the carbon source. In some embodiments, the mixture comprises 65% to 99% by weight of the carbon source based on the total weight of the plurality of briquettes and the carbon source. In some embodiments, the mixture comprises 70% to 99% by weight of the carbon source based on the total weight of the plurality of briquettes and the carbon source. In some embodiments, the mixture comprises 75% to 99% by weight of the carbon source based on the total weight of the plurality of briquettes and the carbon source. In some embodiments, the mixture comprises 80% to 99% by weight of the carbon source based on the total weight of the plurality of briquettes and the carbon source. In some embodiments, the mixture comprises 85% to 99% by weight of the carbon source based on the total weight of the plurality of briquettes and the carbon source. In some embodiments, the mixture comprises 90% to 99% by weight of the carbon source based on the total weight of the plurality of briquettes and the carbon source. In some embodiments, the mixture comprises 95% to 99% by weight of the carbon source based on the total weight of the plurality of briquettes and the carbon source.

In some embodiments, the plurality of briquettes is fed to the kiln in an amount sufficient to result in a reduction of 10% to 80% by weight of the carbon source fed to the kiln, relative to the amount of the carbon source having the same calorific value (e.g., the calorific value of "X") that would be required to be fed to a kiln in a control process, wherein the control process does not comprise feeding any briquettes to the kiln. In some embodiments, the plurality of briquettes is fed to the kiln in an amount sufficient to result in a reduction of 10% to 75% by weight of the carbon source fed to the kiln. In some embodiments, the plurality of briquettes is fed to the kiln in an amount sufficient to result in a reduction of 10% to 70% by weight of the carbon source fed to the kiln. In some embodiments, the plurality of briquettes is fed to the kiln in an amount sufficient to result in a reduction of 10% to 65% by weight of the carbon source fed to the kiln. In some embodiments, the plurality of briquettes is fed to the kiln in an amount sufficient to result in a reduction of 10% to 60% by weight of the carbon source fed to the kiln. In some embodiments, the plurality of briquettes is fed to the kiln in an amount sufficient to result in a reduction of 10% to 55% by weight of the carbon source fed to the kiln. In some embodiments, the plurality of briquettes is fed to the kiln in an amount sufficient to result in a reduction of 10% to 50% by weight of the carbon source fed to the kiln. In some embodiments, the plurality of briquettes is fed to the kiln in an amount sufficient to result in a reduction of 10% to 45% by weight of the carbon source fed to the kiln. In some embodiments, the plurality of briquettes is fed to the kiln in an amount sufficient to result in a reduction of 10% to 40% by weight of the carbon source fed to the kiln. In some embodiments, the plurality of briquettes is fed to the kiln in an amount sufficient to result in a reduction of 10% to 35% by weight of the carbon source fed to the kiln. In some embodiments, the plurality of briquettes is fed to the kiln in an amount sufficient to result in a reduction of 10% to 30% by weight of the carbon source fed to the kiln. In some embodiments, the plurality of briquettes is fed to the kiln in an amount sufficient to result in a reduction of 10% to 25% by weight of the carbon source fed to the kiln. In some embodiments, the plurality of briquettes is fed to the kiln in an amount sufficient to result in a reduction of 10% to 20% by weight of the carbon source fed to the kiln. In some embodiments, the plurality of briquettes is fed to the kiln in an amount sufficient to result in a reduction of 10% to 15% by weight of the carbon source fed to the kiln.

In some embodiments, the plurality of briquettes is fed to the kiln in an amount sufficient to result in a reduction of 15% to 80% by weight of the carbon source fed to the kiln. In some embodiments, the plurality of briquettes is fed to the kiln in an amount sufficient to result in a reduction of 20% to 80% by weight of the carbon source fed to the kiln. In some embodiments, the plurality of briquettes is fed to the kiln in an amount sufficient to result in a reduction of 25% to 80% by weight of the carbon source fed to the kiln. In some embodiments, the plurality of briquettes is fed to the kiln in an amount sufficient to result in a reduction of 30% to 80% by weight of the carbon source fed to the kiln. In some embodiments, the plurality of briquettes is fed to the kiln in an amount sufficient to result in a reduction of 35% to 80% by weight of the carbon source fed to the kiln. In some embodiments, the plurality of briquettes is fed to the kiln in an amount sufficient to result in a reduction of 40% to 80% by weight of the carbon source fed to the kiln. In some embodiments, the plurality of briquettes is fed to the kiln in an amount sufficient to result in a reduction of 45% to 80% by weight of the carbon source fed to the kiln. In some embodiments, the plurality of briquettes is fed to the kiln in an amount sufficient to result in a reduction of 50% to 80% by weight of the carbon source fed to the kiln. In some embodiments, the plurality of briquettes is fed to the kiln in an amount sufficient to result in a reduction of 55% to 80% by weight of the carbon source fed to the kiln. In some embodiments, the plurality of briquettes is fed to the kiln in an amount sufficient to result in a reduction of 60% to 80% by weight of the carbon source fed to the kiln. In some embodiments, the plurality of briquettes is fed to the kiln in an amount sufficient to result in a reduction of 65% to 80% by weight of the carbon source fed to the kiln. In some embodiments, the plurality of briquettes is fed to the kiln in an amount sufficient to result in a reduction of 70% to 80% by weight of the carbon source fed to the kiln. In some embodiments, the plurality of briquettes is fed to the kiln in an amount sufficient to result in a reduction of 75% to 80% by weight of the carbon source fed to the kiln.

Some embodiments relate to a composition. In some embodiments, the composition is useful for waterproofing applications. In some embodiments, the composition comprises an adhesive composition. In some embodiments, the composition comprises a sealant composition. In some embodiments, the composition comprises a liquid-applied formulation (e.g., liquid-applied roofing formulations). In some embodiments, the composition is incorporated into a roofing underlayment. In some embodiments, the composition is useful as a coating. In some embodiments, the composition is useful as coatings on asphalt driveways. In some embodiments, the composition is useful as a waterproof coating on building materials (e.g., basement walls and other materials, like cinder blocks, etc.). In some embodiments, the composition is useful as a base layer between aged pavement (e.g., damaged pavement or pavement otherwise in need of repair) and a new pavement. In some embodiments, the composition is provided as a highly filled stable emulsion that maintains water vapor permeability while improving at least one of an adhesive strength, a coefficient of thermal expansion (CTE), or any combination thereof. In some embodiments, the composition additionally or alternatively improves resistance to water. In some embodiments, the composition exhibits an improved evaporation rate, an improved water vapor permeability, an improved adhesive strength, an improved coefficient of thermal expansion, or any combination thereof, relative to conventional compositions, such as, for example and without limitation, conventional compositions with different amounts, or no, asphalt shingle waste.

In some embodiments, the composition comprises 5% to 50% by weight of an asphalt shingle waste based on a total weight of the composition. In some embodiments, the composition comprises 5% to 45% by weight of the asphalt shingle waste based on the total weight of the composition. In some embodiments, the composition comprises 5% to 40% by weight of the asphalt shingle waste based on the total weight of the composition. In some embodiments, the composition comprises 5% to 35% by weight of the asphalt shingle waste based on the total weight of the composition. In some embodiments, the composition comprises 5% to 30% by weight of the asphalt shingle waste based on the total weight of the composition. In some embodiments, the composition comprises 5% to 25% by weight of the asphalt shingle waste based on the total weight of the composition. In some embodiments, the composition comprises 5% to 20% by weight of the asphalt shingle waste based on the total weight of the composition. In some embodiments, the composition comprises 5% to 15% by weight of the asphalt shingle waste based on the total weight of the composition. In some embodiments, the composition comprises 5% to 10% by weight of the asphalt shingle waste based on the total weight of the composition.

In some embodiments, the composition comprises 10% to 50% by weight of the asphalt shingle waste based on the total weight of the composition. In some embodiments, the composition comprises 15% to 50% by weight of the asphalt shingle waste based on the total weight of the composition. In some embodiments, the composition comprises 20% to 50% by weight of the asphalt shingle waste based on the total weight of the composition. In some embodiments, the composition comprises 25% to 50% by weight of the asphalt shingle waste based on the total weight of the composition. In some embodiments, the composition comprises 30% to 50% by weight of the asphalt shingle waste based on the total weight of the composition. In some embodiments, the composition comprises 35% to 50% by weight of the asphalt shingle waste based on the total weight of the composition. In some embodiments, the composition comprises 40% to 50% by weight of the asphalt shingle waste based on the total weight of the composition. In some embodiments, the composition comprises 45% to 50% by weight of the asphalt shingle waste based on the total weight of the composition.

In some embodiments, the composition comprises 10% to 40% by weight of the asphalt shingle waste based on the total weight of the composition. In some embodiments, the composition comprises 15% to 35% by weight of the asphalt shingle waste based on the total weight of the composition. In some embodiments, the composition comprises 20% to 30% by weight of the asphalt shingle waste based on the total weight of the composition. In some embodiments, the composition comprises 10% to 35% by weight of the asphalt shingle waste based on the total weight of the composition. In some embodiments, the composition comprises 15% to 40% by weight of the asphalt shingle waste based on the total weight of the composition.

In some embodiments, the composition comprises 1% to 25% by weight of at least one filler material based on the total weight of the composition. In some embodiments, the composition comprises 1% to 24% by weight of the at least one filler material based on the total weight of the composition. In some embodiments, the composition comprises 1% to 22% by weight of the at least one filler material based on the total weight of the composition. In some embodiments, the composition comprises 1% to 20% by weight of the at least one filler material based on the total weight of the composition. In some embodiments, the composition comprises 1% to 18% by weight of the at least one filler material based on the total weight of the composition. In some embodiments, the composition comprises 1% to 16% by weight of the at least one filler material based on the total weight of the composition. In some embodiments, the composition comprises 1% to 15% by weight of the at least one filler material based on the total weight of the composition. In some embodiments, the composition comprises 1% to 14% by weight of the at least one filler material based on the total weight of the composition. In some embodiments, the composition comprises 1% to 12% by weight of the at least one filler material based on the total weight of the composition. In some embodiments, the composition comprises 1% to 10% by weight of the at least one filler material based on the total weight of the composition. In some embodiments, the composition comprises 1% to 8% by weight of the at least one filler material based on the total weight of the composition. In some embodiments, the composition comprises 1% to 6% by weight of the at least one filler material based on the total weight of the composition. In some embodiments, the composition comprises 1% to 5% by weight of the at least one filler material based on the total weight of the composition. In some embodiments, the composition comprises 1% to 4% by weight of the at least one filler material based on the total weight of the composition. In some embodiments, the composition comprises 1% to 2% by weight of the at least one filler material based on the total weight of the composition.

In some embodiments, the composition comprises 2% to 25% by weight of the at least one filler material based on the total weight of the composition. In some embodiments, the composition comprises 4% to 25% by weight of the at least one filler material based on the total weight of the composition. In some embodiments, the composition comprises 5% to 25% by weight of the at least one filler material based on the total weight of the composition. In some embodiments, the composition comprises 6% to 25% by weight of the at least one filler material based on the total weight of the composition. In some embodiments, the composition comprises 8% to 25% by weight of the at least one filler material based on the total weight of the composition. In some embodiments, the composition comprises 10% to 25% by weight of the at least one filler material based on the total weight of the composition. In some embodiments, the composition comprises 12% to 25% by weight of the at least one filler material based on the total weight of the composition. In some embodiments, the composition comprises 14% to 25% by weight of the at least one filler material based on the total weight of the composition. In some embodiments, the composition comprises 15% to 25% by weight of the at least one filler material based on the total weight of the composition. In some embodiments, the composition comprises 16% to 25% by weight of the at least one filler material based on the total weight of the composition. In some embodiments, the composition comprises 18% to 25% by weight of the at least one filler material based on the total weight of the composition. In some embodiments, the composition comprises 20% to 25% by weight of the at least one filler material based on the total weight of the composition. In some embodiments, the composition comprises 22% to 25% by weight of the at least one filler material based on the total weight of the composition. In some embodiments, the composition comprises 24% to 25% by weight of the at least one filler material based on the total weight of the composition.

In some embodiments, the composition comprises 1% to 15% by weight of at least one polymer based on the total weight of the composition. In some embodiments, the composition comprises 1% to 14% by weight of the at least one polymer based on the total weight of the composition. In some embodiments, the composition comprises 1% to 13% by weight of the at least one polymer based on the total weight of the composition. In some embodiments, the composition comprises 1% to 12% by weight of the at least one polymer based on the total weight of the composition. In some embodiments, the composition comprises 1% to 11% by weight of the at least one polymer based on the total weight of the composition. In some embodiments, the composition comprises 1% to 10% by weight of the at least one polymer based on the total weight of the composition. In some embodiments, the composition comprises 1% to 9% by weight of the at least one polymer based on the total weight of the composition. In some embodiments, the composition comprises 1% to 8% by weight of the at least one polymer based on the total weight of the composition. In some embodiments, the composition comprises 1% to 7% by weight of the at least one polymer based on the total weight of the composition. In some embodiments, the composition comprises 1% to 6% by weight of the at least one polymer based on the total weight of the composition. In some embodiments, the composition comprises 1% to 5% by weight of the at least one polymer based on the total weight of the composition. In some embodiments, the composition comprises 1% to 4% by weight of the at least one polymer based on the total weight of the composition. In some embodiments, the composition comprises 1% to 3% by weight of the at least one polymer based on the total weight of the composition. In some embodiments, the composition comprises 1% to 2% by weight of the at least one polymer based on the total weight of the composition.

In some embodiments, the composition comprises 2% to 15% by weight of the at least one polymer based on the total weight of the composition. In some embodiments, the composition comprises 3% to 15% by weight of the at least one polymer based on the total weight of the composition. In some embodiments, the composition comprises 4% to 15% by weight of the at least one polymer based on the total weight of the composition. In some embodiments, the composition comprises 5% to 15% by weight of the at least one polymer based on the total weight of the composition. In some embodiments, the composition comprises 6% to 15% by weight of the at least one polymer based on the total weight of the composition. In some embodiments, the composition comprises 7% to 15% by weight of the at least one polymer based on the total weight of the composition. In some embodiments, the composition comprises 8% to 15% by weight of the at least one polymer based on the total weight of the composition. In some embodiments, the composition comprises 9% to 15% by weight of the at least one polymer based on the total weight of the composition. In some embodiments, the composition comprises 10% to 15% by weight of the at least one polymer based on the total weight of the composition. In some embodiments, the composition comprises 11% to 15% by weight of the at least one polymer based on the total weight of the composition. In some embodiments, the composition comprises 12% to 15% by weight of the at least one polymer based on the total weight of the composition. In some embodiments, the composition comprises 13% to 15% by weight of the at least one polymer based on the total weight of the composition. In some embodiments, the composition comprises 14% to 15% by weight of the at least one polymer based on the total weight of the composition.

In some embodiments, the composition comprises 2% to 10% by weight of the at least one polymer based on the total weight of the composition. In some embodiments, the composition comprises 3% to 10% by weight of the at least one polymer based on the total weight of the composition. In some embodiments, the composition comprises 4% to 10% by weight of the at least one polymer based on the total weight of the composition. In some embodiments, the composition comprises 5% to 10% by weight of the at least one polymer based on the total weight of the composition. In some embodiments, the composition comprises 6% to 10% by weight of the at least one polymer based on the total weight of the composition. In some embodiments, the composition comprises 7% to 10% by weight of the at least one polymer based on the total weight of the composition. In some embodiments, the composition comprises 8% to 10% by weight of the at least one polymer based on the total weight of the composition. In some embodiments, the composition comprises 9% to 10% by weight of the at least one polymer based on the total weight of the composition.

In some embodiments, the composition comprises 2% to 9% by weight of the at least one polymer based on the total weight of the composition. In some embodiments, the composition comprises 2% to 8% by weight of the at least one polymer based on the total weight of the composition. In some embodiments, the composition comprises 2% to 7% by weight of the at least one polymer based on the total weight of the composition. In some embodiments, the composition comprises 2% to 6% by weight of the at least one polymer based on the total weight of the composition. In some embodiments, the composition comprises 2% to 5% by weight of the at least one polymer based on the total weight of the composition. In some embodiments, the composition comprises 2% to 4% by weight of the at least one polymer based on the total weight of the composition. In some embodiments, the composition comprises 2% to 3% by weight of the at least one polymer based on the total weight of the composition.

In some embodiments, the composition comprises 1% to 10% by weight of at least one stabilizer based on the total weight of the composition. In some embodiments, the composition comprises 1% to 9% by weight the of at least one stabilizer based on the total weight of the composition. In some embodiments, the composition comprises 1% to 8% by weight the of at least one stabilizer based on the total weight of the composition. In some embodiments, the composition comprises 1% to 7% by weight the of at least one stabilizer based on the total weight of the composition. In some embodiments, the composition comprises 1% to 6% by weight the of at least one stabilizer based on the total weight of the composition. In some embodiments, the composition comprises 1% to 5% by weight the of at least one stabilizer based on the total weight of the composition. In some embodiments, the composition comprises 1% to 4% by weight the of at least one stabilizer based on the total weight of the composition. In some embodiments, the composition comprises 1% to 3% by weight the of at least one stabilizer based on the total weight of the composition. In some embodiments, the composition comprises 1% to 2% by weight the of at least one stabilizer based on the total weight of the composition.

In some embodiments, the composition comprises 2% to 10% by weight the of at least one stabilizer based on the total weight of the composition. In some embodiments, the composition comprises 3% to 10% by weight the of at least one stabilizer based on the total weight of the composition. In some embodiments, the composition comprises 4% to 10% by weight the of at least one stabilizer based on the total weight of the composition. In some embodiments, the composition comprises 5% to 10% by weight the of at least one stabilizer based on the total weight of the composition. In some embodiments, the composition comprises 6% to 10% by weight the of at least one stabilizer based on the total weight of the composition. In some embodiments, the composition comprises 7% to 10% by weight the of at least one stabilizer based on the total weight of the composition. In some embodiments, the composition comprises 8% to 10% by weight the of at least one stabilizer based on the total weight of the composition. In some embodiments, the composition comprises 9% to 10% by weight the of at least one stabilizer based on the total weight of the composition.

In some embodiments, the composition comprises 1% to 15% by weight of at least one surfactant based on the total weight of the composition. In some embodiments, the composition comprises 1% to 14% by weight of the at least one surfactant based on the total weight of the composition. In some embodiments, the composition comprises 1% to 13% by weight of the at least one surfactant based on the total weight of the composition. In some embodiments, the composition comprises 1% to 12% by weight of the at least one surfactant based on the total weight of the composition. In some embodiments, the composition comprises 1% to 11% by weight of the at least one surfactant based on the total weight of the composition. In some embodiments, the composition comprises 1% to 10% by weight of the at least one surfactant based on the total weight of the composition. In some embodiments, the composition comprises 1% to 9% by weight of the at least one surfactant based on the total weight of the composition. In some embodiments, the composition comprises 1% to 8% by weight of the at least one surfactant based on the total weight of the composition. In some embodiments, the composition comprises 1% to 7% by weight of the at least one surfactant based on the total weight of the composition. In some embodiments, the composition comprises 1% to 6% by weight of the at least one surfactant based on the total weight of the composition. In some embodiments, the composition comprises 1% to 5% by weight of the at least one surfactant based on the total weight of the composition. In some embodiments, the composition comprises 1% to 4% by weight of the at least one surfactant based on the total weight of the composition. In some embodiments, the composition comprises 1% to 3% by weight of the at least one surfactant based on the total weight of the composition. In some embodiments, the composition comprises 1% to 2% by weight of the at least one surfactant based on the total weight of the composition.

In some embodiments, the composition comprises 2% to 15% by weight of the at least one surfactant based on the total weight of the composition. In some embodiments, the composition comprises 3% to 15% by weight of the at least one surfactant based on the total weight of the composition. In some embodiments, the composition comprises 4% to 15% by weight of the at least one surfactant based on the total weight of the composition. In some embodiments, the composition comprises 5% to 15% by weight of the at least one surfactant based on the total weight of the composition. In some embodiments, the composition comprises 6% to 15% by weight of the at least one surfactant based on the total weight of the composition. In some embodiments, the composition comprises 7% to 15% by weight of the at least one surfactant based on the total weight of the composition. In some embodiments, the composition comprises 8% to 15% by weight of the at least one surfactant based on the total weight of the composition. In some embodiments, the composition comprises 9% to 15% by weight of the at least one surfactant based on the total weight of the composition. In some embodiments, the composition comprises 10% to 15% by weight of the at least one surfactant based on the total weight of the composition. In some embodiments, the composition comprises 11% to 15% by weight of the at least one surfactant based on the total weight of the composition. In some embodiments, the composition comprises 12% to 15% by weight of the at least one surfactant based on the total weight of the composition. In some embodiments, the composition comprises 13% to 15% by weight of the at least one surfactant based on the total weight of the composition. In some embodiments, the composition comprises 14% to 15% by weight of the at least one surfactant based on the total weight of the composition. In some embodiments, the composition comprises 2% to 10% by weight of the at least one surfactant based on the total weight of the composition. In some embodiments, the composition comprises 3% to 7% by weight of the at least one surfactant based on the total weight of the composition.

In some embodiments, the composition is substantially free of a non-waste asphalt. In some embodiments, the composition is substantially free of a non-waste filler. In some embodiments, the composition is free of a non-waste asphalt. In some embodiments, the composition is free of a non-waste filler.

In some embodiments, when the composition is located between a roofing material and a roofing substrate, the composition exhibits a peel strength between the roofing material and the roofing substrate of 1 PLI to 30 PLI when tested according to ASTM D413. In some embodiments, when the composition is located between a roofing material and a roofing substrate, the composition exhibits a peel strength between the roofing material and the roofing substrate of 1 PLI to 25 PLI when tested according to ASTM D413. In some embodiments, when the composition is located between a roofing material and a roofing substrate, the composition exhibits a peel strength between the roofing material and the roofing substrate of 1 PLI to 20 PLI when tested according to ASTM D413. In some embodiments, when the composition is located between a roofing material and a roofing substrate, the composition exhibits a peel strength between the roofing material and the roofing substrate of 1 PLI to 15 PLI when tested according to ASTM D413. In some embodiments, when the composition is located between a roofing material and a roofing substrate, the composition exhibits a peel strength between the roofing material and the roofing substrate of 1 PLI to 10 PLI when tested according to ASTM D413. In some embodiments, when the composition is located between a roofing material and a roofing substrate, the composition exhibits a peel strength between the roofing material and the roofing substrate of 1 PLI to 5 PLI when tested according to ASTM D413.

In some embodiments, when the composition is located between a roofing material and a roofing substrate, the composition exhibits a peel strength between the roofing material and the roofing substrate of 5 PLI to 30 PLI when tested according to ASTM D413. In some embodiments, when the composition is located between a roofing material and a roofing substrate, the composition exhibits a peel strength between the roofing material and the roofing substrate of 10 PLI to 30 PLI when tested according to ASTM D413. In some embodiments, when the composition is located between a roofing material and a roofing substrate, the composition exhibits a peel strength between the roofing material and the roofing substrate of 15 PLI to 30 PLI when tested according to ASTM D413. In some embodiments, when the composition is located between a roofing material and a roofing substrate, the composition exhibits a peel strength between the roofing material and the roofing substrate of 20 PLI to 30 PLI when tested according to ASTM D413. In some embodiments, when the composition is located between a roofing material and a roofing substrate, the composition exhibits a peel strength between the roofing material and the roofing substrate of 25 PLI to 30 PLI when tested according to ASTM D413. In some embodiments, the composition is tested at a thickness of 10 mils to 100 mils (e.g., a thickness of 30 mils, etc.). In some embodiments, the peel strength is tested according to other testing methods that correlate the peel strength measured according to ASTM D413.

In some embodiments, the composition is tested at a thickness of 10 mils to 150 mils (e.g., a thickness of 30 mils, etc.). In some embodiments, the composition is tested at a thickness of 10 mils. In some embodiments, the composition is tested at a thickness of 15 mils. In some embodiments, the composition is tested at a thickness of mils. In some embodiments, the composition is tested at a thickness of 25 mils. In some embodiments, the composition is tested at a thickness of 30 mils. In some embodiments, the composition is tested at a thickness of 35 mils. In some embodiments, the composition is tested at a thickness of 40 mils. In some embodiments, the composition is tested at a thickness of 45 mils. In some embodiments, the composition is tested at a thickness of 50 mils. In some embodiments, the composition is tested at a thickness of 55 mils. In some embodiments, the composition is tested at a thickness of 60 mils. In some embodiments, the composition is tested at a thickness of 65 mils. In some embodiments, the composition is tested at a thickness of 70 mils. In some embodiments, the composition is tested at a thickness of 75 mils. In some embodiments, the composition is tested at a thickness of 80 mils. In some embodiments, the composition is tested at a thickness of 85 mils. In some embodiments, the composition is tested at a thickness of 90 mils. In some embodiments, the composition is tested at a thickness of 95 mils. In some embodiments, the composition is tested at a thickness of 100 mils. In some embodiments, the composition is tested at a thickness of 105 mils. In some embodiments, the composition is tested at a thickness of 110 mils. In some embodiments, the composition is tested at a thickness of 115 mils. In some embodiments, the composition is tested at a thickness of 120 mils. In some embodiments, the composition is tested at a thickness of 125 mils. In some embodiments, the composition is tested at a thickness of 130 mils. In some embodiments, the composition is tested at a thickness of 135 mils. In some embodiments, the composition is tested at a thickness of 140 mils. In some embodiments, the composition is tested at a thickness of 145 mils. In some embodiments, the composition is tested at a thickness of 150 mils. In some embodiments, the composition is tested at any thickness in a range of 10 mils to 150 mils.

In some embodiments, the composition has a thickness of 10 mils to 200 mils. In some embodiments, the composition has a thickness of 10 mils to 190 mils. In some embodiments, the composition has a thickness of 10 mils to 180 mils. In some embodiments, the composition has a thickness of 10 mils to 170 mils. In some embodiments, the composition has a thickness of 10 mils to 160 mils. In some embodiments, the composition has a thickness of 10 mils to 150 mils. In some embodiments, the composition has a thickness of 10 mils to 140 mils. In some embodiments, the composition has a thickness of 10 mils to 130 mils. In some embodiments, the composition has a thickness of 10 mils to 120 mils. In some embodiments, the composition has a thickness of 10 mils to 110 mils. In some embodiments, the composition has a thickness of 10 mils to 100 mils. In some embodiments, the composition has a thickness of 10 mils to 90 mils. In some embodiments, the composition has a thickness of 10 mils to 80 mils. In some embodiments, the composition has a thickness of 10 mils to 70 mils. In some embodiments, the composition has a thickness of 10 mils to 60 mils. In some embodiments, the composition has a thickness of 10 mils to 50 mils. In some embodiments, the composition has a thickness of 10 mils to 40 mils. In some embodiments, the composition has a thickness of 10 mils to 30 mils. In some embodiments, the composition has a thickness of 10 mils to 20 mils.

In some embodiments, the composition has a thickness of 20 mils to 200 mils. In some embodiments, the composition has a thickness of 30 mils to 200 mils. In some embodiments, the composition has a thickness of 40 mils to 200 mils. In some embodiments, the composition has a thickness of 50 mils to 200 mils. In some embodiments, the composition has a thickness of 60 mils to 200 mils. In some embodiments, the composition has a thickness of 70 mils to 200 mils. In some embodiments, the composition has a thickness of 80 mils to 200 mils. In some embodiments, the composition has a thickness of 90 mils to 200 mils. In some embodiments, the composition has a thickness of 100 mils to 200 mils. In some embodiments, the composition has a thickness of 110 mils to 200 mils. In some embodiments, the composition has a thickness of 120 mils to 200 mils. In some embodiments, the composition has a thickness of 130 mils to 200 mils. In some embodiments, the composition has a thickness of 140 mils to 200 mils. In some embodiments, the composition has a thickness of 150 mils to 200 mils. In some embodiments, the composition has a thickness of 160 mils to 200 mils. In some embodiments, the composition has a thickness of 170 mils to 200 mils. In some embodiments, the composition has a thickness of 180 mils to 200 mils. In some embodiments, the composition has a thickness of 190 mils to 200 mils.

In some embodiments, when tested according to ASTM 831, the composition exhibits a coefficient of thermal expansion that is 1% to 50% less than a coefficient of thermal expansion of a control composition, wherein the control composition does not comprise an asphalt shingle waste. In some embodiments, when tested according to ASTM 831, the composition exhibits a coefficient of thermal expansion that is 1% to 45% less than a coefficient of thermal expansion of a control composition, wherein the control composition does not comprise an asphalt shingle waste. In some embodiments, when tested according to ASTM 831, the composition exhibits a coefficient of thermal expansion that is 1% to 40% less than a coefficient of thermal expansion of a control composition, wherein the control composition does not comprise an asphalt shingle waste. In some embodiments, when tested according to ASTM 831, the composition exhibits a coefficient of thermal expansion that is 1% to 35% less than a coefficient of thermal expansion of a control composition, wherein the control composition does not comprise an asphalt shingle waste. In some embodiments, when tested according to ASTM 831, the composition exhibits a coefficient of thermal expansion that is 1% to 30% less than a coefficient of thermal expansion of a control composition, wherein the control composition does not comprise an asphalt shingle waste. In some embodiments, when tested according to ASTM 831, the composition exhibits a coefficient of thermal expansion that is 1% to 25% less than a coefficient of thermal expansion of a control composition, wherein the control composition does not comprise an asphalt shingle waste. In some embodiments, when tested according to ASTM 831, the composition exhibits a coefficient of thermal expansion that is 1% to 20% less than a coefficient of thermal expansion of a control composition, wherein the control composition does not comprise an asphalt shingle waste. In some embodiments, when tested according to ASTM 831, the composition exhibits a coefficient of thermal expansion that is 1% to 15% less than a coefficient of thermal expansion of a control composition, wherein the control composition does not comprise an asphalt shingle waste. In some embodiments, when tested according to ASTM 831, the composition exhibits a coefficient of thermal expansion that is 1% to 10% less than a coefficient of thermal expansion of a control composition, wherein the control composition does not comprise an asphalt shingle waste. In some embodiments, when tested according to ASTM 831, the composition exhibits a coefficient of thermal expansion that is 1% to 5% less than a coefficient of thermal expansion of a control composition, wherein the control composition does not comprise an asphalt shingle waste.

In some embodiments, when tested according to ASTM 831, the composition exhibits a coefficient of thermal expansion that is 5% to 50% less than a coefficient of thermal expansion of a control composition, wherein the control composition does not comprise an asphalt shingle waste. In some embodiments, when tested according to ASTM 831, the composition exhibits a coefficient of thermal expansion that is 10% to 50% less than a coefficient of thermal expansion of a control composition, wherein the control composition does not comprise an asphalt shingle waste. In some embodiments, when tested according to ASTM 831, the composition exhibits a coefficient of thermal expansion that is 15% to 50% less than a coefficient of thermal expansion of a control composition, wherein the control composition does not comprise an asphalt shingle waste. In some embodiments, when tested according to ASTM 831, the composition exhibits a coefficient of thermal expansion that is 20% to 50% less than a coefficient of thermal expansion of a control composition, wherein the control composition does not comprise an asphalt shingle waste. In some embodiments, when tested according to ASTM 831, the composition exhibits a coefficient of thermal expansion that is 25% to 50% less than a coefficient of thermal expansion of a control composition, wherein the control composition does not comprise an asphalt shingle waste. In some embodiments, when tested according to ASTM 831, the composition exhibits a coefficient of thermal expansion that is 30% to 50% less than a coefficient of thermal expansion of a control composition, wherein the control composition does not comprise an asphalt shingle waste. In some embodiments, when tested according to ASTM 831, the composition exhibits a coefficient of thermal expansion that is 35% to 50% less than a coefficient of thermal expansion of a control composition, wherein the control composition does not comprise an asphalt shingle waste. In some embodiments, when tested according to ASTM 831, the composition exhibits a coefficient of thermal expansion that is 40% to 50% less than a coefficient of thermal expansion of a control composition, wherein the control composition does not comprise an asphalt shingle waste. In some embodiments, when tested according to ASTM 831, the composition exhibits a coefficient of thermal expansion that is 45% to 50% less than a coefficient of thermal expansion of a control composition, wherein the control composition does not comprise an asphalt shingle waste.

In some embodiments, when tested according to ASTM 831, the composition exhibits a coefficient of thermal expansion that is 1% to 20% less than a coefficient of thermal expansion of a control composition, wherein the control composition does not comprise an asphalt shingle waste. In some embodiments, when tested according to ASTM 831, the composition exhibits a coefficient of thermal expansion that is 1% to 18% less than a coefficient of thermal expansion of a control composition, wherein the control composition does not comprise an asphalt shingle waste. In some embodiments, when tested according to ASTM 831, the composition exhibits a coefficient of thermal expansion that is 1% to 16% less than a coefficient of thermal expansion of a control composition, wherein the control composition does not comprise an asphalt shingle waste. In some embodiments, when tested according to ASTM 831, the composition exhibits a coefficient of thermal expansion that is 1% to 14% less than a coefficient of thermal expansion of a control composition, wherein the control composition does not comprise an asphalt shingle waste. In some embodiments, when tested according to ASTM 831, the composition exhibits a coefficient of thermal expansion that is 1% to 12% less than a coefficient of thermal expansion of a control composition, wherein the control composition does not comprise an asphalt shingle waste. In some embodiments, when tested according to ASTM 831, the composition exhibits a coefficient of thermal expansion that is 1% to 10% less than a coefficient of thermal expansion of a control composition, wherein the control composition does not comprise an asphalt shingle waste. In some embodiments, when tested according to ASTM 831, the composition exhibits a coefficient of thermal expansion that is 1% to 8% less than a coefficient of thermal expansion of a control composition, wherein the control composition does not comprise an asphalt shingle waste. In some embodiments, when tested according to ASTM 831, the composition exhibits a coefficient of thermal expansion that is 1% to 6% less than a coefficient of thermal expansion of a control composition, wherein the control composition does not comprise an asphalt shingle waste. In some embodiments, when tested according to ASTM 831, the composition exhibits a coefficient of thermal expansion that is 1% to 4% less than a coefficient of thermal expansion of a control composition, wherein the control composition does not comprise an asphalt shingle waste. In some embodiments, when tested according to ASTM 831, the composition exhibits a coefficient of thermal expansion that is 1% to 2% less than a coefficient of thermal expansion of a control composition, wherein the control composition does not comprise an asphalt shingle waste.

In some embodiments, when tested according to ASTM 831, the composition exhibits a coefficient of thermal expansion that is 2% to 20% less than a coefficient of thermal expansion of a control composition, wherein the control composition does not comprise an asphalt shingle waste. In some embodiments, when tested according to ASTM 831, the composition exhibits a coefficient of thermal expansion that is 4% to 20% less than a coefficient of thermal expansion of a control composition, wherein the control composition does not comprise an asphalt shingle waste. In some embodiments, when tested according to ASTM 831, the composition exhibits a coefficient of thermal expansion that is 6% to 20% less than a coefficient of thermal expansion of a control composition, wherein the control composition does not comprise an asphalt shingle waste. In some embodiments, when tested according to ASTM 831, the composition exhibits a coefficient of thermal expansion that is 8% to 20% less than a coefficient of thermal expansion of a control composition, wherein the control composition does not comprise an asphalt shingle waste. In some embodiments, when tested according to ASTM 831, the composition exhibits a coefficient of thermal expansion that is 10% to 20% less than a coefficient of thermal expansion of a control composition, wherein the control composition does not comprise an asphalt shingle waste. In some embodiments, when tested according to ASTM 831, the composition exhibits a coefficient of thermal expansion that is 12% to 20% less than a coefficient of thermal expansion of a control composition, wherein the control composition does not comprise an asphalt shingle waste. In some embodiments, when tested according to ASTM 831, the composition exhibits a coefficient of thermal expansion that is 14% to 20% less than a coefficient of thermal expansion of a control composition, wherein the control composition does not comprise an asphalt shingle waste. In some embodiments, when tested according to ASTM 831, the composition exhibits a coefficient of thermal expansion that is 16% to 20% less than a coefficient of thermal expansion of a control composition, wherein the control composition does not comprise an asphalt shingle waste. In some embodiments, when tested according to ASTM 831, the composition exhibits a coefficient of thermal expansion that is 18% to 20% less than a coefficient of thermal expansion of a control composition, wherein the control composition does not comprise an asphalt shingle waste.

In some embodiments, the composition has a water vapor permeability of 1 perm to 9.9 perms as measured according to ASTM E96B. In some embodiments, the composition has a water vapor permeability of 1 perm to 9.5 perms as measured according to ASTM E96B. In some embodiments, the composition has a water vapor permeability of 1 perm to 9 perms as measured according to ASTM E96B. In some embodiments, the composition has a water vapor permeability of 1 perm to 8.5 perms as measured according to ASTM E96B. In some embodiments, the composition has a water vapor permeability of 1 perm to 8 perms as measured according to ASTM E96B. In some embodiments, the composition has a water vapor permeability of 1 perm to 7.5 perms as measured according to ASTM E96B. In some embodiments, the composition has a water vapor permeability of 1 perm to 7 perms as measured according to ASTM E96B. In some embodiments, the composition has a water vapor permeability of 1 perm to 6.5 perms as measured according to ASTM E96B. In some embodiments, the composition has a water vapor permeability of 1 perm to 6 perms as measured according to ASTM E96B. In some embodiments, the composition has a water vapor permeability of 1 perm to 5.5 perms as measured according to ASTM E96B. In some embodiments, the composition has a water vapor permeability of 1 perm to 5 perms as measured according to ASTM E96B. In some embodiments, the composition has a water vapor permeability of 1 perm to 4.5 perms as measured according to ASTM E96B. In some embodiments, the composition has a water vapor permeability of 1 perm to 4 perms as measured according to ASTM E96B. In some embodiments, the composition has a water vapor permeability of 1 perm to 3.5 perms as measured according to ASTM E96B. In some embodiments, the composition has a water vapor permeability of 1 perm to 3 perms as measured according to ASTM E96B. In some embodiments, the composition has a water vapor permeability of 1 perm to 2.5 perms as measured according to ASTM E96B. In some embodiments, the composition has a water vapor permeability of 1 perm to 2 perms as measured according to ASTM E96B. In some embodiments, the composition has a water vapor permeability of 1 perm to 1.5 perms as measured according to ASTM E96B.

In some embodiments, the composition has a water vapor permeability of 1.1 perm to 10 perms as measured according to ASTM E96B. In some embodiments, the composition has a water vapor permeability of 1.5 perms to 10 perms as measured according to ASTM E96B. In some embodiments, the composition has a water vapor permeability of 2 perms to 10 perms as measured according to ASTM E96B. In some embodiments, the composition has a water vapor permeability of 2.5 perms to 10 perms as measured according to ASTM E96B. In some embodiments, the composition has a water vapor permeability of 3 perms to 10 perms as measured according to ASTM E96B. In some embodiments, the composition has a water vapor permeability of 3.5 perms to 10 perms as measured according to ASTM E96B. In some embodiments, the composition has a water vapor permeability of 4 perms to 10 perms as measured according to ASTM E96B. In some embodiments, the composition has a water vapor permeability of 4.5 perms to 10 perms as measured according to ASTM E96B. In some embodiments, the composition has a water vapor permeability of 5 perms to 10 perms as measured according to ASTM E96B. In some embodiments, the composition has a water vapor permeability of 5.5 perms to 10 perms as measured according to ASTM E96B. In some embodiments, the composition has a water vapor permeability of 6 perms to 10 perms as measured according to ASTM E96B. In some embodiments, the composition has a water vapor permeability of 6.5 perms to 10 perms as measured according to ASTM E96B. In some embodiments, the composition has a water vapor permeability of 7 perms to 10 perms as measured according to ASTM E96B. In some embodiments, the composition has a water vapor permeability of 7.5 perms to 10 perms as measured according to ASTM E96B. In some embodiments, the composition has a water vapor permeability of 8 perms to 10 perms as measured according to ASTM E96B. In some embodiments, the composition has a water vapor permeability of 8.5 perms to 10 perms as measured according to ASTM E96B. In some embodiments, the composition has a water vapor permeability of 9 perms to 10 perms as measured according to ASTM E96B. In some embodiments, the composition has a water vapor permeability of 9.5 perms to 10 perms as measured according to ASTM E96B.

In some embodiments, the composition has a water vapor permeability of 10 perms to 100 perms as measured according to ASTM E96B. In some embodiments, the composition has a water vapor permeability of 15 perms to 100 perms as measured according to ASTM E96B. In some embodiments, the composition has a water vapor permeability of 20 perms to 100 perms as measured according to ASTM E96B. In some embodiments, the composition has a water vapor permeability of 30 perms to 100 perms as measured according to ASTM E96B. In some embodiments, the composition has a water vapor permeability of 40 perms to 100 perms as measured according to ASTM E96B. In some embodiments, the composition has a water vapor permeability of 50 perms to 100 perms as measured according to ASTM E96B. In some embodiments, the composition has a water vapor permeability of 60 perms to 100 perms as measured according to ASTM E96B. In some embodiments, the composition has a water vapor permeability of 70 perms to 100 perms as measured according to ASTM E96B. In some embodiments, the composition has a water vapor permeability of 80 perms to 100 perms as measured according to ASTM E96B. In some embodiments, the composition has a water vapor permeability of 90 perms to 100 perms as measured according to ASTM E96B. In some embodiments, the composition has a water vapor permeability of perms to 100 perms as measured according to ASTM E96B.

In some embodiments, the composition has a water vapor permeability of 10 perms to 90 perms as measured according to ASTM E96B. In some embodiments, the composition has a water vapor permeability of 10 perms to 80 perms as measured according to ASTM E96B. In some embodiments, the composition has a water vapor permeability of 10 perms to 70 perms as measured according to ASTM E96B. In some embodiments, the composition has a water vapor permeability of 10 perms to 60 perms as measured according to ASTM E96B. In some embodiments, the composition has a water vapor permeability of 10 perms to 50 perms as measured according to ASTM E96B. In some embodiments, the composition has a water vapor permeability of 10 perms to 40 perms as measured according to ASTM E96B. In some embodiments, the composition has a water vapor permeability of 10 perms to 30 perms as measured according to ASTM E96B. In some embodiments, the composition has a water vapor permeability of 10 perms to 20 perms as measured according to ASTM E96B. In some embodiments, the water vapor permeability is tested according to other testing methods that correlate the water vapor permeability measured according to ASTM D413.

In some embodiments, the asphalt shingle waste and/or the waste filler portion of the asphalt shingle waste reduces an amount of the at least one filler material required to be present in the composition. In some embodiments, the percent reduction in the amount of the at least one filler material required to be present in the composition is relative to a control composition that comprises the at least one filler material, wherein the control composition does not comprise the asphalt shingle waste and/or the waste filler portion of the asphalt shingle waste. In some embodiments, the percent reduction in the amount of the at least one filler material required to be present in the composition is in reference to at least one property (e.g., including, for example and without limitation, any one or more of the properties disclosed herein, such as, for example and without limitation, an adhesion strength or a peel strength, a coefficient of thermal expansion, a water vapor permeability, etc.).

In some embodiments, the asphalt shingle waste is present the composition in an amount sufficient to result in a reduction of 1% to 25% by weight of the at least one filler material, relative to the amount of the at least one filler material that would be required to be present in a control composition having same or similar property as the composition, wherein the control composition does not comprise an asphalt shingle waste. In some embodiments, for example, the control composition, which does not comprise asphalt shingle waste, requires "X" amount of the at least one filler material to achieve a property; whereas the composition disclosed herein achieves the property with less of the at least one filler material. In some embodiments, the percent reduction by weight of the at least one filler material refers to the difference in the weight percentage of the at least one filler material present in the control composition based on the total weight of the control composition, and the weight percentage of the at least one filler material present in the composition based on the total weight of the composition. In some embodiments, the asphalt shingle waste reduces the amount of the at least one filler material by 1% to 24% by weight based on the total weight of the composition. In some embodiments, the asphalt shingle waste reduces the amount of the at least one filler material by 1% to 23% by weight based on the total weight of the composition. In some embodiments, the asphalt shingle waste reduces the amount of the at least one filler material by 1% to 22% by weight based on the total weight of the composition. In some embodiments, the asphalt shingle waste reduces the amount of the at least one filler material by 1% to 21% by weight based on the total weight of the composition. In some embodiments, the asphalt shingle waste reduces an amount of the at least one filler material by 1% to 20% by weight based on a total weight of the composition. In some embodiments, the asphalt shingle waste reduces the amount of the at least one filler material by 1% to 19% by weight based on the total weight of the composition. In some embodiments, the asphalt shingle waste reduces the amount of the at least one filler material by 1% to 18% by weight based on the total weight of the composition. In some embodiments, the asphalt shingle waste reduces the amount of the at least one filler material by 1% to 17% by weight based on the total weight of the composition. In some embodiments, the asphalt shingle waste reduces the amount of the at least one filler material by 1% to 16% by weight based on the total weight of the composition. In some embodiments, the asphalt shingle waste reduces the amount of the at least one filler material by 1% to 15% by weight based on the total weight of the composition. In some embodiments, the asphalt shingle waste reduces the amount of the at least one filler material by 1% to 14% by weight based on the total weight of the composition. In some embodiments, the asphalt shingle waste reduces the amount of the at least one filler material by 1% to 13% by weight based on the total weight of the composition. In some embodiments, the asphalt shingle waste reduces the amount of the at least one filler material by 1% to 12% by weight based on the total weight of the composition. In some embodiments, the asphalt shingle waste reduces the amount of the at least one filler material by 1% to 11% by weight based on the total weight of the composition. In some embodiments, the asphalt shingle waste reduces the amount of the at least one filler material by 1% to 10% by weight based on the total weight of the composition. In some embodiments, the asphalt shingle waste reduces the amount of the at least one filler material by 1% to 9% by weight based on the total weight of the composition. In some embodiments, the asphalt shingle waste reduces the amount of the at least one filler material by 1% to 8% by weight based on the total weight of the composition. In some embodiments, the asphalt shingle waste reduces the amount of the at least one filler material by 1% to 7% by weight based on the total weight of the composition. In some embodiments, the asphalt shingle waste reduces the amount of the at least one filler material by 1% to 6% by weight based on the total weight of the composition. In some embodiments, the asphalt shingle waste reduces the amount of the at least one filler material by 1% to 5% by weight based on the total weight of the composition. In some embodiments, the asphalt shingle waste reduces the amount of the at least one filler material by 1% to 4% by weight based on the total weight of the composition. In some embodiments, the asphalt shingle waste reduces the amount of the at least one filler material by 1% to 3% by weight based on the total weight of the composition.

In some embodiments, the asphalt shingle waste reduces the amount of the at least one filler material by 2% to 25% by weight based on the total weight of the composition. In some embodiments, the asphalt shingle waste reduces the amount of the at least one filler material by 3% to 25% by weight based on the total weight of the composition. In some embodiments, the asphalt shingle waste reduces the amount of the at least one filler material by 4% to 25% by weight based on the total weight of the composition. In some embodiments, the asphalt shingle waste reduces the amount of the at least one filler material by 5% to 25% by weight based on the total weight of the composition. In some embodiments, the asphalt shingle waste reduces the amount of the at least one filler material by 6% to 25% by weight based on the total weight of the composition. In some embodiments, the asphalt shingle waste reduces the amount of the at least one filler material by 7% to 25% by weight based on the total weight of the composition. In some embodiments, the asphalt shingle waste reduces the amount of the at least one filler material by 8% to 25% by weight based on the total weight of the composition. In some embodiments, the asphalt shingle waste reduces the amount of the at least one filler material by 9% to 25% by weight based on the total weight of the composition. In some embodiments, the asphalt shingle waste reduces the amount of the at least one filler material by 10% to 25% by weight based on the total weight of the composition. In some embodiments, the asphalt shingle waste reduces the amount of the at least one filler material by 11% to 25% by weight based on the total weight of the composition. In some embodiments, the asphalt shingle waste reduces the amount of the at least one filler material by 12% to 25% by weight based on the total weight of the composition. In some embodiments, the asphalt shingle waste reduces the amount of the at least one filler material by 13% to 25% by weight based on the total weight of the composition. In some embodiments, the asphalt shingle waste reduces the amount of the at least one filler material by 14% to 25% by weight based on the total weight of the composition. In some embodiments, the asphalt shingle waste reduces the amount of the at least one filler material by 15% to 25% by weight based on the total weight of the composition. In some embodiments, the asphalt shingle waste reduces the amount of the at least one filler material by 16% to 25% by weight based on the total weight of the composition. In some embodiments, the asphalt shingle waste reduces the amount of the at least one filler material by 17% to 25% by weight based on the total weight of the composition. In some embodiments, the asphalt shingle waste reduces the amount of the at least one filler material by 18% to 25% by weight based on the total weight of the composition. In some embodiments, the asphalt shingle waste reduces the amount of the at least one filler material by 19% to 25% by weight based on the total weight of the composition. In some embodiments, the asphalt shingle waste reduces the amount of the at least one filler material by 20% to 25% by weight based on the total weight of the composition. In some embodiments, the asphalt shingle waste reduces the amount of the at least one filler material by 21% to 25% by weight based on the total weight of the composition. In some embodiments, the asphalt shingle waste reduces the amount of the at least one filler material by 22% to 25% by weight based on the total weight of the composition. In some embodiments, the asphalt shingle waste reduces the amount of the at least one filler material by 23% to 25% by weight based on the total weight of the composition. In some embodiments, the asphalt shingle waste reduces the amount of the at least one filler material by 24% to 25% by weight based on the total weight of the composition.

In some embodiments, the asphalt shingle waste reduces the amount of the at least one filler material while also maintaining or enhancing at least one property of the composition. In some embodiments, the at least one property comprises a water vapor permeability. In some embodiments, the at least one property comprises a cure rate. In some embodiments, the at least one property comprises an evaporation rate. In some embodiments, the at least one property comprises an adhesive strength. In some embodiments, the at least one property comprises a coefficient of thermal expansion.

Some embodiments relate to a roofing underlayment. In some embodiments, the roofing underlay comprises a first layer. In some embodiments, the first layer comprises a substrate. In some embodiments, the substrate comprises any one or more of the substrates disclosed herein. In some embodiments, the roofing underlayment comprises a second layer. In some embodiments, the second layer is located on the first layer. In some embodiments, the second layer covers the first layer. In some embodiments, the second layer directly contacts the first layer. In some embodiments, the second layer is adhered to the first layer. In some embodiments, the second layer is bonded to the first layer. In some embodiments, the second layer comprises a composition. In some embodiments, the composition comprises any one or more of the compositions disclosed herein. In some embodiments, when the roofing underlayment is installed on a roofing substrate, the second layer adheres the roofing underlayment to the roofing substrate. In some embodiments, the roofing underlayment, prior to being installed on the roofing substrate, comprises a release liner, wherein the release liner covers the second layer. In some embodiments, the roofing substrate comprises any one or more of the roofing substrates disclosed herein. Some embodiments relate to a roofing system comprising the roofing substrate, and the roofing underlayment is located on the roofing substrate, wherein the second layer of the roofing underlayment adheres the roofing underlayment to the roofing substrate. In some embodiments, the roofing substrate comprises any one or more of the roofing substrates disclosed herein.

Some embodiments relate to a liquid applied roofing formulation. In some embodiments, the liquid applied roofing formulation comprises a composition. In some embodiments, the composition comprises any one or more of the compositions disclosed herein. Some embodiments relate to a roofing system comprising a roofing substrate, and a cured liquid applied roofing formulation, wherein the cured liquid applied roofing formulation is located on the roofing substrate. In some embodiments, the roofing substrate comprises any one or more of the roofing substrates disclosed herein.

Some embodiments relate to a method of making a composition. In some embodiments, the method comprises one or more of the following steps: obtaining at least one of an asphalt shingle waste, at least one filler material, at least one polymer, at least one stabilizer, at least one surfactant, or any combination thereof; feeding at least one of the asphalt shingle waste, the at least one filler material, the at least one polymer, the at least one stabilizer, the at least one surfactant, or any combination thereof, to a mixer; mixing at least one of the asphalt shingle waste, the at least one filler material, the at least one polymer, the at least one stabilizer, the at least one surfactant, or any combination thereof, in the mixer to form a composition. In some embodiments, the composition comprises any one or more of the compositions disclosed herein.

Some embodiments relate to a method of making a composition. In some embodiments, the method comprises one or more of the following steps: obtaining at least one of a plurality of a briquettes, at least one filler material, at least one polymer, at least one stabilizer, at least one surfactant, or any combination thereof; feeding at least one of the plurality of briquettes, the at least one filler material, the at least one polymer, the at least one stabilizer, the at least one surfactant, or any combination thereof, to a mixer; mixing at least one of the plurality of briquettes, the at least one filler material, the at least one polymer, the at least one stabilizer, the at least one surfactant, or any combination thereof, in the mixer to form a composition. In some embodiments, the composition comprises any one or more of the compositions disclosed herein.

Some embodiments relate to a method of making a composition. In some embodiments, the method comprises one or more of the following steps: obtaining at least one of an asphalt shingle waste powder, at least one filler material, at least one polymer, at least one stabilizer, at least one surfactant, or any combination thereof; feeding at least one of the asphalt shingle waste powder, the at least one filler material, the at least one polymer, the at least one stabilizer, the at least one surfactant, or any combination thereof, to a mixer; mixing at least one of the asphalt shingle waste powder, the at least one filler material, the at least one polymer, the at least one stabilizer, the at least one surfactant, or any combination thereof, in the mixer to form a composition. In some embodiments, the composition comprises any one or more of the compositions disclosed herein. In some embodiments, prior to obtaining the asphalt shingle waste powder, the method comprises obtaining a plurality of briquettes, wherein the plurality of briquettes comprises a pressurized asphalt shingle waste powder; and forming the plurality of briquettes into the asphalt shingle waste powder.

In some embodiments, the feeding comprises at least one of supplying, flowing, conveying, introducing, delivering, providing, pumping, dispensing, passing, injecting, or any combination thereof.

In some embodiments, the mixing comprises at least one of contacting, combining, agitating, stirring, tumbling, sonicating, or any combination thereof, among other techniques for mixing two or more components together. In some embodiments, the mixing is conducted on a substantially standard manufacturing line for asphaltic shingles at a standard speed, ranging from 110 FPM to 1000 FPM. In some embodiments, the mixer is a low shear mixer. In some embodiments, the mixer is a high shear mixer. In some embodiments, the composition is prepared by mixing the various components using at least one of static mixing, a low shear mixer, a high shear mixer, or any combination thereof. A non-limiting example of a low shear mixer is EUROSTAR® 60 Digital, IKA Works, Inc., Wilmington, NC, which mixes batches at about 500 to 1500 RPM, with a paddle-type blade to generate low shear. A non-limiting example of a high shear mixer is SILVERSON® L5M-A Laboratory Mixer, Silverson Machines, Inc., East Longmeadow, MA, which mixes batches at or above 3200 RPM, with a blade and a head that are configured to generate high shear, as well as heat mixing. In some embodiments, the mixing is conducted at an ambient temperature (e.g., about 70° Fahrenheit). In some embodiments, the mixing is conducted at a temperature of 300° F. to 425° F.

In some embodiments, the mixing is conducted at a temperature of 300° F. to 450° F. In some embodiments, the mixing is conducted at a temperature of 305° F. to 450° F. In some embodiments, the mixing is conducted at a temperature of 310° F. to 450° F. In some embodiments, the mixing is conducted at a temperature of 315° F. to 450° F. In some embodiments, the mixing is conducted at a temperature of 320° F. to 450° F. In some embodiments, the mixing is conducted at a temperature of 325° F. to 450° F. In some embodiments, the mixing is conducted at a temperature of 330° F. to 450° F. In some embodiments, the mixing is conducted at a temperature of 335° F. to 450° F. In some embodiments, the mixing is conducted at a temperature of 340° F. to 450° F. In some embodiments, the mixing is conducted at a temperature of 345° F. to 450° F. In some embodiments, the mixing is conducted at a temperature of 350° F. to 450° F. In some embodiments, the mixing is conducted at a temperature of 355° F. to 450° F. In some embodiments, the mixing is conducted at a temperature of 360° F. to 450° F. In some embodiments, the mixing is conducted at a temperature of 365° F. to 450° F. In some embodiments, the mixing is conducted at a temperature of 370° F. to 450° F. In some embodiments, the mixing is conducted at a temperature of 375° F. to 450° F. In some embodiments, the mixing is conducted at a temperature of 380° F. to 450° F. In some embodiments, the mixing is conducted at a temperature of 385° F. to 450° F. In some embodiments, the mixing is conducted at a temperature of 390° F. to 450° F. In some embodiments, the mixing is conducted at a temperature of 395° F. to 450° F. In some embodiments, the mixing is conducted at a temperature of 400° F. to 450° F. In some embodiments, the mixing is conducted at a temperature of 405° F. to 450° F. In some embodiments, the mixing is conducted at a temperature of 410° F. to 450° F. In some embodiments, the mixing is conducted at a temperature of 415° F. to 450° F. In some embodiments, the mixing is conducted at a temperature of 420° F. to 450° F.

In some embodiments, the mixing is conducted at a temperature of 300° F. to 305° F. In some embodiments, the mixing is conducted at a temperature of 300° F. to 310° F. In some embodiments, the mixing is conducted at a temperature of 300° F. to 315° F. In some embodiments, the mixing is conducted at a temperature of 300° F. to 320° F. In some embodiments, the mixing is conducted at a temperature of 300° F. to 325° F. In some embodiments, the mixing is conducted at a temperature of 300° F. to 330° F. In some embodiments, the mixing is conducted at a temperature of 300° F. to 335° F. In some embodiments, the mixing is conducted at a temperature of 300° F. to 340° F. In some embodiments, the mixing is conducted at a temperature of 300° F. to 345° F. In some embodiments, the mixing is conducted at a temperature of 300° F. to 350° F. In some embodiments, the mixing is conducted at a temperature of 300° F. to 355° F. In some embodiments, the mixing is conducted at a temperature of 300° F. to 360° F. In some embodiments, the mixing is conducted at a temperature of 300° F. to 365° F. In some embodiments, the mixing is conducted at a temperature of 300° F. to 370° F. In some embodiments, the mixing is conducted at a temperature of 300° F. to 375° F. In some embodiments, the mixing is conducted at a temperature of 300° F. to 380° F. In some embodiments, the mixing is conducted at a temperature of 300° F. to 385° F. In some embodiments, the mixing is conducted at a temperature of 300° F. to 390° F. In some embodiments, the mixing is conducted at a temperature of 300° F. to 395° F. In some embodiments, the mixing is conducted at a temperature of 300° F. to 400° F. In some embodiments, the mixing is conducted at a temperature of 300° F. to 405° F. In some embodiments, the mixing is conducted at a temperature of 300° F. to 410° F. In some embodiments, the mixing is conducted at a temperature of 300° F. to 415° F. In some embodiments, the mixing is conducted at a temperature of 300° F. to 420° F. In some embodiments, the mixing is conducted at a temperature of 300° F. to 425° F. In some embodiments, the mixing is conducted at a temperature of 300° F. to 450° F.

In some embodiments, the mixing is conducted in an extruder and/or a high shear mixer at 330° F. to 425° F., and then the composition is discharged from the high shear mixer at 330° F. to 410° F. and roll pressed into sheets. In some embodiments, the composition is discharged from the mixer at a temperature of 330° F. to 400° F. In some embodiments, the composition is discharged from the mixer at a temperature of 330° F. to 390° F. In some embodiments, the composition is discharged from the mixer at a temperature of 330° F. to 380° F. In some embodiments, the composition is discharged from the mixer at a temperature of 330° F. to 375° F. In some embodiments, the composition is discharged from the mixer at a temperature of 330° F. to 360° F. In some embodiments, the composition is discharged from the mixer at a temperature of 330° F. to 350° F. In some embodiments, the composition is discharged from the mixer at a temperature of 330° F. to 340° F. In some embodiments, the composition is pressed into a glass mat. According to one embodiment, once the composition is roll pressed, it is capped with granules and cut to the desired shape.

In some embodiments, any one or more of the methods disclosed herein further comprise a step of forming at least one of a sealant product, an adhesive product, a waterproofing product, a coating product, a liquid-applied roofing product, a roofing material product (e.g., a roofing underlayment, etc). a coating product, or any combination thereof. In some embodiments, the forming comprising applying the composition to a substrate, such as, for example and without limitation, any one or more of the substrates disclosed herein, including roofing substrates and reinforcement layers, etc.

In some embodiments, the applying comprises coating the composition on the substrate. In some embodiments, the applying comprises dispensing the composition on the substrate. In some embodiments, the applying comprises extruding the composition onto a substrate. In some embodiments, the applying comprises immersing the substrate in the composition. In some embodiments, the applying comprises contacting the composition with the substrate. In some embodiments, the applying comprises brushing the composition onto the substrate. In some embodiments, the applying comprises rolling the composition onto the substrate. In some embodiments, the applying comprises pouring the composition onto the substrate. In some embodiments, the applying comprises spraying the composition onto the substrate. In some embodiments, the applying comprises another technique for bringing the composition into direct or indirect contact with the substrate.

Some embodiments relate to a drilling fluid. In some embodiments, the drilling fluid comprises 1% to 10% by weight of at least one rheology modifier based on a total weight of the drilling fluid. In some embodiments, the drilling fluid comprises 1% to 9% by weight of the at least one rheology modifier based on the total weight of the drilling fluid. In some embodiments, the drilling fluid comprises 1% to 8% by weight of the at least one rheology modifier based on the total weight of the drilling fluid. In some embodiments, the drilling fluid comprises 1% to 7% by weight of the at least one rheology modifier based on the total weight of the drilling fluid. In some embodiments, the drilling fluid comprises 1% to 6% by weight of the at least one rheology modifier based on the total weight of the drilling fluid. In some embodiments, the drilling fluid comprises 1% to 5% by weight of the at least one rheology modifier based on the total weight of the drilling fluid. In some embodiments, the drilling fluid comprises 1% to 4% by weight of the at least one rheology modifier based on the total weight of the drilling fluid. In some embodiments, the drilling fluid comprises 1% to 3% by weight of the at least one rheology modifier based on the total weight of the drilling fluid. In some embodiments, the drilling fluid comprises 1% to 2% by weight of the at least one rheology modifier based on the total weight of the drilling fluid.

In some embodiments, the drilling fluid comprises 2% to 10% by weight of the at least one rheology modifier based on the total weight of the drilling fluid. In some embodiments, the drilling fluid comprises 3% to 10% by weight of the at least one rheology modifier based on the total weight of the drilling fluid. In some embodiments, the drilling fluid comprises 4% to 10% by weight of the at least one rheology modifier based on the total weight of the drilling fluid. In some embodiments, the drilling fluid comprises 5% to 10% by weight of the at least one rheology modifier based on the total weight of the drilling fluid. In some embodiments, the drilling fluid comprises 6% to 10% by weight of the at least one rheology modifier based on the total weight of the drilling fluid. In some embodiments, the drilling fluid comprises 7% to 10% by weight of the at least one rheology modifier based on the total weight of the drilling fluid. In some embodiments, the drilling fluid comprises 8% to 10% by weight of the at least one rheology modifier based on the total weight of the drilling fluid. In some embodiments, the drilling fluid comprises 9% to 10% by weight of the at least one rheology modifier based on the total weight of the drilling fluid.

In some embodiments, the drilling fluid comprises 1% to 10% by weight of at least one fluid loss reducer based on the total weight of the drilling fluid. In some embodiments, the drilling fluid comprises 1% to 9% by weight of the at least one fluid loss reducer based on the total weight of the drilling fluid. In some embodiments, the drilling fluid comprises 1% to 8% by weight of the at least one fluid loss reducer based on the total weight of the drilling fluid. In some embodiments, the drilling fluid comprises 1% to 7% by weight of the at least one fluid loss reducer based on the total weight of the drilling fluid. In some embodiments, the drilling fluid comprises 1% to 6% by weight of the at least one fluid loss reducer based on the total weight of the drilling fluid. In some embodiments, the drilling fluid comprises 1% to 5% by weight of the at least one fluid loss reducer based on the total weight of the drilling fluid. In some embodiments, the drilling fluid comprises 1% to 4% by weight of the at least one fluid loss reducer based on the total weight of the drilling fluid. In some embodiments, the drilling fluid comprises 1% to 3% by weight of the at least one fluid loss reducer based on the total weight of the drilling fluid. In some embodiments, the drilling fluid comprises 1% to 2% by weight of the at least one fluid loss reducer based on the total weight of the drilling fluid.

In some embodiments, the drilling fluid comprises 2% to 10% by weight of the at least one fluid loss reducer based on the total weight of the drilling fluid. In some embodiments, the drilling fluid comprises 3% to 10% by weight of the at least one fluid loss reducer based on the total weight of the drilling fluid. In some embodiments, the drilling fluid comprises 4% to 10% by weight of the at least one fluid loss reducer based on the total weight of the drilling fluid. In some embodiments, the drilling fluid comprises 5% to 10% by weight of the at least one fluid loss reducer based on the total weight of the drilling fluid. In some embodiments, the drilling fluid comprises 6% to 10% by weight of the at least one fluid loss reducer based on the total weight of the drilling fluid. In some embodiments, the drilling fluid comprises 7% to 10% by weight of the at least one fluid loss reducer based on the total weight of the drilling fluid. In some embodiments, the drilling fluid comprises 8% to 10% by weight of the at least one fluid loss reducer based on the total weight of the drilling fluid. In some embodiments, the drilling fluid comprises 9% to 10% by weight of the at least one fluid loss reducer based on the total weight of the drilling fluid.

In some embodiments, the drilling fluid comprises 1% to 20% by weight of an asphalt shingle waste based on the total weight of the drilling fluid. In some embodiments, the drilling fluid comprises 1% to 19% by weight of the asphalt shingle waste based on the total weight of the drilling fluid. In some embodiments, the drilling fluid comprises 1% to 18% by weight of the asphalt shingle waste based on the total weight of the drilling fluid. In some embodiments, the drilling fluid comprises 1% to 17% by weight of the asphalt shingle waste based on the total weight of the drilling fluid. In some embodiments, the drilling fluid comprises 1% to 16% by weight of the asphalt shingle waste based on the total weight of the drilling fluid. In some embodiments, the drilling fluid comprises 1% to 15% by weight of the asphalt shingle waste based on the total weight of the drilling fluid. In some embodiments, the drilling fluid comprises 1% to 14% by weight of the asphalt shingle waste based on the total weight of the drilling fluid. In some embodiments, the drilling fluid comprises 1% to 13% by weight of the asphalt shingle waste based on the total weight of the drilling fluid. In some embodiments, the drilling fluid comprises 1% to 12% by weight of the asphalt shingle waste based on the total weight of the drilling fluid. In some embodiments, the drilling fluid comprises 1% to 11% by weight of the asphalt shingle waste based on the total weight of the drilling fluid. In some embodiments, the drilling fluid comprises 1% to 10% by weight of the asphalt shingle waste based on the total weight of the drilling fluid. In some embodiments, the drilling fluid comprises 1% to 9% by weight of the asphalt shingle waste based on the total weight of the drilling fluid. In some embodiments, the drilling fluid comprises 1% to 8% by weight of the asphalt shingle waste based on the total weight of the drilling fluid. In some embodiments, the drilling fluid comprises 1% to 7% by weight of the asphalt shingle waste based on the total weight of the drilling fluid. In some embodiments, the drilling fluid comprises 1% to 6% by weight of the asphalt shingle waste based on the total weight of the drilling fluid. In some embodiments, the drilling fluid comprises 1% to 5% by weight of the asphalt shingle waste based on the total weight of the drilling fluid. In some embodiments, the drilling fluid comprises 1% to 4% by weight of the asphalt shingle waste based on the total weight of the drilling fluid. In some embodiments, the drilling fluid comprises 1% to 3% by weight of the asphalt shingle waste based on the total weight of the drilling fluid. In some embodiments, the drilling fluid comprises 1% to 2% by weight of the asphalt shingle waste based on the total weight of the drilling fluid.

In some embodiments, the drilling fluid comprises 2% to 20% by weight of the asphalt shingle waste based on the total weight of the drilling fluid. In some embodiments, the drilling fluid comprises 3% to 20% by weight of the asphalt shingle waste based on the total weight of the drilling fluid. In some embodiments, the drilling fluid comprises 4% to 20% by weight of the asphalt shingle waste based on the total weight of the drilling fluid. In some embodiments, the drilling fluid comprises 5% to 20% by weight of the asphalt shingle waste based on the total weight of the drilling fluid. In some embodiments, the drilling fluid comprises 6% to 20% by weight of the asphalt shingle waste based on the total weight of the drilling fluid. In some embodiments, the drilling fluid comprises 7% to 20% by weight of the asphalt shingle waste based on the total weight of the drilling fluid. In some embodiments, the drilling fluid comprises 8% to 20% by weight of the asphalt shingle waste based on the total weight of the drilling fluid. In some embodiments, the drilling fluid comprises 9% to 20% by weight of the asphalt shingle waste based on the total weight of the drilling fluid. In some embodiments, the drilling fluid comprises 10% to 20% by weight of the asphalt shingle waste based on the total weight of the drilling fluid. In some embodiments, the drilling fluid comprises 11% to 20% by weight of the asphalt shingle waste based on the total weight of the drilling fluid. In some embodiments, the drilling fluid comprises 12% to 20% by weight of the asphalt shingle waste based on the total weight of the drilling fluid. In some embodiments, the drilling fluid comprises 13% to 20% by weight of the asphalt shingle waste based on the total weight of the drilling fluid. In some embodiments, the drilling fluid comprises 14% to 20% by weight of the asphalt shingle waste based on the total weight of the drilling fluid. In some embodiments, the drilling fluid comprises 15% to 20% by weight of the asphalt shingle waste based on the total weight of the drilling fluid. In some embodiments, the drilling fluid comprises 16% to 20% by weight of the asphalt shingle waste based on the total weight of the drilling fluid. In some embodiments, the drilling fluid comprises 17% to 20% by weight of the asphalt shingle waste based on the total weight of the drilling fluid. In some embodiments, the drilling fluid comprises 18% to 20% by weight of the asphalt shingle waste based on the total weight of the drilling fluid. In some embodiments, the drilling fluid comprises 19% to 20% by weight of the asphalt shingle waste based on the total weight of the drilling fluid.

In some embodiments, the asphalt shingle waste reduces the amount of the at least one rheology modifier required for the drilling fluid. In some embodiments, the asphalt shingle waste reduces the amount of the at least one fluid loss reducer required for the drilling fluid. In some embodiments, the amount required for the drilling fluid refers to an amount to achieve a certain property of the drilling fluid. In some embodiments, for example, the asphalt shingle waste is useful for viscosity control or producing a drilling fluid having a desired viscosity, among other properties.

In some embodiments, the drilling fluid is substantially free of a non-waste asphalt. In some embodiments, the drilling fluid is substantially free of a non-waste filler. In some embodiments, the drilling fluid is free of a non-waste asphalt. In some embodiments, the drilling fluid is free of a non-waste filler.

Some embodiments relate to a membrane. In some embodiments, the membrane comprises a roofing membrane. In some embodiments, the membrane comprises a modified bitumen (MODBIT) roofing membrane. In some embodiments, an asphalt shingle waste is useful as a replacement for non-waste asphalt and/or non-waste filler. That is, in some embodiments, the asphalt shingle waste comprises a waste asphalt and a waste filler. In some embodiments, the use of waste asphalt results in an unexpected reduction in the amount of non-waste asphalt. In some embodiments, for example, the waste asphalt reduces the amount of non-waste asphalt required in the membrane, while maintaining or enhancing the performance of the membrane. In some embodiments, the waste asphalt reduces the amount of non-waste asphalt required in the membrane, while maintaining or enhancing at least one property of the membrane. In some embodiments, the use of waste filler results in a reduction in the amount of non-waste filler. In some embodiments, the waste filler reduces the amount of non-waste filler required for the membrane, while maintaining or enhancing the performance of the membrane. In some embodiments, the membrane disclosed herein obviates the need to oxidize any asphalt during manufacturing process. That is, in some embodiments, when the membrane is manufactured, the membrane is formed without any step comprising oxidizing any asphalt.

In some embodiments, the asphalt shingle waste is present in the membrane in an amount sufficient to result in a reduction of 1% to 30% by weight of a non-waste asphalt and/or a non-waste filler, relative to the amount of the non-waste asphalt and/or the non-waste filler that would be required to be present in a control membrane having same or similar property as the membrane, wherein the control membrane does not comprise an asphalt shingle waste. In some embodiments, the percent reduction by weight of the non-waste asphalt and/or the non-waste filler refers to the difference in the weight percentage of the non-waste asphalt and/or non-waste filler present in the control composition based on the total weight of the control composition, and the weight percentage of the non-waste asphalt and/or the non-waste filler present in the composition based on the total weight of the composition. In some embodiments, the asphalt shingle waste is present in the membrane in an amount sufficient to result in a reduction of 1% to 25% by weight of a non-waste asphalt and/or a non-waste filler. In some embodiments, the asphalt shingle waste is present in the membrane in an amount sufficient to result in a reduction of 1% to 20% by weight of a non-waste asphalt and/or a non-waste filler. In some embodiments, the asphalt shingle waste is present in the membrane in an amount sufficient to result in a reduction of 1% to 15% by weight of a non-waste asphalt and/or a non-waste filler. In some embodiments, the asphalt shingle waste is present in the membrane in an amount sufficient to result in a reduction of 1% to 10% by weight of a non-waste asphalt and/or a non-waste filler. In some embodiments, the asphalt shingle waste is present in the membrane in an amount sufficient to result in a reduction of 1% to 5% by weight of a non-waste asphalt and/or a non-waste filler. In some embodiments, the asphalt shingle waste is present in the membrane in an amount sufficient to result in a reduction of 5% to 30% by weight of a non-waste asphalt and/or a non-waste filler. In some embodiments, the asphalt shingle waste is present in the membrane in an amount sufficient to result in a reduction of 10% to 30% by weight of a non-waste asphalt and/or a non-waste filler. In some embodiments, the asphalt shingle waste is present in the membrane in an amount sufficient to result in a reduction of 15% to 30% by weight of a non-waste asphalt and/or a non-waste filler. In some embodiments, the asphalt shingle waste is present in the membrane in an amount sufficient to result in a reduction of 20% to 30% by weight of a non-waste asphalt and/or a non-waste filler. In some embodiments, the asphalt shingle waste is present in the membrane in an amount sufficient to result in a reduction of 25% to 30% by weight of a non-waste asphalt and/or a non-waste filler.

In some embodiments, the membrane comprises a substrate. Any of the substrates disclosed herein may be used, without departing from the scope of this disclosure. For example, in some embodiments, the substrate comprises a mat. In some embodiments, the substrate comprises a non-woven mat. In some embodiments, the substrate comprises a non-woven polyester mat.

In some embodiments, the membrane comprises a first layer. In some embodiments, the first layer covers the substrate. In some embodiments, the first layer is located on the substrate. In some embodiments, the first layer directly contacts the substrate. In some embodiments, the first layer is adhered to the substrate. In some embodiments, the first layer is bonded to the substrate. In some embodiments, an intervening layer is located between the first layer and the substrate.

In some embodiments, the first layer comprises an asphalt. In some embodiments, the asphalt comprises at least one of a waste asphalt, a non-waste asphalt, or any combination thereof.

In some embodiments, the first layer comprises 25% to 75% by weight of the asphalt based on a total weight of the first layer. In some embodiments, the first layer comprises 25% to 70% by weight of the asphalt based on a total weight of the first layer. In some embodiments, the first layer comprises 25% to 65% by weight of the asphalt based on a total weight of the first layer. In some embodiments, the first layer comprises 25% to 60% by weight of the asphalt based on a total weight of the first layer. In some embodiments, the first layer comprises 25% to 55% by weight of the asphalt based on a total weight of the first layer. In some embodiments, the first layer comprises 25% to 50% by weight of the asphalt based on a total weight of the first layer. In some embodiments, the first layer comprises 25% to 45% by weight of the asphalt based on a total weight of the first layer. In some embodiments, the first layer comprises 25% to 40% by weight of the asphalt based on a total weight of the first layer. In some embodiments, the first layer comprises 25% to 35% by weight of the asphalt based on a total weight of the first layer. In some embodiments, the first layer comprises 25% to 30% by weight of the asphalt based on a total weight of the first layer.

In some embodiments, the first layer comprises 30% to 75% by weight of the asphalt based on a total weight of the first layer. In some embodiments, the first layer comprises 35% to 75% by weight of the asphalt based on a total weight of the first layer. In some embodiments, the first layer comprises 40% to 75% by weight of the asphalt based on a total weight of the first layer. In some embodiments, the first layer comprises 45% to 75% by weight of the asphalt based on a total weight of the first layer. In some embodiments, the first layer comprises 50% to 75% by weight of the asphalt based on a total weight of the first layer. In some embodiments, the first layer comprises 55% to 75% by weight of the asphalt based on a total weight of the first layer. In some embodiments, the first layer comprises 60% to 75% by weight of the asphalt based on a total weight of the first layer. In some embodiments, the first layer comprises 65% to 75% by weight of the asphalt based on a total weight of the first layer. In some embodiments, the first layer comprises 70% to 75% by weight of the asphalt based on a total weight of the first layer.

In some embodiments, the first layer comprises at least one polymer. Any of the polymers disclosed herein may be used, without departing from the scope of this disclosure. In some embodiments, the at least one polymer comprises at least one of a thermoplastic polyolefin, a styrenic block copolymer, or any combination thereof. In some embodiments, the at least one polymer comprises at least one of an isotactic polypropylene, an atactic polypropylene, a poly (styrene-isoprene-styrene) (SIS), a poly(styrene-butadiene-styrene) (SBS), a poly(styrene-ethylene/butylene-styrene) (SEBS), a poly(styrene-ethylene/propylene-styrene) (SEPS), a styrene-butadiene rubber (SBR), or any combination thereof.

In some embodiments, the first layer comprises 0.1% to 20% by weight of the at least one polymer based on the total weight of the first layer. In some embodiments, the first layer comprises 0.1% to 18% by weight of the at least one polymer based on the total weight of the first layer. In some embodiments, the first layer comprises 0.1% to 16% by weight of the at least one polymer based on the total weight of the first layer. In some embodiments, the first layer comprises 0.1% to 15% by weight of the at least one polymer based on the total weight of the first layer. In some embodiments, the first layer comprises 0.1% to 14% by weight of the at least one polymer based on the total weight of the first layer. In some embodiments, the first layer comprises 0.1% to 12% by weight of the at least one polymer based on the total weight of the first layer. In some embodiments, the first layer comprises 0.1% to 10% by weight of the at least one polymer based on the total weight of the first layer. In some embodiments, the first layer comprises 0.1% to 8% by weight of the at least one polymer based on the total weight of the first layer. In some embodiments, the first layer comprises 0.1% to 6% by weight of the at least one polymer based on the total weight of the first layer. In some embodiments, the first layer comprises 0.1% to 5% by weight of the at least one polymer based on the total weight of the first layer. In some embodiments, the first layer comprises 0.1% to 4% by weight of the at least one polymer based on the total weight of the first layer. In some embodiments, the first layer comprises 0.1% to 2% by weight of the at least one polymer based on the total weight of the first layer. In some embodiments, the first layer comprises 0.1% to 1% by weight of the at least one polymer based on the total weight of the first layer.

In some embodiments, the first layer comprises 1% to 20% by weight of the at least one polymer based on the total weight of the first layer. In some embodiments, the first layer comprises 2% to 20% by weight of the at least one polymer based on the total weight of the first layer. In some embodiments, the first layer comprises 4% to 20% by weight of the at least one polymer based on the total weight of the first layer. In some embodiments, the first layer comprises 5% to 20% by weight of the at least one polymer based on the total weight of the first layer. In some embodiments, the first layer comprises 6% to 20% by weight of the at least one polymer based on the total weight of the first layer. In some embodiments, the first layer comprises 8% to 20% by weight of the at least one polymer based on the total weight of the first layer. In some embodiments, the first layer comprises 10% to 20% by weight of the at least one polymer based on the total weight of the first layer. In some embodiments, the first layer comprises 12% to 20% by weight of the at least one polymer based on the total weight of the first layer. In some embodiments, the first layer comprises 14% to 20% by weight of the at least one polymer based on the total weight of the first layer. In some embodiments, the first layer comprises 15% to 20% by weight of the at least one polymer based on the total weight of the first layer. In some embodiments, the first layer comprises 16% to 20% by weight of the at least one polymer based on the total weight of the first layer. In some embodiments, the first layer comprises 18% to 20% by weight of the at least one polymer based on the total weight of the first layer.

In some embodiments, the first layer comprises at least one filler material. In some embodiments, the at least one filler material comprises at least one of a waste filler, a non-waste filler, or any combination thereof. In some embodiments, the waste filler comprises a waste limestone, waste granules, and waste impurities. In some embodiments, the non-waste filler comprises a non-waste limestone.

In some embodiments, the first layer comprises 0.1% to 40% by weight of the at least one filler material based on the total weight of the first layer. In some embodiments, the first layer comprises 0.1% to 35% by weight of the at least one filler material based on the total weight of the first layer. In some embodiments, the first layer comprises 0.1% to 30% by weight of the at least one filler material based on the total weight of the first layer. In some embodiments, the first layer comprises 0.1% to 25% by weight of the at least one filler material based on the total weight of the first layer. In some embodiments, the first layer comprises 0.1% to 20% by weight of the at least one filler material based on the total weight of the first layer. In some embodiments, the first layer comprises 0.1% to 15% by weight of the at least one filler material based on the total weight of the first layer. In some embodiments, the first layer comprises 0.1% to 10% by weight of the at least one filler material based on the total weight of the first layer. In some embodiments, the first layer comprises 0.1% to 5% by weight of the at least one filler material based on the total weight of the first layer. In some embodiments, the first layer comprises 0.1% to 4% by weight of the at least one filler material based on the total weight of the first layer. In some embodiments, the first layer comprises 0.1% to 3% by weight of the at least one filler material based on the total weight of the first layer. In some embodiments, the first layer comprises 0.1% to 2% by weight of the at least one filler material based on the total weight of the first layer. In some embodiments, the first layer comprises 0.1% to 1% by weight of the at least one filler material based on the total weight of the first layer.

In some embodiments, the first layer comprises 1% to 40% by weight of the at least one filler material based on the total weight of the first layer. In some embodiments, the first layer comprises 5% to 40% by weight of the at least one filler material based on the total weight of the first layer. In some embodiments, the first layer comprises 10% to 40% by weight of the at least one filler material based on the total weight of the first layer. In some embodiments, the first layer comprises 15% to 40% by weight of the at least one filler material based on the total weight of the first layer. In some embodiments, the first layer comprises 20% to 40% by weight of the at least one filler material based on the total weight of the first layer. In some embodiments, the first layer comprises 25% to 40% by weight of the at least one filler material based on the total weight of the first layer. In some embodiments, the first layer comprises 30% to 40% by weight of the at least one filler material based on the total weight of the first layer. In some embodiments, the first layer comprises 35% to 40% by weight of the at least one filler material based on the total weight of the first layer.

In some embodiments, the asphalt comprises 1% to 99% by weight of the waste asphalt based on a total weight of the asphalt. In some embodiments, the asphalt comprises 1% to 95% by weight of the waste asphalt based on the total weight of the asphalt. In some embodiments, the asphalt comprises 1% to 90% by weight of the waste asphalt based on the total weight of the asphalt. In some embodiments, the asphalt comprises 1% to 85% by weight of the waste asphalt based on the total weight of the asphalt. In some embodiments, the asphalt comprises 1% to 80% by weight of the waste asphalt based on the total weight of the asphalt. In some embodiments, the asphalt comprises 1% to 75% by weight of the waste asphalt based on the total weight of the asphalt. In some embodiments, the asphalt comprises 1% to 70% by weight of the waste asphalt based on the total weight of the asphalt. In some embodiments, the asphalt comprises 1% to 65% by weight of the waste asphalt based on the total weight of the asphalt. In some embodiments, the asphalt comprises 1% to 60% by weight of the waste asphalt based on the total weight of the asphalt. In some embodiments, the asphalt comprises 1% to 55% by weight of the waste asphalt based on the total weight of the asphalt. In some embodiments, the asphalt comprises 1% to 50% by weight of the waste asphalt based on the total weight of the asphalt. In some embodiments, the asphalt comprises 1% to 45% by weight of the waste asphalt based on the total weight of the asphalt. In some embodiments, the asphalt comprises 1% to 40% by weight of the waste asphalt based on the total weight of the asphalt. In some embodiments, the asphalt comprises 1% to 35% by weight of the waste asphalt based on the total weight of the asphalt. In some embodiments, the asphalt comprises 1% to 30% by weight of the waste asphalt based on the total weight of the asphalt. In some embodiments, the asphalt comprises 1% to 25% by weight of the waste asphalt based on the total weight of the asphalt. In some embodiments, the asphalt comprises 1% to 20% by weight of the waste asphalt based on the total weight of the asphalt. In some embodiments, the asphalt comprises 1% to 15% by weight of the waste asphalt based on the total weight of the asphalt. In some embodiments, the asphalt comprises 1% to 10% by weight of the waste asphalt based on the total weight of the asphalt. In some embodiments, the asphalt comprises 1% to 5% by weight of the waste asphalt based on the total weight of the asphalt.

In some embodiments, the asphalt comprises 5% to 99% by weight of the waste asphalt based on the total weight of the asphalt. In some embodiments, the asphalt comprises 10% to 99% by weight of the waste asphalt based on the total weight of the asphalt. In some embodiments, the asphalt comprises 15% to 99% by weight of the waste asphalt based on the total weight of the asphalt. In some embodiments, the asphalt comprises 20% to 99% by weight of the waste asphalt based on the total weight of the asphalt. In some embodiments, the asphalt comprises 25% to 99% by weight of the waste asphalt based on the total weight of the asphalt. In some embodiments, the asphalt comprises 30% to 99% by weight of the waste asphalt based on the total weight of the asphalt. In some embodiments, the asphalt comprises 35% to 99% by weight of the waste asphalt based on the total weight of the asphalt. In some embodiments, the asphalt comprises 40% to 99% by weight of the waste asphalt based on the total weight of the asphalt. In some embodiments, the asphalt comprises 45% to 99% by weight of the waste asphalt based on the total weight of the asphalt. In some embodiments, the asphalt comprises 50% to 99% by weight of the waste asphalt based on the total weight of the asphalt. In some embodiments, the asphalt comprises 55% to 99% by weight of the waste asphalt based on the total weight of the asphalt. In some embodiments, the asphalt comprises 60% to 99% by weight of the waste asphalt based on the total weight of the asphalt. In some embodiments, the asphalt comprises 65% to 99% by weight of the waste asphalt based on the total weight of the asphalt. In some embodiments, the asphalt comprises 70% to 99% by weight of the waste asphalt based on the total weight of the asphalt. In some embodiments, the asphalt comprises 75% to 99% by weight of the waste asphalt based on the total weight of the asphalt. In some embodiments, the asphalt comprises 80% to 99% by weight of the waste asphalt based on the total weight of the asphalt. In some embodiments, the asphalt comprises 85% to 99% by weight of the waste asphalt based on the total weight of the asphalt. In some embodiments, the asphalt comprises 90% to 99% by weight of the waste asphalt based on the total weight of the asphalt. In some embodiments, the asphalt comprises 95% to 99% by weight of the waste asphalt based on the total weight of the asphalt.

In some embodiments, the asphalt comprises 1% to 99% by weight of a non-waste asphalt based on the total weight of the asphalt. In some embodiments, the asphalt comprises 1% to 95% by weight of a non-waste asphalt based on the total weight of the asphalt. In some embodiments, the asphalt comprises 1% to 90% by weight of a non-waste asphalt based on the total weight of the asphalt. In some embodiments, the asphalt comprises 1% to 85% by weight of a non-waste asphalt based on the total weight of the asphalt. In some embodiments, the asphalt comprises 1% to 80% by weight of a non-waste asphalt based on the total weight of the asphalt. In some embodiments, the asphalt comprises 1% to 75% by weight of a non-waste asphalt based on the total weight of the asphalt. In some embodiments, the asphalt comprises 1% to 70% by weight of a non-waste asphalt based on the total weight of the asphalt. In some embodiments, the asphalt comprises 1% to 65% by weight of a non-waste asphalt based on the total weight of the asphalt. In some embodiments, the asphalt comprises 1% to 60% by weight of a non-waste asphalt based on the total weight of the asphalt. In some embodiments, the asphalt comprises 1% to 55% by weight of a non-waste asphalt based on the total weight of the asphalt. In some embodiments, the asphalt comprises 1% to 50% by weight of a non-waste asphalt based on the total weight of the asphalt. In some embodiments, the asphalt comprises 1% to 45% by weight of a non-waste asphalt based on the total weight of the asphalt. In some embodiments, the asphalt comprises 1% to 40% by weight of a non-waste asphalt based on the total weight of the asphalt. In some embodiments, the asphalt comprises 1% to 35% by weight of a non-waste asphalt based on the total weight of the asphalt. In some embodiments, the asphalt comprises 1% to 30% by weight of a non-waste asphalt based on the total weight of the asphalt. In some embodiments, the asphalt comprises 1% to 25% by weight of a non-waste asphalt based on the total weight of the asphalt. In some embodiments, the asphalt comprises 1% to 20% by weight of a non-waste asphalt based on the total weight of the asphalt. In some embodiments, the asphalt comprises 1% to 15% by weight of a non-waste asphalt based on the total weight of the asphalt. In some embodiments, the asphalt comprises 1% to 10% by weight of a non-waste asphalt based on the total weight of the asphalt. In some embodiments, the asphalt comprises 1% to 5% by weight of a non-waste asphalt based on the total weight of the asphalt.

In some embodiments, the asphalt comprises 5% to 99% by weight of a non-waste asphalt based on the total weight of the asphalt. In some embodiments, the asphalt comprises 10% to 99% by weight of a non-waste asphalt based on the total weight of the asphalt. In some embodiments, the asphalt comprises 15% to 99% by weight of a non-waste asphalt based on the total weight of the asphalt. In some embodiments, the asphalt comprises 20% to 99% by weight of a non-waste asphalt based on the total weight of the asphalt. In some embodiments, the asphalt comprises 25% to 99% by weight of a non-waste asphalt based on the total weight of the asphalt. In some embodiments, the asphalt comprises 30% to 99% by weight of a non-waste asphalt based on the total weight of the asphalt. In some embodiments, the asphalt comprises 35% to 99% by weight of a non-waste asphalt based on the total weight of the asphalt. In some embodiments, the asphalt comprises 40% to 99% by weight of a non-waste asphalt based on the total weight of the asphalt. In some embodiments, the asphalt comprises 45% to 99% by weight of a non-waste asphalt based on the total weight of the asphalt. In some embodiments, the asphalt comprises 50% to 99% by weight of a non-waste asphalt based on the total weight of the asphalt. In some embodiments, the asphalt comprises 55% to 99% by weight of a non-waste asphalt based on the total weight of the asphalt. In some embodiments, the asphalt comprises 60% to 99% by weight of a non-waste asphalt based on the total weight of the asphalt. In some embodiments, the asphalt comprises 65% to 99% by weight of a non-waste asphalt based on the total weight of the asphalt. In some embodiments, the asphalt comprises 70% to 99% by weight of a non-waste asphalt based on the total weight of the asphalt. In some embodiments, the asphalt comprises 75% to 99% by weight of a non-waste asphalt based on the total weight of the asphalt. In some embodiments, the asphalt comprises 80% to 99% by weight of a non-waste asphalt based on the total weight of the asphalt. In some embodiments, the asphalt comprises 85% to 99% by weight of a non-waste asphalt based on the total weight of the asphalt. In some embodiments, the asphalt comprises 90% to 99% by weight of a non-waste asphalt based on the total weight of the asphalt. In some embodiments, the asphalt comprises 95% to 99% by weight of a non-waste asphalt based on the total weight of the asphalt.

In some embodiments, the at least one filler material comprises 1% to 99% by weight of the waste filler based on a total weight of the at least one filler material. In some embodiments, the at least one filler material comprises 1% to 95% by weight of the waste filler based on the total weight of the at least one filler material. In some embodiments, the at least one filler material comprises 1% to 90% by weight of the waste filler based on the total weight of the at least one filler material. In some embodiments, the at least one filler material comprises 1% to 85% by weight of the waste filler based on the total weight of the at least one filler material. In some embodiments, the at least one filler material comprises 1% to 80% by weight of the waste filler based on the total weight of the at least one filler material. In some embodiments, the at least one filler material comprises 1% to 75% by weight of the waste filler based on the total weight of the at least one filler material. In some embodiments, the at least one filler material comprises 1% to 70% by weight of the waste filler based on the total weight of the at least one filler material. In some embodiments, the at least one filler material comprises 1% to 65% by weight of the waste filler based on the total weight of the at least one filler material. In some embodiments, the at least one filler material comprises 1% to 60% by weight of the waste filler based on the total weight of the at least one filler material. In some embodiments, the at least one filler material comprises 1% to 55% by weight of the waste filler based on the total weight of the at least one filler material. In some embodiments, the at least one filler material comprises 1% to 50% by weight of the waste filler based on the total weight of the at least one filler material. In some embodiments, the at least one filler material comprises 1% to 45% by weight of the waste filler based on the total weight of the at least one filler material. In some embodiments, the at least one filler material comprises 1% to 40% by weight of the waste filler based on the total weight of the at least one filler material. In some embodiments, the at least one filler material comprises 1% to 35% by weight of the waste filler based on the total weight of the at least one filler material. In some embodiments, the at least one filler material comprises 1% to 30% by weight of the waste filler based on the total weight of the at least one filler material. In some embodiments, the at least one filler material comprises 1% to 25% by weight of the waste filler based on the total weight of the at least one filler material. In some embodiments, the at least one filler material comprises 1% to 20% by weight of the waste filler based on the total weight of the at least one filler material. In some embodiments, the at least one filler material comprises 1% to 15% by weight of the waste filler based on the total weight of the at least one filler material. In some embodiments, the at least one filler material comprises 1% to 10% by weight of the waste filler based on the total weight of the at least one filler material. In some embodiments, the at least one filler material comprises 1% to 5% by weight of the waste filler based on the total weight of the at least one filler material.

In some embodiments, the at least one filler material comprises 5% to 99% by weight of the waste filler based on the total weight of the at least one filler material. In some embodiments, the at least one filler material comprises 10% to 99% by weight of the waste filler based on the total weight of the at least one filler material. In some embodiments, the at least one filler material comprises 15% to 99% by weight of the waste filler based on the total weight of the at least one filler material. In some embodiments, the at least one filler material comprises 20% to 99% by weight of the waste filler based on the total weight of the at least one filler material. In some embodiments, the at least one filler material comprises 25% to 99% by weight of the waste filler based on the total weight of the at least one filler material. In some embodiments, the at least one filler material comprises 30% to 99% by weight of the waste filler based on the total weight of the at least one filler material. In some embodiments, the at least one filler material comprises 35% to 99% by weight of the waste filler based on the total weight of the at least one filler material. In some embodiments, the at least one filler material comprises 40% to 99% by weight of the waste filler based on the total weight of the at least one filler material. In some embodiments, the at least one filler material comprises 45% to 99% by weight of the waste filler based on the total weight of the at least one filler material. In some embodiments, the at least one filler material comprises 50% to 99% by weight of the waste filler based on the total weight of the at least one filler material. In some embodiments, the at least one filler material comprises 55% to 99% by weight of the waste filler based on the total weight of the at least one filler material. In some embodiments, the at least one filler material comprises 60% to 99% by weight of the waste filler based on the total weight of the at least one filler material. In some embodiments, the at least one filler material comprises 65% to 99% by weight of the waste filler based on the total weight of the at least one filler material. In some embodiments, the at least one filler material comprises 70% to 99% by weight of the waste filler based on the total weight of the at least one filler material. In some embodiments, the at least one filler material comprises 75% to 99% by weight of the waste filler based on the total weight of the at least one filler material. In some embodiments, the at least one filler material comprises 80% to 99% by weight of the waste filler based on the total weight of the at least one filler material.

In some embodiments, the at least one filler material comprises 85% to 99% by weight of the waste filler based on the total weight of the at least one filler material. In some embodiments, the at least one filler material comprises 90% to 99% by weight of the waste filler based on the total weight of the at least one filler material. In some embodiments, the at least one filler material comprises 95% to 99% by weight of the waste filler based on the total weight of the at least one filler material.

In some embodiments, the at least one filler material comprises 1% to 99% by weight of a non-waste filler based on the total weight of the at least one filler material. In some embodiments, the at least one filler material comprises 1% to 95% by weight of a non-waste filler based on the total weight of the at least one filler material. In some embodiments, the at least one filler material comprises 1% to 90% by weight of a non-waste filler based on the total weight of the at least one filler material. In some embodiments, the at least one filler material comprises 1% to 85% by weight of a non-waste filler based on the total weight of the at least one filler material. In some embodiments, the at least one filler material comprises 1% to 80% by weight of a non-waste filler based on the total weight of the at least one filler material. In some embodiments, the at least one filler material comprises 1% to 75% by weight of a non-waste filler based on the total weight of the at least one filler material. In some embodiments, the at least one filler material comprises 1% to 70% by weight of a non-waste filler based on the total weight of the at least one filler material. In some embodiments, the at least one filler material comprises 1% to 65% by weight of a non-waste filler based on the total weight of the at least one filler material. In some embodiments, the at least one filler material comprises 1% to 60% by weight of a non-waste filler based on the total weight of the at least one filler material. In some embodiments, the at least one filler material comprises 1% to 55% by weight of a non-waste filler based on the total weight of the at least one filler material. In some embodiments, the at least one filler material comprises 1% to 50% by weight of a non-waste filler based on the total weight of the at least one filler material. In some embodiments, the at least one filler material comprises 1% to 45% by weight of a non-waste filler based on the total weight of the at least one filler material. In some embodiments, the at least one filler material comprises 1% to 40% by weight of a non-waste filler based on the total weight of the at least one filler material. In some embodiments, the at least one filler material comprises 1% to 35% by weight of a non-waste filler based on the total weight of the at least one filler material. In some embodiments, the at least one filler material comprises 1% to 30% by weight of a non-waste filler based on the total weight of the at least one filler material. In some embodiments, the at least one filler material comprises 1% to 25% by weight of a non-waste filler based on the total weight of the at least one filler material. In some embodiments, the at least one filler material comprises 1% to 20% by weight of a non-waste filler based on the total weight of the at least one filler material. In some embodiments, the at least one filler material comprises 1% to 15% by weight of a non-waste filler based on the total weight of the at least one filler material. In some embodiments, the at least one filler material comprises 1% to 10% by weight of a non-waste filler based on the total weight of the at least one filler material. In some embodiments, the at least one filler material comprises 1% to 5% by weight of a non-waste filler based on the total weight of the at least one filler material.

In some embodiments, the at least one filler material comprises 5% to 99% by weight of a non-waste filler based on the total weight of the at least one filler material. In some embodiments, the at least one filler material comprises 10% to 99% by weight of a non-waste filler based on the total weight of the at least one filler material. In some embodiments, the at least one filler material comprises 15% to 99% by weight of a non-waste filler based on the total weight of the at least one filler material. In some embodiments, the at least one filler material comprises 20% to 99% by weight of a non-waste filler based on the total weight of the at least one filler material. In some embodiments, the at least one filler material comprises 25% to 99% by weight of a non-waste filler based on the total weight of the at least one filler material. In some embodiments, the at least one filler material comprises 30% to 99% by weight of a non-waste filler based on the total weight of the at least one filler material. In some embodiments, the at least one filler material comprises 35% to 99% by weight of a non-waste filler based on the total weight of the at least one filler material. In some embodiments, the at least one filler material comprises 40% to 99% by weight of a non-waste filler based on the total weight of the at least one filler material. In some embodiments, the at least one filler material comprises 45% to 99% by weight of a non-waste filler based on the total weight of the at least one filler material. In some embodiments, the at least one filler material comprises 50% to 99% by weight of a non-waste filler based on the total weight of the at least one filler material. In some embodiments, the at least one filler material comprises 55% to 99% by weight of a non-waste filler based on the total weight of the at least one filler material. In some embodiments, the at least one filler material comprises 60% to 99% by weight of a non-waste filler based on the total weight of the at least one filler material. In some embodiments, the at least one filler material comprises 65% to 99% by weight of a non-waste filler based on the total weight of the at least one filler material. In some embodiments, the at least one filler material comprises 70% to 99% by weight of a non-waste filler based on the total weight of the at least one filler material. In some embodiments, the at least one filler material comprises 75% to 99% by weight of a non-waste filler based on the total weight of the at least one filler material. In some embodiments, the at least one filler material comprises 80% to 99% by weight of a non-waste filler based on the total weight of the at least one filler material. In some embodiments, the at least one filler material comprises 85% to 99% by weight of a non-waste filler based on the total weight of the at least one filler material. In some embodiments, the at least one filler material comprises 90% to 99% by weight of a non-waste filler based on the total weight of the at least one filler material. In some embodiments, the at least one filler material comprises 95% to 99% by weight of a non-waste filler based on the total weight of the at least one filler material.

In some embodiments, the first layer is substantially free of a non-waste asphalt. In some embodiments, the first layer is free of a non-waste asphalt. In some embodiments, the first layer is substantially free of a non-waste filler. In some embodiments, the first layer is free of a non-waste filler.

Figure 4:
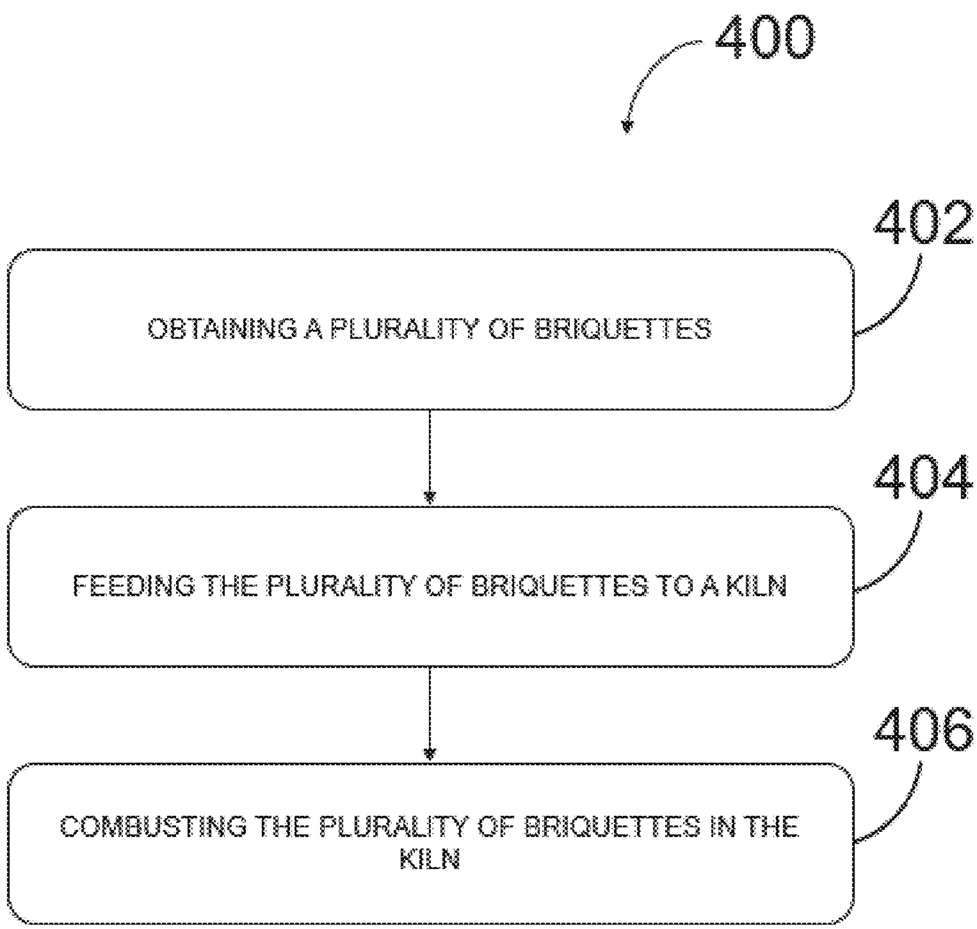
FIG. 4 is a flow diagram depicting an exemplary method of forming a cement formulation, according to some embodiments.

FIG. 4 is a flow diagram depicting an exemplary method of forming a cement formulation, according to some embodiments. As shown in FIG. 4, in some embodiments, the method comprises obtaining 402 a plurality of briquettes. In some embodiments, the method comprises feeding 404 the plurality of briquettes to a kiln. In some embodiments, the method comprises combusting 406 the plurality of briquettes in the kiln. In some embodiments, the plurality of briquettes is replaced with or combined with any form of asphalt shingle waste disclosed herein (e.g., an ASW powder, an AC powder, etc.).

Figure 5:
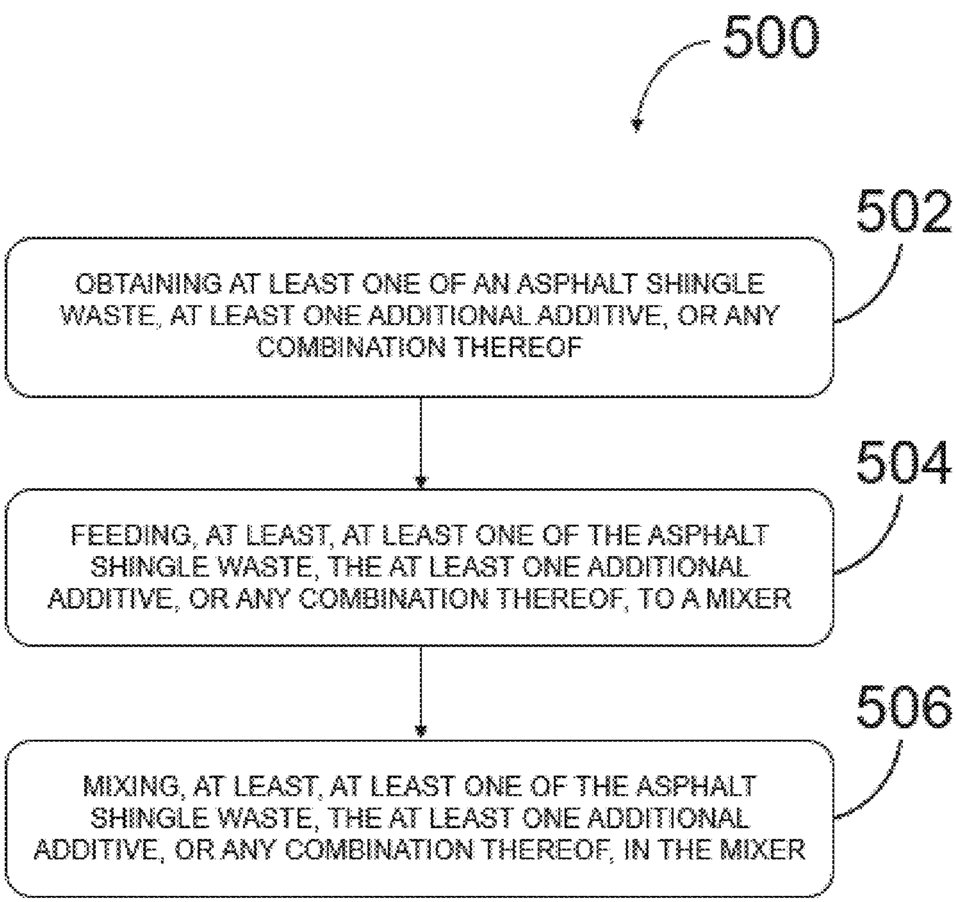
FIG. 5 is a flow diagram depicting an exemplary method of making a composition, according to some embodiments.

FIG. 5 is a flow diagram depicting an exemplary method of making a composition, according to some embodiments. As shown in FIG. 5, in some embodiments, the method comprises obtaining 502 at least one of an asphalt shingle waste, at least one additional additive, or any combination thereof. In some embodiments, the method comprises feeding 504, at least, at least one of the asphalt shingle waste, the at least one additional additive, or any combination thereof, to a mixer. In some embodiments, the method comprises mixing 506, at least, at least one of the asphalt shingle waste, the at least one additional additive, or any combination thereof, in the mixer. In some embodiments, the asphalt shingle waste comprises any form of the asphalt shingle waste disclosed herein (e.g., for example and without limitation, at least one of an ASW powder, an AC powder, a briquette, etc.). In some embodiments, the at least one additional additive comprises any one or more of the additional additives disclosed herein (e.g., for example and without limitation, at least one of at least one filler material, at least one polymer, at least on stabilizer, at least one surfactant, at least one sterol, etc.).

Some embodiments relate to a membrane. In some embodiments, the membrane comprises a first layer. In some embodiments, the first layer comprises a substrate. In some embodiments, the membrane comprises a second layer. In some embodiments, the second layer is located on the first layer. In some embodiments, the second layer comprises 25% to 75% by weight of an asphalt based on a total weight of the second layer. In some embodiments, the asphalt comprises a waste asphalt. In some embodiments, the second layer comprises 0.1% to 20% by weight of at least one polymer based on the total weight of the second layer. In some embodiments, the second layer comprises 0.1% to 40% by weight of at least one filler material based on the total weight of the second layer. In some embodiments, the at least one filler material comprises a waste filler.

In some embodiments, the asphalt comprises 1% to 99% by weight of the waste asphalt based on a total weight of the asphalt.

In some embodiments, the asphalt comprises 1% to 99% by weight of the waste asphalt based on a total weight of the asphalt. In some embodiments, the asphalt comprises 1% to 99% by weight of a non-waste asphalt based on the total weight of the asphalt.

In some embodiments, the waste filler comprises a waste limestone, waste granules, and waste impurities.

In some embodiments, the at least one filler material comprises 1% to 99% by weight of the waste filler based on a total weight of the at least one filler material.

In some embodiments, the at least one filler material comprises 1% to 99% by weight of the waste filler based on a total weight of the at least one filler material. In some embodiments, the waste filler comprises a waste limestone, waste granules, and waste impurities. In some embodiments, the at least one filler material comprises 1% to 99% by weight of a non-waste filler based on the total weight of the at least one filler material. In some embodiments, the non-waste filler comprises a non-waste limestone.

In some embodiments, the at least one polymer comprises at least one of a thermoplastic polyolefin, a styrenic block copolymer, or any combination thereof.

In some embodiments, the at least one polymer comprises at least one of an isotactic polypropylene, an atactic polypropylene, a poly(styrene-isoprene-styrene) (SIS), a poly (styrene-butadiene-styrene) (SBS), a poly(styrene-ethylene/butylene-styrene) (SEBS), a poly(styrene-ethylene/propylene-styrene) (SEPS), a styrene-butadiene rubber (SBR), or any combination thereof.

In some embodiments, the second layer is substantially free of a non-waste asphalt.

In some embodiments, the second layer is free of a non-waste asphalt.

Some embodiments of the present disclose relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 250 microns to 450 microns; and a fifth set of ASW particles, wherein the fifth set of ASW particles has an average particle size of 2 microns to 250 microns; grinding the fourth set of ASW particles; wherein the grinding of the fourth set of ASW particles results in a sixth set of ASW particles, wherein the sixth set of ASW particles have an average particle size of 2 microns to 250 microns; wherein each of the fifth set of ASW particles and the sixth set of ASW particles is an ASW powder having the following composition: 5 wt % to 40 wt % asphalt based on a total weight of the ASW powder, and 60 wt % to 95 wt % of limestone, granules, and impurities based on the total weight of the ASW powder, wherein the method does not comprise a wet extraction step.

In some embodiments, the ASW is obtained from recycling or recycled asphalt shingles.

Some embodiments of the present disclose relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 150 microns to 450 microns; and a fifth set of ASW particles, wherein the fifth set of ASW particles has an average particle size of 2 microns to 150 microns; grinding the fourth set of ASW particles; wherein the grinding of the fourth set of ASW particles results in a sixth set of ASW particles, wherein the sixth set of ASW particles has an average particle size of 2 microns to 150 microns; wherein each of the fifth set of ASW particles and the sixth set of ASW particles is an ASW powder having the following composition: 5 wt % to 40 wt % asphalt based on a total weight of the ASW powder, and 60 wt % to 95 wt % of limestone, granules, and impurities based on the total weight of the ASW powder, wherein the method does not comprise a wet extraction step.

In some embodiments, the rotary screener is a trommel screener.

In some embodiments, the method does not comprise a grinding step after the step of grinding the fourth set of ASW particles.

In some embodiments, the method does not comprise any grinding steps other than the steps of: grinding the ASW, grinding the first set of ASW particles, and grinding the fourth set of ASW particles.

In some embodiments, the impurities comprise least one of: fiberglass mat sand, fines, marker paint, sealant, one or more adhesives, tape, plastic debris, paper debris, soil, woods, nails, or any combination thereof.

In some embodiments, the method does not comprise any steps of screening with a vibratory screener.

In some embodiments, the method does not comprise any steps of screening with a screening device that comprises at least one ball tray.

In some embodiments, the method does not comprise any steps of screening with a sizing shaker.

In some embodiments, the method does not comprise a screening step after the step of separating the second and third sets of ASW particles using the air separator.

In some embodiments, the second and third sets of ASW particles are combined prior to the step of separating the second and third sets of ASW particles using the air separator.

In some embodiments, the fifth set of ASW particles and the sixth set of ASW particles are combined to form the ASW powder.

In some embodiments, the method further comprises forming the ASW powder into a plurality of briquettes.

In some embodiments, forming the ASW powder into the plurality of briquettes comprises adding limestone powder to the ASW powder.

In some embodiments, forming the ASW powder into the plurality of briquettes comprises compressing the ASW powder at a pressure sufficient to form the plurality of briquettes.

In some embodiments, the pressure sufficient to form the plurality of briquettes ranges from 200 psi to 20,000 psi.

In some embodiments, each briquette of the plurality of briquettes is an oblate spheroid.

In some embodiments, each briquette of the plurality of briquettes has a first diameter and a second diameter, wherein at least one of: the first diameter, the second diameter, or any combination thereof ranges from 0.5 inches to 2 inches.

In some embodiments, the at least one granule liberator comprises a rotary impact separator.

In some embodiments, the method further comprises using a scalping screen to separate particles having an average particle size of 4 microns to 425 microns from the ground ASW.

In some embodiments, the step of using the scalping screen is performed between the steps of: grinding the ASW and screening the ground ASW.

In some embodiments, the method comprises deagglomerating the ground ASW using a lump breaker.

In some embodiments, the step of deagglomerating the ground ASW is performed between the steps of: grinding the ASW and screening the ground ASW.

Some embodiments of the present disclosure relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of: the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 250 microns to 450 microns; and a fifth set of ASW particles, wherein the fifth set of ASW particles have an average particle size of 2 microns to 250 microns; grinding the fourth set of ASW particles; wherein the grinding of the fourth set of ASW particles results in a sixth set of ASW particles, wherein the sixth set of ASW particles have an average particle size of 2 microns to 250 microns; wherein each of the fifth set of ASW particles and the sixth set of ASW particles is an ASW powder having the following composition: 5 wt % to 40 wt % asphalt based on a total weight of the ASW powder, and 60 wt % to 95 wt % of limestone, granules, and impurities based on the total weight of the ASW powder; forming the ASW powder into the plurality of briquettes; wherein the method does not comprise a wet extraction step.

Some embodiments of the present disclosure relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of: the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 250 microns to 450 microns; and a fifth set of ASW particles, wherein the fifth set of ASW particles have an average particle size of 2 microns to 250 microns; grinding the fourth set of ASW particles; wherein the grinding of the fourth set of ASW particles results in a sixth set of ASW particles, wherein the sixth set of ASW particles has an average particle size of 2 microns to 250 microns; wherein at least one of: the second set of ASW particles, the third set of ASW particles, the fourth set of ASW particles, the fifth set of ASW particles, the sixth set of ASW particles or any combination thereof comprises an ASW powder having the following composition: 5 wt % to 40 wt % asphalt based on a total weight of the ASW powder, and 60 wt % to 95 wt % of limestone, granules, and impurities based on the total weight of the ASW powder, obtaining the ASW powder from at least one of: the second set of ASW particles, the third set of ASW particles, the fourth set of ASW particles, the fifth set of ASW particles, the sixth set of ASW particles, or any combination thereof, wherein the ASW powder has an average particle size of 2 microns to 425 microns; feeding a sufficient amount of the ASW powder and a sufficient amount of an asphalt coating into at least one first mixer to form a mixture of the ASW powder and the asphalt coating; wherein the mixture of the ASW powder and the asphalt coating has the following composition: 0.1 wt % to 50 wt % ASW powder based on a total weight of the mixture, and 50 wt % to 99.9 wt % of the asphalt coating based on a total weight of the mixture; heating the mixture of the ASW powder and the asphalt coating to form a heated mixture; wherein the heated mixture has a temperature in a range of 400° F. to 500° F.; conveying the heated mixture of the ASW powder and the asphalt coating to at least one second mixer; mixing a sufficient amount of at least one filler material with the heated mixture in the second mixer to obtain an ASW powder filled coating; wherein the ASW powder filled coating has the following composition: 30 wt % to 50 wt % asphalt based on the total weight of the ASW powder filled coating, and 50 wt % to 70 wt % of: limestone powder, granules, impurities, and the at least one filler material based on the total weight of the ASW powder filled coating.

Some embodiments of the present disclosure relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of: the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 250 microns to 450 microns; and a fifth set of ASW particles, wherein the fifth set of ASW particles have an average particle size of 2 microns to 250 microns; grinding the fourth set of ASW particles; wherein the grinding of the fourth set of ASW particles results in a sixth set of ASW particles, wherein the sixth set of ASW particles has an average particle size of 2 microns to 250 microns; wherein at least one of: the second set of ASW particles, the third set of ASW particles, the fourth set of ASW particles, the fifth set of ASW particles, the sixth set of ASW particles or any combination thereof comprises an ASW powder having the following composition: 5 wt % to 40 wt % asphalt based on a total weight of the ASW powder, and 60 wt % to 95 wt % of limestone, granules, and impurities based on the total weight of the ASW powder, obtaining the ASW powder from at least one of: the second set of ASW particles, the third set of ASW particles, the fourth set of ASW particles, the fifth set of ASW particles, the sixth set of ASW particles, or any combination thereof, wherein the ASW powder has an average particle size of 2 microns to 425 microns; forming the ASW powder into a plurality of briquettes; feeding a sufficient amount of the plurality of briquettes and a sufficient amount of an asphalt coating into at least one first mixer to form a mixture of the ASW powder and the asphalt coating; wherein the mixture of the ASW powder and the asphalt coating has the following composition: 0.1 wt % to 50 wt % ASW powder based on a total weight of the mixture, and 50 wt % to 99.9 wt % of the asphalt coating based on a total weight of the mixture; heating the mixture of the ASW powder and the asphalt coating to form a heated mixture; wherein the heated mixture has a temperature in a range of 400° F. to 500° F.; conveying the heated mixture of the ASW powder and the asphalt coating to at least one second mixer; mixing a sufficient amount of at least one filler material with the heated mixture in the second mixer to obtain an ASW powder filled coating; wherein the ASW powder filled coating has the following composition: 30 wt % to 50 wt % asphalt based on the total weight of the ASW powder filled coating, and 50 wt % to 70 wt % of: limestone powder, granules, impurities, and the at least one filler material based on the total weight of the ASW powder filled coating.

Some embodiments of the present disclosure relate to a method comprising: obtaining asphalt shingle waste (ASW), wherein the ASW comprises: asphalt, limestone powder, granules, and impurities; performing sufficient grinding steps and screening steps on the ASW to result in ASW powder having an average particle size of 2 microns to 425 microns and the following composition: 5 wt % to 40 wt % asphalt based on a total weight of the ASW powder, 60 wt % to 95 wt % limestone powder, granules, and impurities based on the total weight of the ASW powder; wherein the grinding steps and screening steps do not comprise wet extraction steps; feeding a sufficient amount of the ASW powder and a sufficient amount of an asphalt coating into at least one first mixer to form a mixture of the ASW powder and the asphalt coating; wherein the mixture of the ASW powder and the asphalt coating has the following composition: 0.1 wt % to 50 wt % powder based on a total weight of the mixture, and 50 wt % to 99.9 wt % of the asphalt coating based on a total weight of the mixture; heating the mixture of the ASW powder and the asphalt coating to form a heated mixture; wherein the heated mixture has a temperature in a range of 400° F. to 500° F.; conveying the heated mixture of the ASW powder and the asphalt coating to at least one second mixer; mixing a sufficient amount of at least one filler material with the heated mixture in the at least one second mixer to obtain an ASW powder filled coating; wherein the ASW powder filled coating has the following composition: 30 wt % to 50 wt % asphalt based on the total weight of the ASW powder filled coating, and 50 wt % to 70 wt % of: limestone powder, granules, impurities, and the at least one filler material based on the total weight of the ASW powder filled coating.

In some embodiments, the impurities comprise at least one of: fiberglass mat, sand, fines, marker paint, sealant, one or more adhesives, tape, plastic debris, paper debris, soil, woods, nails, or any combination thereof.

In some embodiments, the at least one filler material is limestone powder; and wherein the ASW powder filled coating has the following composition: 30% to 50% asphalt based on the total weight of the ASW powder filled coating, and 50% to 70% of: limestone powder, granules, and impurities based on the total weight of the ASW powder filled coating.

In some embodiments, the ASW powder filled coating is applied to a fiberglass mat to form a coated fiberglass mat.

In some embodiments, at least one of granules or sand are applied to the coated fiberglass mat to form an asphalt shingle.

In some embodiments, the ASW consists essentially of: asphalt, limestone powder, granules, and impurities.

In some embodiments, the ASW powder has the following composition: 25 wt % to 30 wt % asphalt based on a total weight of the ASW powder; 70 wt % to 75 wt % limestone powder, granules, and impurities based on the total weight of the ASW powder.

In some embodiments, the asphalt coating comprises at least one of: oxidized asphalt coating, virgin asphalt coating, polymer modified asphalt coating, or mixtures thereof.

In some embodiments, the polymer modified asphalt coating is poly(styrene-butadiene-styrene) (SBS) modified asphalt coating, a poly(styrene-ethylene/butylene-styrene) (SEBS) modified asphalt coating, an atactic polypropylene (APP) modified asphalt coating, an isotactic polypropylene (IPP) modified asphalt coating, or any mixture thereof.

In some embodiments, the weight percentage of asphalt in the ASW powder filled coating, based on the total weight of the ASW powder filled coating, is the same as a weight percentage of asphalt in a powder filled coating that does not contain any ASW.

In some embodiments, the mixture of the ASW powder and the asphalt coating is not subjected to grinding or screening steps.

In some embodiments, the ASW powder filled coating comprises 1 wt % to 40 wt % of the ASW powder based on the total weight of the ASW powder filled coating.

In some embodiments, the method further comprises, after performing sufficient grinding steps and screening steps on the ASW to result in the ASW powder, forming the ASW powder into a plurality of briquettes.

In some embodiments, during the step of feeding the sufficient amount of the ASW powder and the sufficient amount of an asphalt coating into at the least one first mixer, at least a portion of the ASW powder takes the form of a plurality of briquettes.

In some embodiments, the ASW powder filled coating has a viscosity of 100 cP to 20,000 cP.

Some embodiments of the present disclosure relate to a method comprising: obtaining asphalt containing (AC) powder; wherein the AC powder has an average particle size of 2 microns to 425 microns; wherein the AC powder comprises ASW powder; wherein the AC powder has the following composition: 5 wt % to 40 wt % asphalt based on a total weight of the AC powder, 60 wt % to 95 wt % limestone powder, granules, and impurities based on the total weight of the AC powder; feeding a sufficient amount of the AC powder and a sufficient amount of an asphalt coating into at least one first mixer to form a mixture of the AC powder and the asphalt coating; wherein the mixture of the AC powder and the asphalt coating has the following composition: 0.1 wt % to 50 wt % of AC powder based on a total weight of the mixture, and 50 wt % to 99.9 wt % of the asphalt coating based on a total weight of the mixture; heating the mixture of the AC powder and the asphalt coating to form a heated mixture; wherein the heated mixture has a temperature in a range of 400° F. to 500° F.; conveying the heated mixture of the AC powder and the asphalt coating to at least one second mixer; mixing a sufficient amount of at least one filler material with the heated mixture in the second mixer to obtain an AC powder filled coating; wherein the AC powder filled coating has the following composition: 30 wt % to 50 wt % asphalt based on the total weight of the AC powder filled coating, and 50 wt % to 70 wt % of: limestone powder, granules, impurities, and the at least one filler material based on the total weight of the AC powder filled coating.

In some embodiments, the AC powder filled coating has a viscosity of 100 cP to 20,000 cP.

Some embodiments of the present disclosure relate to a method comprising: obtaining a plurality of briquettes, wherein each briquette of the plurality of briquettes comprises asphalt containing (AC) powder, asphalt shingle waste (ASW) powder, or any combination thereof; wherein the AC powder, the ASW powder, or combination thereof has an average particle size of 2 microns to 425 microns and the following composition: 5 wt % to 40 wt % asphalt based on a total weight of the AC powder, the ASW powder, or any combination thereof, 60 wt % to 95 wt % limestone powder, granules, and impurities based on the total weight of the AC powder, the ASW powder, or any combination thereof; feeding a sufficient amount of the briquettes and a sufficient amount of an asphalt coating into at least one first mixer to form a mixture of: the AC powder, the ASW powder, or combination thereof; and the asphalt coating wherein the mixture of: the AC powder, the ASW powder, or combination thereof; and the asphalt coating has the following composition: 0.1 wt % to 50 wt % of the AC powder, the ASW powder, or combination thereof based on a total weight of the mixture; and 50 wt % to 99.9 wt % of the asphalt coating based on a total weight of the mixture; heating the mixture of: the AC powder, the ASW powder, or combination thereof; and the asphalt coating to form a heated mixture; wherein the heated mixture has a temperature in a range of 400° F. to 500° F.; conveying the heated mixture of the AC powder, the ASW powder, or combination thereof and the asphalt coating to at least one second mixer; mixing a sufficient amount of at least one filler material with the heated mixture in the second mixer to obtain an AC powder filled coating, an ASW powder filled coating or combination thereof; wherein the AC powder filled coating, the ASW powder filled coating, or combination thereof has the following composition: 30 wt % to 50 wt % asphalt based on the total weight of the AC powder filled coating, the ASW powder filled coating, or combination thereof, and 50 wt % to 70 wt % of: limestone powder, granules, impurities, and the at least one filler material based on the total weight of the AC powder filled coating, the ASW powder filled coating, or combination thereof.

In some embodiments, obtaining the plurality of briquettes comprises: performing sufficient grinding steps and screening steps on ASW to result in ASW powder; and compressing the ASW powder at a pressure sufficient to form the plurality of briquettes.

In some embodiments, obtaining the plurality of briquettes further comprises adding at least one of: limestone powder, at least one other filler, AC powder, or any combination thereof to the ASW powder.

In some embodiments, the pressure sufficient to form the plurality of briquettes ranges from 200 psi to 20,000 psi.

In some embodiments, an asphalt product comprises the ASW powder combined with one or more additives. In some embodiments, the asphalt product may be incorporated into a ground covering including asphalt, such as, for example, a road, parking lot, or other asphalt ground-covering surface. In some embodiments, the asphalt product may be incorporated into a product that coats an asphalt ground covering. In some embodiments, the asphalt product may be incorporated into a product that at least partially or totally fills a crack, seam, fissure, opening, and/or void in an asphalt ground covering.

In some embodiments, the asphalt product comprises a pavement comprising at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product comprises a liquid binder comprising at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product comprises a crack seal comprising at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product comprises a chip seal comprising at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product comprises a slurry seal comprising at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product comprises a cold patch comprising at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into roofing applications. In some embodiments, the asphalt product may be incorporated into a coating that coats a roofing deck, a roofing shingle, and/or another component or layer installed on a roofing deck. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives. In some embodiments, the asphalt product comprises one or more additives that enhance impact resistance properties of the coating, roofing deck, roofing shingle, and/or other component or layer installed on a roofing deck.

In some embodiments, the asphalt product may be incorporated into a sealant that seals a roofing deck, a roofing shingle, and/or another component or layer installed on a roofing deck. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives. In some embodiments, the asphalt product comprises one or more additives that enhance impact water resistance properties of the coating, roofing deck, roofing shingle, and/or other component or layer installed on a roofing deck.

In some embodiments, the asphalt product may be incorporated into an adhesive that adheres one or more components or layers to a roofing deck, such as a roofing shingle, and/or another component or layer installed on the roofing deck. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into a roofing membrane installed above a roofing deck. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into an artificial or engineered lumber substitute. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into an artificial or engineered brick substitute. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into a lubricant. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

In some embodiments, the asphalt product may be incorporated into a drilling fluid. In some embodiments, the asphalt product comprises at least one of ASW powder and/or a briquette, with or without an additional asphalt coating including one or more of oxidized asphalt coating, virgin asphalt coating, polymer modified asphalt coating, and/or mixtures thereof, and/or with or without one or more additives.

Some embodiments relate to a method. In some embodiments, the method comprises obtaining a plurality of briquettes. In some embodiments, each of the plurality of briquettes comprises a pressurized asphalt shingle waste powder from any form of discarded asphalt shingle. In some embodiments, the asphalt shingle waste powder comprises 5% to 40% by weight of an asphalt based on a total weight of the asphalt shingle waste powder. In some embodiments, the asphalt shingle waste powder comprises 50% to 95% by weight of limestone, granules, and impurities based on the total weight of the asphalt shingle waste powder. In some embodiments, the method comprises feeding the plurality of briquettes to a kiln. In some embodiments, the method comprises combusting the plurality of briquettes in the kiln to produce a cement clinker.

In some embodiments, each of the plurality of briquettes further comprises a binding agent.

In some embodiments, each of the plurality of briquettes having at least one of a rectangular prism shape, a cube shape, a cone shape, a tetrahedron shape, a pentahedron shape, a hexahedron shape, a dodecahedron shape, a torus shape, or any combination thereof.

In some embodiments, each of the plurality of briquettes has a length of 0.5 inches to 2 inches, a width of 0.5 inches to 2 inches, and a height of 0.5 inches to 2 inches.

In some embodiments, each of the plurality of briquettes having a spherical shape with a diameter in a range of 0.5 inches to 2 inches.

In some embodiments, each of the plurality of briquettes being an oblate spheroid.

In some embodiments, the oblate spheroid has a first diameter and a second diameter, wherein the first diameter is 0.5 inches to 2 inches, wherein the second diameter is 0.5 inches to 2 inches.

In some embodiments, the asphalt shingle waste powder comprises 15 wt % to 40 wt % asphalt based on the total weight of the asphalt shingle waste powder.

In some embodiments, the asphalt shingle waste powder comprises 5 wt % to 30 wt % asphalt based on the total weight of the asphalt shingle waste powder.

In some embodiments, each of the plurality of briquettes comprises 5% to 90% of limestone based on the total weight of the briquette.

In some embodiments, each of the plurality of briquettes has a calorific value of 5000 btu/lb. to 6000 btu/lb.

In some embodiments, the method further comprises obtaining a cement precursor. In some embodiments, the method further comprises feeding the cement precursor to the kiln. In some embodiments, the method further comprises mixing the cement precursor and the plurality of briquettes in the kiln.

In some embodiments, the cement precursor comprises at least one of limestone, sand, shells, chalk combined with shale, marl combined with shale, coal, clay, slate, blast furnace slag, silica sand, iron ore combustion ash, iron oxides, lime waste, alumina, calcium carbonate, clay fines, diatomaceous earth, perlite, slag fines, aluminum dross fines, pyrite ashes, cinder fines, shale fines, bauxite, silica sand, dolomite, or any combination thereof.

In some embodiments, combusting comprises heating the plurality of briquettes in the kiln to a temperature of 2600° F. to 3000° F.

In some embodiments, the method does not comprise feeding another cement precursor that is configured to combust to produce calcium oxide.

In some embodiments, the method further comprises feeding a carbon source to the kiln. In some embodiments, the carbon source comprises coal.

What is claimed is:

1. A composition comprising:

15% to 35% by weight of an asphalt shingle waste based on a total weight of the composition, wherein the asphalt shingle waste comprises a waste asphalt;

1% to 25% by weight of at least one filler material based on the total weight of the composition;

1% to 15% by weight of at least one polymer based on the total weight of the composition;

1% to 10% by weight of at least one stabilizer based on the total weight of the composition; and 1% to 15% by weight of at least one surfactant based on the total weight of the composition.

2. The composition of claim 1, wherein the composition comprises 1% to 10% by weight of the at least one filler material based on the total weight of the composition.

3. The composition of claim 1, wherein the composition comprises 2% to 10% by weight of the at least one polymer based on the total weight of the composition.

4. The composition of claim 1, wherein the composition comprises 1% to 5% by weight of the at least one stabilizer based on the total weight of the composition.

5. The composition of claim 1, wherein the composition comprises 1% to 10% by weight of the at least one surfactant based on the total weight of the composition.

6. The composition of claim 1, wherein the asphalt shingle waste further comprises limestone, granules, and impurities.

7. The composition of claim 1, wherein the at least one polymer comprises at least one of a poly(styrene-isoprene-styrene) (SIS), a poly(styrene-butadiene-styrene) (SBS), a poly(styrene-ethylene/butylene-styrene) (SEBS), a poly(styrene-ethylene/propylene-styrene) (SEPS), a styrene-butadiene rubber (SBR), or any combination thereof.

8. The composition of claim 1, wherein the at least one stabilizer comprises at least one of a microcrystalline cellulose, a xanthan gum, a carboxymethyl cellulose (CMC), an alginate, a pectin, a guar gum, or any combination thereof.

9. The composition of claim 1, wherein the composition is substantially free of a non-waste asphalt.

10. The composition of claim 1, wherein the composition is free of a non-waste asphalt.

11. The composition of claim 1, wherein the asphalt shingle waste comprises:

5% to 95% by weight of the waste asphalt based on a total weight of the asphalt shingle waste.

12. The composition of claim 1, wherein the at least one filler material comprises limestone, granules, and impurities.

13. A composition comprising:

5% to 50% by weight of an asphalt shingle waste based on a total weight of the composition, wherein the asphalt shingle waste comprises a waste asphalt;

1% to 10% by weight of at least one filler material based on the total weight of the composition;

1% to 15% by weight of at least one polymer based on the total weight of the composition;

1% to 10% by weight of at least one stabilizer based on the total weight of the composition; and 1% to 15% by weight of at least one surfactant based on the total weight of the composition.

14. The composition of claim 13, wherein the at least one stabilizer comprises at least one of a microcrystalline cellulose, a xanthan gum, a carboxymethyl cellulose (CMC), an alginate, a pectin, a guar gum, or any combination thereof.

15. The composition of claim 13, wherein the composition is substantially free of a non-waste asphalt.

16. The composition of claim 13, wherein the composition is free of a non-waste asphalt.

17. The composition of claim 13, wherein the asphalt shingle waste comprises:

5% to 95% by weight of the waste asphalt based on a total weight of the asphalt shingle waste.

18. The composition of claim 13, wherein the at least one filler material comprises limestone, granules, and impurities.

19. A composition comprising:

5% to 50% by weight of an asphalt shingle waste based on a total weight of the composition, wherein the asphalt shingle waste comprises a waste asphalt;

1% to 25% by weight of at least one filler material based on the total weight of the composition;

1% to 15% by weight of at least one polymer based on the total weight of the composition;

1% to 10% by weight of at least one stabilizer based on the total weight of the composition; and 1% to 10% by weight of at least one surfactant based on the total weight of the composition.

20. The composition of claim 19, wherein the at least one stabilizer comprises at least one of a microcrystalline cellulose, a xanthan gum, a carboxymethyl cellulose (CMC), an alginate, a pectin, a guar gum, or any combination thereof.

21. The composition of claim 19, wherein the composition is substantially free of a non-waste asphalt.

22. The composition of claim 19, wherein the composition is free of a non-waste asphalt.

23. The composition of claim 19, wherein the asphalt shingle waste comprises:

5% to 95% by weight of the waste asphalt based on a total weight of the asphalt shingle waste.

24. The composition of claim 19, wherein the at least one filler material comprises limestone, granules, and impurities.

25. A composition comprising:

5% to 50% by weight of an asphalt shingle waste based on a total weight of the composition, wherein the asphalt shingle waste comprises 5% to 95% by weight of a waste asphalt based on a total weight of the asphalt shingle waste;

1% to 25% by weight of at least one filler material based on the total weight of the composition;

1% to 15% by weight of at least one polymer based on the total weight of the composition;

1% to 10% by weight of at least one stabilizer based on the total weight of the composition; and 1% to 15% by weight of at least one surfactant based on the total weight of the composition.

26. The composition of claim 25, wherein the composition comprises:

15% to 35% by weight of the asphalt shingle waste based on the total weight of the composition;

1% to 10% by weight of the at least one filler material based on the total weight of the composition; and 1% to 10% by weight of the at least one surfactant based on the total weight of the composition.

27. The composition of claim 25, wherein the at least one stabilizer comprises at least one of a microcrystalline cellulose, a xanthan gum, a carboxymethyl cellulose (CMC), an alginate, a pectin, a guar gum, or any combination thereof.

28. The composition of claim 25, wherein the composition is substantially free of a non-waste asphalt.

29. The composition of claim 25, wherein the composition is free of a non-waste asphalt.

30. The composition of claim 25, wherein the at least one filler material comprises limestone, granules, and impurities.

* * * * *